US008023599B2

(12) United States Patent
Tanaka et al.

(10) Patent No.: US 8,023,599 B2
(45) Date of Patent: Sep. 20, 2011

(54) INTERFERING SIGNAL CHARACTERIZING QUANTITY STORING METHOD AND DEVICE, INTERFERING SIGNAL CHARACTERIZING QUANTITY ACQUIRING METHOD AND DEVICE, AND INTERFERING SIGNAL SUPPRESSING METHOD AND DEVICE

(75) Inventors: Koichiro Tanaka, Hyogo (JP); Naganori Shirakata, Osaka (JP); Yoshio Urabe, Nara (JP); Tsutomu Mukai, Osaka (JP); Kenji Miyanaga, Osaka (JP); Koji Imamura, Osaka (JP); Shuya Hosokawa, Osaka (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 12/064,421

(22) PCT Filed: Oct. 23, 2006

(86) PCT No.: PCT/JP2006/321039
§ 371 (c)(1),
(2), (4) Date: Feb. 21, 2008

(87) PCT Pub. No.: WO2007/049547
PCT Pub. Date: May 3, 2007

(65) Prior Publication Data

US 2009/0135972 A1 May 28, 2009

(30) Foreign Application Priority Data

| | | | |
|---|---|---|---|
| Oct. 24, 2005 | (JP) | ................................ | 2005-308157 |
| Dec. 9, 2005 | (JP) | ................................ | 2005-355828 |
| Mar. 30, 2006 | (JP) | ................................ | 2006-094894 |
| Mar. 31, 2006 | (JP) | ................................ | 2006-098781 |
| May 10, 2006 | (JP) | ................................ | 2006-131321 |
| Jun. 20, 2006 | (JP) | ................................ | 2006-170011 |
| Jul. 11, 2006 | (JP) | ................................ | 2006-190600 |

(51) Int. Cl.
*H04B 7/10* (2006.01)

(52) U.S. Cl. ......... 375/347; 375/267; 455/132; 455/296

(58) Field of Classification Search .................. 375/347, 375/267; 455/132, 296
See application file for complete search history.

(56) References Cited

U.S. PATENT DOCUMENTS 5,329,242 A * 7/1994 Myers ........................... 329/300
(Continued)

FOREIGN PATENT DOCUMENTS

JP 10-004391 1/1998
(Continued)

OTHER PUBLICATIONS

International Search Report mailed Jan. 16, 2007 for International Application No. PCT/JP2006/321039.

(Continued)

*Primary Examiner* — Juan A Torres
(74) *Attorney, Agent, or Firm* — Wenderoth, Lind & Ponack, L.L.P.

(57) ABSTRACT

Interfering signals coming at random timings from different radio stations are identified. In order to attain this, a method for storing the characterizing quantity of an interfering signal included in a received signal includes calculating the characterizing quantity of the received signal, determining a probability that a desired signal is included in the received signal, determining that the received signal is an interfering signal when determining that there is no probability that the desired signal is included in the received signal, and storing the characterizing quantity of the received signal as an interfering signal characterizing quantity when it is determined at the received signal determination step that there is no probability that the desired signal is included in the received signal.

16 Claims, 59 Drawing Sheets

U.S. PATENT DOCUMENTS

| | | | | |
|---|---|---|---|---|
| 5,537,443 | A * | 7/1996 | Yoshino et al. | 375/340 |
| 5,729,576 | A * | 3/1998 | Stone et al. | 375/334 |
| 6,052,421 | A * | 4/2000 | Richardson et al. | 375/346 |
| 6,697,633 | B1 * | 2/2004 | Dogan et al. | 455/509 |
| 6,968,023 | B2 * | 11/2005 | Aoyama et al. | 375/346 |
| 7,366,471 | B1 * | 4/2008 | Kitchin | 455/63.1 |
| 2003/0016174 | A1 * | 1/2003 | Anderson | 342/378 |

FOREIGN PATENT DOCUMENTS

| | | |
|---|---|---|
| JP | 2920131 | 4/1999 |
| JP | 2002-374179 | 12/2002 |
| JP | 2003-258763 | 9/2003 |
| JP | 2004-112058 | 4/2004 |
| JP | 2004-147079 | 5/2004 |
| JP | 2004-180156 | 6/2004 |
| JP | 2006-340312 | 12/2006 |

OTHER PUBLICATIONS

Shuya Hosokawa, Naganori Shirakata, Koji Imamura, Kenji Miyanaga, Koichiro Tanaka, "Takyoku Kansho o Yokuatsu suru Musen OFDM Jushin Hoho no Kento", 2005, Nen lEICE Communications Society Conference Koen Ronbunshu 1, Sep. 7, 2005. p. 589.

* cited by examiner

F I G. 1
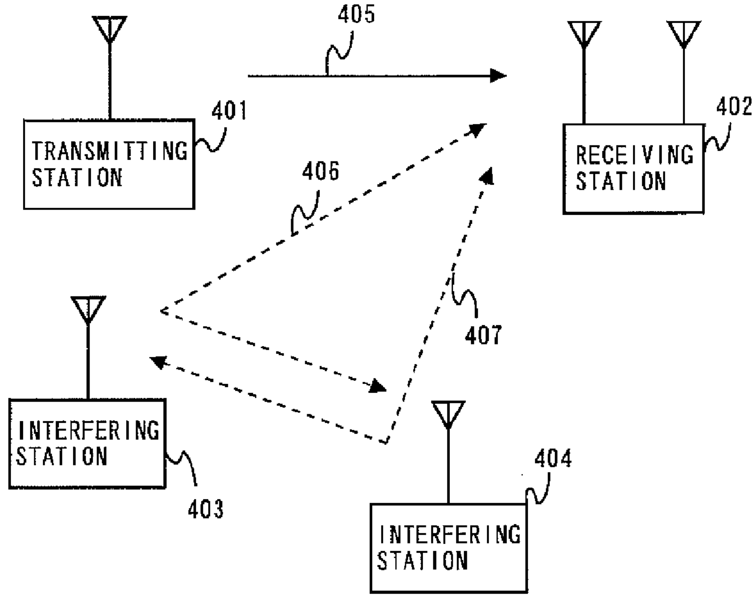
F I G. 2
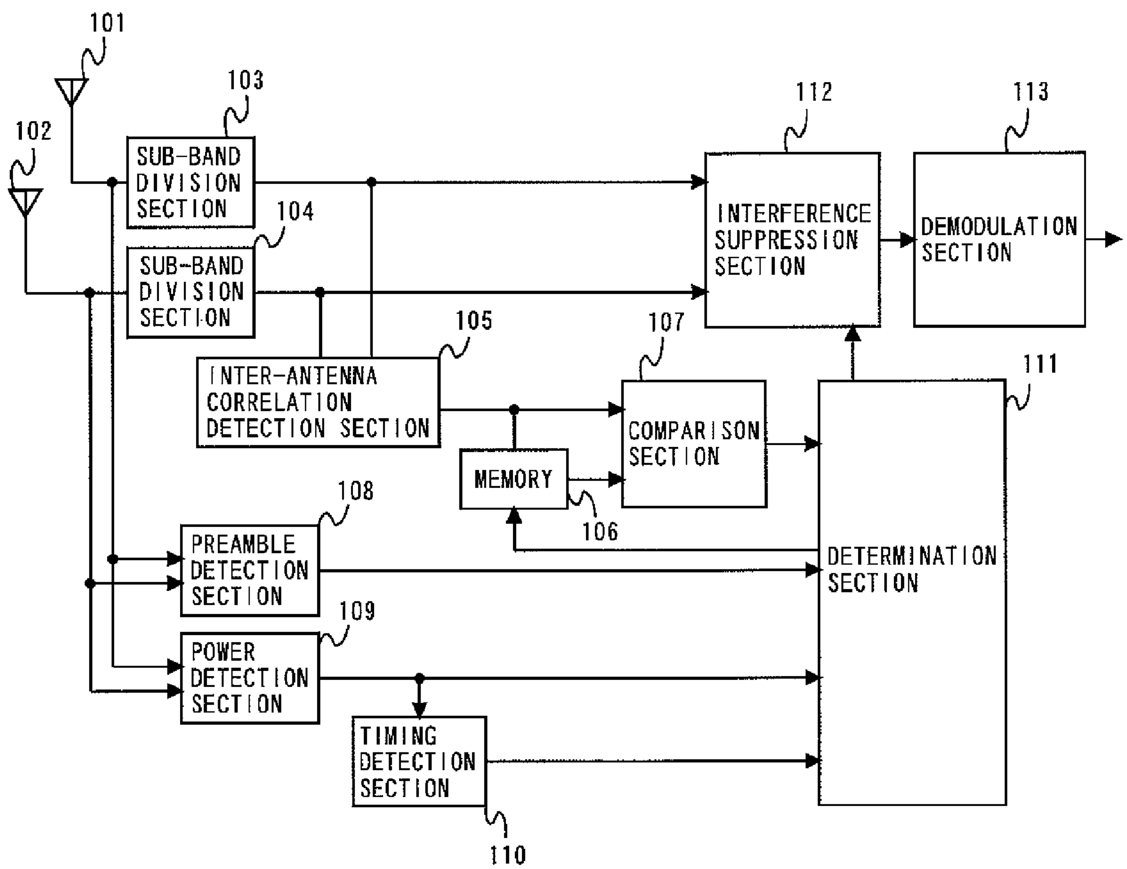

F I G. 8
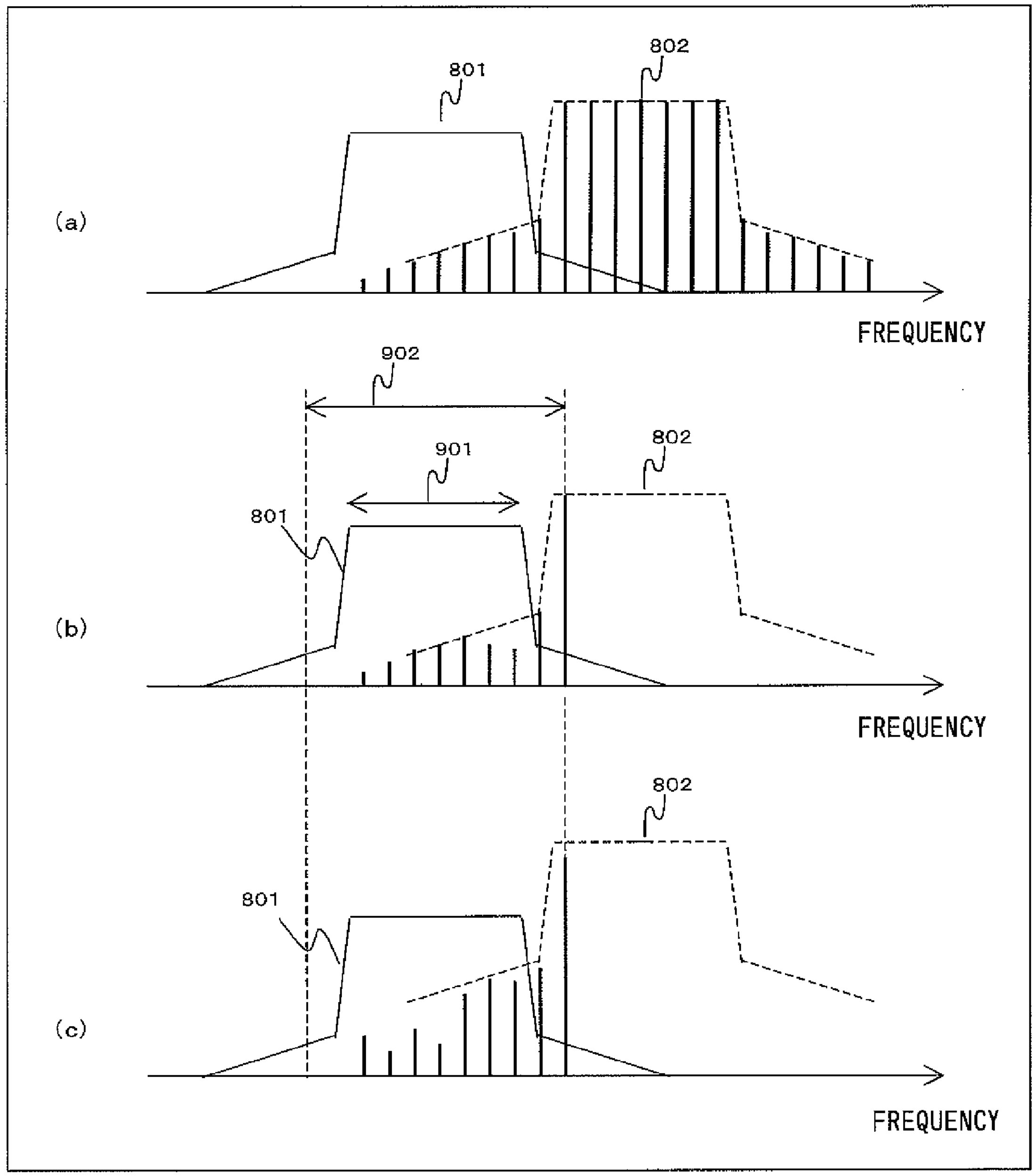

F I G. 9
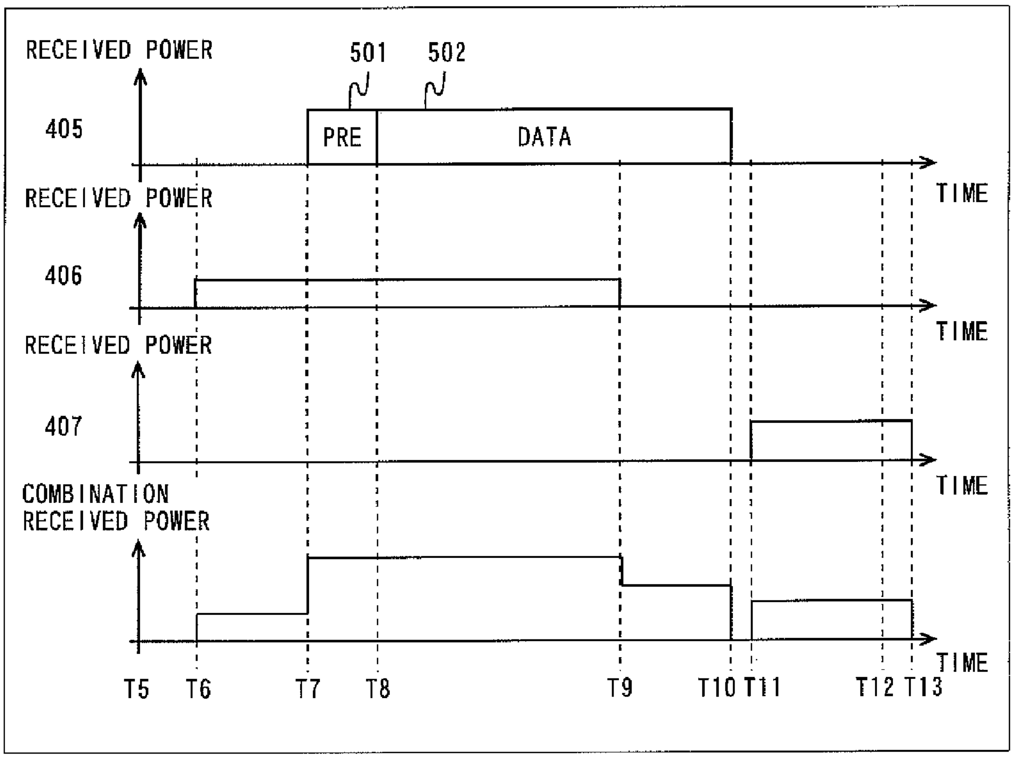
F I G. 10
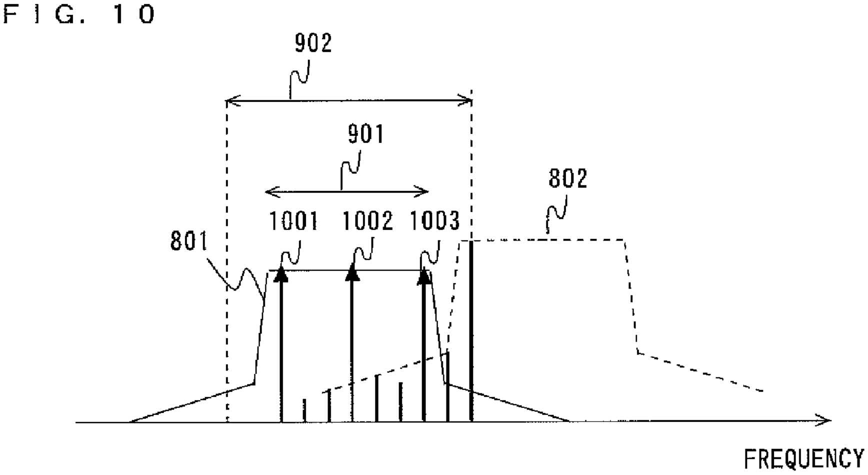

F I G. 1 1
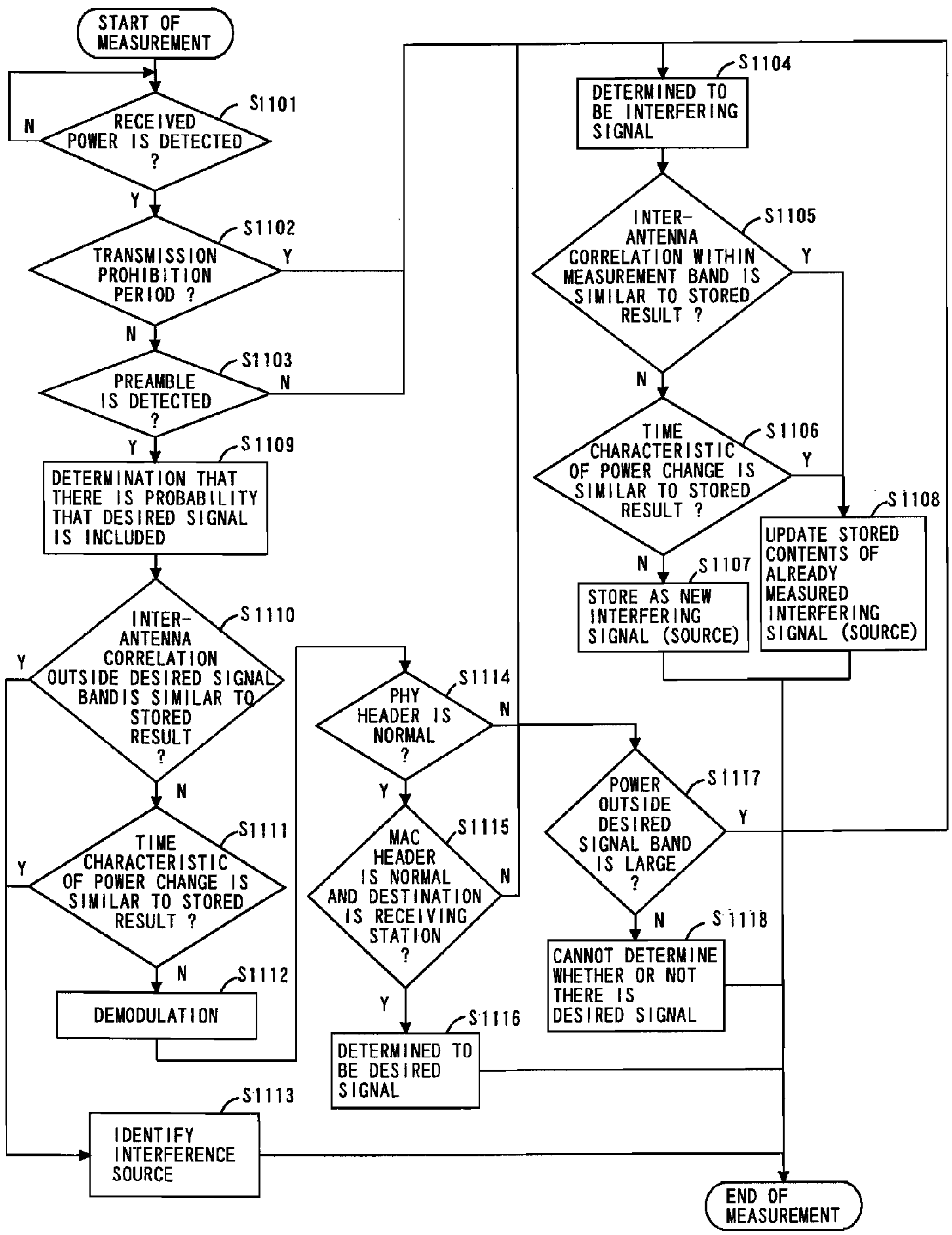

F I G. 1 3
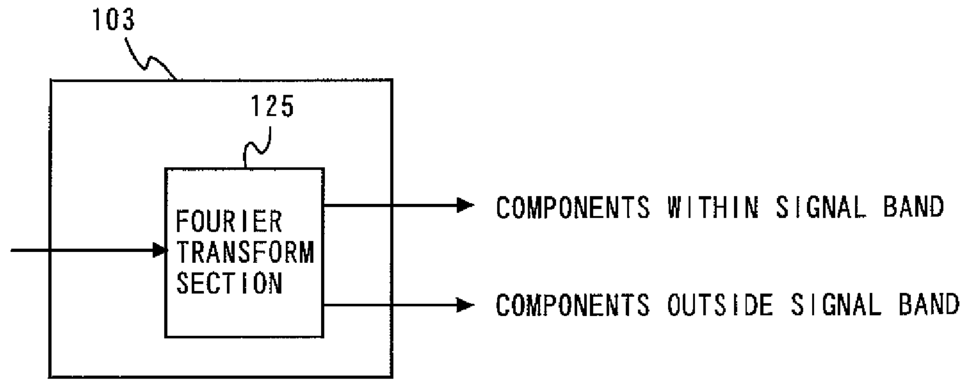
F I G. 1 4
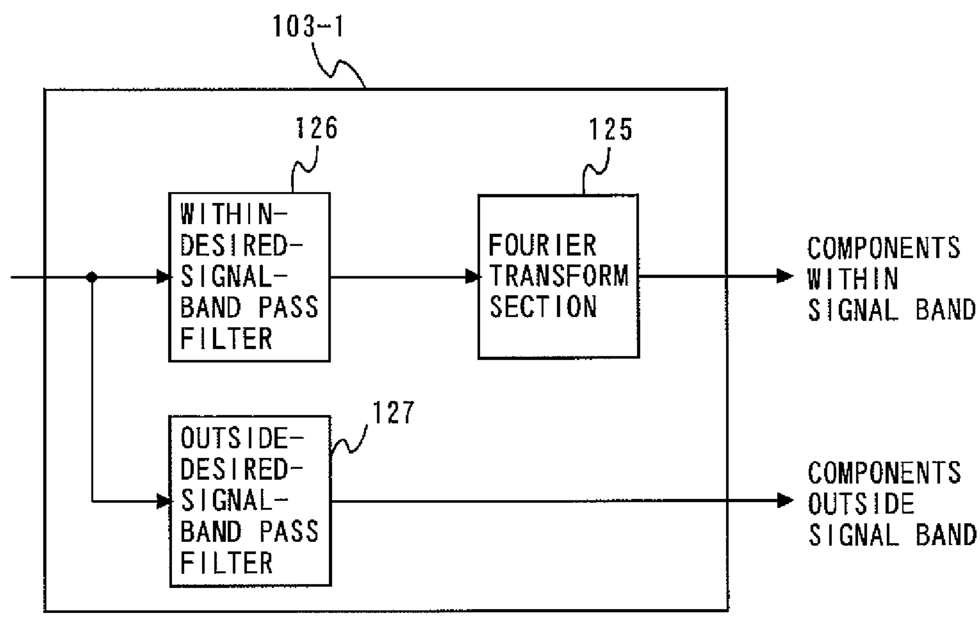

F I G. 2 1
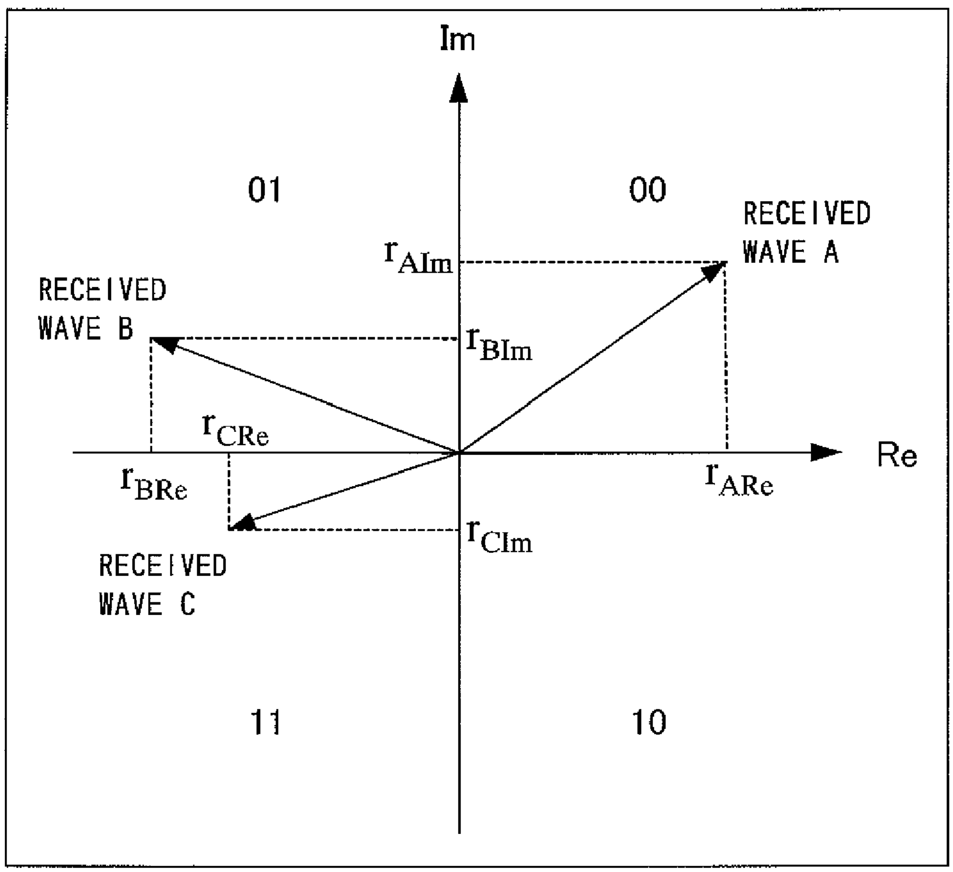

F I G. 2 5
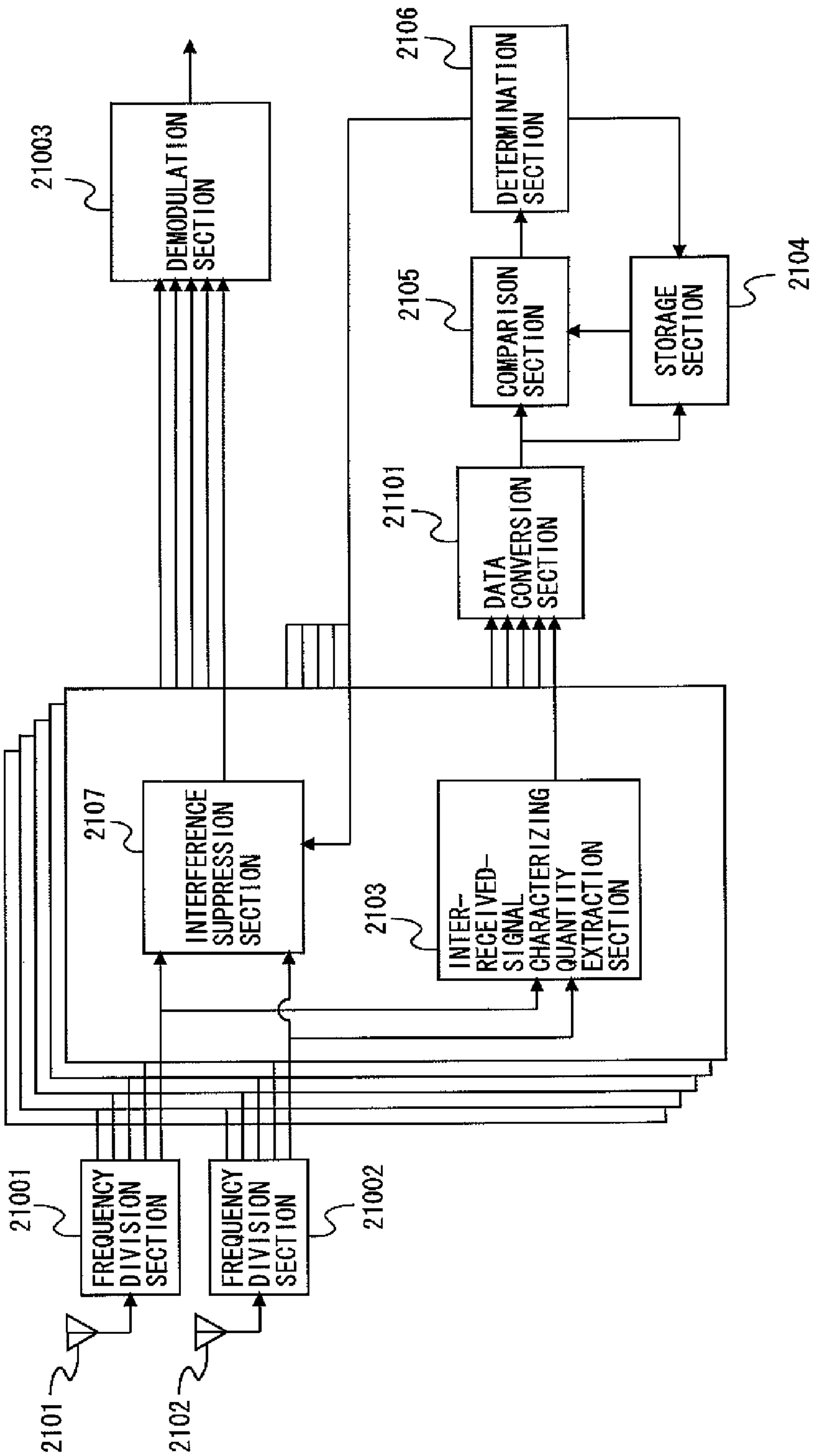

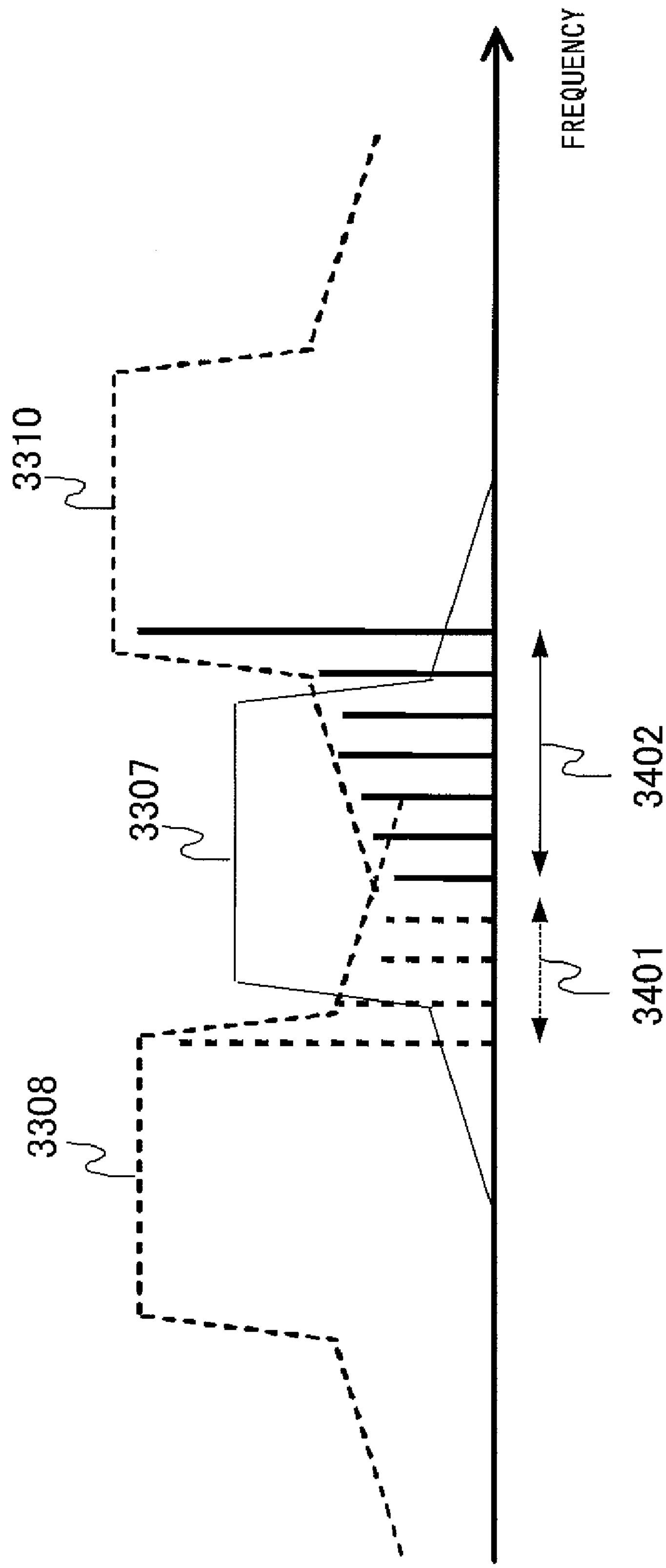
F I G. 2 8

FIG. 38

| (a) … | (b) … | (c) … | (d) … |
|---|---|---|---|
| FIRST INTERFERING STATION | CHARACTERIZING QUANTITY | SECOND INTERFERING STATION | CHARACTERIZING QUANTITY |
| A | $W_A$ | B | $W_B$ |
| B | $W_B$ | A | $W_A$ |
| C | $W_A$ | D | $W_D$ |
| D | $W_C$ | C | $W_C$ |

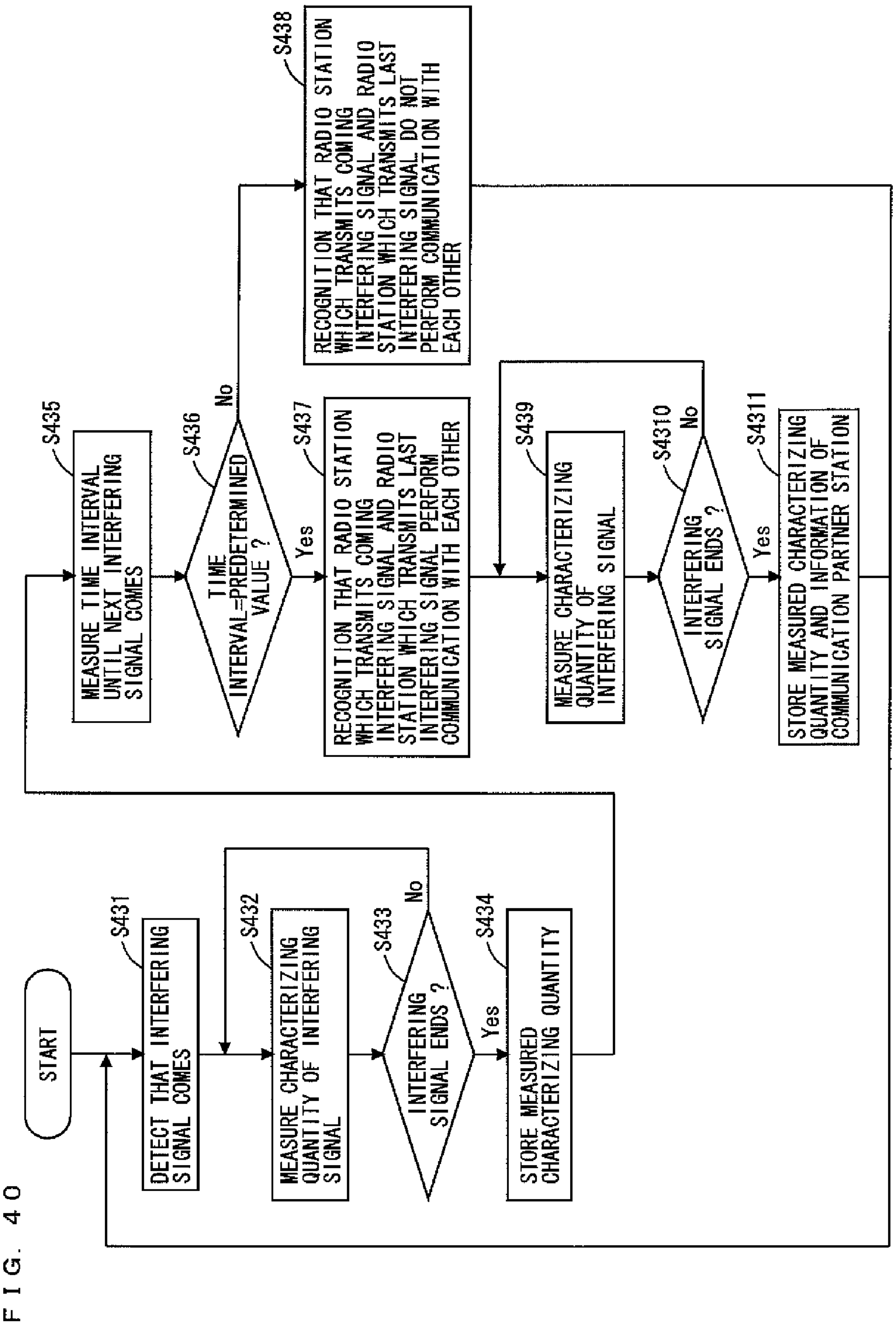
F I G. 4 0

F I G. 4 3

| (a) FIRST INTERFERING STATION | (b) CHARACTERIZING QUANTITY | (c) SECOND INTERFERING STATION | (d) CHARACTERIZING QUANTITY |
|---|---|---|---|
| A | $W_A$ | B | $W_B$ |
| B | $W_B$ | A | $W_A$ |
| A | $W_A$ | C | $W_C$ |
| D | $W_C$ | A | $W_A$ |

F I G. 45

| FIRST INTERFERING STATION (a) | CHARACTERIZING QUANTITY (b) | SECOND INTERFERING STATION (c) | CHARACTERIZING QUANTITY (d) |
|---|---|---|---|
| A | $W_A$ | B | $W_B$ |
| B | $W_B$ | A | $W_A$ |
| A | $W_A$ | C | $W_C$ |
| C | $W_C$ | A | $W_A$ |
| A | $W_A$ | A | $W_A$ |

F I G. 47
| FIRST INTERFERING STATION (a) | CHARACTERIZING QUANTITY (b) | SECOND INTERFERING STATION (c) | CHARACTERIZING QUANTITY (d) |
|---|---|---|---|
| A | $W_A$ | B | $W_B$ |
| B | $W_B$ | A | $W_A$ |
| A | $W_A$ | C | $W_C$ |
| C | $W_C$ | A | $W_A$ |
| A | $W_A$ | A | $W_A$ |
| A | $W_B$ | A | $W_B$ |
F I G. 48
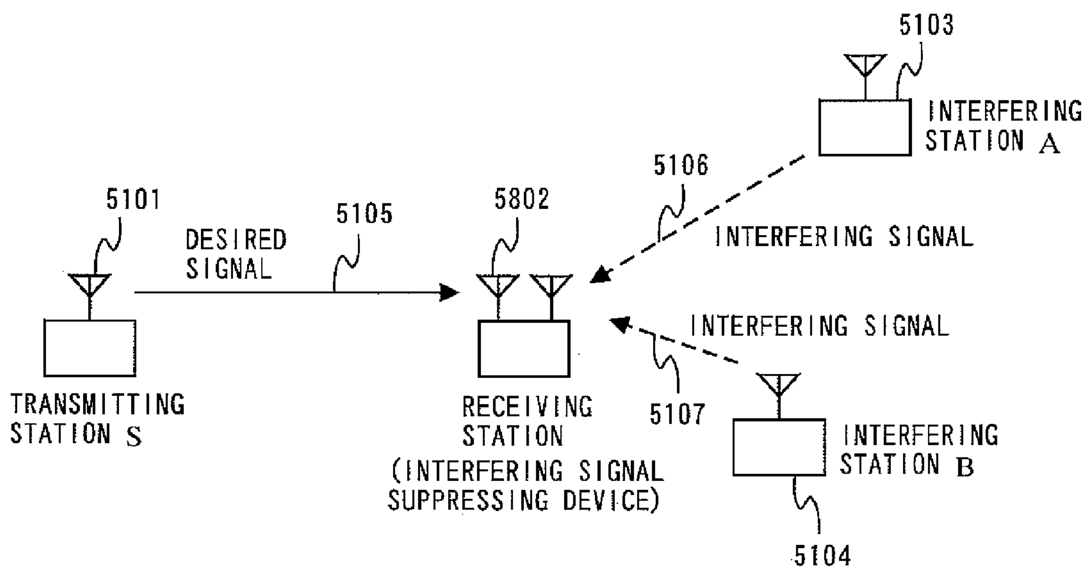

F I G. 5 1
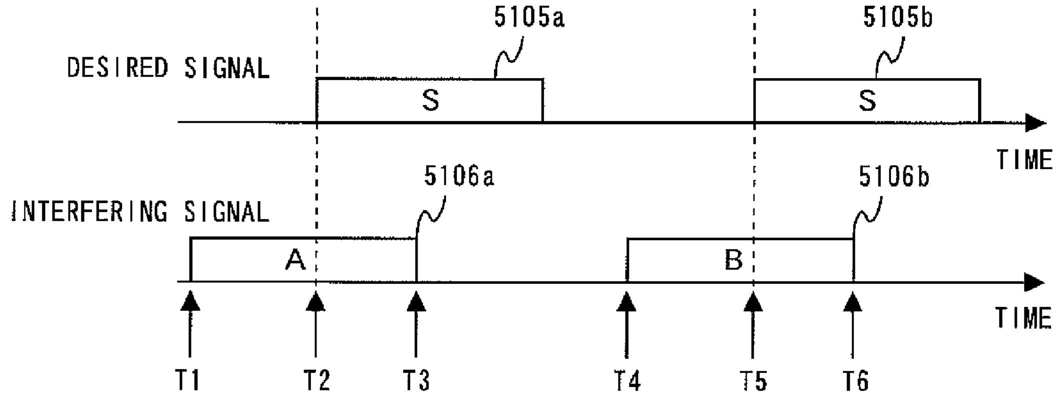
F I G. 5 2
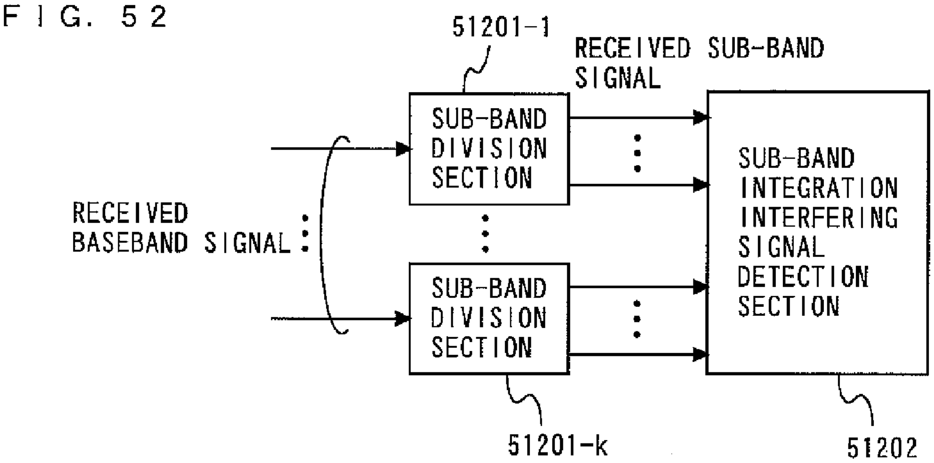
F I G. 5 3
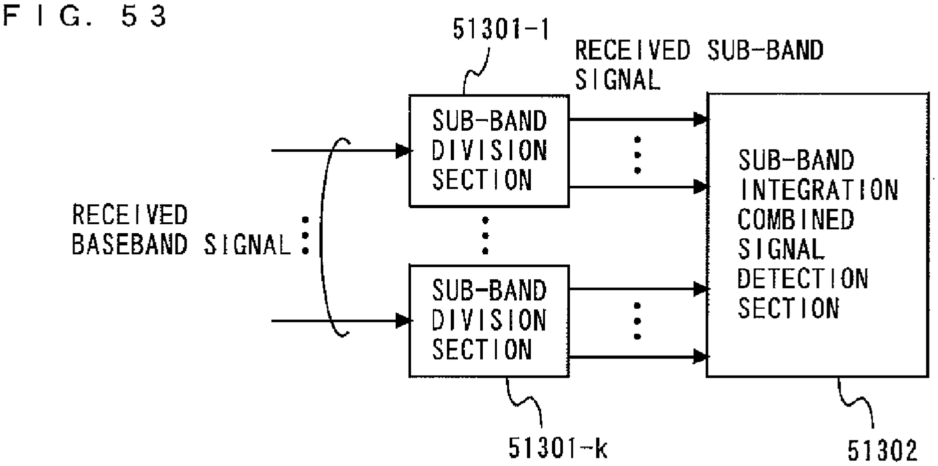

FIG. 54

| (a) INTERFERING STATION | (b) CHARACTERIZING QUANTITY |
|---|---|
| A | $W_A$ |
| B | $W_B$ |
| S + A | $W_{S+A}$ |
| S + B | $W_{S+B}$ |

F I G. 5 5
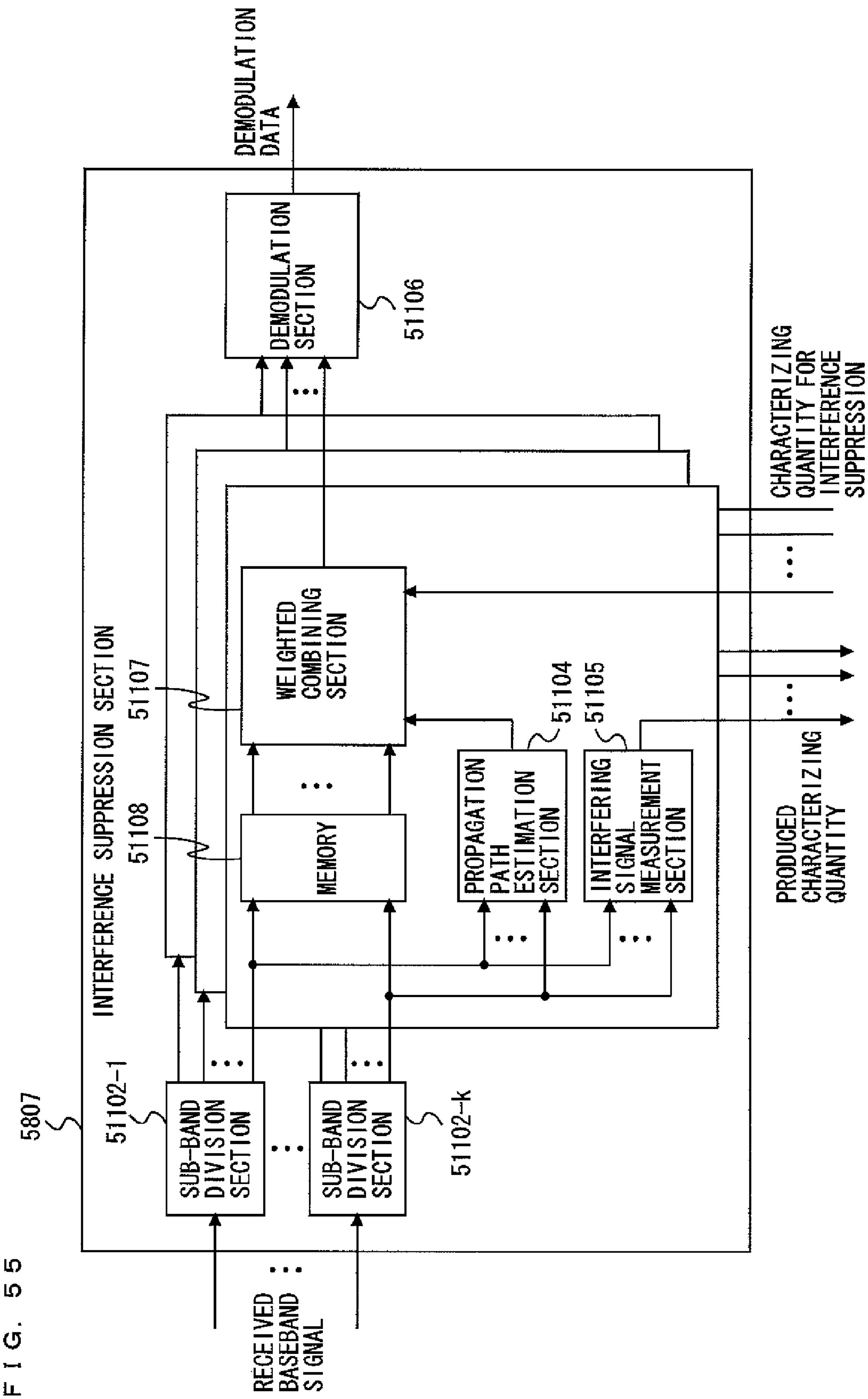

F I G. 5 7
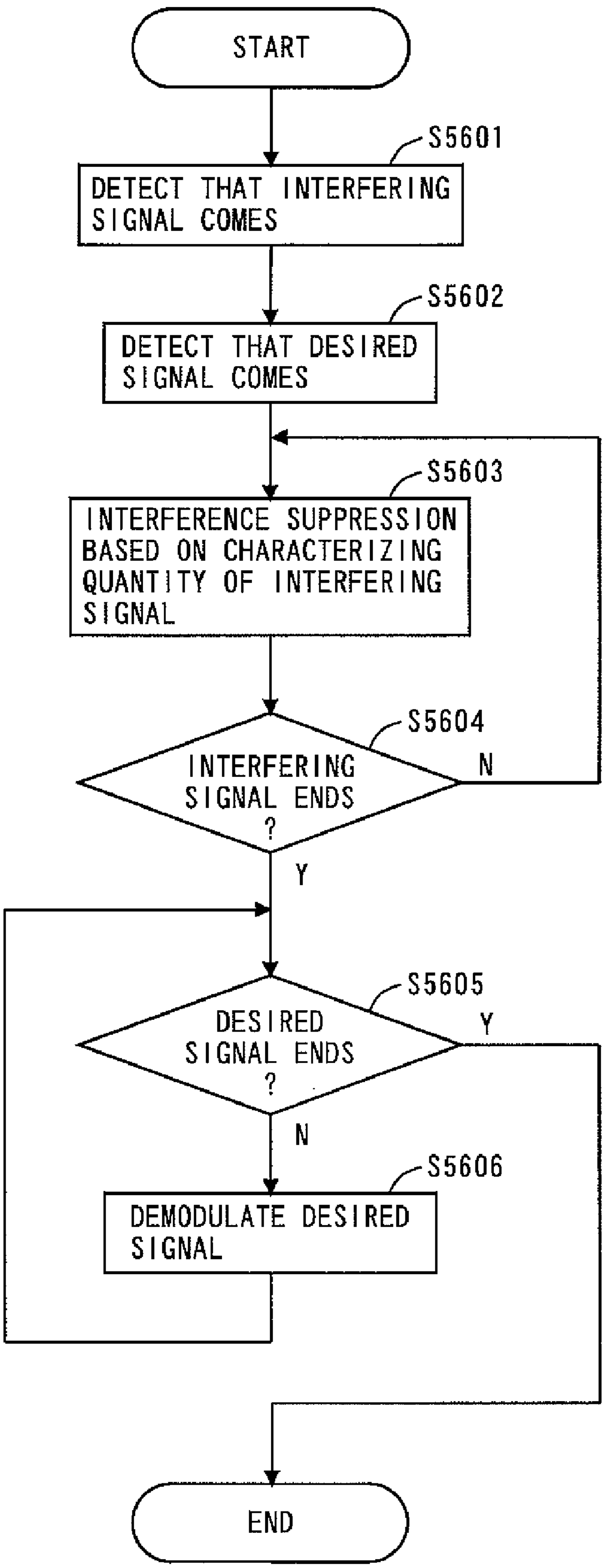

F I G. 7 0
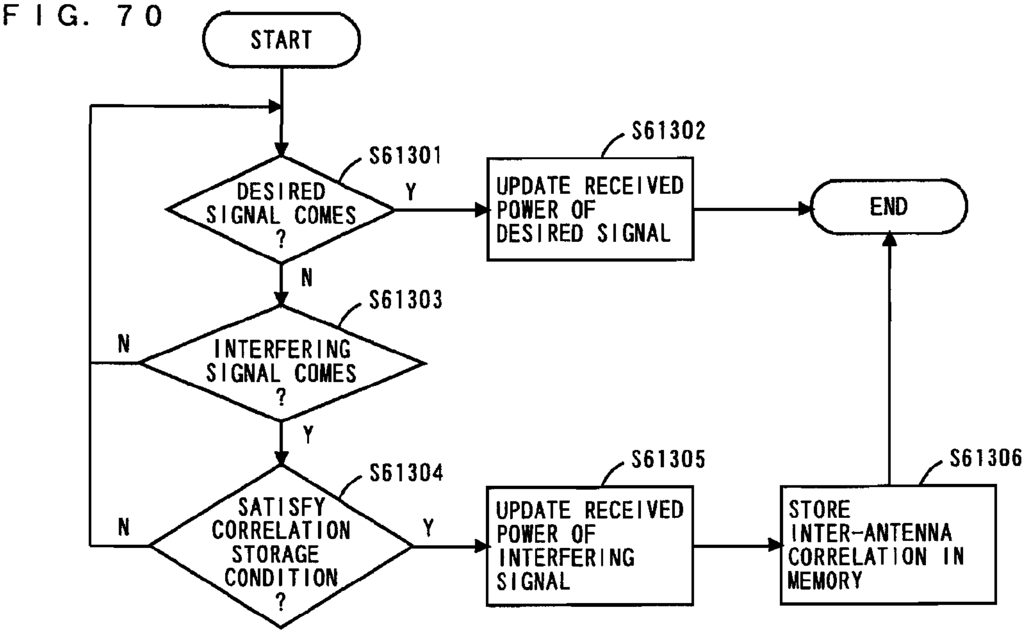
F I G. 7 1
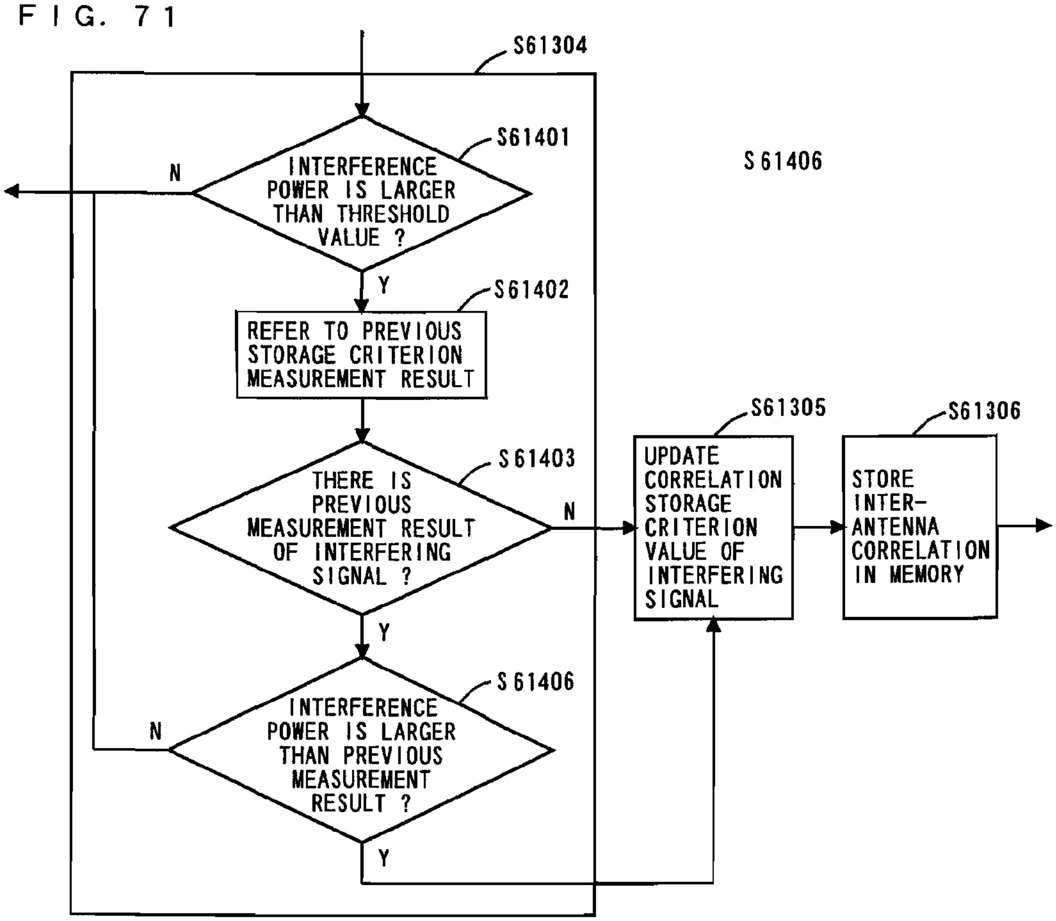

F I G. 7 2
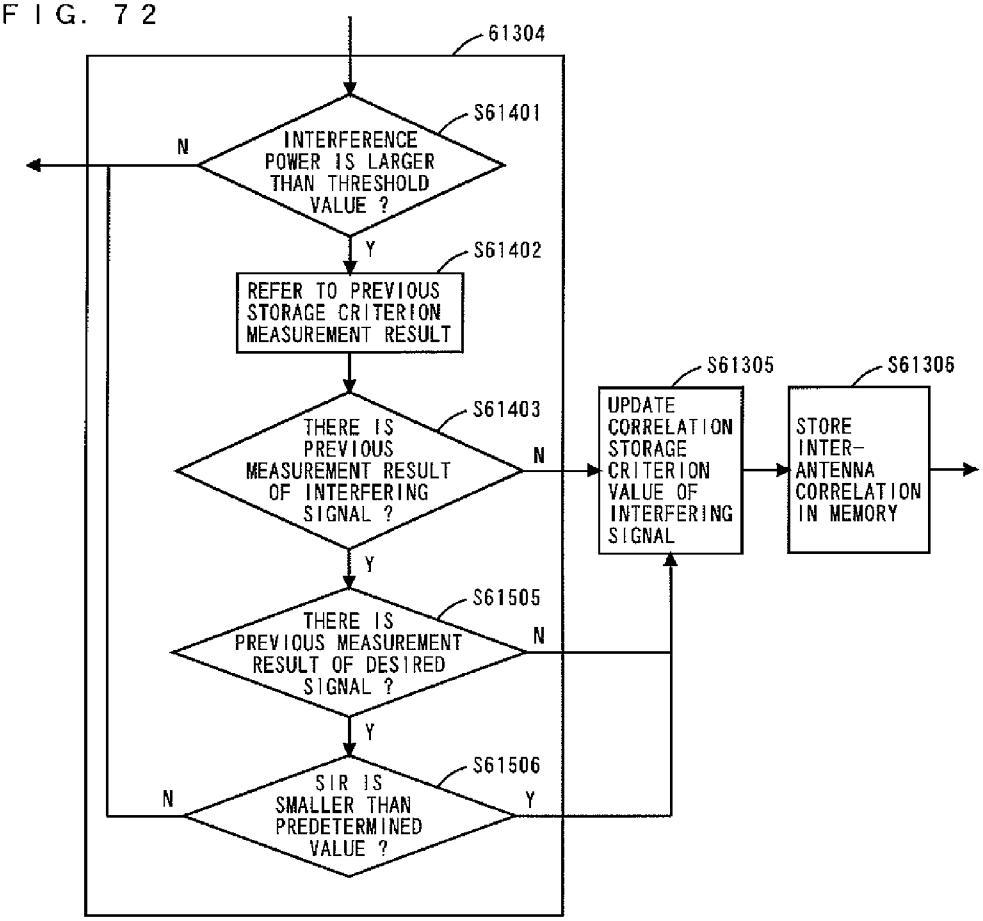
F I G. 7 3
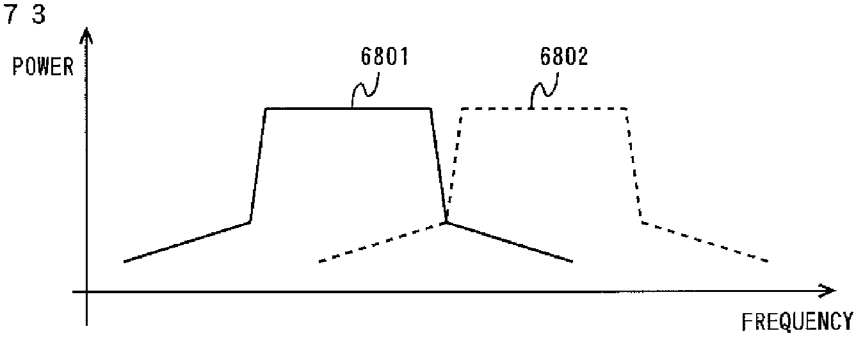
F I G. 7 4
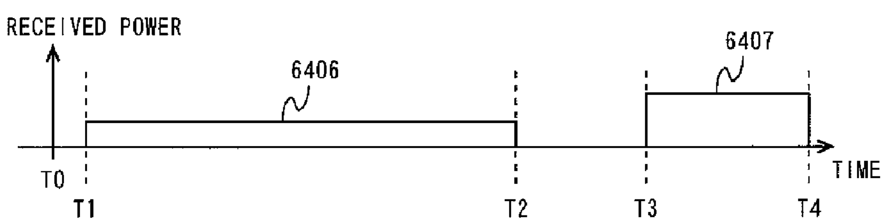

F I G. 7 7
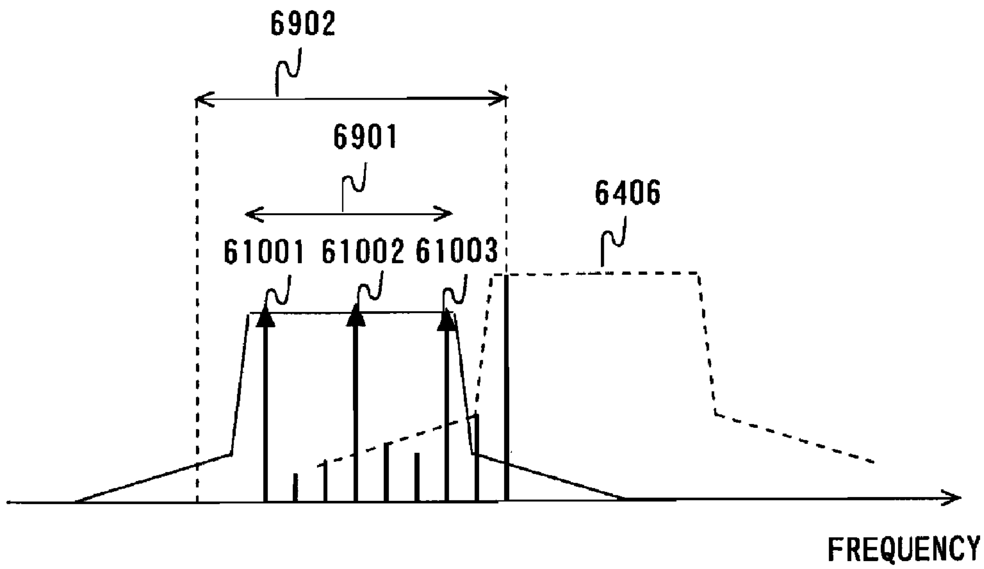
F I G. 7 8
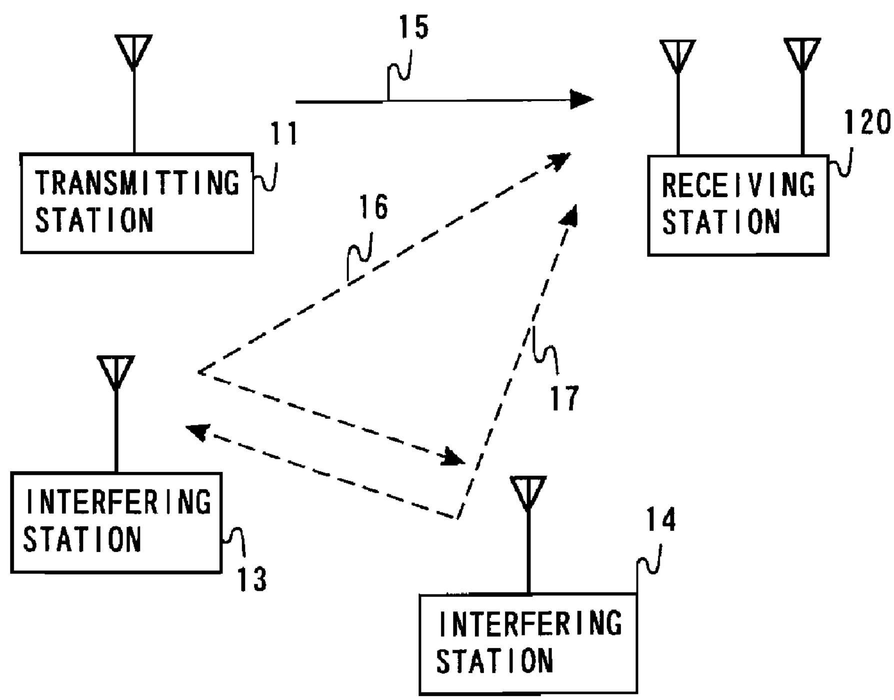

INTERFERING SIGNAL CHARACTERIZING QUANTITY STORING METHOD AND DEVICE, INTERFERING SIGNAL CHARACTERIZING QUANTITY ACQUIRING METHOD AND DEVICE, AND INTERFERING SIGNAL SUPPRESSING METHOD AND DEVICE

TECHNICAL FIELD

The present invention relates to an interfering signal suppressing technique used in a radio communication system, and in particular, to an interfering signal storing method and device, an interfering signal characterizing quantity acquiring method and device, and an interfering signal suppressing method and device for identifying an interfering signal used for communication between radio stations, which is irrelative to communication with their station.

BACKGROUND ART

In a radio communication system such as a wireless local area network (LAN) system, a digital cellular communication system, or the like, a plurality of radio stations shares a predetermined frequency band to perform communication. Thus, a signal which is received by a receiving station includes not only a signal (a desired signal) the destination of which is the receiving station but also a signal (an interfering signal) used for communication between radio stations which is irrelative to communication with the receiving station. These signals overlap with each other to generate a combined signal.

FIG. 78 illustrates an example of a radio communication system including a plurality of radio stations. The radio communication system in FIG. 78 includes a transmitting station 11, a receiving station 120, and interfering stations 13 and 14. The transmitting station 11 performs communication with the receiving station 120, and the interfering station 13 performs communication with the interfering station 14.

The transmitting station 11 converts into a radio signal 15 transmission data, the destination of which is the receiving station 120, and transmits the radio signal 15. The receiving station 120 receives and demodulates the radio signal 15 to obtain the transmission data from the transmitting station 11. By these operations, communication is performed between the transmitting station 11 and the receiving station 120.

On the other hand, the interfering station 13 transmits a radio signal 16, the destination of which is the interfering station 14, and the interfering station 14 receives it. Also, the interfering station 14 transmits a radio signal 17, the destination of which is the interfering station 13, and the interfering station 13 receives it.

Here, when a timing of transmitting the radio signal 15 overlaps with a timing of transmitting the radio signal 16 or 17, the receiving station 120 receives a combined signal into which the radio signal 16 or 17 overlaps with the radio signal 15, which is a desired signal.

In the case of receiving the signal into which the interfering signal overlaps with the desired signal, a probability that demodulation error of the desired signal occurs due to an effect of the interfering signal depends on an SIR (desired signal power to interfering signal power ratio) at the receiving station. For example, in the case where the transmitting timings of the transmitting station 11 and the interfering station 13 overlap with each other, if the distance between the interfering station 13 and the receiving station 120 is large in comparison with the distance between the transmitting station 11 and the receiving station 120 and if the received power of the interfering signal is sufficiently small at the receiving station 120 in comparison with the received power of the desired signal, the probability that demodulation error of the desired signal occurs is low. On the other hand, if the distance between the interfering station 13 and the receiving station 120 is small in comparison with the distance between the transmitting station 11 and the receiving station 120 and if the received power of the interfering signal is large at the receiving station 120 in comparison with the received power of the desired signal, the probability that demodulation error of the desired signal occurs is high.

The effect which the interfering signal has on the desired signal depends on channel frequencies of the desired signal and the interfering signal. In the case where the channel frequency of the radio signal 15 is the same as that of the radio signal 16 or 17, since the effect of the interfering signal is large, the probability that demodulation error of the desired signal occurs is high. On the other hand, in the case where the channel frequency of the radio signal 15 is different from that of the radio signal 16 or 17, the effect of the interfering signal is small. However, a radio signal is a broadband signal, and when a leakage power to outside the channel frequency band becomes large, such as the case where nonlinear distortion by a transmitting power amplifier occurs, or the like, the probability that demodulation error of the desired signal due to the effect of the interfering signal is high similarly as in the case of the same channel.

It is considered that the interfering station 13 and the interfering station 14 are included in a system different from that including the transmitting station 11 and the receiving station 120. For example, radio waves used by a wireless LAN system, a Bluetooth system, a cordless phone system, and the like are mixed in a 2.4 GHz band. Further, a microwave oven or the like which emits a leakage radio wave is not a radio station but exists as a generation source of a leakage radio wave, and such a leakage radio wave can be considered as an interfering signal. In a 5 GHz band, radio waves used by a wireless LAN system, a wireless access system, a radar, and the like are mixed.

In eliminating such an interfering signal from the received signal, the interfering signal is measured or presumed, and which interfering station the interfering signal overlapped with the desired signal is transmitted from is determined, thereby efficiently eliminating the interfering signal.

Patent Document 1 is provided as a conventional technique to eliminate the interfering signal from the received signal.

FIG. 79 illustrates a configuration of an interfering signal eliminator in the Patent Document 1. The interfering signal eliminator corresponds to the receiving station 120 in FIG. 78. The interfering signal eliminator comprises an interfering signal estimation section 201, an interfering signal extraction section 202, an adder 203, a memory 204, and a timing control section 205. The interfering signal eliminator assumes that a desired signal is a broadband signal while an interfering signal is a narrowband signal coming periodically. The interfering signal eliminator estimates and eliminates a narrowband signal (an interfering signal) which periodically overlaps with the desired signal. When the received power changes at constant intervals while the broadband signal is received, the interfering signal eliminator determines that the interfering signal overlaps with the broadband signal.

The interfering signal estimation section 201 estimates the interfering signal included in the received signal based on the received signal and the result of elimination of the interfering signal from the received signal. At this time, the interfering signal estimation section 201 uses a previous estimation result stored in the memory 204 as an initial value for an estimation value of this time, repeatedly performs calculation until the estimation value converges, thereby calculating a new estimation result. Interfering signal elimination means constituted of the interfering signal extraction section 202 and the adder 203 regards the estimation result calculated by the interfering signal estimation section 201 as a power level of the interfering signal, and eliminates the interfering signal from the received signal. Interfering signal estimation control means constituted of the memory 204 and the timing control section 205 stores the current estimation result of the interfering signal estimation section 201. The stored estimation result is used for estimation of the next interfering signal.

In the case where interfering signals come with a constant voltage and at known intervals as shown in FIG. 80, the interfering signal eliminator of the Patent Document 1 estimates the interfering signal based on a power difference between the received signal and the desired signal, and uses the estimation result for the next interfering signal estimation. Thus, the interfering signal eliminator can efficiently estimate and eliminate interfering signals which have constant packet lengths and come at a constant interval like a time division multiplex access (TDMA) signal.

[Patent Document 1] Japanese Laid-open Patent Publication No. 2002-374179

SUMMARY OF THE INVENTION

Problems to be Solved by the Invention

However, since the interfering signal eliminator of the Patent Document 1 is a device which eliminates interfering signals which have constant packet lengths and come at a constant interval, it is difficult for the interfering signal eliminator to estimate and eliminate interfering signals which come at random timings. For example, in a communication system using a CSMA/CA (Carrier Sense Multiple Access with Collision Avoidance) method of the IEEE802.11 standard as an access method, each radio station does not periodically transmit packets, and the packet lengths are not constant. Thus, it is hard to apply the interfering signal eliminator of the Patent Document 1 to the communication system of the CSMA/CA method.

An object of the present invention, which has been made in view of such a situation, is to provide an interfering signal characterizing quantity storing method and device, an interfering signal characterizing quantity acquiring method and device, and an interfering signal suppressing method and device which can identify the interfering signal sources of even interfering signals which come at random timings and have different packet lengths, thereby contributing to interfering signal suppression with high accuracy.

Solution to the Problems

Positions of an interfering signal characterizing quantity storing method and device, an interfering signal characterizing quantity acquiring method and device, and an interfering signal suppressing method and device according to the present invention with respect to each other will be described.

The interfering signal characterizing quantity storing method and device are a method and a device for measuring in advance the characterizing quantity of an interfering signal at a receiving station before an interfering signal comes to the receiving station so as to overlap with a desired signal, and storing the characterizing quantity.

The interfering signal characterizing quantity acquiring method and device are a method and device for appropriately selecting a characterizing quantity, which is to be used for interfering signal suppression, from a plurality of characterizing quantities stored by the interfering signal characterizing quantity storing method and device when the interfering signal comes to the receiving station so as to overlap with the desired signal, in order to suppress the interfering signal and demodulate the desired signal correctly.

The interfering signal suppressing method and device are a method and a device for appropriately suppressing an interfering signal by using the characterizing quantity obtained by the interfering signal characterizing quantity acquiring method and device in order to demodulate the desired signal correctly.

An interfering signal characterizing quantity storing method according to the present invention for storing a characterizing quantity of an interfering signal included in a received signal, comprises:

characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal; and an interfering signal characterizing quantity storage step of storing the characterizing quantity of the received signal as an interfering signal characterizing quantity when it is determined at the received signal determination step that there is no probability that the desired signal is included in the received signal.

According to the present invention, the characterizing quantity of the received signal is measured, and the measurement result is stored as the interfering signal characterizing quantity at the time when it is determined that the received signal is not the desired signal. By storing the interfering signal characterizing quantity, it is possible to identify the interfering signal sources of the interfering signals which come at random timings and have inconstant packet lengths, thereby contributing to interfering signal suppression with high accuracy.

In the present invention, preferably, the interfering signal characterizing quantity storing method further comprises:

a criterion value setting step of setting a criterion value which is a criterion for determining whether or not the interfering signal becomes a deterioration factor for a reception characteristic of the desired signal;

a comparison object value calculation step of calculating a comparison object value concerning the interfering signal, which is a comparison object for the criterion value, when it is detected that the interfering signal comes; and a significant interfering signal determination step of determining whether or not the interfering signal is an interfering signal which becomes the deterioration factor for the reception characteristic of the desired signal based on the criterion value and the comparison object value when it is detected that the interfering signal comes, and at the interfering signal characterizing quantity storage step, the characterizing quantity of the interfering signal is stored when it is determined at the significant interfering signal determination step that the interfering signal is the interfering signal which becomes the deterioration factor for the reception characteristic of the desired signal.

According to this configuration, when it is determined that the currently received interfering signal becomes the deterioration factor for the reception characteristic of the desired signal, the characterizing quantity of the interfering signal is stored. Thus, a load on the memory becomes small, and the characterizing quantity of the interfering signal, which becomes the deterioration factor for the reception characteristic of the desired signal, can be preferentially stored.

An interfering signal characterizing quantity acquiring method according to the present invention for acquiring a characterizing quantity of an interfering signal included in a received signal comprises:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

an interfering signal characterizing quantity storage step of storing the characterizing quantity of the received signal as an interfering signal characterizing quantity when it is determined at the received signal determination step that there is no probability that the desired signal is included in the received signal;

a similarity calculation step of calculating a similarity between the characterizing quantity of the received signal and the interfering signal characterizing quantity stored at the characterizing quantity storage step when it is determined at the received signal determination step that there is the probability that the desired signal is included in the received signal; and an interfering signal characterizing quantity selection step of selecting an interfering signal characterizing quantity having the highest similarity from a plurality of the stored interfering signal characterizing quantities when there are interfering signal characterizing quantities having similarities, which are equal to or higher than a predetermined value, among the stored interfering signal characterizing quantities.

According to the present invention, the characterizing quantity of the received signal is measured, and the measurement result is stored as the interfering signal characterizing quantity at a time when it is determined that the received signal is not the desired signal. Also, when a signal is newly received, a similarity between the characterizing quantity of the received signal and the stored characterizing quantity of the interfering signal is calculated. A characterizing quantity having the highest similarity is selected from the stored interfering signal characterizing quantities. By this selection, the interfering signal which overlaps with the desired signal can be identified for each interfering station. Thus, it is possible to identify the interfering signal sources of the interfering signals which come at random timings and have inconstant packet lengths, thereby contributing to interfering signal suppression with high accuracy.

In the present invention, preferably, the characterizing quantity is a correlation value between signals which are concurrently received by a plurality of antennas.

According to this configuration, since the inter-antenna correlation value is used as the characterizing quantity, interfering signal suppression can be performed with higher accuracy.

In the present invention, preferably, the interfering signal characterizing quantity acquiring method further comprises a step of dividing the received signal into a plurality of sub-bands, and at the characterizing quantity calculation step, the characterizing quantity of the received signal is calculated for each sub-band.

According to this configuration, since the characterizing quantity is calculated for each sub-band, interfering signal suppression can be performed with higher accuracy.

In the present invention, preferably, the interfering signal characterizing quantity acquiring method further comprises:

a first time interval measurement step of measuring a time interval from an end of the interfering signal to a time when another interfering signal comes;

a characterizing quantity association storage step of storing the characterizing quantity of the interfering signal and a characterizing quantity of said another interfering signal so as to be associated with each other for each first interfering station, which transmits the interfering signal, when the time interval is a predetermined interval;

a second time interval measurement step of measuring a time interval from the end of the interfering signal to the time when said another interfering signal comes when the desired signal comes during a time period when the characterizing quantity of the interfering signal is measured and the interfering signal ends during a time period when the desired signal comes;

a time interval determination step of determining whether or not the time interval measured at the second time interval measurement step corresponds to the predetermined period; and a characterizing quantity selection step of collating a characterizing quantity of the interfering signal, which has been coming at a time when the desired signal comes, which characterizing quantity is measured before the desired signal comes, with information stored at the characterizing quantity storage step when determination of a correspondence is made at the time interval determination step, and selecting a characterizing quantity of said another interfering signal, which corresponds to the characterizing quantity of the interfering signal, from a plurality of the stored characterizing quantities of said another interfering signal.

According to this configuration, even if the first interfering station which transmits the interfering signal is changed to the second interfering station, which is its communication partner, during interfering signal suppression, the interfering station which the interfering signal comes from can be recognized. Thus, the interfering signal included in the received signal can be suppressed, and the desired signal included in the received signal can be demodulated without error. Also, since the characterizing quantity stored previously for each interfering station is read, which interfering station the interfering signal comes from can be presumed easily in a short time, and the characterizing quantity used for interfering signal suppression can be switched.

In the present invention, preferably, the interfering signal characterizing quantity acquiring method further comprises:

a first combined signal characterizing quantity measurement step of measuring a characterizing quantity of a combined signal of the interfering signal and the desired signal when it is detected that the desired signal during a time period when the characterizing quantity of the interfering signal is measured;

a characterizing quantity association storage step of storing the interfering signal characterizing quantity and the combined signal characterizing quantity so as to be associated with each other for each interfering station;

a second combined signal characterizing quantity measurement step of measuring a characterizing quantity of the combined signal of the desired signal and the interfering signal when it is detected that the interfering signal comes during a time period when the desired signal comes; and an interfering signal characterizing quantity selection step of collating a value measured at the second combined signal characterizing quantity measurement step with information stored at the characterizing quantity association storage step, and selecting a characterizing quantity of an interfering signal of a corresponding interfering station from the stored interfering signal characterizing quantities of a plurality of interfering stations.

According to this configuration, even when an interfering signal comes during a time period when a desired signal comes, the characterizing quantity of the interfering signal is selected from the stored characterizing quantities, and the interfering signal in the combined signal can be suppressed. Thus, the desired signal in the received signal can be demodulated without error. Also, since the interfering signal characterizing quantity required for interfering signal suppression is obtained without demodulating the interfering signal, interfering signal suppression can be performed easily in a short time. Also, the characterizing quantity of the interfering signal from the interfering station using a different channel in addition to the same channel is stored, and interfering signal suppression can be performed by using the interfering signal characterizing quantity. Also, when a plurality of interfering signals come with a desired signal, by storing in advance a plurality of interfering signal characterizing quantities and a plurality of corresponding combined signal characterizing quantities, the interfering signal characterizing quantities required for interfering signal suppression can be selected from the stored interfering signal characterizing quantities to suppress the interfering signals.

An interfering signal suppressing method according to the present invention for suppressing an interfering signal included in a received signal comprises:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

an interfering signal characterizing quantity storage step of storing the characterizing quantity of the received signal as an interfering signal characterizing quantity when it is determined at the received signal determination step that there is no probability that the desired signal is included in the received signal;

a similarity calculation step of calculating a similarity between the characterizing quantity of the received signal and the interfering signal characterizing quantity stored at the characterizing quantity storage step when it is determined at the received signal determination step that there is the probability that the desired signal is included in the received signal;

an interfering signal characterizing quantity selection step of selecting an interfering signal characterizing quantity having the highest similarity from a plurality of the stored interfering signal characterizing quantities when there are interfering signal characterizing quantities having similarities, which are equal to or higher than a predetermined value, among the stored interfering signal characterizing quantities; and an interfering signal suppression step of suppressing the interfering signal by using the selected interfering signal characterizing quantity.

An interfering signal characterizing quantity storing device according to the present invention for storing a characterizing quantity of an interfering signal included in a received signal comprises:

a characterizing quantity calculation section for calculating a characterizing quantity of the received signal;

a received signal determination section for determining a probability that a desired signal is included in the received signal, and determining that the received signal is an interfering signal when determining that there is no probability that the desired signal is included in the received signal; and an interfering signal characterizing quantity storage section for storing the characterizing quantity of the received signal as an interfering signal characterizing quantity when the received signal determination section determines that there is no probability that the desired signal is included in the received signal.

An interfering signal characterizing quantity acquiring device according to the present invention for acquiring an characterizing quantity of an interfering signal included in a received signal comprises:

a characterizing quantity calculation section for calculating a characterizing quantity of the received signal;

a received signal determination section for determining a probability that a desired signal is included in the received signal, and determining that the received signal is an interfering signal when determining that there is no probability that the desired signal is included in the received signal;

an interfering signal characterizing quantity storage section for storing the characterizing quantity of the received signal as an interfering signal characterizing quantity when the received signal determination section determines that there is no probability that the desired signal is included in the received signal;

a similarity calculation section for calculating a similarity between the characterizing quantity of the received signal and the interfering signal characterizing quantity stored by the characterizing quantity storage section when the received signal determination section determines that there is the probability that the desired signal is included in the received signal; and an interfering signal characterizing quantity selection section for selecting an interfering signal characterizing quantity having the highest similarity from a plurality of the stored interfering signal characterizing quantities when there are interfering signal characterizing quantities having similarities, which are equal to or higher than a predetermined value, among the stored interfering signal characterizing quantities.

An interfering signal suppressing device according to the present invention for suppressing an interfering signal included in the received signal comprises:

a characterizing quantity calculation section for calculating a characterizing quantity of the received signal;

a received signal determination section for determining a probability that a desired signal is included in the received signal, and determining that the received signal is an interfering signal when determining that there is no probability that the desired signal is included in the received signal;

an interfering signal characterizing quantity storage section for storing the characterizing quantity of the received signal as an interfering signal characterizing quantity when the received signal determination section determines that there is no probability that the desired signal is included in the received signal;

a similarity calculation section for calculating a similarity between the characterizing quantity of the received signal and the interfering signal characterizing quantity stored by the characterizing quantity storage section when the received signal determination section determines that there is the probability that the desired signal is included in the received signal;

an interfering signal characterizing quantity selection section for selecting an interfering signal characterizing quantity having the highest similarity from a plurality of the stored interfering signal characterizing quantities when there are interfering signal characterizing quantities having similarities, which are equal to or higher than a predetermined value, among the stored interfering signal characterizing quantities; and an interfering signal suppression section for suppressing the interfering signal by using the selected interfering signal characterizing quantity.

In the present invention, preferably, the similarity is a similarity which is calculated for a sub-band, among the plurality of sub-bands, which is outside of a frequency band of the desired signal.

According to this configuration, since the desired signal does not have an effect on the calculation of the similarity, the similarity can be calculated accurately.

In the present invention, preferably, the interfering signal characterizing quantity acquiring method further comprises a phase component extraction step of extracting a phase component from the correlation value, at the similarity calculation step, a similarity concerning the phase component is calculated.

According to this configuration, wrong determination due to change of the correlation value which occurs in receiving an amplitude-modulated transmission signal can be prevented by comparison of the phase component of the inter-received-signal correlation value.

In the present invention, preferably, the interfering signal characterizing quantity acquiring method further comprises a complex region determination step of determining in which region on a complex plane, which is divided into N regions (N is an integer number which is equal to or greater than 2), the correlation value, which is a complex number, exists, and at the similarity calculation step, a similarity concerning a result of the region determination is calculated.

According to this configuration, since the identification of the interfering signal is performed by determining in which region on the complex plane the correlation value exists, the identification can be performed relatively easily.

In the present invention, preferably, the interfering signal suppressing method further comprises:

a transmission path estimation step of performing transmission path estimation of the desired signal for each of the sub-bands; and a weighting coefficients calculation step of calculating weighting coefficients from the selected interfering signal characterizing quantity and a transmission path estimation value of the desired signal, and at the interfering signal suppression step, the interfering signal is suppressed by weighted combining a plurality of the received signals with the weighting coefficients.

According to this configuration, since interfering signal suppression is performed by weighted combining, the interfering signal suppression can be performed reliably.

In the present invention, preferably, the characterizing quantity association storage step includes a characterizing quantity comparison step of comparing the characterizing quantity of the interfering signal with the characterizing quantity of said another interfering signal, the characterizing quantity comparison step includes a storage pattern in which when determining, based on a result of the comparison, that the characterizing quantity of the interfering signal and the characterizing quantity of said another interfering signal do not satisfy a predetermined condition concerning sameness, the first interfering station which transmits the interfering signal is considered to be different from a second interfering station which transmits said another interfering signal, and the characterizing quantity of the interfering signal and the characterizing quantity of said another interfering signal are stored so as to be associated with each other for each first interfering station, and the characterizing quantity comparison step includes a storage pattern in which when determining, based on a result of the comparison, that the characterizing quantity of the interfering signal and the characterizing quantity of said another interfering signal satisfy the predetermined condition concerning sameness, the first interfering station which transmits the interfering signal is considered to be the same as the second interfering station which transmits said another interfering signal, the characterizing quantity of the interfering signal and the characterizing quantity of said another interfering signal are stored so as to be associated with each other for each first interfering station.

According to this configuration, it is determined that the transmission source of the interfering signal and the transmission source of said another interfering signal are the same when the characterizing quantity of the interfering signal and the characterizing quantity of said another interfering signal satisfy the predetermined condition concerning sameness, and it is determined that the transmission source of the interfering signal is different from that of said another interfering signal when the characterizing quantity of the interfering signal and the characterizing quantity of said another interfering signal do not satisfy the above condition. Thus, when the same interfering signal source transmits the same signal many times periodically, or when the different interfering signal sources transmit different signals at a predetermined interval, the interfering signals can be suppressed appropriately.

In the present invention, preferably, an initial value of the criterion value is a received power value of a thermal noise which is a type of the interfering signal, and the criterion value is updatable.

According to this configuration, most of the interfering signals become initially suppression objects by setting the initial value of the criterion value to the thermal noise. However, the criterion value is updatable, so that the criterion value is updated as time advances. Thus, a suppression level of the interfering signal can be automatically set to a level which is adapted to communication environment as time advances.

In the present invention, preferably, the criterion value is a received power of the interfering signal which is previously received, the comparison object value is a received power of the interfering signal which is currently received, and at the significant interfering signal determination step, it is determined that the interfering signal which is currently received becomes the deterioration factor for the reception characteristic of the desired signal when the comparison object value is larger than the criterion value.

According to this configuration, as the received power of the interfering signal increases, the criterion value increases gradually. Thus, a suppression level of the interfering signal can be automatically set to a level which is adapted to communication environment as time advances.

In the present invention, preferably, the criterion value is a ratio (SIR) of a received power of the desired signal which is previously received to a received power of the interfering signal which is previously received, or a ratio (SIR) of a received power of the desired signal which is currently received to the received power of the interfering signal which is previously received, the comparison object value is a ratio (SIR) of the received power of the desired signal which is previously received to a received power of the interfering signal which is currently received, or a ratio (SIR) of the received power of the desired signal which is currently received to the received power of the interfering signal which is currently received, and at the significant interfering signal determination step, it is determined that the interfering signal which is currently received becomes the deterioration factor for the reception characteristic of the desired signal when the comparison object value is larger than the criterion value.

According to this configuration, as the SIR concerning the currently received interfering signal increases, the criterion value increases gradually. Thus, a suppression level of the interfering signal can be automatically set to a level which is adapted to communication environment as time advances.

In the present invention, preferably, at the significant interfering signal determination step, the determination is performed based on a number of times of reception of the interfering signal within a certain period of time or based on a time period of reception of the interfering signal within a certain period of time.

According to this configuration, the determination is performed based on a number of times which the interfering signal uses the radio channel or a time period for which the interfering signal uses the radio channel. Thus, the interfering signal which becomes the deterioration factor of the reception characteristic of the desired signal can be determined with high accuracy.

Effect of the Invention

According to the present invention, an interfering signal characterizing quantity storing method and device, an interfering signal characterizing quantity acquiring method and device, and an interfering signal suppressing method and device can be provided, which can identify the interfering signal sources of the interfering signals which come at random timings and have inconstant packet lengths, thereby contributing to interfering signal suppression with high accuracy.

BRIEF DESCRIPTION OF THE DRAWINGS

FIG. 1 is a view showing an example of a radio communication system including an interfering signal suppressing device according to an example 1 of a first embodiment.

FIG. 2 is a block diagram showing a configuration of the interfering signal suppressing device (a receiving station) 402 according to the example 1 of the first embodiment.

FIG. 8 illustrates an example in which a characterizing quantity of a radio signal for the other communication which is received by the receiving station 402 is shown on a frequency axis in the example 1 of the first embodiment.

FIG. 9 illustrates a state where signals come and end in the case where a desired signal and an interfering signal come during the substantially same period in the example 1 of the first embodiment.

FIG. 10 illustrates an example of an interference frequency characteristic in a preamble symbol in the example 1 of the first embodiment.

FIG. 11 is a flow chart showing an example of an operation of obtaining an interference characterizing quantity in the example 1 of the first embodiment.

FIG. 13 illustrates an exemplary configuration of a sub-band division section 103 which output both components within and outside a desired signal band in the example 2 of the first embodiment.

FIG. 14 illustrates another example of the sub-band division section 103 in the example 2 of the first embodiment.

FIG. 21 is a view of a complex plane for the inter-received-signal characterizing quantity extraction section 2103-2 in the example 1 of the second embodiment.

FIG. 25 is a block diagram showing a configuration of an interfering signal suppressing device (a receiving station) according to an example 3 of the second embodiment.

FIG. 28 illustrates an example in which a characterizing quantity of a radio signal for other communication which is received by the receiving station is shown on a frequency axis in the example 1 of the third embodiment.

FIG. 38 illustrates an example of an interfering quantity table which is created by an interference information storage section in the example 1 of the fourth embodiment.

FIG. 40 is a flow chart showing an example of an interfering signal measurement operation of the interfering signal suppressing device according to the example 1 of the fourth embodiment.

FIG. 43 illustrates another example of the characterizing quantity table which is created by the interference information storage section in the example 1 of the fourth embodiment.

FIG. 45 illustrates an example of a characterizing quantity table which is created by the interference information storage section in the example 2 of the fourth embodiment.

FIG. 47 illustrates an example of a characterizing quantity table which is created by the interference information storage section in the example 3 of the fourth embodiment.

FIG. 48 illustrates an example of a radio communication system including an interfering signal suppressing device according to an example 1 of a fifth embodiment.

FIG. 51 is a time sequence diagram which shows that signals come when the interfering signal suppressing device according to the example 1 of the fifth embodiment measures characterizing quantities of an interfering signal and a combined signal and creates a characterizing quantity table.

FIG. 52 is a block diagram showing an exemplary configuration of an interfering signal detection section.

FIG. 53 is a block diagram showing an exemplary configuration of a combined signal detection section in the example 1 of the fifth embodiment.

FIG. 54 illustrates an example of a characterizing quantity table which stores characterizing quantities.

FIG. 55 is a block diagram showing an exemplary configuration of the interfering signal suppression section.

FIG. 57 is a flow chart showing an example of an interfering signal suppression operation in the example 1 of the fifth embodiment.

FIG. 70 is a flow chart showing an operation when whether or not an inter-antenna correlation value is to be stored is determined in the example 1 of the sixth embodiment.

FIG. 71 is a flow chart showing an operation when a received power of an interfering signal is used for a correlation storage condition in the example 1 of the sixth embodiment.

FIG. 72 is a flow chart showing an operation when an SIR is used for a correlation storage condition in the example 1 of the sixth embodiment.

FIG. 73 shows frequency bands for self communication and other communication in the example 1 of the sixth embodiment.

FIG. 74 shows an example of a received power for the other communication which is received by a receiving station in the example 1 of the sixth embodiment.

FIG. 77 illustrates an example of an interference frequency characteristic in a preamble symbol in the example 1 of the sixth embodiment.

FIG. 78 illustrates a conventional example of a radio communication system including a plurality of radio stations.

DESCRIPTION OF THE REFERENCE CHARACTERS

Figure 3:
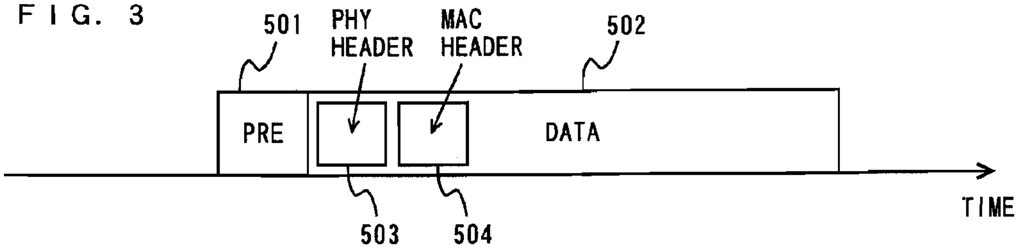
FIG. 3 illustrates an example of a format of a radio signal which is transmitted by a transmitting station 401 in the example 1 of the first embodiment.

| | |
|---|---|
| 101, 102 | antenna |
| 103, 104 | sub-band division section |
| 105 | inter-antenna correlation value detection section |
| 106 | memory |
| 107 | comparison section |
| 108 | preamble detection section |
| 109 | power detection section |
| 110 | timing detection section |
| 111 | determination section |
| 112 | interfering signal suppression section |
| 113 | demodulation section |
| 121 | within-desired-signal-band memory |
| 122 | within-desired-signal-band comparison section |
| 123 | outside-desired-signal-band memory |
| 124 | outside-desired-signal-band comparison section |

-continued

| | |
|---|---|
| 125 | Fourier transform section |
| 126 | within-desired-signal-frequency-band pass filter |
| 127 | outside-desired-signal-frequency-band pass filter |
| 201 | interfering signal estimation section |
| 202 | interfering signal extraction section |
| 203 | adder |
| 204 | memory |
| 205 | timing control section |
| 401 | transmitting station |
| 402 | receiving station |
| 403 | interfering station |
| 404 | interfering station |
| 405 | radio signal(desired signal) |
| 406, 407 | radio signal(interfering signal) |
| 501 | preamble section |
| 502 | data section |
| 503 | PHY header |
| 504 | MAC header |
| 801 | self communication signal |
| 802 | other communication signal |
| 901 | self communication signal band |
| 902 | measurement band |
| 1001, 1002, 1003 | preamble carrier |

DETAILED DESCRIPTION OF THE INVENTION

The following will describe each embodiment of the present invention with reference to the drawings.

First Embodiment

Example 1

An exemplary overall configuration and an exemplary overall operation of a radio communication system including an interfering signal suppressing device according to an example 1 of a first embodiment will be described. The interfering signal suppressing device according to the example 1 can be regarded as a receiving station in the radio communication system. Hereinafter, the interfering signal suppressing device according to the example 1 is referred to as a receiving station according to need. FIG. 1 is a view showing an example of the radio communication system including the interfering signal suppressing device according to the example 1. As shown in FIG. 1, the radio communication system including the interfering signal suppressing device 402 (the receiving station 402) according to the example 1 comprises a transmitting station 401, the receiving station 402, and interfering stations 403 and 404. The transmitting station 401 converts into a radio signal 405 transmission data, the destination of which is the receiving station 402, and transmits the radio signal 405. The receiving station 402 receives and demodulates the radio signal 405 to obtain the transmission data from the transmitting station 401. By this sequence of operations, communication is performed.

On the other hand, the interfering station 403 and the interfering station 404 perform transmission of radio signals independently of the transmitting station 401 and the receiving station 402. In this example, the interfering station 403 and the interfering station 404 perform transmission and reception of signals by using a communication channel which is different from that used by the transmitting station 401 and the receiving station 402.

In the example 1, the radio stations 401, 402, 403, and 404 use the same access method, and, for example, can use the CSMA/CA method of the IEEE802.11 standard. In this method, the radio stations 401, 402, 403, and 404 each detect a radio communication carrier before transmission. If not detecting a carrier the level of which is equal to or higher than a threshold level, the radio stations 401, 402, 403, and 404 each wait for a random time to perform transmission, and then transmit a frame. This technique can prevent collision of frames due to concurrent transmission of signals by a plurality of radio stations which perform communication over the same channel. In this example, the interfering stations 403 and 404, which perform communication over the same channel, use this technique so as not to transmit signals concurrently.

FIG. 2 is a block diagram showing a configuration of the interfering signal suppressing device (the receiving station) 402 according to the example 1 of the present invention. As shown in FIG. 2, the interfering signal suppressing device 402 comprises antennas 101 and 102, sub-band division sections 103 and 104, an inter-antenna correlation value detection section 105, a memory 106, a comparison section 107, a preamble detection section 108, a power detection section 109, a timing detection section 110, a determination section 111, an interfering signal suppression section 112, and a demodulation section 113.

FIG. 3 illustrates an example of a format of a radio signal which is transmitted by the transmitting station 401 in the example 1 of the first embodiment. The format of the radio signal includes a preamble symbol 501 which is used for synchronization detection and transmission path estimation, and a data symbol sequence 502. The data symbol sequence 502 includes a PHY header 503, and a MAC header 504. The PHY header 503 includes a modulation parameter of each data symbol, and information of a data length. The MAC header 504 includes a source address, a destination address, and control information. In the case of a wireless LAN device of the IEEE802.11a standard, each symbol is orthogonal frequency division multiplexing (OFDM) modulated by the transmitting station 401, and orthogonal frequency division (OFDM) demodulated by the receiving station 402.

An operation of each section of the interfering signal suppressing device 402 will be described using FIG. 2.

The sub-band division sections 103 and 104 divide a signal received by the antennas 101 and 102 into sub-band signals, respectively. FFT (Fast Fourier Transform), wavelet conversion, a filter bank, or the like can be used for the sub-band division. For the FFT, FFT for OFDM demodulation can be used. It is noted that in FIG. 2, although the sub-band division section is provided for each antenna input, signals from two antennas may be inputted to one sub-band division section, and the sub-band division section may process the received signals by time division.

The inter-antenna correlation value detection section 105 detects an inter-antenna correlation value for each sub-band. Since a signal transmitted from a different direction has a different inter-antenna correlation value, the position of the interfering signal source can be spatially identified from the inter-antenna correlation value. In the case of the configuration in which the inter-antenna correlation value is obtained as a characterizing quantity by using a plurality of antennas as described above, it is possible to identify interfering stations (radio stations) which are located in positions different from each other even when not a known signal but an unknown signal is received.

It is noted that although the case where the inter-antenna correlation value is used as a characterizing quantity has been described, a type of the characterizing quantity is not limited as long as it indicates a different value for each interfering station. An example of the characterizing quantity includes a covariance matrix between signals received by a plurality of antennas, a weighting coefficient for weighted combining a plurality of signals received by a plurality of antennas and performing interfering signal suppression, each received power value of a plurality of signals received by a plurality of antennas, and an average of received power values of a plurality of signals received by a plurality of antennas. It is noted that characterizing quantities, each of which provides low identification accuracy, can be used in combination to improve identification accuracy of the interfering station.

The detected inter-antenna correlation value is stored in the memory 106.

The comparison section 107 compares an inter-antenna correlation value of a currently received signal with a plurality of inter-antenna correlation values of previously received signals which are stored in the memory 106. The comparison section 107 calculates similarities between the inter-antenna correlation values stored in the memory 106 and the inter-antenna correlation value of the currently received signal according to this comparison. The calculated similarities are outputted to the determination section 111.

The preamble detection section 108 detects whether or not a preamble unique to a desired signal is included in the received signal based on each antenna input.

The power detection section 109 detects a change of the received power based on each antenna input. According to the detected change of the received power, the timing detection section 110 detects a time interval of the change. For example, the timing detection section 110 measures a time period for which the received power is maintained greater than a predetermined threshold value, or a time period for which no received power is detected.

The determination section 111 determines whether or not the desired signal is included in the currently received signal based on the outputs of the comparison section 107, the preamble detection section 108, the power detection section 109, and the timing detection section 110. Also, when determining that the desired signal is not included in the currently received signal, the determination section 111 determines that the currently received signal is an interfering signal. Information concerning whether or not the desired signal is included in the received signal is outputted to the memory 106, or the like. Also, when determining that the desired signal is included in the currently received signal, the determination section 111 selects the inter-antenna correlation value which has the highest similarity with the inter-antenna correlation value of the currently received interfering signal from the inter-antenna correlation values stored in the memory 106 based on information of the similarities which is inputted from the comparison section 107. Information of the interfering signal characterizing quantity, which is determined to have the highest similarity among the inter-antenna correlation values stored in the memory 106, is outputted to the interfering signal suppression section 112. In other words, for interfering signal suppression, the determination section 111 outputs the information of the characterizing quantity of the interfering signal, among the previously received interfering signals, which is presumed to be transmitted from the same interfering signal source as the currently received interfering signal is outputted to the interfering signal suppression section 112. If the previously received interfering signal is not received so as to overlap with a desired signal, the inter-antenna correlation value measured concerning the interfering signal becomes an accurate value even within the frequency band of the desired signal. Therefore, when the currently received interfering signal comes so as to overlap with the desired signal, by using the accurate inter-antenna correlation value of the previously received signal, it is possible to appropriately suppress the interfering signal within the frequency band of the desired signal.

The interfering signal suppression section 112 suppresses the interfering signal which overlaps with the desired signal based on the information of the interfering signal characterizing quantity obtained from the determination section 111. The demodulation section 113 demodulates the desired signal in which the interfering signal is suppressed.

Here, a typical operation of obtaining an interfering signal characterizing quantity in the present invention will be described.

Figure 4:
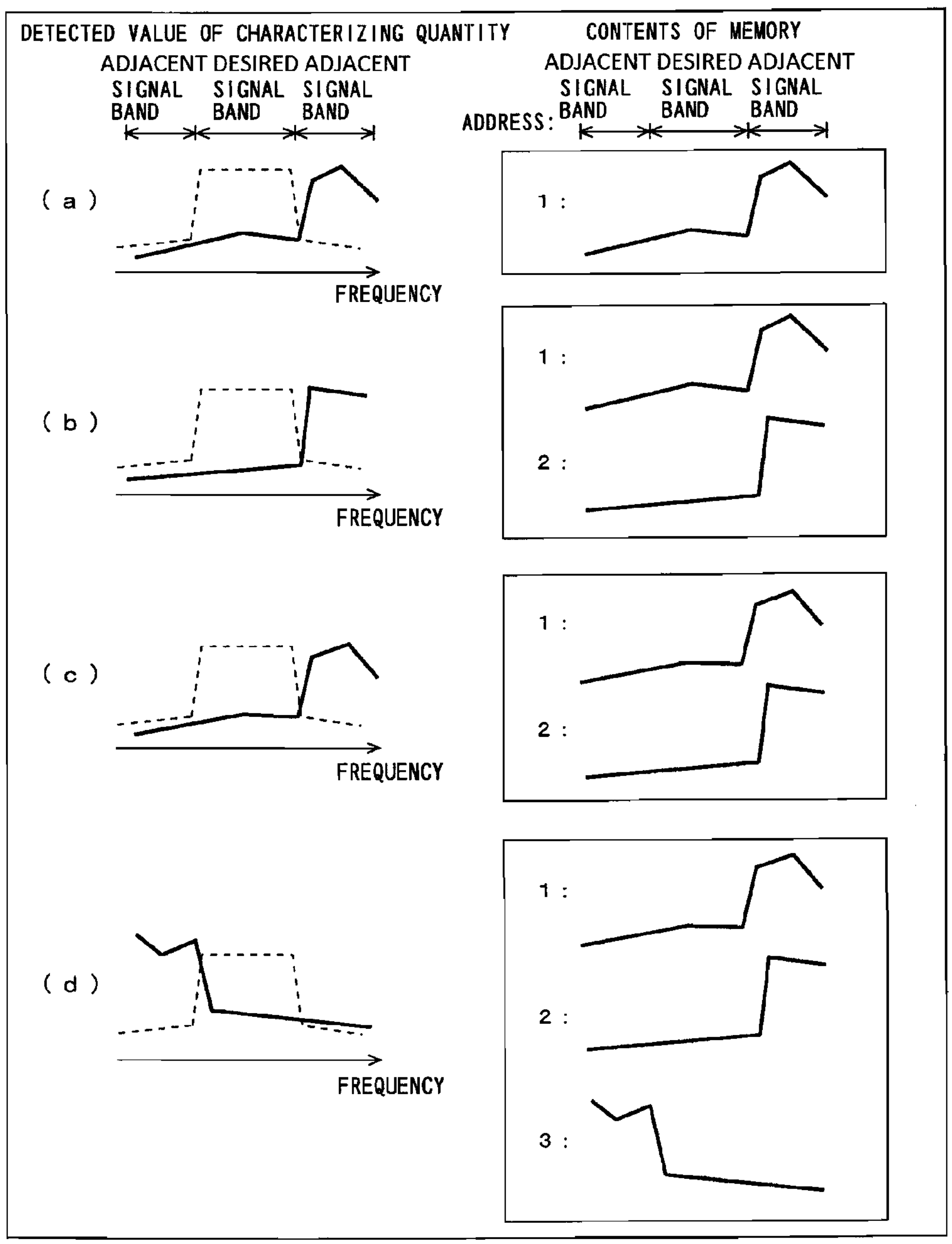
FIG. 4 illustrates an operation of the receiving station 402 when there is no probability that a desired signal is included in a received signal in the example 1 of the first embodiment.

FIG. 4 illustrates an operation of the receiving station 402 when there is no probability that a desired signal is included in the received signal. The left half of FIG. 4 is a time sequence diagram which shows a relation between an interfering signal characterizing quantity and a desired signal characterizing quantity. In the left half of FIG. 4, the horizontal axis indicates frequencies of the interfering signal and the desired signal. The dashed line indicates the characterizing quantity of the desired signal, and the solid line indicates the characterizing quantity of the interfering signal. In the state as shown in the left half of FIG. 4, only the interfering signal is included in the received signal, and the desired signal is not included therein. The right half of FIG. 4 is a time sequence diagram which shows the characterizing quantities of the interfering signals stored in the memory 106. FIG. 4 shows the case where an inter-antenna correlation value is used as a characterizing quantity.

As an initial state, the memory 106 is empty. As shown in FIG. 4 (a), an inter-antenna correlation value (the solid line portion) of an interfering signal is detected. Since nothing is stored in the memory 106, the detected inter-antenna correlation value is stored in an address 1 of the memory 106. Then, as shown in (b), another inter-antenna correlation value (the solid line portion) is detected. Since an inter-antenna correlation value which is similar to the newly detected inter-antenna correlation value is not stored in the memory 106, the newly detected inter-antenna correlation value is newly stored in an address 2 of the memory 106. Then, as shown in (c), an inter-antenna correlation value similar to the previously detected inter-antenna correlation value is detected. In this example, the previously detected inter-antenna correlation value as shown in (a) is similar to the currently detected inter-antenna correlation value as shown in (c). Since there is the similar inter-antenna correlation value in the memory 106, the content of the address 1 of the memory 106 is updated by using the currently detected similar inter-antenna correlation value. Then, as shown in (d), another new inter-antenna correlation value is detected. Since there is no similar inter-antenna correlation value in the memory 106, the currently detected inter-antenna correlation value is newly stored in an address 3 of the memory 106.

Figure 5:
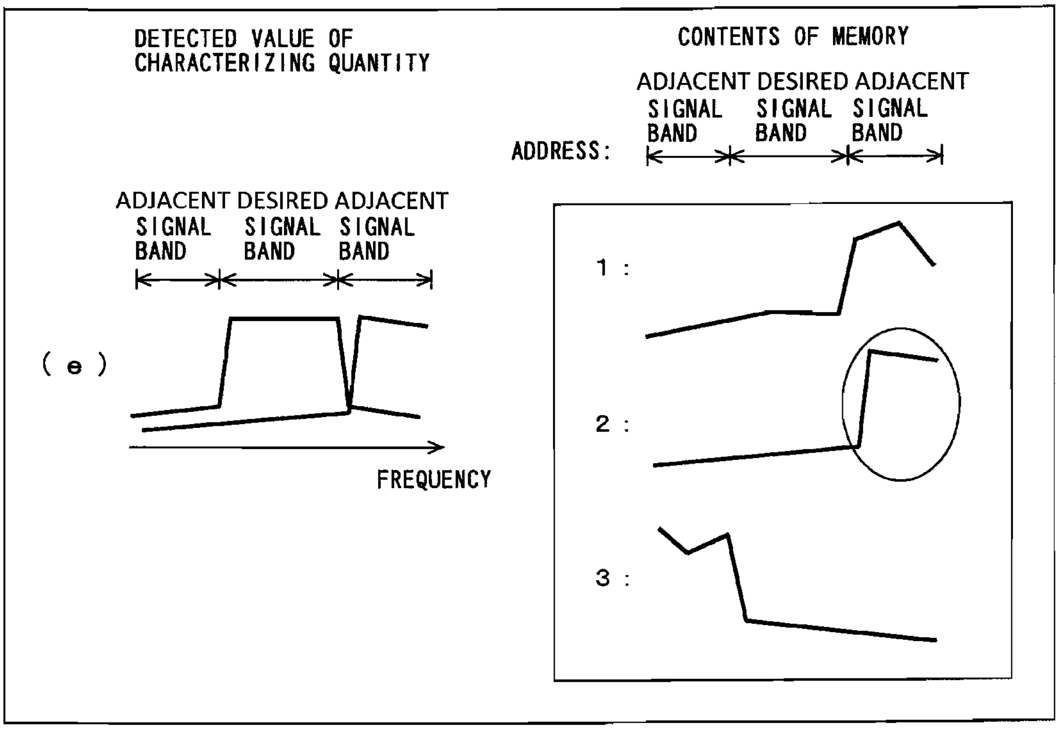
FIG. 5 illustrates an operation of the receiving station 402 when there is a probability that a desired signal is included in a received signal in the example 1 of the first embodiment.

FIG. 5 illustrates an operation of the receiving station 402 when there is the probability that a desired signal is included in a received signal. The left half of FIG. 5 shows a relation between an interfering signal characterizing quantity and a desired signal characterizing quantity. The characterizing quantities of the desired signal and the interfering signal are each indicated by a solid line. The right half of FIG. 5 shows characterizing quantities of interfering signals which are already stored in the memory 106. It is noted that the indication, (e), means to be subsequent to FIG. 4 (d). As shown in FIG. 5 (e), inter-antenna correlation values within and outside the desired signal band are detected. The determination section 111 collates a part of the detected inter-antenna correlation value outside the desired signal band with the contents stored in the memory 106, and selects the address 2 in which the similar content is stored. The collation with the stored contents is performed by calculating a similarity. An address, in which a characterizing quantity having a similarity which is larger than a predetermined value and becomes the maximum is stored, is selected. In calculating a similarity, only a frequency component, among the part of the detected inter-antenna correlation value outside the desired signal band, which has a received power larger than a standard value may be used. Thus, the similarity can be accurately calculated without being disturbed by a component of the desired signal and noise. As a value for identifying an interfering signal source (an interfering station), information of the address 2 may be outputted, or the inter-antenna correlation value within the desired signal band which is stored in the address 2 may be outputted. In the case where the inter-antenna correlation value within the desired signal band is outputted, before demodulating the desired signal, the receiving station 402 can use the inter-antenna correlation value for determining reliability of each frequency and for generating a combination coefficient for suppressing the interfering signal.

The following will describe an operation of the receiving station (the interfering signal suppressing device) 402 shown in FIGS. 1 and 2.

Figure 6:
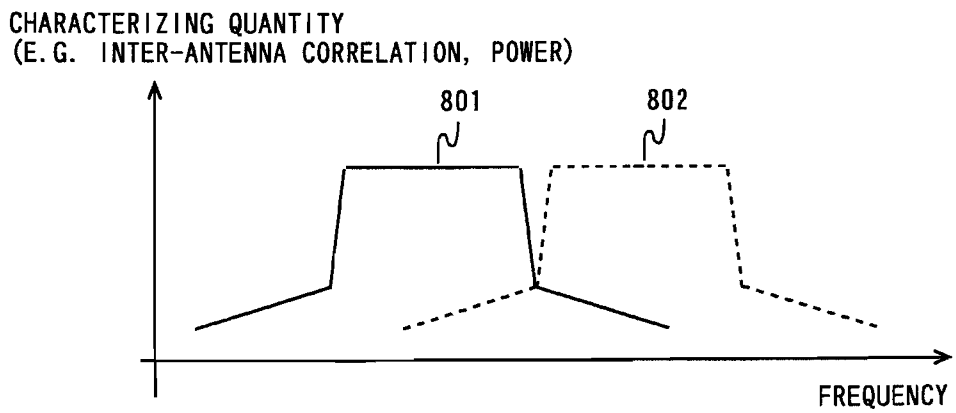
FIG. 6 illustrates a characterizing quantity 801 of a signal used for self communication and a characterizing quantity 802 of a signal used for other communication so as to be associated with a used frequency band.

In the following description, the communication between the transmitting station 401 and the receiving station 402 is referred to as self communication, and the communication between the interfering station 403 and the interfering station 404, which is interference communication for the self communication, is referred to as other communication. The other communication is performed over a channel adjacent to that of the self communication. FIG. 6 illustrates a characterizing quantity 801 of a signal used for the self communication and a characterizing quantity 802 of a signal used for the other communication so as to be associated with a used frequency band. In FIG. 6, the horizontal axis indicates a frequency, and the vertical axis indicates a characterizing quantity. As seen from FIG. 6, since the frequency band of the self communication and the frequency band of the other communication are adjacent to each other, a part of the characterizing quantity for the other communication is mixed in the signal band of the self communication.

Here, the self communication and the other communication use the same access protocol. This protocol defines that a predetermined interval is put between frames for giving a transmission priority. For example, in the CSMA/CA of the IEEE802.11, SIFS (Short Inter Frame Space), PIFS (Point Coordination IFS), DIFS (Distributed Coordination IFS), and the like are defined in ascending order of frame interval. The SIFS having the highest transmission priority is used for transmitting an acknowledge (ACK) packet. These periods corresponding to frame intervals are transmission prohibition periods. Another transmission prohibition period includes a period for which a NAV (Network Allocation Vector) which gives transmission right to only a specific radio station is set, and the like.

Figure 7:
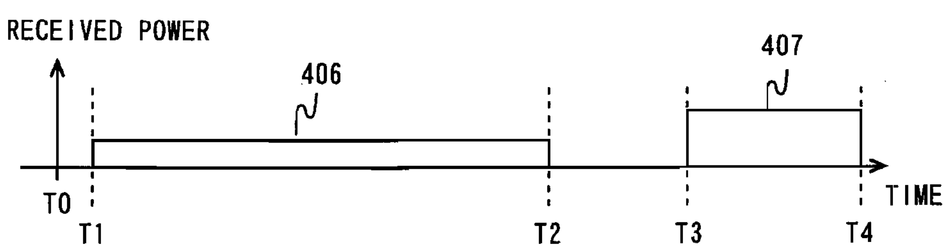
FIG. 7 illustrates an example of a received power for the other communication which is received by the receiving station 402 in the example 1 of the first embodiment.

FIG. 7 illustrates an example of a received power for the other communication, which is received by the receiving station 402. Between a time T1 to a time T2, a radio signal 406 is transmitted from the interfering station 403 toward the interfering station 404. The interfering station 404 receives and demodulates the radio signal 406. The interfering station 404 transmits an acknowledge (ACK) packet when the demodulation is normally performed. After a frame interval (from T2 to T3) defined by the protocol, the interfering station 404 transmits a radio signal 407 as an acknowledge packet between T3 and T4. At this time, due to distances between the receiving station 402, and the interfering station 403 and the interfering station 404 and relations of the locations thereof, the received power of the radio signal 406 is different from that of the radio signal 407.

Here, an example of operations of the power detection section 109 and the timing detection section 110 will be described. When a received power which is equal to or larger than a predetermined value is detected by the power detection section 109, the timing detection section 110 detects a duration time period of the received power and a time period (a frame interval) for which no received power is detected. In the case of FIG. 7, a time period from T1 to T2 and a time period from T3 to T4 are detected as a duration time period. At this time, when the received power value between T1 and T2 is different from that between T3 and T4 and the time period from T2 to T3 is the interval defined by the protocol, it is determined that the received signal between T1 and T2 and the received signal between T3 and T4 are alternately transmitted by two different radio stations. Also, when the time period from T3 to T4 is equal to the length of a control packet defined by the protocol, such as the ACK packet of the IEEE802.11, it can be more reliably determined that two radio stations alternately performs transmission.

As described above, in the case of the configuration in which a time occupancy ratio and a coming interval of the interfering signal are measured, if it is the known protocol, accuracy of identifying the interfering radio station can be improved.

An example of operations of the sub-band division sections 103 and 104 and the inter-antenna correlation value detection section 105 will be described. The sub-band division sections 103 and 104 each divide a received signal, which is a multiband signal, into a plurality of sub-bands. The inter-antenna correlation value detection section 105 detects a correlation between the antennas for each sub-band. Here, FFT is used for the sub-band division section, and the self communication is performed by using OFDM signals. Each sub-band indicates a frequency bin of the FFT. In inter-antenna correlation value detection, a correlation between a plurality of antenna inputs is obtained. For example, an antenna number is denoted by n (n is a natural number between 1 and N), a sub-band number is denoted by m (m is a natural number between 1 and M), and a reception sub-band signal is denoted by $r_m$ (n). An inter-antenna correlation value $R_m$ for the sub-band number m may be represented as:

$$R_m=[r_m(1)\ldots r_m(n)]^H[r_m(1)\ldots r_m(n)]. \quad \text{(equation 1-1)}$$

Here, $^H$ denotes a complex conjugate transposition. R denotes a received power for each sub-band in the case of one antenna. In the case of a plurality of antennas, R is a matrix indicating a received power for each antenna as a diagonal component, and a correlation between the antennas as another component.

FIG. 8 illustrates an example in which a characterizing quantity of a radio signal for the other communication which is received by the receiving station 402 is shown on a frequency axis. In FIG. 8 (a), an envelope 801 of a characterizing quantity for the self communication signal and an envelope 802 of the characterizing quantity for the other communication signal are indicated by a solid line and a dashed line, respectively. The vertical lines within the envelope 802 of the characterizing quantity for the other communication signal each indicate a characterizing quantity for the other communication signal for each sub-band. Although the characterizing quantity includes, for example, a received power, a phase, and an inter-antenna correlation value of the received signal, it is not particularly limited thereto.

FIG. 8 (b) illustrates an example when the other communication signal in (a) is divided into a plurality of sub-bands by the sub-band division sections 103 and 104 of the receiving station 402 and a characterizing quantity for each sub-band is calculated by the inter-antenna correlation value detection section 105, or the like. The sub-band division is performed by fast Fourier transform (FFT). In FIG. 8 (b), a frequency band 901 of the signal for the self communication and a frequency band 902 in which the sub-band division is performed are shown. The frequency band 902 in which the sub-band division is performed is set so as to include the frequency band 901 of the self communication signal and so as to be broader than the frequency band 901. The receiving station 402 takes out components of the frequency band 902, in which the sub-band division is performed, by using a filter, and performs fast Fourier transform (FFT) on the taken components. Concerning the value obtained after the fast Fourier transform, an inter-antenna correlation value is calculated for each sub-band. Thus, the characterizing quantity of the other communication signal (e.g. an interfering signal 406) is obtained for each sub-band in the frequency band 902 in which the sub-band division is performed.

Similarly, FIG. 8 (c) illustrates an example when a signal (e.g. an interfering signal 407) for other communication different from that in (b) is divided into a plurality of sub-bands by the sub-band division sections 103 and 104 of the receiving station 402 and a characterizing quantity for each sub-band is calculated by the inter-antenna correlation value detection section 105, or the like. The different other communication signal is, for example, a response packet with respect to the other communication signal of (b). As seen from these figures, the characterizing quantity within the frequency band 902 in which the sub-band division is performed is different between the other communication shown in (b) and the different other communication shown in (c) due to differences in a received power, a transmission path, and a coming direction.

The following will describe an operation of the receiving station 402 when storing the characterizing quantity of the interfering signal by using FIGS. 1, 7 and 8. In the following description, a time T0, . . . , a time T13 are described merely as T0, . . . , T13.

As shown in FIG. 1, a signal 406 for the other communication is transmitted from the radio station 403, and the radio station 404 which has received this signal transmits a signal 407 for the different other communication. At this stage, a signal 405 for the self communication has not been transmitted.

As shown in FIG. 7, the receiving station 402 starts to measure an interfering signal from T0. In this example, the transmission prohibition period for the self communication is not set between T0 and T4, but the self communication is not performed.

The receiving station 402 detects a certain received power at T1. Since the transmission prohibition period for the self communication is not set between T1 and T4, whether a signal for the self communication or a signal for the other communication is received can be determined by determining whether or not a preamble unique to the self communication is detected. Since the initially received radio signal 406 is a signal for the other communication, a preamble unique to a signal (a desired signal) for the self communication is not detected. Thus, the receiving station 402 determines that the received signal which lasts from T1 to T2 is an interfering signal.

Between T1 and T2, as shown in FIG. 8 (b), a characterizing quantity (hereinafter, referred to as an interference frequency characteristic according to need) within the frequency band 902 in which the sub-band division is performed is obtained by the receiving station 402. Here, the receiving station 402 determines whether or not there is an interference frequency characteristic which is similar to the currently obtained interference frequency characteristic among the previously stored interference frequency characteristics. For example, a difference between characterizing quantities for each sub-band is calculated, a sum or an average of the differences between the above characterizing quantities for the entire within the band 902 is calculated, and the determination of whether or not to be similar can be performed based on the result of the difference. For example, an interference frequency characteristic having the smallest result difference is considered to have the highest similarity, and it can be selected as "a similar interference frequency characteristic". Alternatively, linear or curved lines which are approximated to the previously stored interference frequency characteristic and the currently obtained interference frequency characteristic, respectively, are obtained, and the similarity determination may be performed based on the degree of coincidence of these lines. In this case, an interference frequency characteristic having the largest degree of coincidence can be selected as "a similar interference frequency characteristic". Still alternatively, a plurality of these similarity determination methods may be used in combination.

When it is determined that an interference frequency characteristic which is similar to the currently obtained interference frequency characteristic of the radio signal 406 is not stored in the memory 106, the receiving station 402 determines that the interference frequency characteristic of the radio signal 406 is a characterizing quantity of a new and unknown interfering signal, assigns a unique identifier thereto, and newly stores it. Here, the new characterizing quantity is stored as an interference frequency characteristic 1 (see FIG. 4 (a)).

It is noted that in the case where a received power can be measured by the power detection section 109 a plurality of times between T1 and T2, it is determined that one interfering signal comes between T1 and T2 by detecting that the received power for each time is maintained constant. In the case where one interfering signal comes between T1 and T2 and the interference frequency characteristic of this interfering signal is similar to the previously stored interference frequency characteristic of the interfering signal, the stored interference frequency characteristic of the interfering signal is updated. There is a probability that the interference frequency characteristic of even an interfering signal which comes from the same interfering station momentarily changes due to a change in the position of the interfering station, a change of weather condition, and the like. However, the interference frequency characteristic is updated as described above, thereby keeping the interference frequency characteristic up to date. Thus, accuracy of the similarity determination can be improved. Here, the newly measured interference frequency characteristic and the stored interference frequency characteristic may be averaged, updating may be performed by using the average. In this case, accuracy of the similarity determination can be improved further.

Between T3 and T4, an interference frequency characteristic as shown in FIG. 8 (c) is obtained by the receiving station 402. The receiving station 402 compares the previously stored interference frequency characteristic 1 with the currently obtained interference frequency characteristic, and calculates a similarity therebetween. The similarity between the interference frequency characteristic 1 and the currently obtained interference frequency characteristic is small. Thus, the currently obtained interference frequency characteristic is determined not to be similar to the interference frequency characteristic 1, and stored as an interference frequency characteristic 2 (see FIG. 4 (b)).

In the case where whether or not to be similar cannot be determined by the comparison of the interference frequency characteristic, whether or not to be similar can be determined by comparison of a received power, its duration time period, a received power time characteristic, such as an interval between frames, or the like. Also, the interfering signal which is expressed by the interference frequency characteristic 1 ends at T2, and a signal of a different power is detected at T3 after a frame interval (from T2 to T3). Thus, it is determined that the signal between T3 and T4 is transmitted from a radio station different from that of the interfering signal of the interference frequency characteristic 1. Alternatively, if the power detected at T3 is the same as that at T2, it is determined that the signal is transmitted from the same radio station.

Similarly as in the case between T1 and T2, in the case where an interference frequency characteristic is measured a plurality of times between T3 and T4 between which the power is continued, since the same power is continued, it is determined that one interfering signal comes between T3 and T4. In the case where one interfering signal comes between T3 and T4 and the interference frequency characteristic of this interfering signal is similar to the previously stored interference frequency characteristic of the interfering signal, the stored interference frequency characteristic of the interfering signal is updated.

During a period for which the self communication is not performed, namely, during the transmission prohibition period for the self communication or during a period for which the preamble unique to the self communication is not detected, an operation of updating or newly storing the interference frequency characteristic is continuously performed while the interfering signal is identified as described above.

The following will describe an operation of the receiving station 402 in obtaining a characterizing quantity of the interfering signal in the received signal in the case where a desired signal and an interfering signal overlap with each other and are received.

FIG. 9 illustrates a state where signals come and end in the case where a desired signal and an interfering signal come during the substantially same period. The radio signal 406 which is an interfering signal is received between T6 and T9, the radio signal 407 which is another interfering signal is received between T11 and T13. On the other hand, the radio signal 405 which is a desired signal for the self communication is received between T7 and T10. The bottom figure in FIG. 9 shows received powers detected by the receiving station 402. Between T7 and T10, the interfering signal 406 and the desired signal 405 overlap with each other.

The receiving station 402 already measures and stores the interference frequency characteristics 1 and 2 between T0 and T4. Between T6 and T7, the same measurement is performed as described above, and the interference frequency characteristic 1 is updated.

From T7, a change of the received power is detected, and preamble detection is performed. The desired signal 405 includes the unique preamble 501. Thus, the preamble is detected at T8.

When detecting the preamble unique to the desired signal 405, the receiving station 402 determines that there is a high probability that the desired signal is included in the currently received signal.

The receiving station 402 compares parts of the stored interference frequency characteristic and the interference frequency characteristic of the currently received signal outside the frequency band of the desired signal 405. According to this comparison, the receiving station 402 identifies the currently received interfering signal which partially overlaps with the desired signal. The interference frequency characteristic of the currently received signal is measured in a zone of the frequency band 902 in which the sub-band division is performed. There is a high probability that a desired signal exists in the frequency band 901 of the desired signal within the frequency band 902, and there is a high probability that the characterizing quantity of the interfering signal and the characterizing quantity of the desired signal are combined. Thus, the frequency band 901 of the desired signal is excluded from an object to be compared. The receiving station 402 determines similarities between the stored interference frequency characteristics 1 and 2 and an interference frequency characteristic 802 of the currently received signal other than a part thereof within the desired signal frequency band 901.

It is noted that in the self communication, in the case where there is a sub-band within the frequency band of the desired signal, which is not used, it is possible to determine a similarity concerning the sub-band. For example, there is the case where in the preamble symbol received between T7 and T8, there are carriers in a small number of certain sub-bands, and null-carriers are used in the rest of sub-bands. FIG. 10 illustrates an example of an interference frequency characteristic of the preamble symbol. In this example, the preamble symbol includes carriers, which carry preamble information thereon, only in sub-bands 1001, 1002, and 1003 within the frequency band 901 of the desired signal, and null-carries in the rest of sub-bands. In this case, the interference frequency characteristic of the interfering signal 406 appears in the sub-bands of the null-carriers.

In the case where it is determined by the comparison of the interference frequency characteristic outside the desired signal band that there is no interference frequency characteristic, which is similar to the interference frequency characteristic of the currently received signal, among the stored interference frequency characteristics, a similarity concerning the received power is determined.

When the characterizing quantity of the interfering signal can be identified, the interfering signal which overlaps with the desired signal can be suppressed. Thus, accuracy of demodulation of the desired signal can be improved. A technique (refer to International Publication WO No. 2006/003776) which is applied previously by the present applicant can be used for the configuration of the interfering signal suppression section 112 which performs suppression of the interfering signal by using the characterizing quantity of the interfering signal.

Although the preamble unique to the desired signal is detected, when the characterizing quantity of the interfering signal cannot be identified at the time, the currently received signal is once demodulated as the desired signal, and the interfering signal is identified by using the demodulation result as described later. The data symbol sequence 502 is demodulated sequentially. The header of the data symbol 502 includes a PHY (Physical Layer) header 503. The receiving station 402 detects the PHY header, and when confirming that it is unique to the desired signal, continues to perform demodulation according to a modulation parameter described in the PHY header. A modulation technique and a data length of the data symbol, and the like are described in the modulation parameter.

The header of the modulation data includes a MAC (Media Access Control) header 504. The MAC header includes a parameter which is used by a MAC layer for control. The parameter includes a source address, a destination address, a frame type, and the like. The receiving station 402 detects the MAC header. The receiving station 402 determines whether or not the destination address is its own address. When the destination address is its own address, it is determined that the received signal is the desired signal. The receiving station 402 does not store the interference frequency characteristic of the desired signal. It is noted that the characterizing quantity of the desired signal outside the frequency band may be newly stored, or may be updated.

When the reception of the radio signal 406 ends at T9, the received power rapidly falls. The receiving station 402 can determine that the coming interfering signal ends by detecting the rapid fall of the received power. Or, when the received power rapidly rises, the receiving station 402 can determine that a new interfering signal overlaps with the desired signal. When there is no error in the PHY header of the desired signal, the length of the desired signal can be known. Thus, the rapid change of the received power between T9 and T10 can be used for determining whether or not the interfering signal overlaps with the desired signal. A period from a time when the coming interfering signal ends to a time when a new interfering signal comes can be detected as a frame interval for the other communication.

The reception of the desired signal 405 ends at T10. A new received power is detected at T11. A period from T10 to T12 is a frame interval defined by the protocol for the self communication, and the transmission prohibition period. Thus, the receiving station 402 can determine that the received power detected during this period is the power of the interfering signal. The receiving station 402 stores or updates the interference frequency characteristic of the newly coming interfering signal.

The interfering signals which come from the different radio stations at random timings can be identified by repeating the above operation during reception.

FIG. 11 is a flow chart showing an example of an operation of obtaining an interference characterizing quantity. The procedure of the operation of obtaining an interference characterizing quantity is described using FIG. 11. In the following description, the self communication means communication between the transmitting station 401 and the receiving station 402, and the other communication means communication between the interfering station 403 and the interfering station 404.

When starting the operation of obtaining an interfering signal characterizing quantity, the receiving station 402 determines whether or not the received power of a predetermined value or greater is detected (a step S1101). When the received power of the predetermined value or greater is not detected, the detection of received power is continued until the received power of the predetermined value or greater is detected. When the received power of the predetermined value or greater is detected, the receiving station 402 moves on to a step S1102.

When the received power of the predetermined value or greater is detected, the receiving station 402 determines whether or not it is during the transmission prohibition period for the self communication (the step S1102). When it is during the transmission prohibition period, the receiving station 402 determines that the currently received signal is an interfering signal (a step S1104). When it is not during the transmission prohibition period, the receiving station 402 moves on to a step S1103.

When it is not during the transmission prohibition period, the receiving station 402 determines whether or not a preamble unique to the desired signal is detected in the received signal (the step S1103). When the preamble unique to the desired signal is not detected, the receiving station 402 determines that the currently received signal is an interfering signal (the step S1104) When the preamble unique to the desired signal is detected, the receiving station 402 determines that there is a probability that the desired signal is included in the currently received signal (a step S1109).

When it is determined as YES at the step S1102 and as NO at the step S1103, in either case, it is determined that the currently received signal is an interfering signal (the step S1104). From a step S1105 to a step S1108 after the step S1104, it is determined whether or not the currently received interfering signal is a signal which comes from the same interfering signal source (the interfering station) as the previously received interfering signal. This determination is performed by comparing the characterizing quantities of the previously received interfering signals with the characterizing quantity of the currently received interfering signal. As described above, the characterizing quantity of the interfering signal includes, for example, an inter-antenna correlation value for each sub-band, a time-change characteristic of the received power, and the like.

When it is determined at the step S1104 that the currently received signal is the interfering signal, it is determined whether or not the inter-antenna correlation value of the currently received signal is similar to any of the inter-antenna correlation values which are previously measured and stored (a step S1105). The inter-antenna correlation value is measured within a predetermined frequency band including the frequency band of the desired signal to be received by the receiving station 402. When the inter-antenna correlation value of the currently received signal is similar to any of the previously measured and stored inter-antenna correlation values, it is determined that the currently received signal is an interfering signal which comes from the same interfering signal source as the interfering signal having the similar inter-antenna correlation value. The stored inter-antenna correlation value is updated to the inter-antenna correlation value of the currently received interfering signal (a step S1108). When there is no similar inter-antenna correlation value, the receiving station 402 moves on to a step S1106.

When there is no similar inter-antenna correlation value, it is determined whether or not the combination of the received power of the currently received signal and its duration is similar to the combination of the previously measured and stored received power and duration (the step S1106). For example, the received power between T1 and T2 and its duration, and the received power between T3 and T4 and its duration which are shown in FIG. 7 are stored in advance in the memory 106. These received powers and duration are values concerning the previously received interfering signals, which are measured by the power detection section 109 and the timing detection section 110 at that time. In this state, it is determined whether or not the combination of the received power between T6 and T7 and its duration is similar to any of the combinations of the received powers and their duration which are stored in the memory 106. When the receiving station 402 determines that the combination of the received power between T6 and T7 and its duration is similar to the combination of the received power between T1 and T2 and its duration, the receiving station 402 determines that these similar signals come from the same interfering signal source. The receiving station 402 updates the stored combination of the received power and its duration to the combination of the current received power and its duration (the step S1108). When there is no similar combination of the received power and its duration, it is determined that the currently received signal is an interfering signal which comes from a new interfering signal source, and the current received power and its duration are newly stored (a step S1107).

After the characterizing quantity is newly stored or updated at the step S1107 or the step S1108, the operation of obtaining and storing the interfering signal characterizing quantity is terminated.

When the preamble unique to the desired signal is detected at the step S1103 (YES at the step S1103), it is determined that there is a probability that the desired signal is included in the currently received signal (the step S1109). At steps S1110 and S1111 after the step S1109, when the interfering signal is included in the currently received signal, whether or not the interfering signal is a signal which comes from the same interfering signal source as the previously received interfering signal is determined to identify the interfering signal source. When the interfering signal source is identified, the interfering signal can be suppressed based on the stored characterizing quantity of the interfering signal which comes from the interfering signal source.

When it is determined at the step S1109 that there is the probability that the desired signal is included, whether or not the frequency characteristic of the inter-antenna correlation value of the currently received signal is similar to any of the frequency characteristics of the previously measured and stored inter-antenna correlation values is determined (the step S1110). It is preferable that the determination of whether or not it is similar is performed concerning the inter-antenna correlation value outside the frequency band of the desired signal. If the determination is performed so as to include the inter-antenna correlation value within the frequency band of the desired signal, the measurement of the inter-antenna correlation value of the interfering signal is disturbed by the inter-antenna correlation value of the desired signal, and there is a probability that the measurement of the inter-antenna correlation value of the interfering signal cannot be performed accurately. The measurement of the inter-antenna correlation value which is performed at the step S1110 is performed in a state where the interfering signal and the desired signal are mixed. Since the inter-antenna correlation value within the frequency band of the desired signal is unnecessary for the above similarity determination, the measurement may be performed outside the frequency band of the desired signal. When there is a similar inter-antenna correlation value, it is determined that the interfering signal source (the interfering station) of the currently received signal is the same as that of the interfering signal having the similar inter-antenna correlation value (a step S1113). When there is no similar inter-antenna correlation value, the receiving station 402 moves on to the step S1111.

When there is no similar inter-antenna correlation value, whether or not the received power of the currently received signal is similar to the previously measured and stored received power is determined (the step S1111). For example, the received power between T1 and T2 and its duration, and the received power between T3 and T4 and its duration which are shown in FIG. 7 are stored in advance in the memory 106. In this state, whether or not the received power between T6 and T7 is similar to any of the received powers stored in the memory 106 is determined. When the receiving station 402 determines that the received power between T6 and T7 shown in FIG. 9 is similar to the received power between T1 and T2, it is determined from the prestored duration between T1 and T2 that the interfering signal power between T1 and T2 is overlapped between T7 and T9. Thus, the receiving station 402 determines that the interfering signal which is the same as the interfering signal between T1 and T2 comes between T7 and T9. According to this, the interfering signal source of the coming interfering signal can be identified (the step S1113). Since the characterizing quantity such as the inter-antenna correlation value of the interfering signal between T1 and T2, and the like not only outside the desired signal band but also within the desired signal band is already stored, the interfering signal can be suppressed later by using the interfering signal characterizing quantity within the desired signal band. It is noted that as shown in the bottom of FIG. 9, a power for which the preamble unique to the desired signal is not detected is continued (from T6 to T7), and the preamble unique to the desired signal is detected (from T7 to T8) after the power significantly changes. In this case, it is determined that the desired signal is overlapped in the middle of receiving the interfering signal. Although not shown, in a state where the desired signal is received, when the received power increases once, falls after a while, increases again after a certain interval, and falls after a while, it can be determined that the interfering signals come from the different interfering signal sources. When there is no similar received power at the step S1111, the receiving station 402 demodulates the currently received signal (a step S1112), and moves on to step S1114.

After the currently received signal is demodulated at the step S1112, the receiving station 402 determines whether or not there is error in the PHY header of the demodulation signal (the step S1114). When there is error in the PHY header, the receiving station 402 moves on to a step S1117. When there is no error in the PHY header, the receiving station 402 moves on to a step S1115.

When there is no error in the PHY header, the MAC header of the modulation signal is detected, and whether or not the currently received signal is a signal the destination of which is the receiving station 402 is determined from the contents of the MAC header (the step S1115). When the currently received signal is not a signal the destination of which is the receiving station 402, it is determined that currently received signal is an interfering signal (the step S1104). Thus, even concerning communication which is performed over the same channel as that of the self communication, whether the communication is the self communication or the other communication can be determined. When the currently received signal is not a signal the destination of which is the receiving station 402, the receiving station 402 determines that the currently received signal is a desired signal (a step S1116).

When the currently received signal is the desired signal at the step S1116, information of the inter-antenna correlation value, the received power, and the like which are measured at that time is not stored as interference information, and the measurement is terminated.

When it is determined as NO at the step S1114, whether or not the power outside the signal band is larger than that within the desired signal band is determined (the step S1117). When it is determined at the step S1114 that there is error in the PHY header, there is a probability that modulation error occurs due to a fact that the power of the desired signal is small, or the preamble of the interfering signal of the adjacent channel is accidentally detected as the preamble of the desired signal at the step S1103. Thus, when the power outside the desired signal band is larger than that within the desired signal band, it is determined that the currently received signal is the interfering signal (the step S1104). When the power outside the signal band is not larger than that within the desired signal band, it is assumed that whether or not the desired signal is included in the currently received signal cannot be determined (a step S1118).

When whether or not the desired signal is included in the currently received signal cannot be determined (the step S1118), information of the inter-antenna correlation value, the received power, and the like which are measured at that time is not stored as interfering signal information, and the measurement is terminated. By the above processing, the interfering signal characterizing quantity can be obtained. It is noted that in FIG. 11, although the operation is terminated at the end of the flow chart, this sequence of operations is basically repeated after returning to the step S1101.

It is noted that in the step S1105 and the step S1106, and the step S1110 and the step S1111 in the present example, when there is no similar frequency characteristic of the inter-antenna correlation value, whether or not there is a similar received power is determined. However, the similarity determination method for identifying the interfering signal source is not limited to this. Naturally, the similarity determination is possible by using only the frequency characteristic of the inter-antenna correlation value, or the order of the determination methods may be changed.

In the present example, whether or not the desired signal is included in the received signal is determined by using the four determination methods of confirming whether or not there is the transmission prohibition period, whether or not there is the preamble unique to the desired signal, whether or not there is error in the PHY header, and whether or not it is communication the destination of which is the receiving station. Each of these four methods can be used solely, or a combination of criteria other than these four criteria can be used.

Example 2

Figure 12:
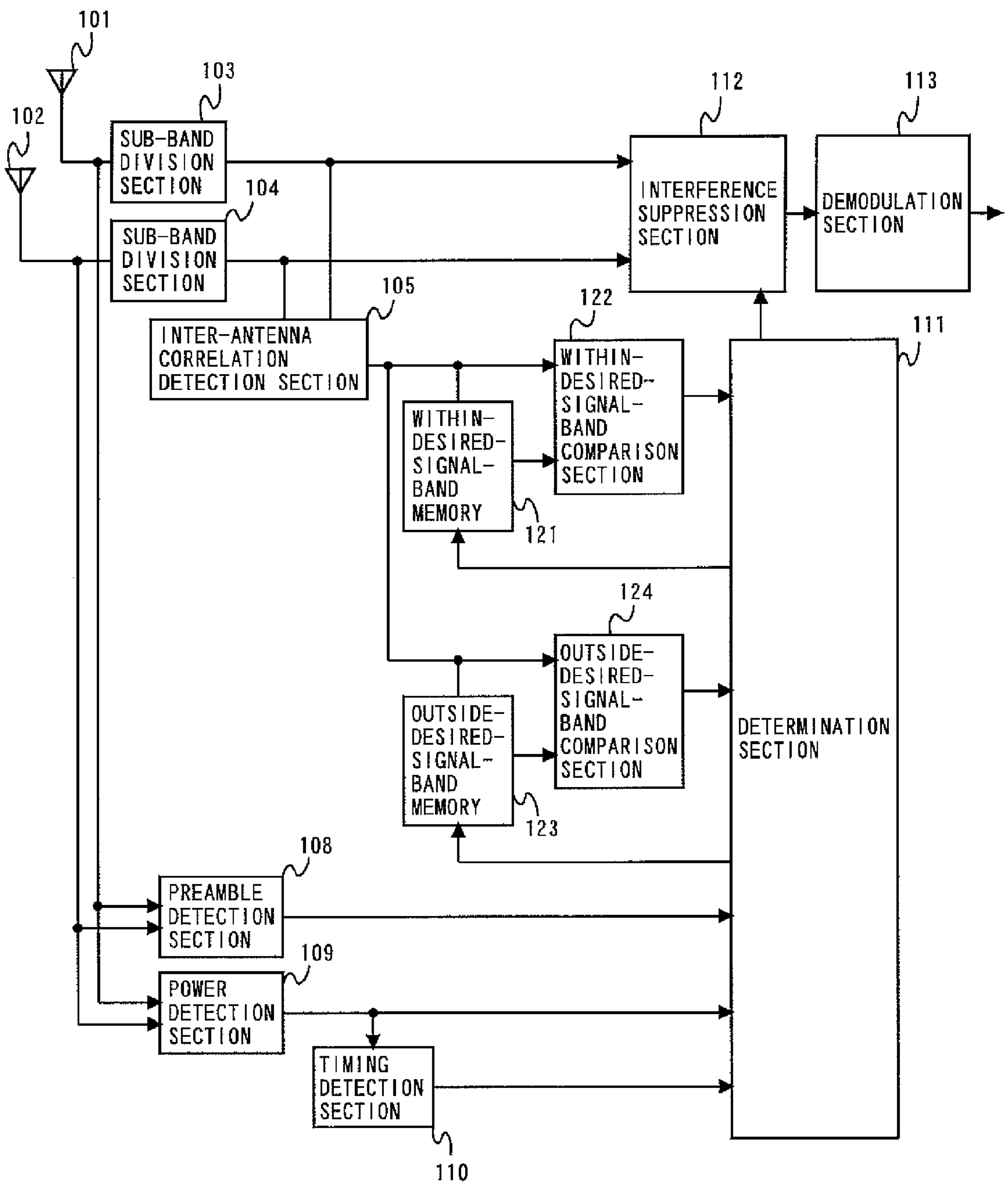
FIG. 12 is a block diagram showing a configuration of a receiving station 402 including an interfering signal measurement device in an example 2 of the first embodiment.

FIG. 12 is a block diagram showing a configuration of an interfering signal suppressing device (a receiving station) including an interfering signal measurement device according to an example 2 of the first embodiment. In FIG. 12, the same configurations as those of FIG. 1 of the embodiment 1 are designated by the same numerals, and the description thereof will be omitted.

What is different from the example 1 is configurations of a section for storing the measured inter-antenna correlation value of the interfering signal, and a section for comparing the stored inter-antenna correlation values with the inter-antenna correlation value of the currently received signal. In the example 2, the section for storing the measured inter-antenna correlation value of the interfering signal is provided so as to be divided into a within-desired-signal-band memory 121 and an outside-desired-signal-band memory 123. The within-desired-signal-band memory 121 and the outside-desired-signal-band memory 123 store and read information according to an instruction from the determination section 111. The section for comparing the stored inter-antenna correlation values with the inter-antenna correlation value of the currently received signal is provided so as to be divided into a within-desired-signal-band comparison section 122 and an outside-desired-signal-band comparison section 124.

FIG. 13 illustrates an exemplary configuration of sub-band division section 103 which outputs both components within and outside the desired signal band. The sub-band division section 103 has the same configuration as the sub-band division section 104, and thus only the configuration of the sub-band division section 103 will be described. The sub-band division section 103 shown in FIG. 13 includes a Fourier transform section 125. The Fourier transform section 125 has a Fourier transform circuit such as FFT, or the like. The Fourier transform circuit is set so that the sampling frequency band thereof includes the frequency band of the desired signal and is broader than the frequency band of the desired signal.

Thus, the Fourier transform circuit can output sub-band signals of the components within the frequency band of the desired signal and sub-band signals of the components outside the frequency band of the desired signal.

FIG. 14 illustrates another example of the sub-band division section 103. A sub-band division section 103-1 shown in FIG. 14 includes a within-desired-signal-frequency-band pass filter 126 and an outside-desired-signal-frequency-band pass filter 127 in addition to the Fourier transform section 125 shown in FIG. 13. In the example shown in FIG. 14, the Fourier transform section 125 outputs sub-band signals within the desired signal frequency band. In the stage immediately prior to the Fourier transform section 125, the within-desired-signal-frequency-band pass filter 126 is provided. The within-desired-signal-frequency-band pass filter 126 extracts the components within the frequency band of the desired signal from an input signal. In parallel with the within-desired-signal-frequency-band pass filter 126, the outside-desired-signal-frequency-band pass filter 127 is provided. The outside-desired-signal-frequency-band pass filter 127 extracts the components outside the frequency band of the desired signal from the input signal. Since only the components within the frequency band of the desired signal have to be demodulated, the Fourier transform section 125 is provided in the following stage of the within-desired-signal-frequency-band pass filter 126. By extracting individually the components within the frequency band of the desired signal and the components outside the frequency band of the desired signal, a frequency band width in frequency division and the like can be set individually, and flexibility of circuit design can be enhanced.

The interfering signal measurement operation is basically the same as the flow chart shown in FIG. 11 of the example 1. It is noted, however, in the example 2, the inter-antenna correlation values within the signal band of the desired signal and outside the signal band thereof are separately stored. The comparison of the stored inter-antenna correlation values with the inter-antenna correlation value of the currently received signal is performed as follows. During a time period when the interfering signal is received, the inter-antenna correlation values stored in the within-desired-signal-band memory 121 and the outside-desired-signal-band memory 123 are compared with the components of the currently received signal within the desired signal frequency band and the components of the currently received signal outside the desired signal frequency band. When there is a probability that the desired signal is included in the currently received signal, the inter-antenna correlation values stored in the outside-signal-band memory 123 are compared with the inter-antenna correlation values of the components of the currently received signal outside the desired signal frequency band.

It is noted in the example 2, the within-desired-signal-band comparison section 122 is not necessarily needed, and may be omitted. This is because if at least similarity determination is performed outside the desired signal frequency band by the outside-desired-signal-band comparison section 124, the interfering signal can be identified. Even in this case, the within-desired-signal-band memory 121 is needed. This is because the characterizing quantity within the desired signal frequency band is needed for suppressing the interfering signal.

The configuration of the present embodiment is not limited to the configuration as described above, and various configurations may be used. The application field of the present invention is not limited to the field as described above, and the present invention is applicable to various fields. As an example, the case in which the present invention is applied to a wireless LAN system by a CSMA using a multicarrier modulation method has been described in the present example, but the present invention may be applied to a radio system using single carrier modulation, or a radio system using various access methods such as TDMA, FDMA, CDMA, SDMA, and the like.

It is noted that each of function blocks of the sub-band division section, the inter-antenna correlation value detection section, the memory, the comparison section, the preamble detection section, the power detection section, the timing detection section, the determination section, the interfering signal suppression section, the demodulation section, and the like is typically achieved as an LSI which is an integrated circuit. They may be individually made into one chip, or a part or all of them may be made into one chip.

Although the LSI is described here, the integrated circuit is referred to as an IC, a system LSI, a super LSI, an ultra LSI depending on difference in integration degrees.

A technique of integrated circuit implementation is not limited to the LSI, but may be achieved by a dedicated circuit or a universal processor. An FPGA (Field Programmable Gate Array) which is programmable after production of an LSI and a reconfigurable processor in which the connection and the setting of a circuit cell inside the LSI are reconfigurable may be used. A configuration in which the processor is controlled by executing a control program stored in a ROM in a hardware resource equipped with a processor, a memory, and the like may be used.

Further, if a technique of integrated circuit implementation which replaces the LSI by advancement of semiconductor technique and another technique derived therefrom is developed, naturally, the function blocks may be integrated by using the technique. Adaptation of a bio technique could be possible.

The following will describe a second embodiment of the present invention with reference to the drawings.

Second Embodiment

Example 1

Figure 15:
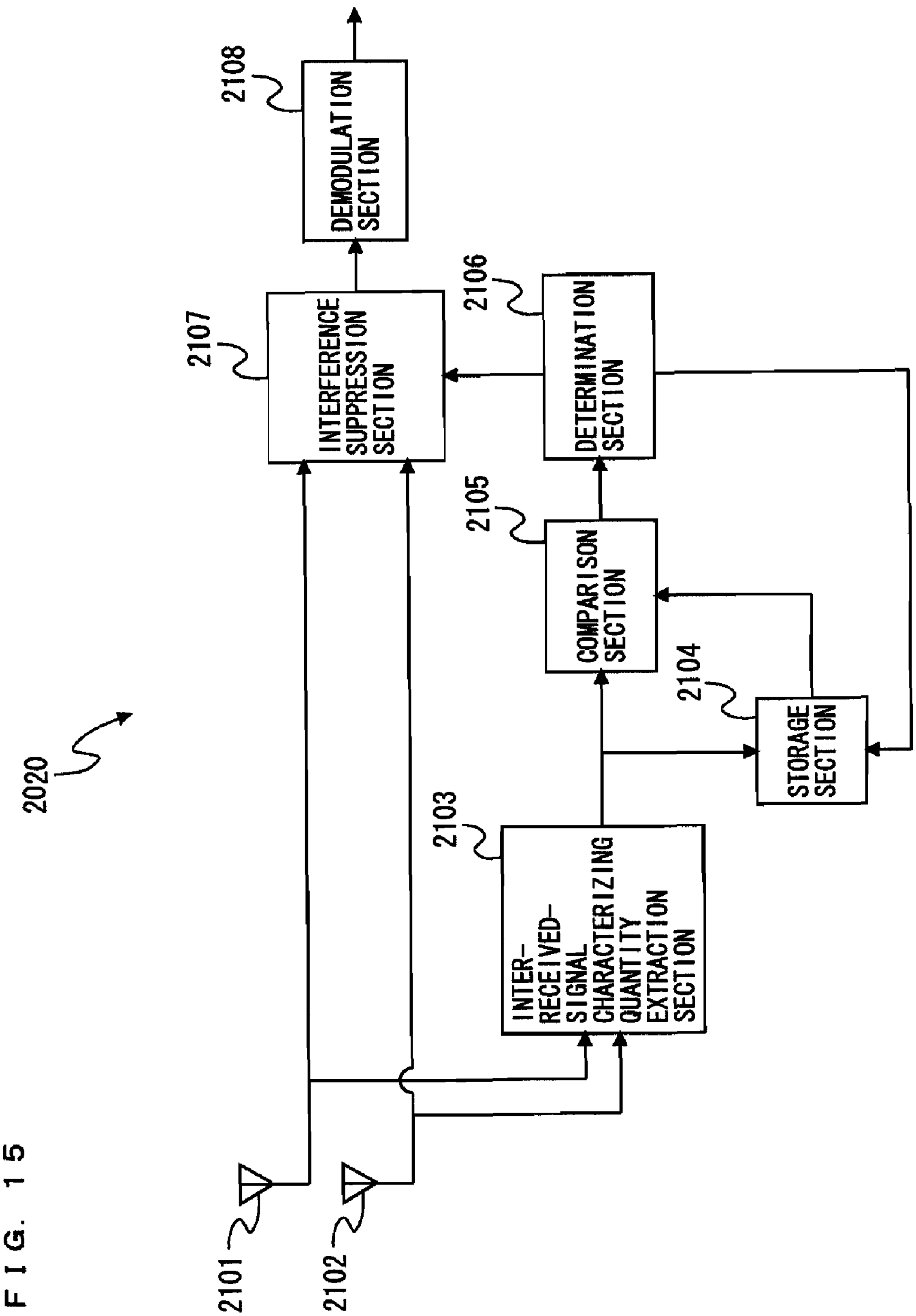
FIG. 15 is a block diagram showing a configuration of an interfering signal suppressing device (a receiving station) according to an example 1 of a second embodiment.

FIG. 15 is a block diagram showing a configuration of an interfering signal suppressing device 2120 according to an example 1 of the second embodiment. The interfering signal suppressing device according to the example 1 is regarded as a receiving station in the radio communication system. In the following description, the interfering signal suppressing device is referred to as a receiving station according to need.

As shown in FIG. 15, the interfering signal suppressing device (the receiving station) 2120 includes two antennas 2101 and 2102, an inter-received-signal characterizing quantity extraction section 2103, a storage section 2104, a storage section 2104, a comparison section 2105, a determination section 2106, an interfering signal suppression section 2107, and a demodulation section 2108.

The antennas 2101 and 2102 shown in FIG. 15 output received signals to the inter-received-signal characterizing quantity extraction section 2103 and the interfering signal suppression section 2107.

The inter-received-signal characterizing quantity extraction section 2103 receives the signals received by the antennas 2101 and 2102. The inter-received-signal characterizing quantity extraction section 2103 calculates a characterizing quantity between the two signals received by the two antennas as a characterizing quantity of the received signal. The inter-received-signal characterizing quantity extraction section 2103 outputs the calculated characterizing quantity to the storage section 2104 and the comparison section 2105. A type of the inter-received-signal characterizing quantity in the example 1 is an inter-antenna correlation value.

The comparison section 2105 receives the characterizing quantity which is extracted by the inter-received-signal characterizing quantity extraction section 2103 from the currently received signal and the characterizing quantities of the previously received signals which are stored in the storage section 2104. The comparison section 2105 calculates differences between these characterizing quantities. The comparison section 2105 outputs the calculated differences between the characterizing quantities as similarities to the determination section 2106. The similarity is a quantity representing degree of a similarity between the characterizing quantity of the currently received signal and the characterizing quantity stored in the storage section 2104.

The determination section 2106 determines whether or not the similarities outputted by the comparison section 2105 are greater or smaller than a threshold value. When the similarity is equal to or greater than the threshold value, the determination section 2106 determines that the currently received signal and the previously received interfering signal the characterizing quantity of which is stored come from the same interfering signal source. When the similarities are smaller than the threshold value, the determination section 2106 determines that the currently received signal and the previously received interfering signals the characterizing quantities of which are stored come from different interfering signal sources. It is noted that in the case where a plurality of characterizing quantities of the previously received interfering signals having the similarities which are equal to or greater than the threshold value are stored, it can be determined that the signal having the highest similarity among the plurality of previously received interfering signals comes from the same interfering signal source as the currently received interfering signal. A type of a similarity is not particularly limited, and for example, may be the same as in the above first embodiment, but may be a distance d on a complex plane between an inter-antenna correlation value of the currently received signal and an inter-antenna correlation value of the previously received signal as described later. The determination section 2106 outputs information concerning the determination of the currently received interfering signal to the storage section 2104.

The storage section 2104 stores the characterizing quantity which is extracted by the inter-received-signal characterizing quantity extraction section 2103. The storage section 2104 receives the information concerning the determination of the interfering signal from the determination section 2106. Based on the information concerning the determination of the currently received interfering signal, the storage section 2104 can input to the interfering signal suppression section 2107 the stored characterizing quantity of the interfering signal which previously comes from the same interfering signal source as the currently received interfering signal. Similarly as in the first embodiment, when only an interfering signal comes, its characterizing quantities concerning within the frequency band of the desired signal and outside the frequency band of the desired signal are measured and stored in advance. Thus, even when an interfering signal having the same characterizing quantity as the interfering signal which previously comes with the desired signal, similarly as in the first embodiment, the currently coming interfering signal can be suppressed.

The interfering signal suppression section 2107 suppresses the interfering signal which overlaps with the desired signal based on the characterizing quantity of the interfering signal which is outputted by the storage section 2104 based on the determination information which is outputted by the determination section 2106. The demodulation section 2108 demodulates the desired signal in which the interfering signal is suppressed.

It is noted that when the signal powers of the signals received by the two antennas 2101 and 2102 are small, an effect of thermal noise becomes relatively large, and determination error at the determination section 2106 easily occurs. Thus, in this case, the processing at the inter-received-signal characterizing quantity extraction section 2103, the storage section 2104, the comparison section 2105, and the determination section 2106 may be suspended. This can prevent malfunction due to the determination error.

Figure 16:
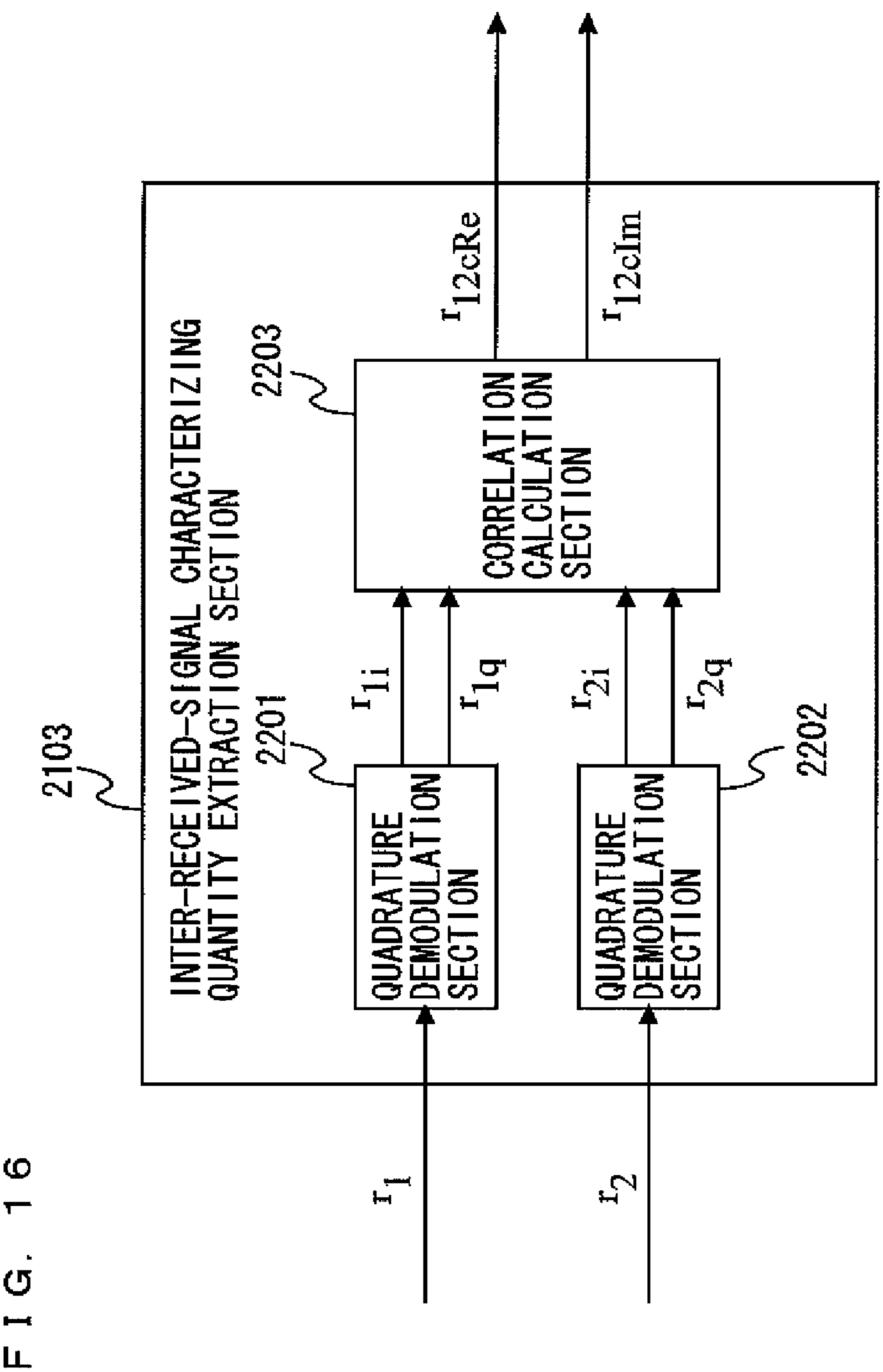
FIG. 16 is a block diagram showing an inter-received-signal characterizing quantity extraction section 2103 in the example 1 of the second embodiment.

Here, a specific configuration of the inter-received-signal characterizing quantity extraction section 2103 will be described. FIG. 16 is a block diagram showing a configuration of the inter-received-signal characterizing quantity extraction section 2103 in the example 1.

As shown in FIG. 16, the inter-received-signal characterizing quantity extraction section 2103 includes two quadrature demodulation sections 2201 and 2202, and a correlation calculation section 2203.

The quadrature demodulation section 2201 receives a received signal $r_1$ of the antenna 2101. The quadrature demodulation section 2201 divides the received signal $r_1$ into an in-phase component $r_{1i}$ and a quadrature component $r_{1q}$ by quadrature demodulation, and outputs these components to the correlation calculation section 2203.

Similarly, the quadrature demodulation section 2202 receives a received signal $r_2$ of the antenna 2102. The quadrature demodulation section 2202 divides the received signal $r_2$ into an in-phase component $r_{2i}$ and a quadrature component $r_{2q}$ by quadrature demodulation, and outputs these components to the correlation calculation section 2203.

It is noted that in the case where the signal inputted to the inter-received-signal characterizing quantity extraction section 2103 is a high-frequency signal or an intermediate-frequency signal, the quadrature demodulation sections 2201 and 2202 are needed in the inter-received-signal characterizing quantity extraction section 2103. However, in the case where the signal inputted to the inter-received-signal characterizing quantity extraction section 2103 is a complex baseband signal, since quadrature demodulation is already performed, the quadrature demodulation sections 2201 and 2102 are not needed in the inter-received-signal characterizing quantity extraction section 2103.

The correlation calculation section 2203 receives the four components $r_{1i}$, $r_{1q}$, $r_{2i}$, and $r_{2q}$, which are outputted by the quadrature demodulation sections 2201 and 2202.

The correlation calculation section 2203 calculates a real part component $r_{12cRe}$, of the inter-received-signal correlation value by:

$$r_{12cRe}=r_{1i}\times r_{2i}+r_{1q}\times r_{2q}. \quad \text{(equation 2-1)}$$

The correlation calculation section 2203 calculates an imaginary part component $r_{12cIm}$ of the inter-received-signal correlation value by:

$$r_{12cIm}=r_{1q}\times r_{2i}-r_{1i}\times r_{2q}. \quad \text{(equation 2-2)}$$

The correlation calculation section 2203 outputs the real part component $r_{12cRe}$ and the imaginary part component $r_{12cIm}$ as a characterizing quantity to the storage section 2104 and the comparison section 2105 which are shown in FIG. 15.

Thus, the real part component $r_{12cRe}$ and the imaginary part component $r_{12cIm}$ of the inter-received-signal correlation value of the currently received signal, and a real part component $r'_{12cRe}$ and an imaginary part component $r'_{12cIm}$ of the previously received signal which are stored in the storage section 2104 are inputted to the comparison section 2105.

The comparison section 2105 calculates a distance d on the complex plane between the correlation value of the currently received signal and the correlation value of the previously received signal by:

$$d=(r_{12cRe}-r'_{12cRe})^2+(r_{12cIm}-r'_{12cIm})^2. \quad \text{(equation 2-3)}$$

The comparison section 2105 outputs the distance d as a similarity.

Figure 17:
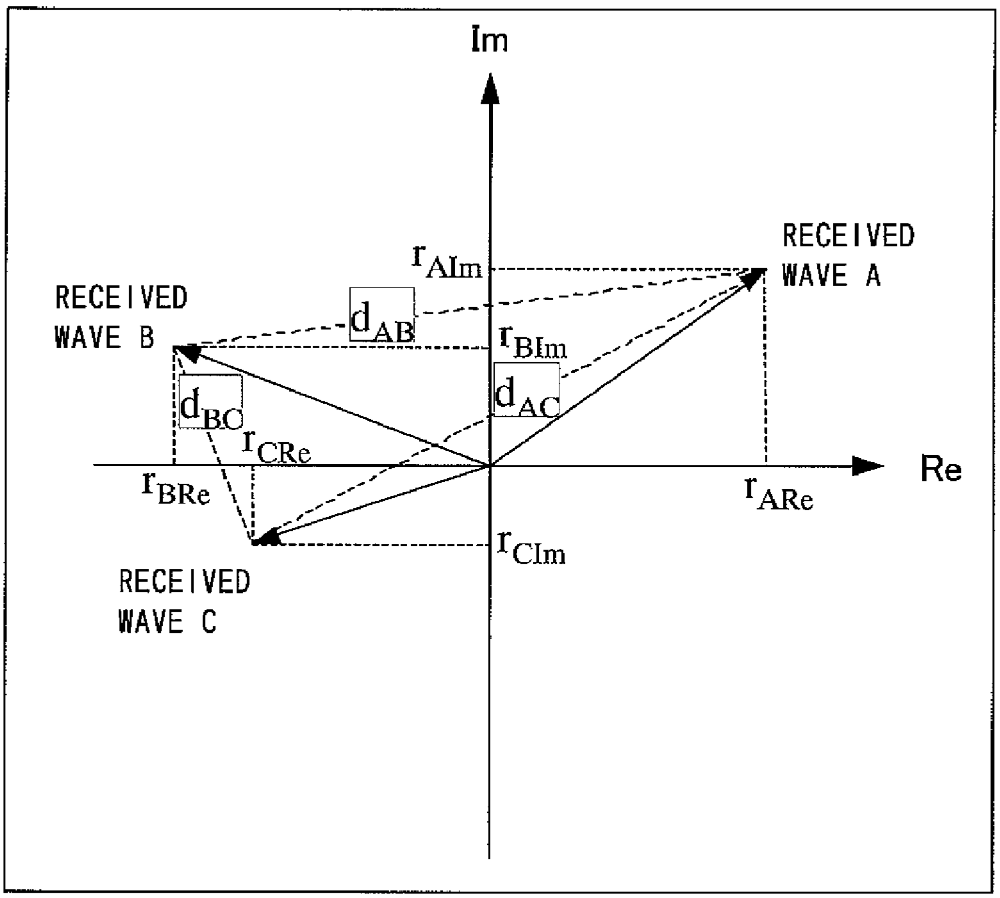
FIG. 17 is a view of a complex plane for the inter-received-signal characterizing quantity extraction section 2103 in the example 1 of the second embodiment.

FIG. 17 is a view in which inter-received-signal correlation values of three received signals A, B, and C transmitted from different interfering signal sources are shown on a complex plane.

Real part components of the inter-received-signal correlation values of the received signals A, B, and C are denoted by $r_{ARe}$, $r_{BRe}$, and $r_{CRe}$, and imaginary part components of the inter-received-signal correlation values thereof are denoted by $r_{AIm}$, $r_{BIm}$, and $r_{CIm}$. A distance between the inter-received-signal correlation values of the received signal A and the received signal B are denoted by $d_{AB}$, a distance between the inter-received-signal correlation values of the received signal B and the received signal C is denoted by $d_{BC}$, and a distance between the inter-received-signal correlation values of the received signal A and the received signal C is denoted by $d_{AC}$.

As shown in FIG. 17, signals which are transmitted from the same transmission source are received as signals having a constant amplitude difference and phase difference between the two antennas, and have an unique correlation between the received signals for the interfering signal source. Thus, signals which are transmitted from different interfering signal sources have a distance between inter-received-signal correlation values which is larger than zero as shown by $d_{AB}$, $d_{BC}$, and $d_{AC}$. A distance between inter-received-signal correlation values of the signals which are transmitted from the same interfering signal source becomes zero.

Therefore, the correlation value between the signals received by the two antennas is compared between the interfering signal sources, thereby determining whether or not the transmission sources of the currently received interfering signal and the previously received interfering signal are the same even in the case an interfering signal other than the desired signal, such as a leakage power from a different radio communication system or an adjacent frequency channel, and the like, comes to the receiving station.

Figure 18:
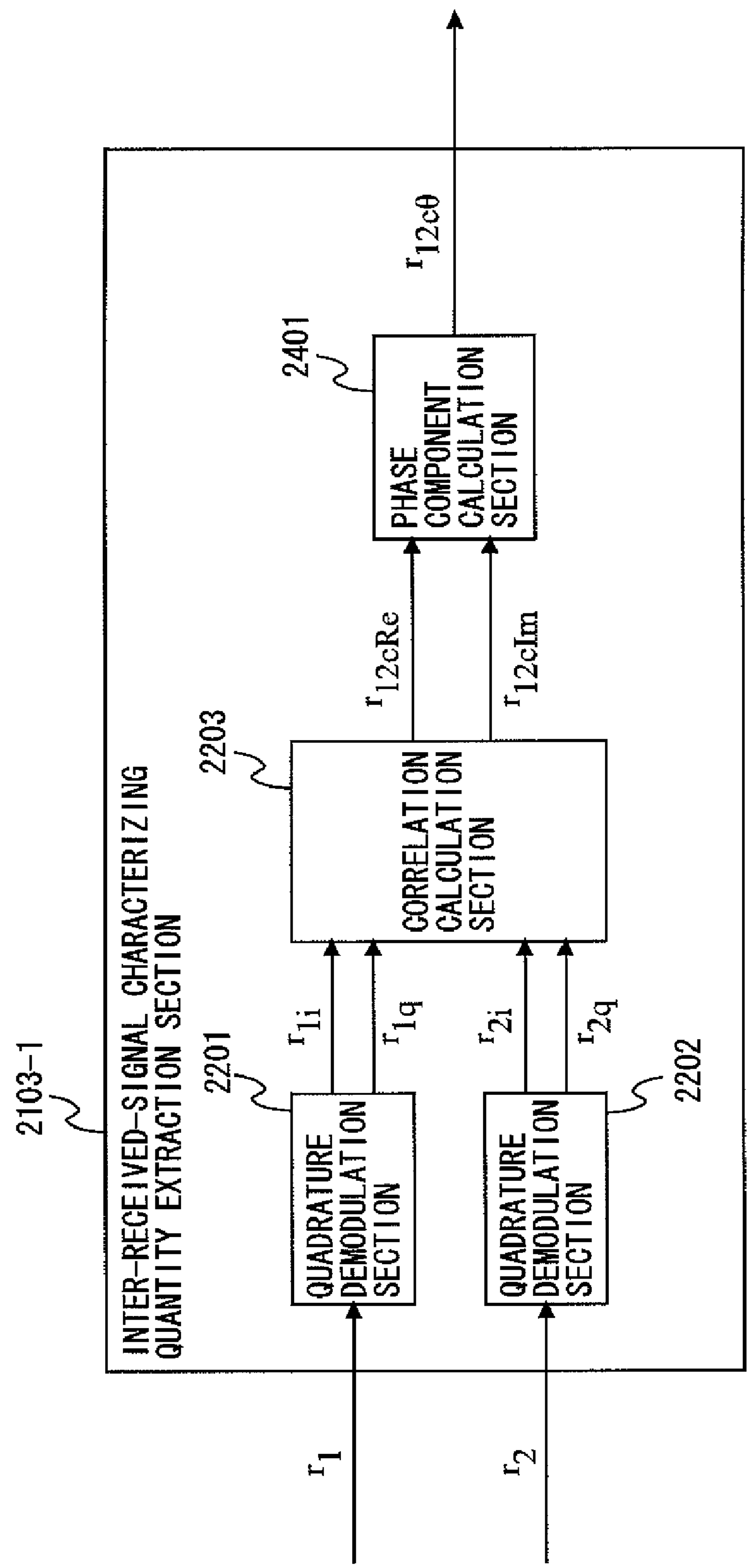
FIG. 18 is a block diagram showing an inter-received-signal characterizing quantity extraction section 2103-1 in the example 1 of the second embodiment.

A configuration of a modified example 2103-1 of the inter-received-signal characterizing quantity extraction section 2103 will be described. FIG. 18 is a block diagram showing the configuration of the modified example 2103-1 of the inter-received-signal characterizing quantity extraction section 2103 in the example 1.

As shown in FIG. 18, the inter-received-signal characterizing quantity extraction section 2103-1 includes two quadrature demodulation sections 2201 and 2202, a correlation calculation section 2203, and a phase component calculation section 2401. In FIG. 18, the same elements as those in FIG. 16 are designated by the same reference numerals, and the description thereof will be omitted.

It is noted that in the case where the signal inputted to the inter-received-signal characterizing quantity extraction section 2103-1 is a high-frequency signal or an intermediate-frequency signal, the quadrature demodulation sections 2201 and 2202 are needed. On the other hand, in the case where the signal inputted to the inter-received-signal characterizing quantity extraction section 2103-1 is a complex baseband signal, since quadrature demodulation is already performed, the quadrature demodulation sections 2201 and 2202 are not needed in the inter-received-signal characterizing quantity extraction section 2103-1.

The phase component calculation section 2401 receives the two components $r_{12cRe}$ and $r_{12cIm}$ representing inter-received-signal correlation value, which are outputted from the correlation calculation section 2203. The phase component calculation section 2401 calculates a phase component $r_{12c\theta}$ of the received signal correlation value by:

$$r_{12c\theta}=\tan^{-1}(r_{12cIm}/r_{12cRe}). \quad \text{(equation 2-4)}$$

The phase component calculation section 2401 outputs the phase component $r_{12c\theta}$ as an inter-received-signal characterizing quantity to the storage section 2104 and the comparison section 2105 which are shown in FIG. 15.

Thus, the phase component of the inter-received-signal correlation value of the currently received signal, and the phase component of the inter-received-signal correlation value of the previously received signal, which is stored in the storage section 2104, are inputted to the comparison section 2105. The comparison section 2105 calculates a phase difference between these phase components, and outputs the calculated value as a similarity to the determination section 2106.

Figure 19:
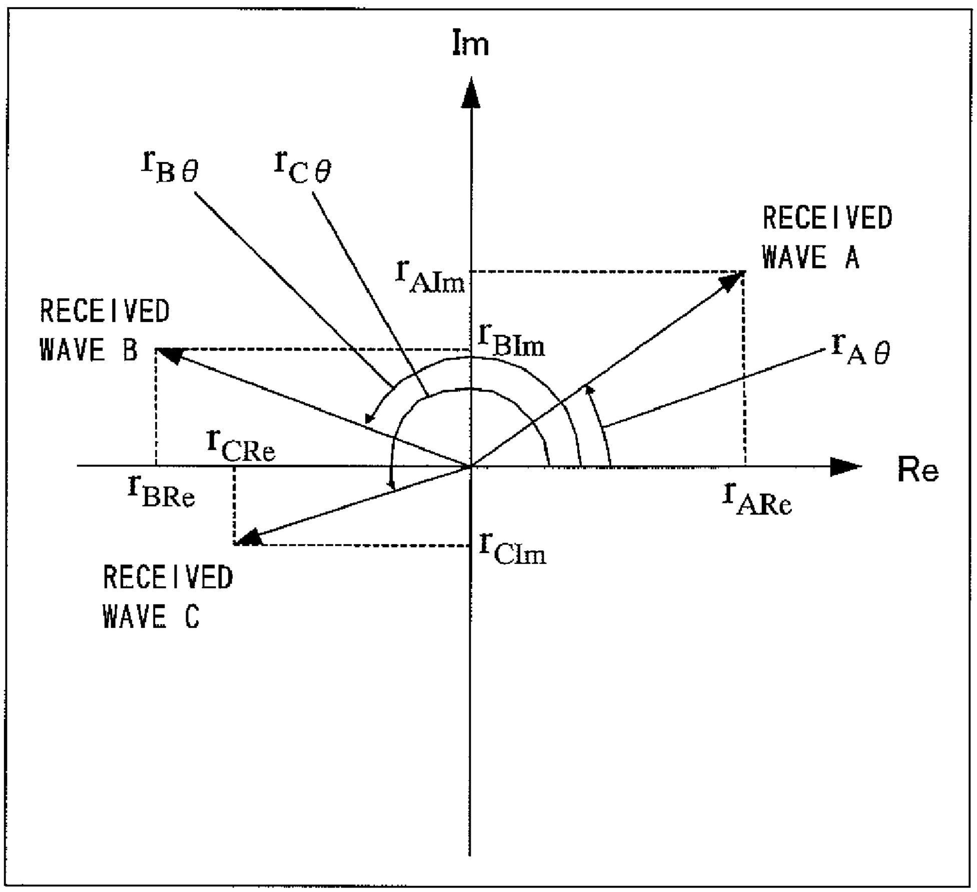
FIG. 19 is a view of a complex plane for the inter-received-signal characterizing quantity extraction section 2103-1 in the example 1 of the second embodiment.

FIG. 19 is a view in which phase components of inter-received-signal correlation values of three received signals A, B, and C transmitted from different interfering signal sources are shown on a complex plane.

Real part components of the inter-received-signal correlation value of the received signals A, B, and C are denoted by $r_{ARe}$, $r_{BRe}$, and $r_{CRe}$, imaginary part components of the inter-received-signal correlation values thereof are denoted by $r_{AIm}$, $r_{BIm}$, $r_{CIm}$, and phase components of the inter-received-signal correlation value thereof are denoted by $r_{A\theta}$, $r_{B\theta}$, and $r_{C\theta}$.

In the case where signals which are transmitted from the same interfering signal source are amplitude-modulated signals, a signal power of the received signal is different for each symbol length of the amplitude-modulated signal. Thus, the values of the real part components $r_{ARe}$, $r_{BRe}$, and $r_{CRe}$ and the imaginary part components $r_{AIm}$, $r_{BIm}$, $r_{CIm}$ of the inter-received-signal correlation values change. However, a change rate of the real part components $r_{ARe}$, $r_{BRe}$, $r_{CRe}$ and a change rate of the imaginary part components $r_{AIm}$, $r_{BIm}$, and $r_{CIm}$, due to a change of the signal power by amplitude modulation are constant. Thus, the phase components $r_{A\theta}$, $r_{B\theta}$, and $r_{c\theta}$ of the inter-received-signal correlation values becomes constant for each symbol length. Therefore, only the phase components $r_{A\theta}$, $r_{B\theta}$, and $r_{C\theta}$ of the inter-received-signal correlation values are compared, thereby preventing determination error which occurs due to a change of the correlation values in receiving the amplitude-modulated signal. Therefore, even though the signal power of the received signal is different for each symbol length of the amplitude-modulated signal, whether or not the transmission sources of the currently received signal and the previously received signal are the same can be precisely determined.

Figure 20:
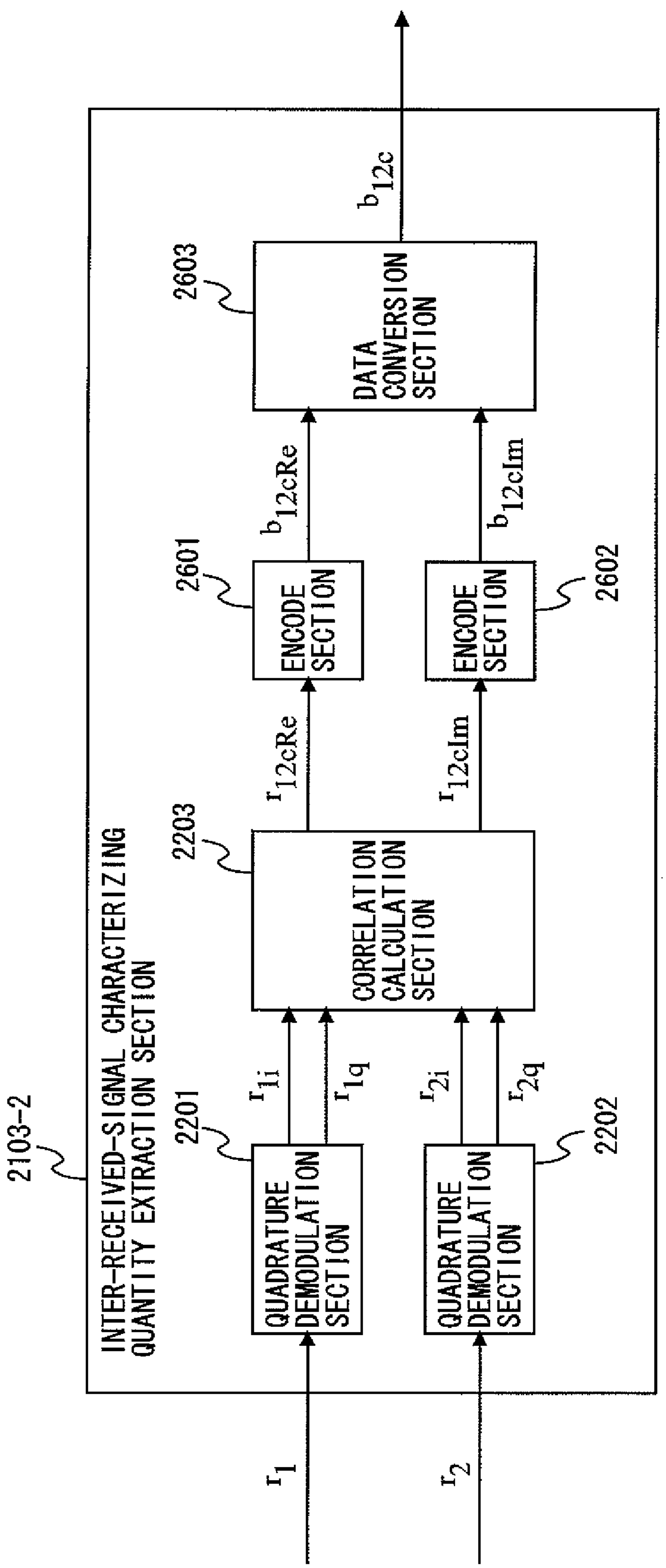
FIG. 20 is a block diagram showing an inter-received-signal characterizing quantity extraction section 2103-2 in the example 1 of the second embodiment.

The following will describe another modified example of the inter-received-signal characterizing quantity extraction section 2103. FIG. 20 is a block diagram showing a configuration of an inter-received-signal characterizing quantity extraction section 2103-2 in the example 1. In FIG. 20, the same elements as those in FIG. 16 are designated by the same reference numerals, and the description thereof will be omitted.

As shown in FIG. 20, the inter-received-signal characterizing quantity extraction section 2103-2 includes two quadrature demodulation sections 2201 and 2202, a correlation calculation section 2203, encode sections 2601 and 2602, and a data conversion section 2603.

It is noted that in the case where the signal inputted to the inter-received-signal characterizing quantity extraction section 2103-2 is a high-frequency signal or an intermediate-frequency signal, the quadrature demodulation sections 2201 and 2202 are needed. On the other hand, in the case where the signal inputted to the inter-received-signal characterizing quantity extraction section 2103 is a complex baseband signal, since quadrature demodulation is already performed, the quadrature demodulation sections 2201 and 2202 are not needed in the inter-received-signal characterizing quantity extraction section 2103-2.

The encode section 2601 receives $r_{12cRe}$ representing a real part component among two components representing the inter-received-signal correlation value, which are outputted from the correlation calculation section 2203.

The encode section 2601 outputs to the data conversion section 2603 zero as bit information $b_{12cRe}$ where $r_{12cRe} \geqq 0$, and 1 as the bit information $b_{12cRe}$ where $r_{12cRe} < 0$.

Similarly, the encode section 2602 receives $r_{12cIm}$ denoting a imaginary part component among two components representing the inter-received-signal correlation value, which are outputted from the correlation calculation section 2203.

The encode section 2602 outputs to the data conversion section 2603 zero as bit information $b_{12cIm}$ where $r_{12cIm} \geqq 0$, and 1 as the bit information $b_{12cIm}$ where $r_{12cIm} < 0$.

The data conversion section 2603 receives the bit information $b_{12cRe}$ and $b_{12cIm}$ which are outputted by the encode sections 2601 and 2602.

The data conversion section 2603 calculates a bit string $b_{12c}$ by:

$$b_{12c} = \{b_{12cRe} b_{12cIm}\}. \quad \text{(equation 2-5)}$$

The data conversion section 2603 outputs the bit string $b_{12}$, as a between-received-signal characterizing quantity to the storage section 2104 and the comparison section 2105 which are shown in FIG. 15.

The bit string $b_{12c}$ calculated by the data conversion section 2603 indicates in which of the four regions (see FIG. 21) on the complex plane the inter-received-signal correlation value exists.

The comparison section 2105 receives the bit string which indicates a region on the complex plane in which the inter-received-signal correlation value of the currently received interfering signal exists, and a bit string which indicates a region on the complex plane in which the inter-received-signal correlation value of the previously received interfering signal, which is stored in the storage section 2104, exists. The comparison section 2105 calculates a bit string which is an exclusive OR of these two bit strings, and calculates a sum of each bit of this bit string. This sum indicates a similarity between the inter-received-signal correlation value of the currently received interfering signal and the received signal correlation value of the previously received interfering signal.

It is noted that code assignment with respect to each region on the complex plane is performed so that a hamming distance between a code representing a region and a code representing a region adjacent to the region becomes 1. In this case, an exclusive OR of two bit strings representing two received signals is calculated, and a sum of each bit of a bit string representing this exclusive OR is calculated, thereby obtaining a similarity. The value of the similarity concerning between the adjacent regions is different from that concerning between non-adjacent regions. The value of the similarity changes depending on a spaced distance between regions. More specifically, as the spaced distance becomes large, the above hamming distance becomes large. Thus, using the similarity makes it easy to determine how much the currently received interfering signal and the previously received interfering signal are similar to each other.

FIG. 21 is a view in which phase components of three received signals A, B, and C which are transmitted from different interfering signal sources are shown on a complex plane which is divided into four regions.

The inter-received-signal characterizing quantity extraction section 2103-2 shown in FIG. 20 performs encode of the received signals at the encode sections 2601 and 2602. The received signal A is represented by "00", the received signal B is represented by "01", and the received signal C is represented by "11".

Further, the inter-received-signal characterizing quantity extraction section 2103-2 calculates exclusive ORs of bit strings which represent the received signals A, B, and C, respectively. The exclusive OR of the received signal A and the received signal B becomes "01", and the similarity therebetween is 1. The exclusive OR of the received signal B and the received signal C becomes "10", and the similarity therebetween is 1. The exclusive OR of the received signal A and the received signal C becomes "11", and the similarity therebetween is 2. Thus, it can be seen that degree of a difference between the received signal A and the received signal C which exist in the regions which are diagonal with respect to each other is greater compared to that between the received signal A and the received signal B, or the received signal B and the received signal C, which exist in the regions which are adjacent to each other.

It is noted that in calculating the similarity between the correlation value of the currently received interfering signal and the correlation value of the previously received interfering signal, the data conversion section 2603 is not used, and the bit information $b_{12cRe}$ and $b_{12cIm}$ of the currently received interfering signal may be compared individually with bit information of the previously received interfering signal for calculating the similarity.

The following will describe a further modified example 2103-3 of the inter-received-signal characterizing quantity extraction section 2103.

Figure 22:
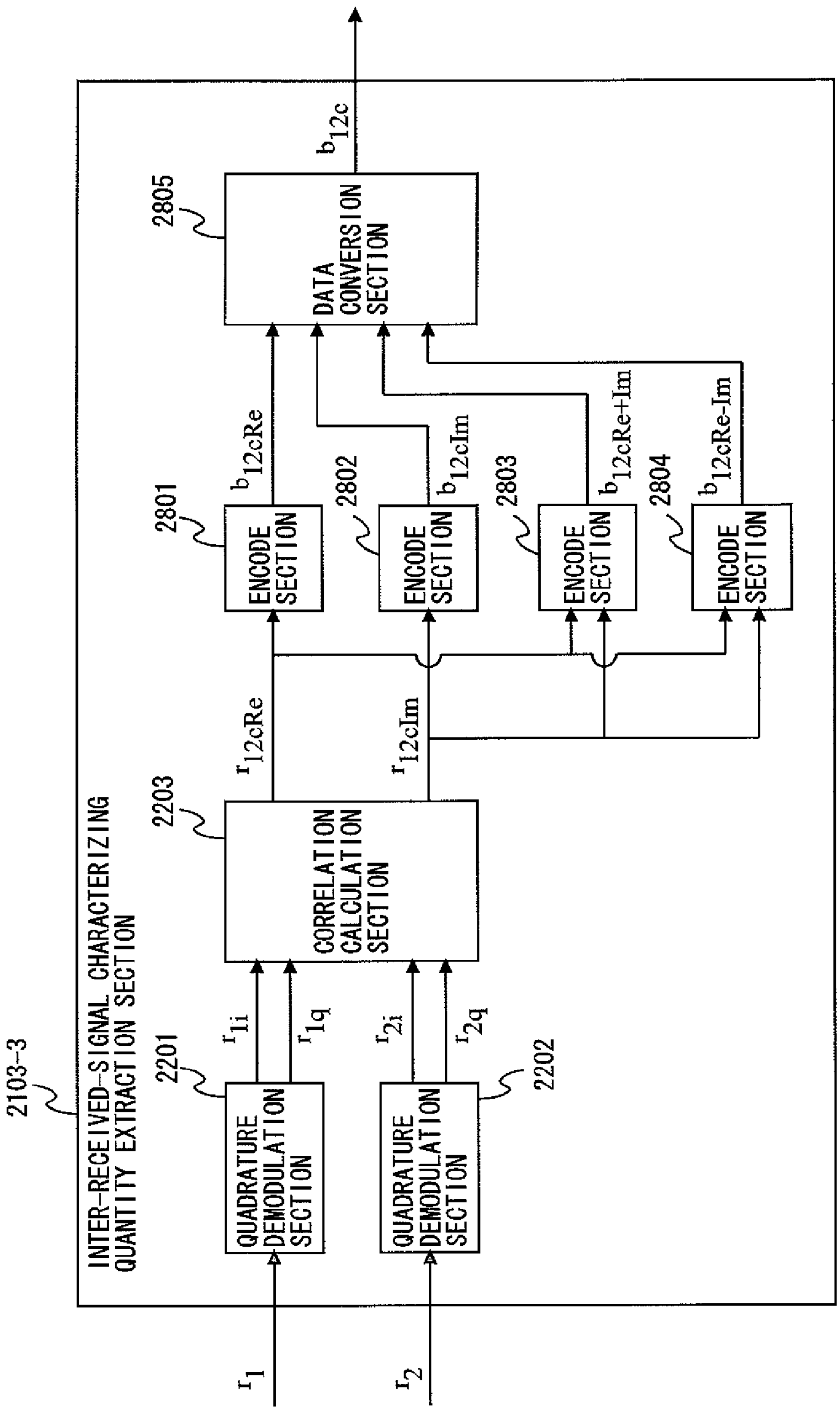
FIG. 22 is a block diagram showing an inter-received-signal characterizing quantity extraction section 2103-3 in the example 1 of the second embodiment.

FIG. 22 is a block diagram showing a configuration of the inter-received-signal characterizing quantity extraction section 2103-3 in the example 1.

In FIG. 22, the same elements as those in FIG. 16 are designated by the same reference numerals, and the description thereof will be omitted.

The inter-received-signal characterizing quantity extraction section 2103-3 shown in FIG. 22 is provided so that two encode sections are added to the configuration shown in FIG. 20. The inter-received-signal characterizing quantity extraction section 2103-3 can determine in which of eight regions on a complex plane the inter-received-signal correlation value exists. As shown in FIG. 22, the inter-received-signal characterizing quantity extraction section 2103-3 includes two quadrature demodulation sections 2201 and 2202, a correlation calculation section 2203, encode sections 2801 . . . 2804, and a data conversion section 2805.

It is noted that in the case where the signal inputted to the inter-received-signal characterizing quantity extraction section 2103-3 is a high-frequency signal or an intermediate-frequency signal, the quadrature demodulation sections 2201 and 2202 are needed. On the other hand, in the case where the signal inputted to the inter-received-signal characterizing quantity extraction section 2103 is a complex baseband signal, since quadrature demodulation is already performed, the quadrature demodulation sections 2201 and 2202 are not needed in the inter-received-signal characterizing quantity extraction section 2103-3.

The encode section 2801 receives $r_{12cRe}$ denoting a real part component among two components representing the inter-received-signal correlation value, which are outputted from the correlation calculation section 2203.

The encode section 2801 outputs to the data conversion section 2805 zero as the bit information $b_{12cRe}$ where $r_{12cRe} \geqq 0$, and 1 as the bit information $b_{12cRe}$ where $r_{12cRe} < 0$.

The encode section 2802 receives $r_{12cIm}$ representing an imaginary part component among two components representing the inter-received-signal correlation value, which are outputted from the correlation calculation section 2203.

The encode section 2802 outputs to the data conversion section 2805 zero as the bit information $b_{12cIm}$ where $r_{12cIm} \geqq 0$, and 1 as the bit information $b_{12cIm}$ where $r_{12cIm} < 0$.

The encode section 2803 receives two components $r_{12cRe}$ and $r_{12cIm}$ representing the inter-received-signal correlation value, which are outputted from the correlation calculation section 2203.

The encode section 2803 outputs to the data conversion section 2805 zero as bit information $b_{12cRe+Im}$ where $r_{12cRe} + r_{12cIm} \geqq 0$, and 1 as the bit information $b_{12cRe+Im}$ where $r_{12cRe} + r_{12cIm} < 0$.

The encode section 2804 receives two components $r_{12cRe}$ and $r_{12cIm}$ representing the inter-received-signal correlation value, which are outputted from the correlation calculation section 2203.

The encode section 2804 outputs to the data conversion section 2805 zero as bit information $b_{12cRe-Im}$ where $r_{12cRe} - r_{12cIm} \geqq 0$ and 1 as the bit information $b_{12cRe-Im}$ where $r_{12cRe} - r_{12cIm} < 0$.

The data conversion section 2805 receives the bit information $b_{12cRe}$, $b_{12cIm}$, $b_{12cRe+Im}$, and $b_{12cRe-Im}$ which are outputted by the encode sections 2801 to 2804.

The data conversion section 2805 calculates a bit string $b_{12c}$ by:

$$b_{12c} = \{b_{12cRe} b_{12cIm} b_{12cRe+Im} b_{12cRe-Im}\}. \quad \text{(equation 2-6)}$$

The data conversion section 2805 outputs the bit string $b_{12c}$ as an inter-received-signal characterizing quantity to the storage section 2104 and the comparison section 2105 which are shown in FIG. 15.

The bit string $b_{12c}$ calculated and outputted by the data conversion section 2805 indicates in which of the eight regions (see FIG. 23) on the complex plane the inter-received-signal correlation value exists.

The comparison section 2105 receives the bit string which indicates a region on the complex plane in which the inter-received-signal correlation value of the currently received interfering signal exists, and a bit string which indicates a region on the complex plane in which the inter-received-signal correlation value of the previously received interfering signal, which is stored in the storage section 2104, exists. The comparison section 2105 calculates an exclusive OR of these two bit strings. The comparison section 2105 calculates a sum of each bit of a bit string which is represented by this exclusive OR. This sum indicates a similarity between the inter-received-signal correlation value of the currently received interfering signal and the received signal crenellation value of the previously received interfering signal.

It is noted that code assignment with respect to each region on the complex plane is performed so that a hamming distance between a code representing a region and a code representing a region adjacent to the region becomes 1. In this case, an exclusive OR of two bit strings representing two received signals is calculated, and a sum of each bit of a bit string representing this exclusive OR, thereby obtaining a similarity. The value of the similarity concerning between the adjacent regions is different from that concerning between non-adjacent regions. The value of the similarity changes depending on a spaced distance between regions. More specifically, as the spaced distance becomes large, the above hamming distance becomes large. Thus, using the similarity makes it easy to determine how much the currently received interfering signal and the previously received interfering signal are similar to each other.

Figure 23:
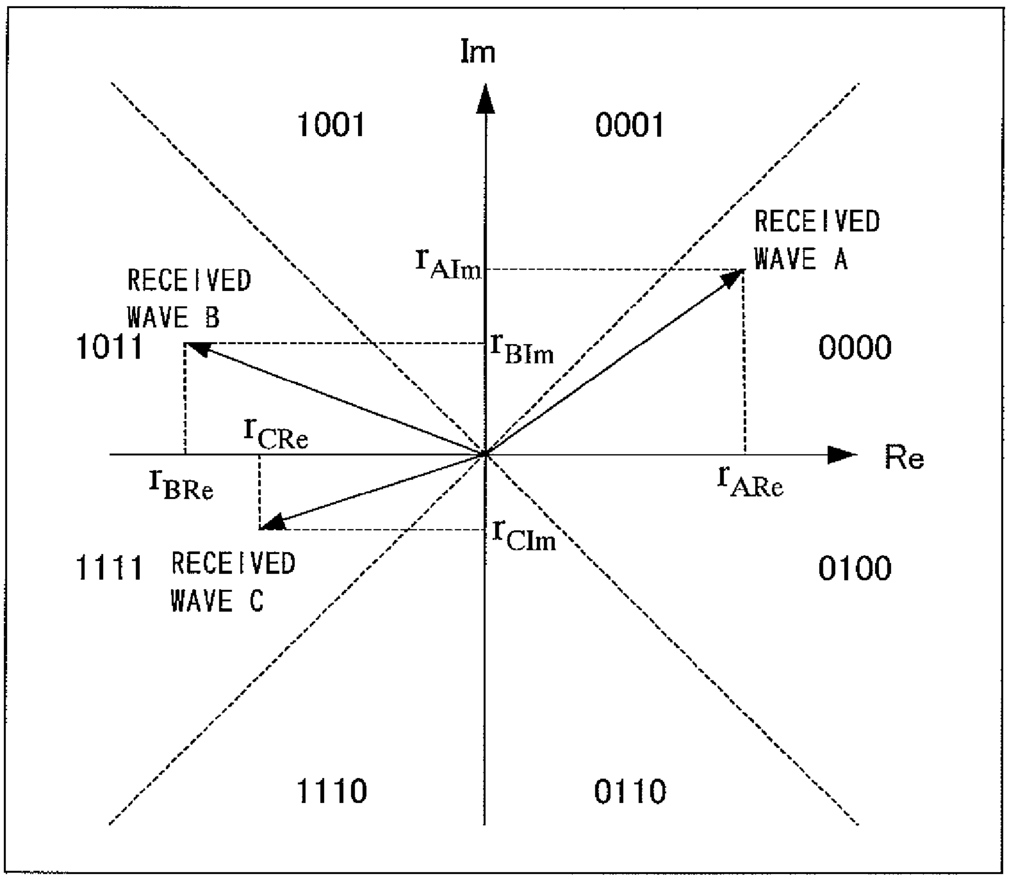
FIG. 23 is a view of a complex plane for the inter-received-signal characterizing quantity extraction section 2103-3 in the example 1 of the second embodiment.

FIG. 23 is a view in which phase components of three received signals A, B, and C which are transmitted from different interfering signal sources are shown on a complex plane which is divided into eight regions.

The inter-received-signal characterizing quantity extraction section 2103-3 shown in FIG. 22 performs encode of the received signals. The received signal A is represented by "0000", the received signal B is represented b7 "1011", and the received signal C is represented by "1111".

The inter-received-signal characterizing quantity extraction section 2103-3 further calculates exclusive ORs of bit strings of the received signals A, B, and C. The exclusive OR of the received signal A and the received signal B becomes "1011", and the similarity therebetween is 3. The exclusive OR of the received signal B and the received signal C becomes "0100", and the similarity therebetween is 1. The exclusive OR of the received signal A and the received signal C becomes "1111", and the similarity therebetween is 4. Thus, it can be seen that degree of a difference between the received signal A and the received signal C which exist in the regions which are diagonal with respect to each other is greater compared to that between the received signal A and the received signal B, or the received signal B and the received signal C, which exist in the regions which are adjacent to each other. The identification accuracy is improved compared to the case where the complex plane is divided into four regions.

It is noted that in calculating the similarity between the correlation value of the currently received interfering signal and the correlation value of the previously received interfering signal, the data conversion section 2805 is not used, and the bit information $b_{12cRe}$, $b_{12cIm}$, $b_{12cRe+Im}$, and $b_{12cRe-Im}$ of the currently received interfering signal may be compared individually with the bit information of the previously received interfering signal for calculating the similarity.

Further, for improving the identification accuracy of the inter-received-signal correlation value, a number of regions on the complex plane may be further increased.

Example 2

Figure 24:
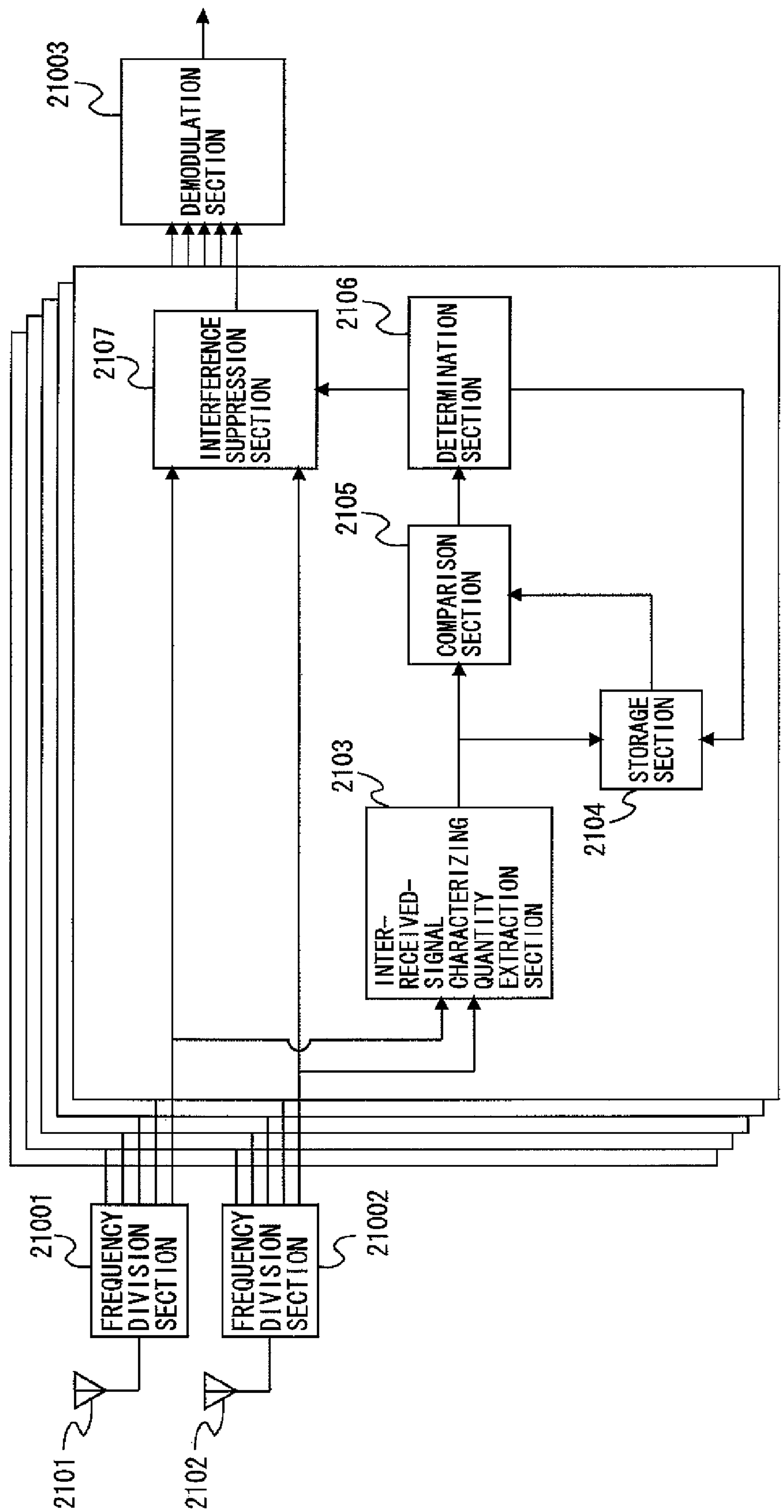
FIG. 24 is a block diagram showing an configuration of an interfering signal suppressing device (a receiving station) according to an example 2 of the second embodiment.

FIG. 24 is a block diagram showing a configuration of an interfering signal suppressing device (a receiving station) according to an example 2 of the second embodiment. In FIG. 24, the same elements as those in FIG. 15 are designated by the same reference numerals, and the description thereof will be omitted.

A radio transmitting station with respect to the interfering signal suppressing device (the receiving station) of the example 2 frequency-division-multiplexes a transmission signal. The transmission signal is composed of F transmission signal vectors. F denotes a number of frequency components which a frequency division multiplex signal has, and is an integer number which is equal to or larger than 2.

Thus, as shown in FIG. 24, the interfering signal suppressing device (the receiving station) comprises two antennas 2101 and 2102, frequency division sections 21001 and 21002 each of which divides the received signal into F frequency regions, F inter-received-signal characterizing quantity extraction sections 2103, F storage sections 2104, F comparison sections 2105, F determination sections 2106, F interfering signal suppression sections 2107, and a demodulation section 21003.

The frequency division sections 21001 and 21002 shown in FIG. 24 receive signals received by the antennas 2101 and 2102, respectively. The frequency division sections 21001 and 21002 each perform frequency division with respect to the input signal, and divide the frequency-division-multiplexed and received signal into F frequency components. The frequency division sections 21001 and 21002 each output the divided signals to the inter-received-signal characterizing quantity extraction sections 2103 corresponding to the frequency components thereof, respectively.

It is noted that frequency division may be performed with respect to a received signal which is not frequency-division-multiplexed. Thus, the received signal which is not frequency-division-multiplexed is divided into frequency components. For the frequency division, FFT, wavelet conversion, a filter bank, or the like can be used. In the case where each symbol of a radio signal is OFDM-modulated, FFT for OFDM demodulation may be used.

It is noted that averaging may be performed among the frequency components of the received signal for reducing an effect of noise and the like. Or, averaging may be performed with respect to the inter-received-signal characterizing quantities which are outputted by the inter-received-signal characterizing quantity extraction sections 2103.

The inter-received-signal characterizing quantity extraction section 2103, the storage section 2104, the comparison section 2105, the determination section 2106, and the interfering signal suppression section 2107 each perform its processing for each frequency component. The interfering signal suppression section 2107 suppresses the interfering signal, which overlaps with the desired signal, for each frequency component. The demodulation section 21003 demodulates the desired signal in which the interfering signal is suppressed.

It is noted as a specific configuration of the inter-received-signal characterizing quantity extraction section 2103, for example, the configuration used in the example 1 can be used.

Example 3

FIG. 25 is a block diagram showing a configuration of an interfering signal suppressing device (a receiving station) according to an example 3 of the second embodiment. In FIG. 25, the same elements as those in FIG. 15 are designated by the same reference numerals, and the description thereof will be omitted.

The interfering signal suppressing device (the receiving station) of the example 3 frequency-division-multiplexes a transmission signal. The transmission signal is composed of F transmission signal vectors. F denotes a number of frequency components which a frequency division multiplex signal has, and is an integer number which is equal to or larger than 2.

As shown in FIG. 25, the interfering signal suppressing device (the receiving station) comprises two antennas 2101 and 2102, two frequency division sections 21001 and 21002, F inter-received-signal characterizing quantity extraction sections 2103, a data conversion section 21101, a storage section 2104, a comparison section 2105, a determination section 2106, F interfering signal suppression sections 2107, and a demodulation section 21003.

The data conversion section 21101 shown in FIG. 25 receives a between-received-signal characterizing quantity of each frequency component outputted by the inter-received-signal characterizing quantity extraction section 2103. The data conversion section 21101 converts the between-received-signal characterizing quantity of each frequency component into a bit string having one row. The data conversion section 21101 outputs the bit string of the between-received-signal characterizing quantity to the storage section 2104 and the comparison section 2105.

Processing of each of the storage section 2104, the comparison section 2105, and the determination section 2106 is performed similarly as in the example 1. The interfering signal suppression sections 2107, which correspond to the respective frequency components, suppress the interfering signal, which overlaps with the desired signal, based on the characterizing quantity of the interfering signal which is outputted by the storage section 2104 based on the determination information outputted by the determination section 2106. The demodulation section 21003 demodulates the desired signal in which the interfering signal is suppressed.

It is noted that a specific configuration of the inter-received-signal characterizing quantity extraction section 2103 can be the configuration used in the example 1.

Specific processing of the data conversion section 21101 will be described using FIG. 26.

The inter-received-signal characterizing quantity extraction sections 21201 to 2120F each corresponding to the respective frequency component can divide a complex plane, for example, into four regions (see FIG. 17) similarly as in the example 1, and can perform encode.

The F inter-received-signal characterizing quantity extraction sections 21201 to 2120F respectively calculate between-received-signal characterizing quantities $b_{f1}$ to $b_{fF}$ of F frequency components f1 to fF, each of which is a bit string of two bits. The inter-received-signal characterizing quantity extraction sections 21201 to 2120F output the between-received-signal characterizing quantities $b_{f1}$ to $b_{fF}$ to the data conversion section 21101, respectively.

The data conversion section 21101 receives the F between-received-signal characterizing quantities $b_{f1}$ to $b_{fF}$ which are outputted by the F inter-received-signal characterizing quantity extraction sections 21201 to 2120F, respectively. The data conversion section 21101 calculates the between-received-signal characterizing quantity bit string $b_f$ by:

$$b_f=\{b_{f1}b_{f2}b_{f3}b_{f4}\ldots b_{fF}\}. \quad \text{(equation 2-7)}$$

The data conversion section 21101 outputs the bit string $b_f$ of the between-received-signal characterizing quantity to the storage section 2104 and the comparison section 2105 which are shown in FIG. 25. At this time, a bit number of the bit string $b_f$ of the between-received-signal characterizing quantity becomes 2*F.

It is noted that concerning order of the bit string, the frequency component $f_1$ may not be the first. The order of the bit string may be any order as long as conversion is performed so that the order is the same for all the received signals.

Figure 26:
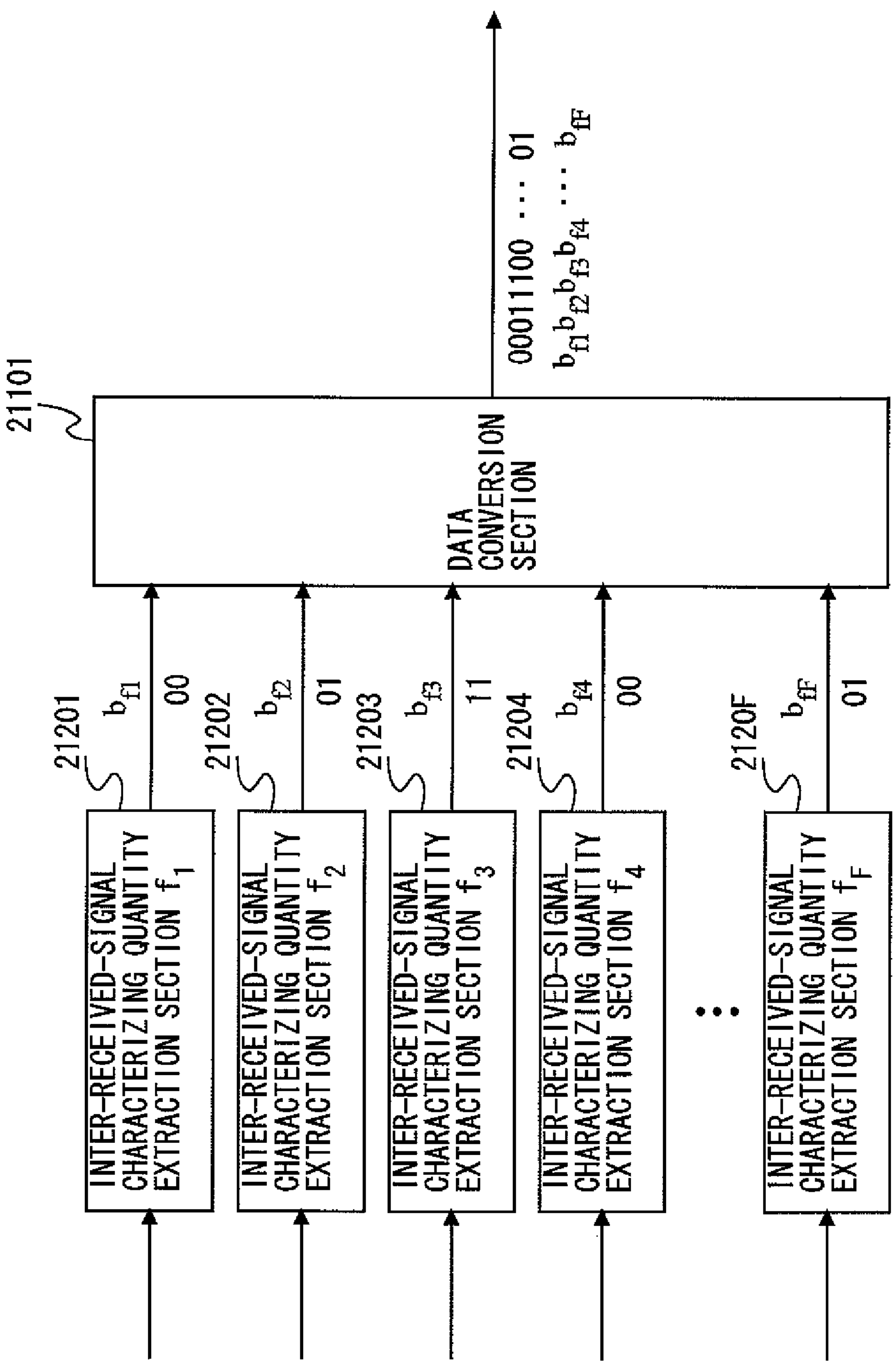
FIG. 26 is a block diagram showing a data conversion section in the example 3 of the second embodiment.

As shown in FIG. 26, to the data conversion section 21101 are inputted "00" as the between-received-signal characterizing quantity $b_{f1}$ from the inter-received-signal characterizing quantity extraction section 21201, "01" as the between-received-signal characterizing quantity $b_{f2}$ from the inter-received-signal characterizing quantity extraction section 21202, "11" as the between-received-signal characterizing quantity $b_{t3}$ from the inter-received-signal characterizing quantity extraction section 21203, "00" as the between-received-signal characterizing quantity $b_{f4}$ from the inter-received-signal characterizing quantity extraction section 21204, and "01" as the between-received-signal characterizing quantity $b_{fF}$ from the inter-received-signal characterizing quantity extraction section 2120F. In this case, an output, $b_{f1}b_{f2}b_{f3}b_{f4} \ldots b_{fF}$, from the data conversion section 21101 becomes "00011100 . . . 01".

The comparison section 2105 receives a bit string of the between-received-signal characterizing quantity outputted by the data conversion section 21101, and a bit string of the between-received-signal characterizing quantity of the previously received signal which is stored in the storage section 2104. The comparison section 2105 calculates an exclusive OR of these two bit strings, and calculates a sum of each bit of a bit string of the exclusive OR. The sum is a similarity. Thus, the between-received-signal characterizing quantities for all the frequency components can be compared easily, and whether or not the transmission sources of the currently received interfering signal and the previously received interfering signal are the same can be precisely determined. Therefore, accuracy of suppressing the interfering signal is enhanced.

The configuration of the radio transmitting apparatus according to the present embodiment is not limited to the configuration as described above, and various configurations may be used. The application field of the present invention is not limited to the field as described above, and the present invention is applicable to various fields. As an example, the case in which the present invention is applied to a wireless LAN system by a CSMA using a multicarrier modulation method has been described in the present example, but the present invention may be applied to a radio system using various access methods such as TDMA, FDMA, CDMA, SDMA, and the like.

It is noted that each of function blocks of a frequency conversion section, an interference detection section, a transmission timing control section, a packet transmission section, a transmission packet length control section, a packet division section, and the like is typically achieved as an LSI which is an integrated circuit. They may be individually made into one chip, or a part or all of them may be made into one chip.

Although the LSI is described here, the integrated circuit is referred to as an IC, a system LSI, a super LSI, an ultra LSI depending on difference in integration degrees.

A technique of integrated circuit implementation is not limited to the LSI, but may be achieved by a dedicated circuit or a universal processor. An FPGA (Field Programmable Gate Array) which is programmable after production of an LSI and a reconfigurable processor in which the connection and the setting of a circuit cell inside the LSI are reconfigurable may be used. A configuration in which the processor is controlled by executing a control program stored in a ROM in a hardware resource equipped with a processor, a memory, and the like may be used.

Further, if a technique of integrated circuit implementation which replaces the LSI by advancement of semiconductor technique and another technique derived therefrom is developed, naturally, the function blocks may be integrated by using the technique. Adaptation of a bio technique could be possible.

The following will describe a third embodiment of the present invention.

Third Embodiment

Example 1

An exemplary overall configuration and an exemplary overall operation of a radio communication system including an interfering signal suppressing device according to an example 1 of the third embodiment will be described. The interfering signal suppressing device according to the example 1 is regarded as a receiving station in the radio communication system. In the following description, the interfering signal suppressing device is referred to as a receiving station according to need.

Figure 27:
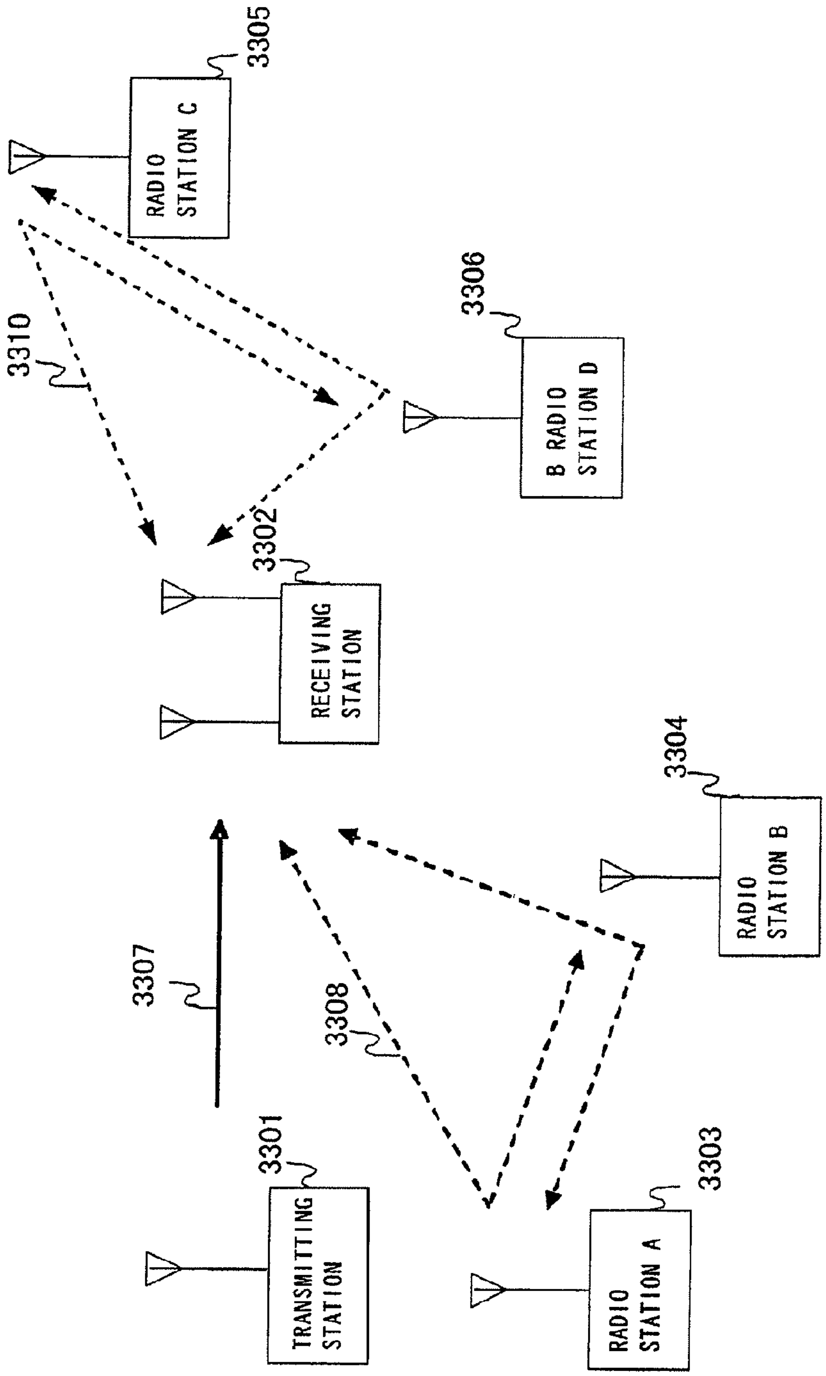
FIG. 27 is a view showing an example of a radio communication system including an interfering signal suppressing device according to an example 1 of a third embodiment.

FIG. 27 is a view showing an example of the radio communication system including the interfering signal suppressing device according to the example 1. As shown in FIG. 27, the radio communication system including the interfering signal suppressing device (a receiving station) 3302 according to the example 1 comprises a transmitting station 3301, the receiving station 3302, a radio station A 3303, a radio station B 3304, a radio station C 3305, and a radio station D 3306. The radio stations A to D are interfering stations which transmit interfering signals.

The receiving station 3302 receives a radio signal 3307 from the transmitting station 3301. The radio station A 3303 and the radio station B 3304 perform communication with each other by using a lower side frequency channel adjacent to the frequency channel which is used by the transmitting station 3301 and the receiving station 3302. The radio station C 3305 and the radio station D 3306 perform communication with each other by using an upper side frequency channel adjacent to the frequency channel (self communication frequency channel) which is used by the transmitting station 3301 and the receiving station 3302.

Here, the case where the transmitting station 3301, the radio station A 3303, and the radio station C 3305 transmit radio signals concurrently is considered. In this case, the radio signals 3307, 3308, and 3310 reach the receiving station 3302 from the transmitting station 3301, the radio station A 3303, and the radio station C 3305, respectively. Depending on the positional relation among the radio stations, there is considered the case where the interfering radio signals 3308 and 3310 reach the receiving station 3302 from the radio station A and the radio station C with levels stronger than that of the desired radio signal 3307 from the transmitting station 3301.

A spectrum showing a frequency and a signal level of the radio signal received by the receiving station 3302 at that time is shown in FIG. 28. In the case where the radio signal is a broadband signal and nonlinear distortion by a transmitting power amplifier occurs to the radio signal, the following interference state occurs. As shown in FIG. 28, parts of the spectrum leak to the self communication frequency channel from the lower side frequency channel and the upper side frequency channel, which are adjacent to the self communication frequency channel. The leakage spectrum is generated with a level which cannot be neglected for the self communication frequency channel. In the case as shown in FIG. 28, radio signal spectrums 3308 and 3310 from the lower and upper side adjacent frequency channels with respect to the desired radio signal spectrum 3307 affect, as an interfering signal, reception and demodulation of the desired signal.

The following will describe a configuration of the example 1 and an exemplary operation of the example 1 in the situation as shown in FIG. 28.

Figure 29:
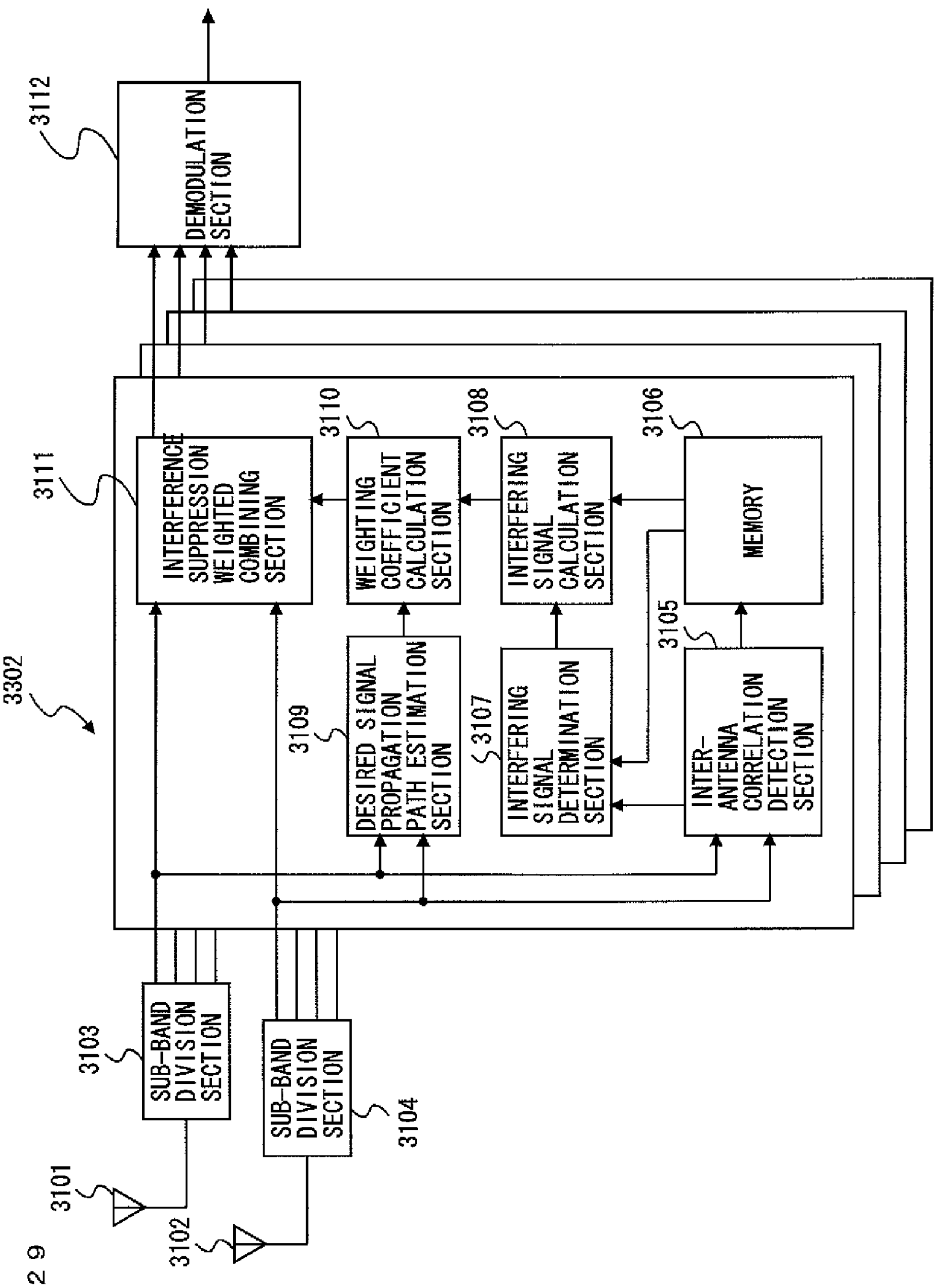
FIG. 29 is a block diagram showing a configuration of the interfering signal suppressing device (the receiving station) according to the example 1 of the third embodiment.

FIG. 29 is a block diagram showing a configuration of an interfering signal suppression receiving apparatus 3302 in the example 1. As shown in FIG. 29, the interfering signal suppression receiving apparatus 3302 comprises antennas 3101 and 3102, sub-band division sections 3103 and 3104, an inter-antenna correlation value detection section 3105, a memory 3106, an interfering signal determination section 3107, an interfering signal calculation section 3108, a desired signal propagation path estimation section 3109, a weighting coefficient calculation section 3110, an interfering signal suppression weighted combination section 3111, and a demodulation section 3112.

The following will describe an outline of an operation of each section.

The sub-band division sections 3103 and 3104 divide signals received by the antennas 3101 and 3102 into a plurality of sub-band signals, respectively. For the sub-band division, for example, FFT (fast Fourier transform), wavelet conversion, a filter bank, or the like can be used. In the case where each symbol of the radio signal is OFDM-modulated, FFT for OFDM demodulation may be used. It is noted although the sub-band division sections 3103 and 3104 are provided for the antenna inputs, respectively, in FIG. 29, the signals from the two antennas 3101 and 3102 may be inputted to one sub-band division section, and the received signals which are divided into a plurality of sub-bands may be used for time division.

The inter-antenna correlation value detection section 3105 detects an inter-antenna correlation value for each sub-band. A signal transmitted from a different direction has a different inter-antenna correlation value. Thus, the position, and the like of the interfering signal source can be spatially identified from the inter-antenna correlation value, and the interfering signal source can be identified. In other words, in the case where a configuration is provided in which an inter-antenna correlation value is obtained as a characterizing quantity of the received signal by using a plurality of antennas, even when not a known signal but an unknown signal is received, the interfering stations which are located in different positions can be identified. It is noted that whether or not the desired signal is included in the received signal can be determined, for example, similarly as in the first embodiment, by providing a preamble detection section which is not shown, or the like, and determining whether or not a preamble unique to the desired signal is detected in the received signal by the preamble detection section, or the like. When it is determined that the desired signal is not included in the received signal, it is determined that the received signal is an interfering signal. The inter-antenna correlation value of the received signal, which is determined to the interfering signal, is stored as the inter-antenna correlation value of the interfering signal in the memory 3106.

It is noted that although the case where the inter-antenna correlation value is used as the characterizing quantity of the received signal has been described here, a type of the characterizing quantity is not particularly limited as long as it indicates a different value for each interfering station. An example of the characterizing quantity includes a covariance matrix between received signals received by a plurality of antennas, a weighting coefficient for weighted combining a plurality of signals received by a plurality of antennas and performing interfering signal suppression, each received power value of a plurality of signals received by a plurality of antennas, and an average of received power values of a plurality of signals received by a plurality of antennas, and the like. It is noted that characterizing quantities, each of which provides low identification accuracy, can be used in combination to improve identification accuracy of the interfering station.

The memory 3106 stores the correlation value of the interfering signal detected by the inter-antenna correlation value detection section 3105 so as to be associated with the corresponding interfering station. The association with the corresponding interfering station can be performed, for example, by assigning a different identifier to each correlation value for the corresponding interfering station.

Here, a specific example of the correlation value detected by the inter-antenna correlation value detection section 3105 is shown. Where the interfering signals received by the two antennas 3101 and 3102 are denoted by $u_1$ and $u_2$ (equation 3-1), respectively, and these interfering signals are represented by a matrix U, a correlation value can be calculated as $R_{UU}$ as shown in equation 3-2.

[Mathematical expression 1]

$$U = \begin{bmatrix} u_1 \\ u_2 \end{bmatrix} \quad \text{(equation 3-1)}$$

[Mathematical Expression 2]

(equation 3-2)

$$R_{UU}=E[UU^H] \quad \text{(equation 3-2)}$$

[Mathematical Expression 3]

$A^H$ denotes a complex conjugate transposition of a matrix A.

[Mathematical Expression 4]

E[A] denotes a time average of A.

When a signal including the desired signal is received in the state where the inter-antenna correlation values of the interfering signals are stored in the memory 3106, the interfering signal determination section 3107 performs the following operation. The interfering signal determination section 3107 compares the inter-antenna correlation value detected by the inter-antenna correlation value detection section 3105 with the inter-antenna correlation values stored in the memory 3106. The interfering signal determination section 3107 selects the inter-antenna correlation value having the highest similarity according to this comparison. This selection is performed for each sub-band of the currently received interfering signal which is divided into a plurality of sub-bands.

An example of a criterion for a similarity between the inter-antenna correlation values is a difference between the inter-antenna correlation values. The interfering signal determination section 3107 calculates differences between the inter-antenna correlation values stored in the memory 3106 and the inter-antenna correlation value of the currently received interfering signal. The interfering signal determination section 3107. It is determined that the inter-antenna correlation value having the smallest difference is the inter-antenna correlation value of the interfering signal which comes from the same interfering signal source as the currently received interfering signal. This determination is performed for each sub-band. Thus, the later-described interfering signal calculation section 3108 can appropriately select the inter-antenna correlation value of the interfering signal, which is the previously received interfering signal and determined by the interfering signal determination section 3107 to come from the same interfering signal source as the currently received interfering signal, from the stored data for each sub-band.

The interfering signal calculation section 3108 selects (extracts), for each sub-band, an inter-antenna correlation value to be used for interfering signal suppression from the inter-antenna correlation values concerning a plurality of interfering stations, which are stored in the memory 3106. By operations such as selection, combination, and the like, the interfering signal calculation section 3108 selects the inter-antenna correlation value $R_{UU}$ indicated by equation 3-2, which is appropriate to be used for interfering signal suppression, from the stored data of the memory 3106 for each sub-band. The interfering signal calculation section 3108 outputs the selected inter-antenna correlation value $R_{UU}$ to the weighting coefficient calculation section 3110 for each sub-band. The inter-antenna correlation value $R_{UU}$ selected for each sub-band is used by the weighting coefficient calculation section 3110 for calculating a weighting coefficient, which is used for weighted combining.

In the case as shown in FIG. 28, for dealing with each of leakage spectrums from the interfering signal having a frequency characteristic 3308 of the inter-antenna correlation value and the interfering signal having a frequency characteristic 3310 of the inter-antenna correlation value, the interfering signal calculation section 3108 selects an inter-antenna correlation value as follows. The interfering signal calculation section 3108 selects and outputs the inter-antenna correlation value of the interfering signal 3308 for the leakage spectrum of the sub-bands within a frequency region 3401, and the inter-antenna correlation value of the interfering signal 3310 for the leakage spectrum of the sub-bands within a frequency region 3402.

The desired signal propagation path estimation section 3109 estimates a propagation path from a desired station, which transmits the desired signal, to the antennas 3101 and 3102 for each sub-band based on a preamble (training) signal of the desired signal included in the received signal.

A general method of estimating the propagation path includes a method of estimating the propagation path by dividing an actually received preamble signal $r_p$ by a preamble signal $t_p$ at the time of transmission, which is known at the receiving station side as shown by equation 3-3. A propagation path estimation value is denoted by h as shown in the equation 3-3.

[Mathematical expression 5]

$$h=r_p/t_p \qquad \text{(equation 3-3)}$$

In the receiving station in the example 1, the desired signal propagation path estimation section 3109 calculates a matrix H shown in equation 3-4 for each sub-band where propagation path estimation values concerning the signals received by the two antennas are denoted by $h_1$ and $h_2$, respectively. The desired signal propagation path estimation section 3109 outputs the matrix H to the weighting coefficient calculation section 3110.

[Mathematical Expression 6]

$$H=\begin{bmatrix} h_1 \\ h_2 \end{bmatrix} \qquad \text{(equation 3-4)}$$

A weighting coefficient calculation section 3110 calculates, for each sub-band, a weighting coefficient, which is used for combining the received signal from each antenna so as to suppress the interfering signal, from the propagation path estimation value which is presumed by the desired signal propagation path estimation section 3109 and the inter-antenna correlation value of the interfering signal which is calculated by the interfering signal calculation section 3108. An example of calculation equation to be used for calculating the weighting coefficient is shown by equation 3-5. A weighting coefficient to be used for combination for interfering signal suppression which uses an MMSE method is denoted by W. The weighting coefficient W can be calculated for each sub-band as shown by equation 3-5 from the output $R_{UU}$ of the interfering signal calculation section 3108 and the output H of the desired signal propagation path estimation section 3109.

[Mathematical expression 7]

$$W=H^H(HH^H+R_{UU})^{-1} \qquad \text{(equation 3-5)}$$

[Mathematical Expression 8]

$A^{-1}$ denotes an inverse matrix of the matrix A.

Further, the interfering signal suppression weighted combination section 3111 combines and outputs the received signals which are the outputs from the sub-band division sections 3103 and 3104 based on the weighting coefficient W which is calculated by the weighting coefficient calculation section 3110. Here, the received signals from the two antennas are denoted by $r_1$ and $r_2$. Where these received signals are represented by a matrix r as shown by equation 3-6, a signal after weighted combining is represented by equation 3-7. The interfering signal suppression weighted combination section 3111 performs this combination processing for each sub-band. Thus, the received signal in which the interfering signal is suppressed for each sub-band, or the desired signal is obtained. The desired signal is outputted to the demodulation section 3112.

[Mathematical expression 9]

$$r=\begin{bmatrix} r_1 \\ r_2 \end{bmatrix} \qquad \text{(equation 3 – 6)}$$

[Mathematical expression 10]

$$s=W_r=H^H(HH^H+R_{UU})^{-1}r \qquad \text{(equation 3-7)}$$

The demodulation section 3112 performs demodulation processing with respect to the received signal which is the output from the interfering signal suppression weighted combination section 3111 and in which the interfering signal is suppressed, or the desired signal (s shown in equation 3-7).

Figure 30:
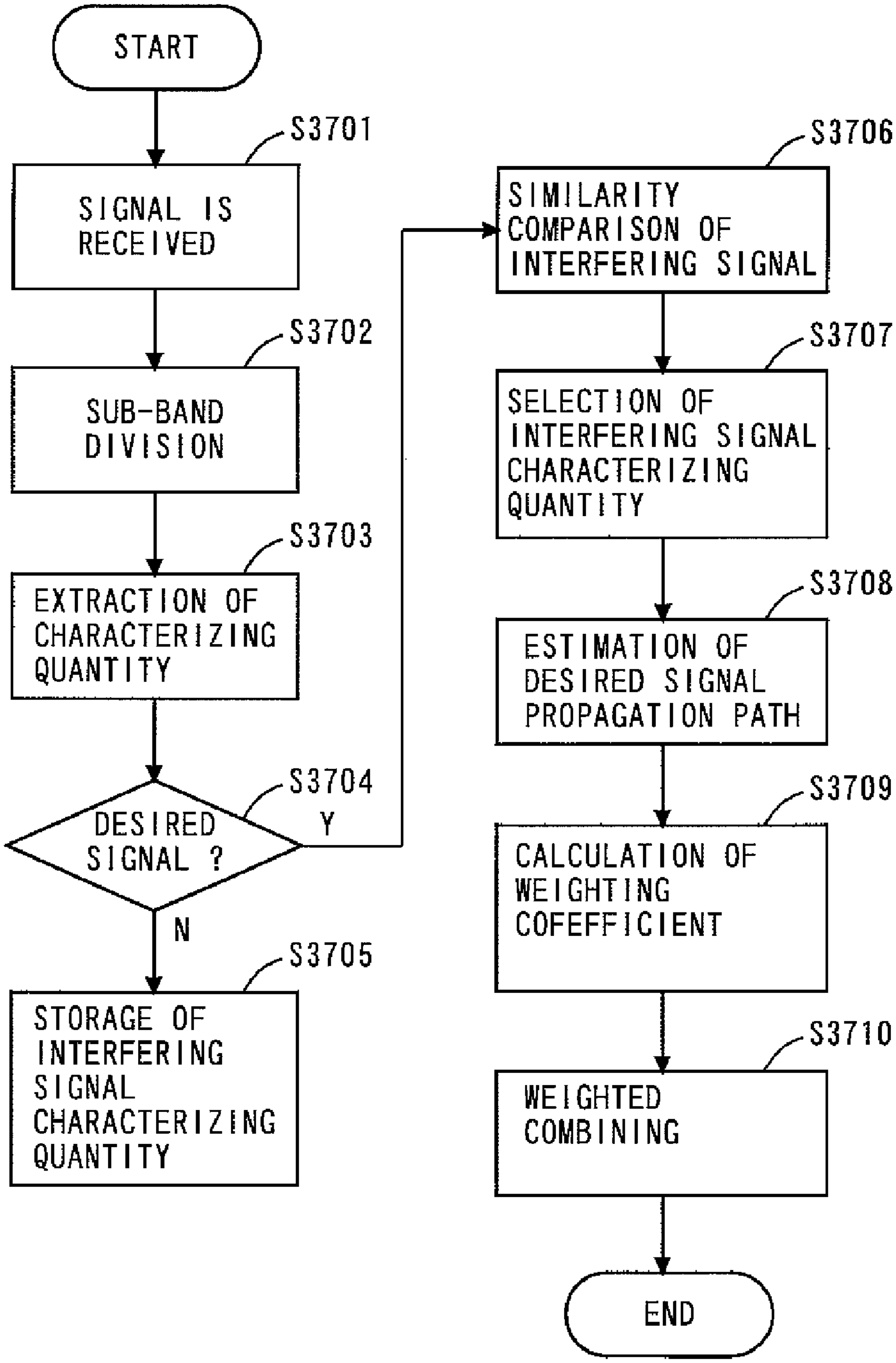
FIG. 30 is a flow chart showing an operation of the interfering signal suppressing device (the receiving station) according to the example 1 of the third embodiment.

The following will describe a procedure of processing in the example 1 using a flow chart shown in FIG. 30.

At a step S3701, the receiving station 3302 receives a signal at a plurality of positions. Here, the case where a signal is received by two antennas and interfering signal suppression is performed based on the received signals will be described.

At the next step S3702, the receiving station 3302 divides the received signals into a plurality of sub-bands.

At the next step S3703, the receiving station 3302 calculates a characterizing quantity concerning the received signals. The characterizing quantity to be calculated may be any value as long as an interfering signal included in the received signal can be identified. Here, as an example of the characterizing quantity, an inter-antenna correlation value between the signals received by a plurality of antennas is used.

At the next step S3704, the receiving station 3302 determines whether or not a desired signal is included in the received signal. Here, the receiving station 3302 moves on to a step S3705 when it is determined that the desired signal is not included, and moves on to a step S3706 when it is determined that the desired signal is included.

At the step S3705, the receiving station 3302 identifies the interfering signal so as to correspond to an interfering station based on its characterizing quantity, stores the characterizing quantity of the interfering signal so as to be associated with the corresponding interfering station, and terminates the processing.

At the step S3706, the receiving station 3302 calculates similarities between the characterizing quantity of the received signal and the characterizing quantities of the previously received interfering signals which are stored in the step S3705, and moves on to a step S3707.

At the step S3707, the receiving station 3302 identifies the interfering signal which is determined to be included in the received signal for each sub-band based on the similarities calculated at the step S3706, obtains and outputs the characterizing quantity of the interfering signal, which is used for weighted combining, for each sub-band. In the example 1, the characterizing quantity of the interfering signal having the maximum received power is selected for each sub-band as the characterizing quantity of the interfering signal, which is to be used for weighted combining.

At a step S3708, the receiving station 3302 estimates a propagation path of the desired signal based on the preamble of the desired signal included in the received signal.

At a step S3709, the receiving station 3302 calculates a weighting coefficient to be used for weighted combining from the characterizing quantity of the interfering signal which is calculated at the step S3707 and the propagation path estimation value of the desired signal which is calculated at the step S3708.

At a step S3710, the receiving station 3302 combines the signals received by the two antennas based on the weighting coefficient which is calculated at the step S3709, and terminated the processing.

By the above processing, the interfering signal suppression receiving apparatus of the example 1 can obtain the signal in which the interfering signal is appropriately suppressed.

According to the configuration of the example 1, when only an interfering signal comes, characterizing quantity measurement of the interfering signal is performed for each sub-band and the result is stored. When a desired signal comes, the characterizing quantity of the interfering signal which comes so as to overlap with the desired signal is extracted for each sub-band. Thus, weighted combining of the received signals to suppress interfering signals can be possible with respect to a plurality of interfering signals which come concurrently. In other words, transmission and demodulation of the desired signal can be stably performed even in a situation where interfering signals are received concurrently from a plurality of interfering stations.

By performing calculation processing of the interfering signal, which is used for calculating the weighting coefficient W, for each sub-band, even a radio receiving apparatus including only two antennas can perform interfering signal suppression which is adapted to two interfering signals or more which come concurrently.

Example 2

The following will describe another operation of the interfering signal calculation section 3108 which is different from that of the example 1 by using an specific example.

Similarly as in the case of the example 1, there is considered the case where the transmitting station 3301, the radio station A 3303, and the radio station C 3305 in FIG. 27 transmits radio signals concurrently. The radio signals 3307, 3308, and 3310 reach the receiving station 3302 from the transmitting station 3301, the radio station A 3303, and the radio station C 3305, respectively. Depending on the positional relation among the radio stations, the interfering radio signals 3308 and 3310 reach the receiving station 3302 from the radio station A 3303 and the radio station C 3305 with a level stronger than that of the desired radio signal 3307 from the transmitting station 3301.

Figure 31:
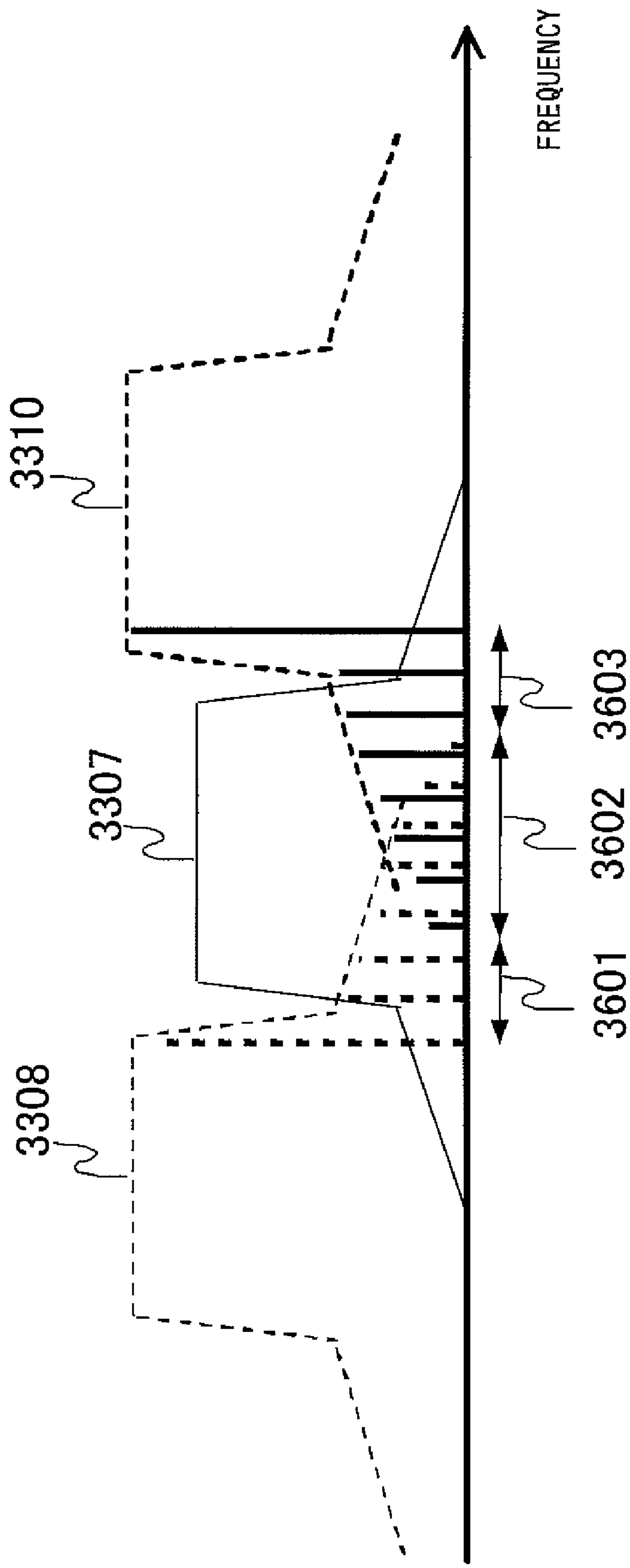
FIG. 31 illustrates an example in which a characterizing quantity of a radio signal for the other communication which is received by the receiving station is shown on a frequency axis in an example 2 of the third embodiment.

A spectrum showing a frequency and a signal level of the radio signal received by the receiving station 3302 at that time is shown in FIG. 31. In the case where the radio signal is a broadband signal and nonlinear distortion by a transmitting power amplifier occurs to the radio signal, as shown in FIG. 31, leakage spectrums into the self communication frequency channel from the lower and upper side frequency channels adjacent to the self communication frequency channel are generated with a level which cannot be neglected. In the case as shown in FIG. 31, the leakage spectrums from the lower and upper side adjacent frequency channels, which have characterizing quantity frequency characteristics 3310 and 3308, respectively, affect, as an interfering signal, the desired signal having a characterizing quantity frequency characteristic 3307.

The interfering signal calculation section 3108 in the interfering signal suppressing device (the receiving station) according to the example 2 can obtain, for each sub-band, a correlation value of the interfering signal, which is to be used for weighted combining, by combining or averaging the interfering signals from a plurality of interfering stations, which exist for each sub-band, based on determination information of the interfering signal which is inputted from the interfering signal determination section 3107. The obtained correlation value of the interfering signal is outputted to the weighting coefficient calculation section 3110.

"Combining interfering signals" means to simply add each element of the correlation value $R_{UU}$ in the example 1 which is obtained concerning the interfering signals from a plurality of interfering stations, which exist for each sub-band. "Averaging interfering signals" means to average the correlation value $R_{UU}$ of a plurality of interference signals for each element and each sub-band.

In the case as shown in FIG. 31, for dealing with the leakage spectrums from the interfering signals which have the characterizing quantity frequency characteristics 3308 and 3310, respectively, the interfering signal calculation section 3108 performs the following processing. The interfering signal calculation section 3108 selects the correlation value of the interfering signal 3308 for the sub-bands of a frequency region 3601, calculates a value which the correlation values of the interfering signal 3308 and the interfering signal 3310 are combined or averaged into for the sub-bands of a frequency region 3602, and selects the correlation value of the interfering signal 3310 for the sub-bands of a frequency region 3603. The interfering signal calculation section 3106 outputs the selected value, the combined or averaged value, and the selected value.

The following will describe a procedure of processing in the example 2. In the procedure of the processing of the example 2, the steps S3701 to S3706 and the steps S3708 to S3710 in FIG. 30 are the same as those of the example 1, and only the step S3707 is different from that of the example 1.

At the step S3707, based on the similarities calculated at the step S3706, the receiving station 3302 identifies the interfering signal which is determined to be included in the received signal for each sub-band. Thus, the receiving station 3302 calculates the characterizing quantity of the interfering signal, which is to be used for weighted combining, for each sub-band. The calculated values are outputted to the weighting coefficient calculation section 3110. In the example 2, in the case where a plurality of interfering signals are included in the received signal as shown in the frequency region 3602 in FIG. 31, a value which the characterizing quantities of the included interfering signals are added or averaged into is a characterizing quantity of the interfering signal, which is to be used for weighted combining.

By the above processing, these interfering signals can be appropriately suppressed even when a plurality of interfering signals come concurrently.

In the example 2, even an interfering signal suppressing device (a receiving station) including only two antennas can perform interfering signal suppression which is adapted to two interfering signals or more which come concurrently.

Example 3

Here, an operation of the interfering signal calculation section 3108 which is different from those of the example 1 and the example 2 will be described. There is considered the case where the transmitting station 3301 and the radio station A 3303 transmit radio signals concurrently. In this case, the desired signal 3307 and the interfering signal 3308 come to the receiving station 3302 from the transmitting station (the desired station) 3301 and the radio station A 3303, respectively.

Figure 32:
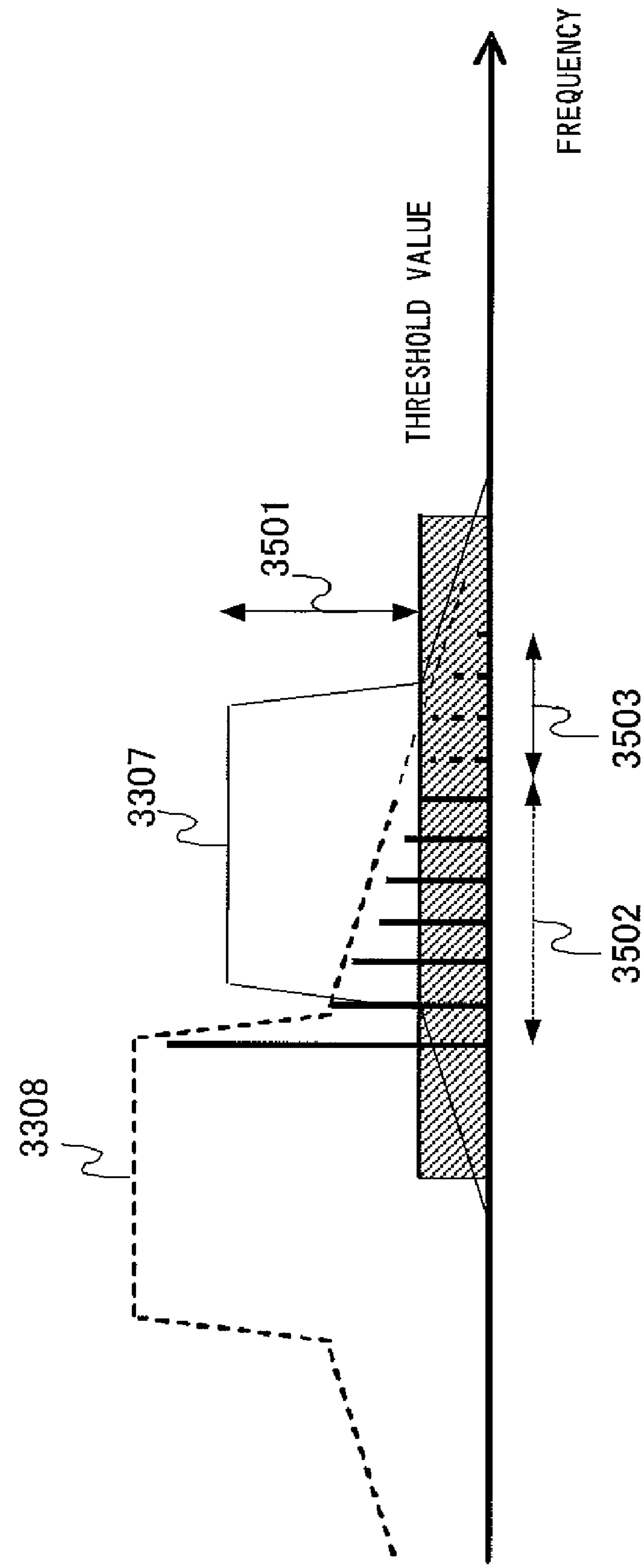
FIG. 32 illustrates an example in which a characterizing quantity of a radio signal for the other communication which is received by the receiving station is shown on a frequency axis in an example 3 of the third embodiment.

A spectrum showing a frequency and a signal level of the radio signal received by the receiving station 3302 at that time is shown in FIG. 32. In the case as shown in FIG. 32, the radio signal 3308 from the lower side adjacent channel affects, as an interfering signal, the desired radio signal 3307.

The interfering signal calculation section 3108 in an interfering signal suppressing device (a receiving station) 3302 according to the example 3 calculates a CINR (carrier power to interference noise power ratio) required for demodulation from the propagation path estimation value of the desired signal which is the output of the desired signal propagation path estimation section 3109, and set a threshold value for each sub-band based on the CINR. For the sub-band in which the interfering signal of a power larger than the threshold value is received, the correlation value of the interfering signal is outputted. However, for the sub-band in which the interfering signal of a power equal to or smaller than the threshold value is received, the output of the correlation value is caused to be zero or only the value of the power of the interfering signal is outputted for performing MRC (maximum ratio combination). Setting of such an output does not affect demodulation after weighted combining.

In the case as shown in FIG. 32, the CINR required for demodulation is represented by a threshold value 3501. Within the frequency band of the desired signal having a characterizing quantity frequency characteristic 3307 (the shown characterizing quantity is a signal received power), the threshold value 3501 is set for each sub-band. On that basis, for dealing with the leakage spectrum from the interfering signal having a frequency characteristic 3308, the correlation value of the interfering signal 3308 is selected and outputted for the sub-bands of a frequency region 3502, and zero or the value of the power of the interfering signal is outputted for the sub-bands of a frequency region 3503. Whether the correlation value is selected and outputted, or whether zero or the value of the power of the interfering signal is outputted is determined by whether the received power of the interfering signal is larger or smaller than the threshold value 3501.

The following will describe a procedure of processing in the example 3. In the procedure of the processing of the example 3, the steps S3701 to S3706 and the steps S3708 to S3710 in FIG. 30 are the same as those of the example 1, and only the step S3707 is different from that of the example 1.

At the step S3707, based on the similarities calculated at the step S3706, the receiving station 3302 identifies the interfering signal which is determined to be included in the received signal for each sub-band, calculates the characterizing quantity (the inter-antenna correlation value, or the like) of the interfering signal, which is to be used for weighted combining. In the example 3, based on the CINR required for demodulation, the receiving station 3302 set the threshold value for each sub-band. The receiving station 3302 outputs the correlation value (the inter-antenna correlation value, or the like) of the received interfering signal for the sub-band in which the interfering signal of a power larger than the threshold value is received, and outputs zero or the value of the power of the interfering signal, as a characterizing quantity of the interfering signal which is to be used for weighted combining, for the sub-band in which the interfering signal of a power not larger than the threshold value is received.

By the above processing, the signal in which the interfering signal is appropriately suppressed can be obtained.

By performing the above calculation processing of the interfering signal, interfering signal suppression which is adapted to the coming interfering signal can be performed without performing unnecessary weighted combining for each sub-band.

The operation of the interfering signal calculation section 3108 in the example 3 can be naturally combined with the operation of the interfering signal calculation section 3108 in the example 1 or the example 2.

It is noted that each of function blocks of the interfering signal suppression receiving apparatus in each example of the present invention is typically achieved as an LSI which is an integrated circuit. They may be individually made into one chip, or a part or all of them may be made into one chip.

Although the LSI is described here, the integrated circuit is referred to as an IC, a system LSI, a super LSI, an ultra LSI depending on difference in integration degrees.

A technique of integrated circuit implementation is not limited to the LSI, but may be achieved by a dedicated circuit or a universal processor. An FPGA (Field Programmable Gate Array) which is programmable after production of an LSI and a reconfigurable processor in which the connection and the setting of a circuit cell inside the LSI are reconfigurable may be used. A configuration in which the processor is controlled by executing a control program stored in a ROM in a hardware resource equipped with a processor, a memory, and the like may be used.

Further, if a technique of integrated circuit implementation which replaces the LSI by advancement of semiconductor technique and another technique derived therefrom is developed, naturally, the function blocks may be integrated by using the technique. Adaptation of a bio technique could be possible.

The following will describe a fourth embodiment of the present invention.

Fourth Embodiment

Example 1

Figure 33:
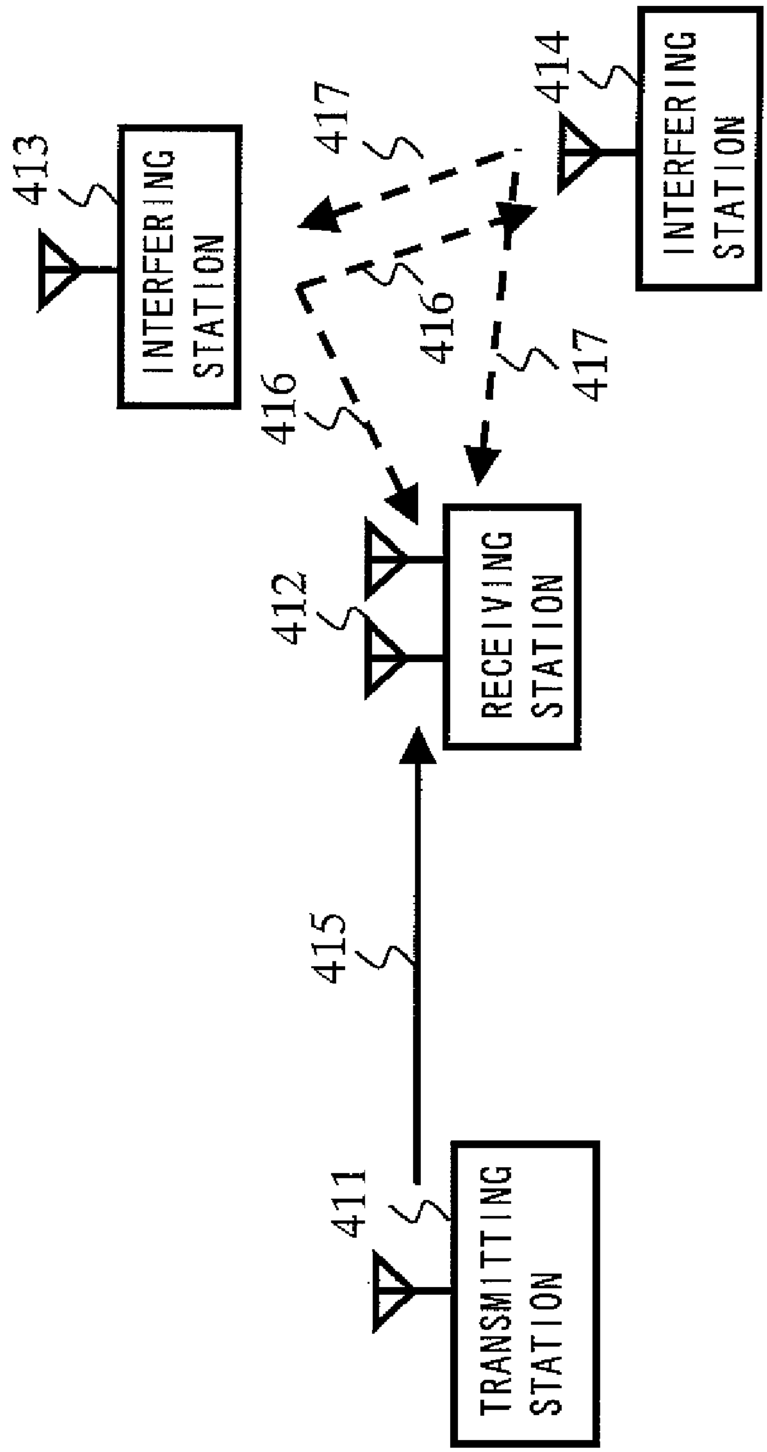
FIG. 33 illustrates an example of a radio communication system including an interfering signal suppressing device (a receiving station) according to an example 1 of a fourth embodiment.

A radio communication system using an interfering signal suppressing device according to an example 1 of the fourth embodiment will be described. FIG. 33 is a view showing a configuration of the radio communication system using the interfering signal suppressing device (a receiving station 412) according to the example 1. As shown in FIG. 33, the radio communication system comprising a transmitting station 411, the receiving station 412, and interfering stations 413. The interfering signal suppressing device according to the example 1 corresponds to the receiving station 412. In the example 1, the characterizing quantities of an interfering signal and another interfering signal are stored so as to be associated with each other, a characterizing quantity table is created, and interfering signal suppression is performed by using information of the characterizing quantity table. In the following description, a period of measuring the characterizing quantity or the like of the interfering signal for creating the characterizing quantity table is referred to as "an interfering signal measurement period", and a period of performing interfering signal suppression by using information of the characterizing quantity table is referred to as "an interfering signal suppression period".

The transmitting station 411 converts transmission data, the destination of which is the receiving station 412, into a radio signal 415, and transmits the radio signal 415. The receiving station 412 receives and demodulates the radio signal 415 to obtain the transmission data from the transmitting station 411. By these operations, communication is performed between the transmitting station 411 and the receiving station 412.

On the other hand, the interfering station 413 and the interfering station 414 perform communication with each other. The interfering station 413 transmits a radio signal 416 the destination of which is the interfering station 414, and the interfering station 414 receives it. Also, the interfering station 414 transmits a radio signal 417 the destination of which is the interfering station 413, and the interfering station 413 receives it. In other words, the interfering station 413 and the interfering station 414 are communication partner stations for each other.

Here, the case where the communication channel used by the transmitting station 411 and the receiving station 412 is different from that by the interfering station 413 and the interfering station 414 will be described.

Here, each radio station uses the same access method. For example, each radio station uses the CSMA/CA method of the IEEE802.11 standard. In this access method, it is defined that a predetermined frame interval is put between a packet and a packet for giving a transmission priority to the radio station, and SIFS (Short Inter Frame Space), PIFS (Point Coordination IFS), DIFS (Distributed Coordination IFS), and the like are defined in ascending order of frame interval. The SIFS having the highest transmission priority is used for transmitting an acknowledge (ACK) packet, a request-to-send (RTS)/clear-to-send (CTS) packet, divided (fragment) packets, and the like.

Here, the case where a predetermined time interval for identifying a communication partner station in the case where interfering signal measurement is performed, and a predetermined time interval for identifying an interfering station which transmits a interfering signal which has come in the case where interfering signal suppression is performed are SIFS will be described.

Figure 34:
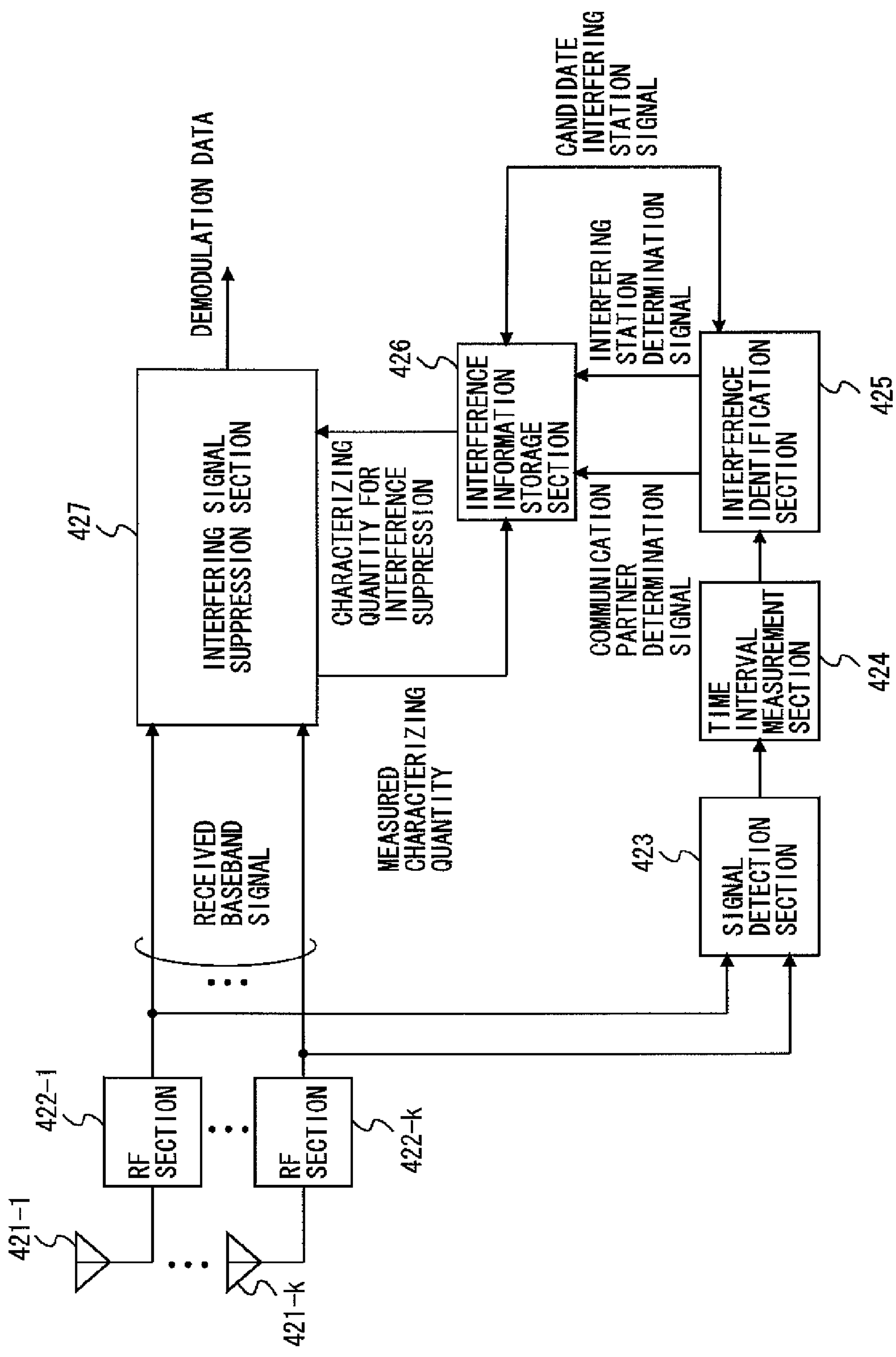
FIG. 34 is a block diagram showing an exemplary configuration of the interfering signal suppressing device according to the example 1 of the fourth embodiment.

FIG. 34 is a block diagram showing a configuration of the interfering signal suppressing device according to the example 1, and shows a configuration in the case where the interfering signal suppressing device is applied to the receiving station 412 as described above.

An outline of the configuration of the receiving station 412 will be described by using wording of claims.

The receiving station 412 is a device for suppressing an interfering signal in a received signal, and comprises an interfering signal characterizing quantity measurement section, a first time interval measurement section, another interfering signal characterizing quantity measurement section, a characterizing quantity storage section, a desired signal detection section, a second time interval measurement section, a time interval determination section, a characterizing quantity selection section, and an interfering signal suppression section.

The interfering signal characterizing quantity measurement section measures a characterizing quantity of a coming interfering signal. The interfering signal characterizing quantity measurement section corresponds to an interfering signal suppression section 427 in FIG. 34.

The first time interval measurement section measures a time interval from the end of the interfering signal to a time when another interfering signal comes. The first time interval measurement section corresponds to a time interval measurement section 424 in FIG. 34. It is noted that in the following description, an interfering station which transmits the interfering signal is referred to as a first interfering station, and an interfering station which transmits the other interfering signal is referred to as a second interfering station.

The other interfering signal characterizing quantity measurement section measures a characterizing quantity of the other interfering signal in the case where the time interval from the end of the interfering signal to the time when the other interfering signal comes is a predetermined time interval. The other interfering signal characterizing quantity measurement section corresponds to the interfering signal suppression section 427 in FIG. 34.

In the case where the time interval from the end of the interfering signal to the time when the other interfering signal comes is the predetermined time interval, the characterizing quantity storage section stores the characterizing quantity of the interfering signal and the characterizing quantity of the other interfering signal so as to be associated with each other for each first interfering station. The characterizing quantity storage section corresponds to an interference information storage section 426 in FIG. 34. It is noted that in the example 1, in the case where the time interval from the end of the interfering signal to the time when the other interfering signal comes is the predetermined time interval, the first interfering station and the second interfering station are considered to have a communication relation with each other, and a set of the first interfering station, the characterizing quantity of the interfering signal, the second interfering station, and the characterizing quantity of the other interfering signal is stored in the characterizing quantity.

The desired signal detection section detects that a desired signal comes during a time period when the interfering signal comes. The desired signal detection section corresponds to a signal detection section 423 in FIG. 34.

The second time interval measurement section measures a time interval from an end to a time when the other interfering signal comes when a desired signal comes during a time period when the interfering signal comes and the interfering signal ends during a time period when the desired signal comes. The second time interval measurement section corresponds to the time interval measurement section 424 in FIG. 34.

The time interval determination section determines whether or not a time interval measured at a second time interval measurement step corresponds to a predetermined interval at a communication relation estimation step. The time interval determination section corresponds to an interference identification section 425 in FIG. 34.

In the case where the determination of a correspondence is made at a time interval determination step, the characterizing quantity selection section collates the characterizing quantity of the interfering signal, which is measured at the time when the desired signal comes, with information stored at a characterizing quantity storage step, selects the characterizing quantity of the other interfering signal corresponding to the characterizing quantity of the interfering signal from the stored characterizing quantities of the other interfering signals. The characterizing quantity selection section corresponds to the interference identification section 425 and the interference information storage section 426 in FIG. 34.

The interfering signal suppression section suppresses the interfering signal included in the received signal based on the interfering signal characterizing quantity selected by the characterizing quantity selection section. The interfering signal suppression section corresponds to the interfering signal suppression section 427 in FIG. 34.

The following will describe the interfering signal suppressing device 412 (the receiving station 412) according to the example 1 with reference to FIGS. 33 and 34.

The receiving station 412 comprises a plurality of antennas 421-1, . . . , 421-*k*, a plurality of RF sections 422-1, . . . , 422-*k*, the signal detection section 423, the time interval measurement section 424, the interference identification section 425, the interference information storage section 426, and the interfering signal suppression section 427.

The antennas 421-1, . . . , 421-*k* each receive a signal in which a desired signal and an interfering signal overlap with each other. The RF sections 422-1, . . . , 422-*k* each convert the received signal, which is a signal of a high-frequency band, into a signal of a baseband by frequency conversion, or the like, and output the received baseband signal to the interfering signal suppression section 427 and the signal detection section 423.

The signal detection section 423 detects that the interfering signal comes and the coming interfering signal ends based on the received base band signal. Also, the signal detection section 423 outputs a signal detection signal indicating that the interfering signal comes and ends. For example, the signal detection section 423 can detect that the interfering signal comes and ends by detecting a change of the power value of the received baseband signal. Determination of whether or not the received signal is an interfering signal can be performed by determining whether or not a preamble unique to the desired signal is detected at the header of the packetized radio signal. Or, it may be performed by determining whether or not a unique word unique to the desired signal is detected after the preamble. By these methods, interference by a leakage signal from an adjacent channel or the like, and interference from an incompatible system can be detected. Also, same channel interference of a compatible system can be detected by interpreting address information in a signal and determining that the signal is other than the desired signal. In this case, a time of end of the interference can be detected by interpreting packet length information in the signal.

It is noted that as another method of detecting that an interfering signal comes and ends, for example, a change of a correlation (an inter-antenna correlation value) between received baseband signals obtained from a plurality of antennas may be detected, or a change of a covariance matrix including information of an inter-antenna correlation value and a received power value may be detected. Since the inter-antenna correlation value substantially corresponds to a spatial angle at which a signal comes, the inter-antenna correlation value is advantageous in that a change of the signal can be detected by using correlation information even in the case where a change of a power value is hard to detect. Also, the adjacent channel may be observed to detect a change of a power value in the adjacent channel. In this case, interference from the adjacent channel can be accurately detected. Also, for example, power values of received baseband signals of a plurality of types may be observed, and when any one of them exceeds or becomes smaller than a predetermined threshold value, it may be determined that an interfering signal comes or ends. Or, when the power values concerning a predetermined number or more of the types exceed or become smaller than the predetermined threshold value, it may be determined that the interfering signal comes or ends. Also, when a signal which the received baseband signals of the plurality of types are combined into exceeds or becomes smaller than the predetermined threshold value, it may be determined that a signal comes or ends. It is noted that these methods each can be used solely, or can be used in combination.

Figure 35:
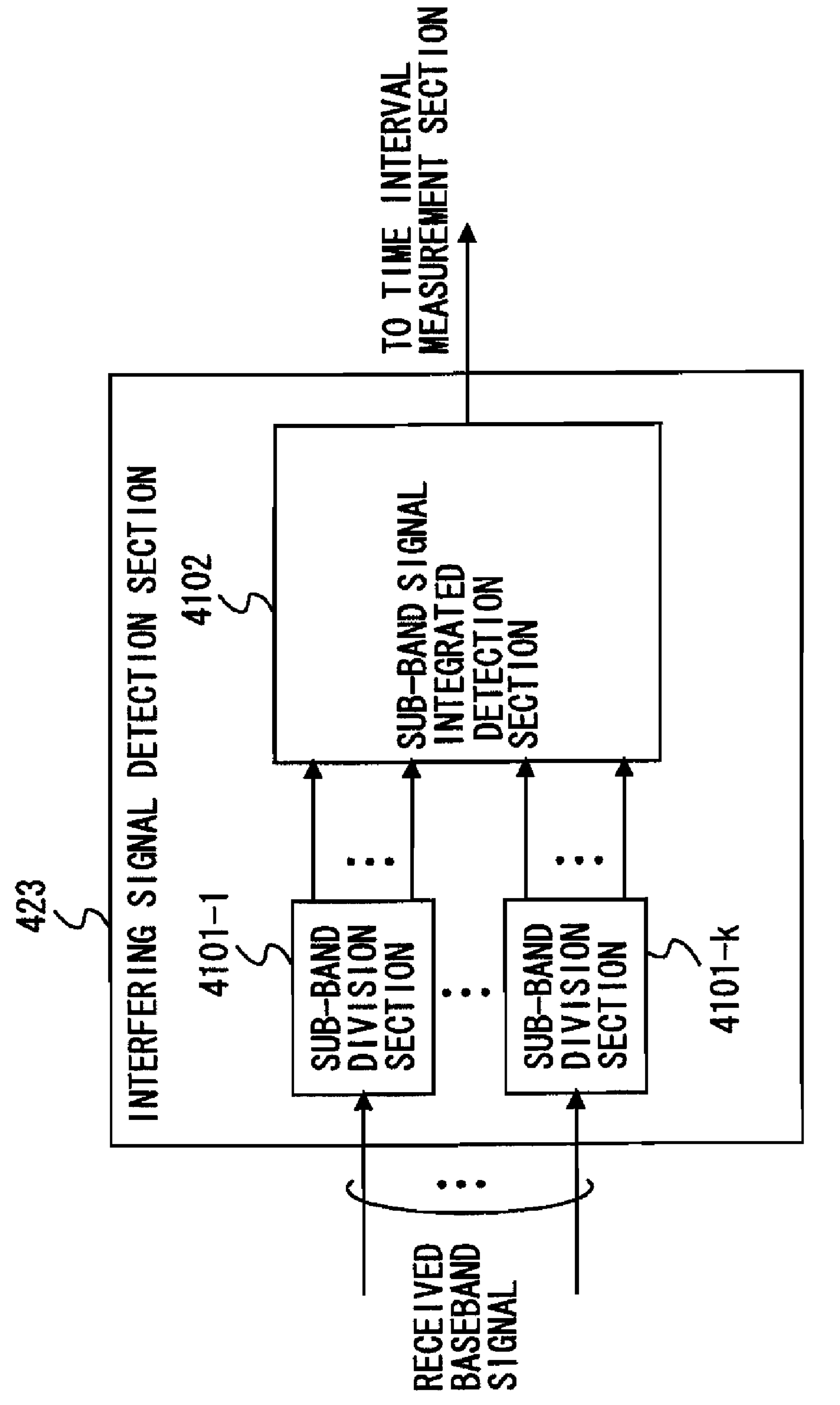
FIG. 35 is a block diagram showing an exemplary configuration of a signal detection section in the example 1 of the fourth embodiment.

It is noted that the signal detection section 423 can be configured, for example, as shown in FIG. 35. The signal detection section 423 shown in FIG. 35 includes sub-band division sections 4101-1, . . . 4101-*k*, and a sub-band signal integrated detection section 4102. The sub-band division sections 4101-1, . . . , 4101-*k* each divide the received baseband signal into a plurality of sub-band signals, and output the received sub-band signals. The sub-band signal integrated detection section 4102 detects change amounts of a power value, an inter-antenna correlation value, and the like for each sub-band based on the received sub-band signals, and detects that an interfering signal comes and ends. By such a configuration, the change can be comprehensively detected by using the power value and the inter-antenna correlation value for each sub-band, and thus detection of an interfering signal can be possible with higher accuracy. For example, in the case where the interfering signal of an adjacent channel comes, although a large power is generated in a sub-band near the adjacent channel, its value is not large for the entire reception band, and thus there may be the case where accurate detection is hard to perform. However, a power for each sub-band is detected, and, for example, it is detected when a number of sub-bands the powers of which exceed a predetermined threshold value is equal to or larger than a predetermined number, thereby enabling more accurate detection of interference. Even if the sub-band division section is used in another circuit like an interfering signal suppression section 427 in FIG. 36, they can be naturally used in combination.

The time interval measurement section 424 receives the signal detection signal from the signal detection section 423, measures a time interval of the coming interfering signal, and outputs a time interval signal indicating the measured time interval. For example, as a method of measuring a time interval, a counter is reset and counting is started at the time of end of the interfering signal, and a count value at the time when the next interfering signal comes is outputted as a time interval signal. Also, for example, in the case where the interfering signal suppressing device has a function to clock a time therein, a time interval may be obtained by calculating a difference between a time when the interfering signal ends and a time when the next interfering signal comes.

During an interfering signal measurement period, in the case where the time interval signal from the time interval measurement section 424 becomes a predetermined value, the interference identification section 425 outputs to the interference information storage section 426 a communication partner determination signal indicating that the second interfering station which transmits the coming interfering signal (the other interfering signal) and the first interfering station which transmits the last interfering signal perform communication with each other.

During an interfering signal suppression period, the interference identification section 425 determines which interfering station the interfering signal comes from based on the time interval signal from the time interval measurement section 424 and information of the second interfering station which is stored in the interference information storage section 426, and outputs to the interference information storage section 426 an interfering station determination signal indicating the determined interfering station. More specifically, when the next interfering signal (the other interfering signal) comes after a predetermined time interval from the end of the last interfering signal, a candidate interfering station signal indicating the second interfering stations which are presumed to transmit the coming other interfering signal is outputted from the interference information storage section 426 to the interference identification section 425. In the case where the time interval signal from the time interval measurement section 424 becomes the predetermined value, the interference identification section 425 determines the second interfering station which transmits the coming other interfering signal from the candidate second interfering stations which are indicated by the candidate interfering station signal, and outputs to the interference information storage section 426 an interfering station determination signal indicating the determined interfering station.

During the interfering signal measurement period, the interference information storage section 426 receives the communication partner determination signal from the interference identification section 425, a characterizing quantity signal (outputted from the interfering signal suppression section 427) indicating the characterizing quantity of the interfering signal and the characterizing quantity of the other interfering signal. The interference information storage section 426 assigns to the characterizing quantity of the interfering signal an identifier corresponding to the first interfering station, and assigns to the characterizing quantity of the other interfering signal an identifier corresponding to the second interfering station. The interfering signal characterizing quantity and the other interfering signal characterizing quantity, which the identifiers are assigned to, are stored as a pair so as to correspond to the first interfering station which transmits the interfering signal and the second interfering station which is a communication partner thereof, respectively, and a characterizing quantity table is created.

During the interfering signal suppression period, the interference information storage section 426 selects a characterizing quantity, which is to be used for interfering signal suppression, from the characterizing quantity table based on the characterizing quantity signal from the interfering signal suppression section 427 or the interfering station determination signal from the interference identification section 425, and outputs the selected characterizing quantity to the interfering signal suppression section 427.

The interfering signal suppression section 427 measures the characterizing quantity of the interfering signal based on the received baseband signals from the RF sections 422-1, . . . , 422-*k*, and outputs the characterizing quantity signal to the interference information storage section 426. Also, the interfering signal suppression section 427 suppresses an interfering signal component included in the received baseband signal by using the characterizing quantity for interfering signal suppression, which is outputted from the interference information storage section 426, demodulates the signal on which the interfering signal suppression is performed, and outputs demodulation data to the outside.

Here, the case of using the interfering signal suppression section 427 in FIG. 36 as the interfering signal suppression section 427 in FIG. 34 will be described. Also, the case of using a multicarrier modulation technique such as an OFDM technique, and the like as a modulation/demodulation technique will be described. The interfering signal suppression section 427 shown in FIG. 36 use a technique (refer to International Publication WO No. 2006/003776) which is applied previously by the present applicant.

Figure 36:
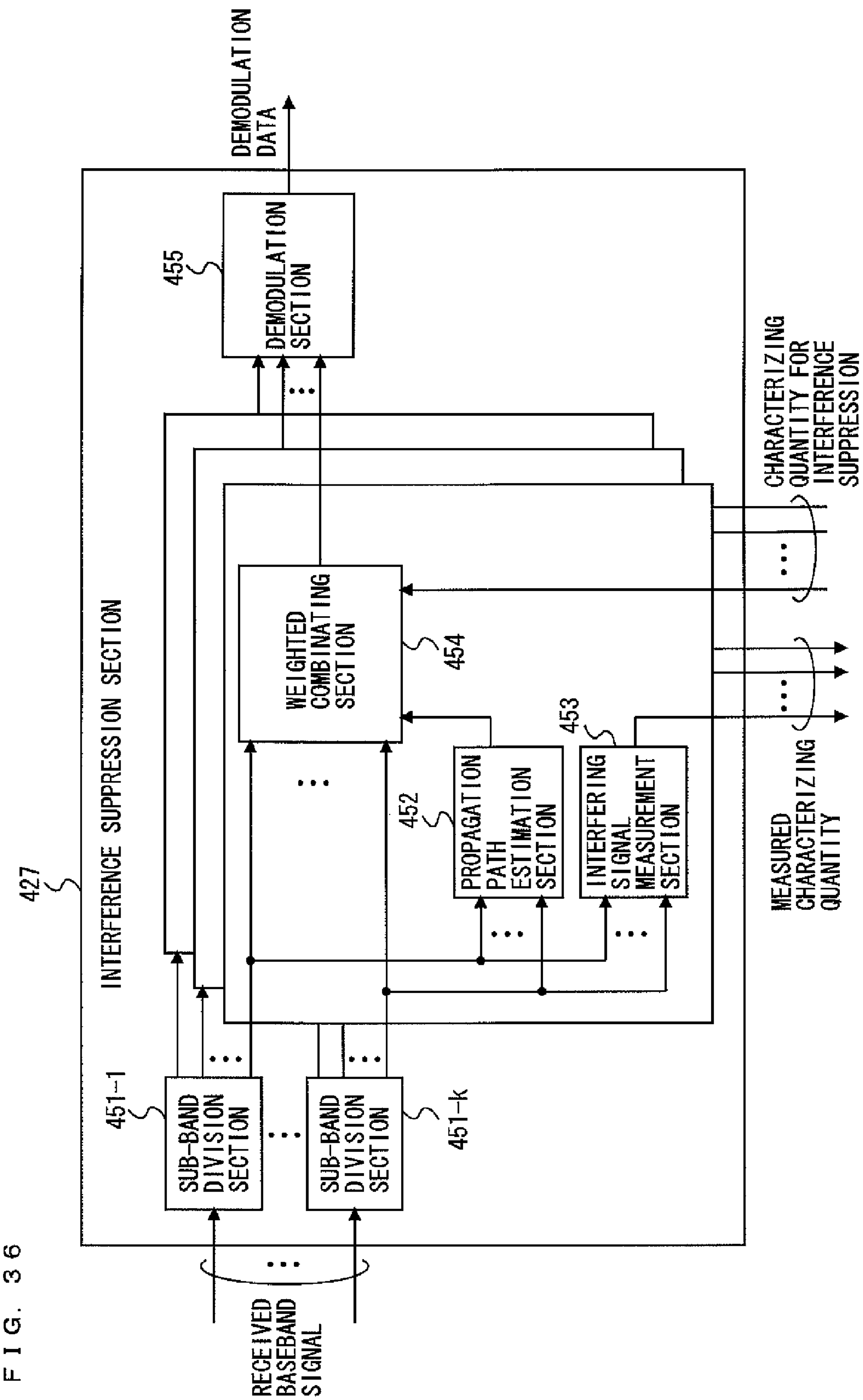
FIG. 36 is a block diagram showing an exemplary configuration of an interfering signal suppression section in the example 1 of the fourth embodiment.

FIG. 36 is a block diagram showing an exemplary configuration of the interfering signal suppression section 427. The interfering signal suppression section 427 comprises sub-band division sections 451-1, . . . , 451-*k*, a propagation path estimation section 452, an interfering signal measurement section 453, a weighted combining section 454, and a demodulation section 455.

The sub-band division sections 451, . . . , 451-*k* each divide each of base band signals of a plurality of types, which are received by the plurality of antennas, into a plurality of sub-band signals, and output the received sub-band signals. As a method of dividing a received baseband signal into a plurality of sub-band signals, for example, fast Fourier transform (FFT), wavelet conversion, a filter bank, or the like can be used. It is noted that in the case as shown in FIG. 36, the sub-band division sections 451-1, . . . , 451-*k* are provided for antenna inputs, respectively, but one sub-band division section may be used for time division.

In receiving a desired signal, the propagation path estimation section 452 estimates a propagation path of the desired signal based on a known signal included in each received sub-band signal of the desired signal, and outputs a propagation path estimation signal H.

In receiving an interfering signal, the interfering signal measurement section 453 calculates a covariance matrix $R_{uu}$ which is a correlation between the received sub-band signals as a characterizing quantity of each received sub-band signal, outputs it as a characterizing quantity signal. The interference information storage section 426 (see FIG. 34) stores the characterizing quantity for each sub-band, and outputs to the weighted combining section 454 the characterizing quantity to be used for interfering signal suppression.

For each sub-band, the weighted combining section 454 combines the received sub-band signals r with weighting coefficients by using the propagation path estimation signal H outputted from the propagation path estimation section 452 and the covariance matrix $R_{uu}$ as shown by equation 4-1, and outputs a signal v in which the interfering signal component is suppressed.

$$v=R_{ss}H^H(HR_{SS}H^H+R_{uu})^{-1}r \quad \text{(equation 4-1)}$$

Here, $A^H$ denotes a complex conjugate transposition of A, and $A^{-1}$ denotes an inverse matrix of A.

$R_{SS}$ denotes a covariance matrix of the signal s transmitted from the transmitting station, and can be known from statistical nature of transmission signals.

The demodulation section 455 demodulates the signal v in which the interfering signal component is suppressed and which is outputted from the weighted combining section 454, and outputs demodulation data.

As described above, the interfering signal suppression section 427 shown in FIG. 36 measures in advance the covariance matrix $R_{uu}$ between the received signals of the plurality of antennas as a characterizing quantity of the interfering signal, and combines the received signals with weighting coefficients based on the propagation path estimation result H of the desired signal and the covariance matrix $R_{uu}$ of the interfering signal, thereby suppressing the interfering signal component.

The interfering signal suppressing device in the example 1 is characterized by an operation of measuring the characterizing quantity of the interfering signal and the characterizing quantity of the other interfering signal and determining the second interfering station (the communication partner station) based on the time interval from the end of the interfering signal to the time when the other interfering signal comes, and an operation of changing the characterizing quantity, which is to be used for interfering signal suppression, based on the time interval from the end of the interfering signal to the time when the other interfering signal comes. The following will describe an interfering signal measurement operation and an interfering signal suppression operation.

Figure 37:
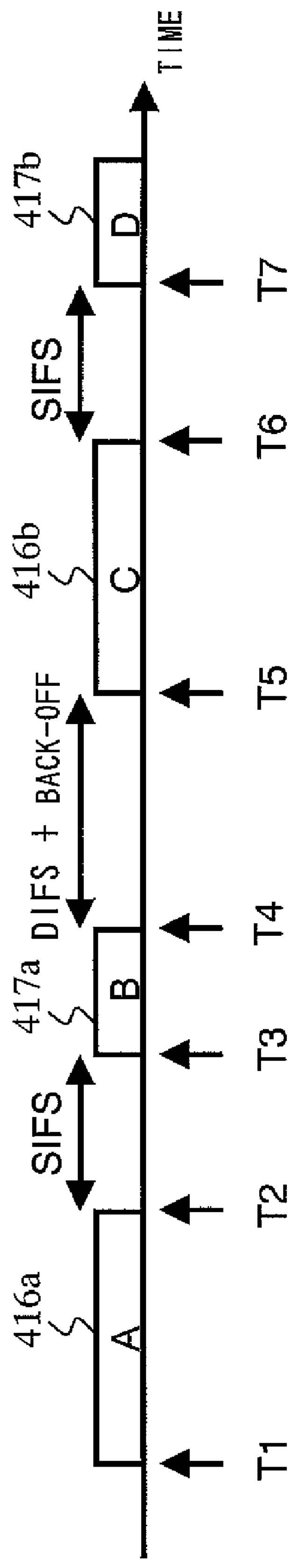
FIG. 37 is a time sequence diagram which shows a state where interfering signals come when the interfering signal suppressing device according to the example 1 of the fourth embodiment measures an interfering signal characterizing quantity.

FIG. 37 is a time sequence diagram which shows a state where signals come when the interfering signal suppressing device according to the example 1 measures an interfering signal. Using FIGS. 33 and 37, an example of an operation when the receiving station 412 (the interfering signal suppressing device) measures an interfering signal will be described.

As shown in FIG. 33, the interfering station 413 and the interfering station 414 perform communication with each other. As shown in FIG. 37, with respect to a data packet 416*a* transmitted by the interfering station 413, the interfering station 414 transmits an ACK packet 417*a* at an SIFS interval. Similarly, with respect to a data packet 416*b* transmitted by one interfering station of other two interfering stations (not shown) which perform communication with each other, the other interfering station transmits an ACK packet 417*b* at the SIFS interval.

At T1, the receiving station 412 detects that the interfering signal 416*a* comes, and starts to measure a characterizing quantity. When detecting that the interfering signal 416*a* ends at T2, the receiving station 412 assigns an identifier A to the measured characterizing quantity, and stores the measured characterizing quantity.

The receiving station 412 measures a time interval (T2 to T3) until the next interfering signal comes. When detecting at T3 that the interfering signal 417*a* comes and determining that the time interval of T2 to T3 is the SIFS, the receiving station 412 starts to measure a characterizing quantity of the coming interfering signal 417*a*, and determines that the interfering station which transmits the coming interfering signal 417*a* and the interfering station which transmits the last interfering signal perform communication with each other. When the interfering signal 417*a* ends at T4, the receiving station 412 assigns an identifier B to the measured characterizing quantity, and stores that the communication partner station of the interfering station corresponding to the identifier B is the interfering station corresponding to the identifier A. Along with that, the receiving station 412 stores that the communication partner station of the interfering station corresponding to the identifier A is the interfering station corresponding to the identifier B.

The receiving station 412 measures a time interval (T4 to T5) until the next interfering signal comes. When detecting at T5 that the interfering signal 416*b* comes and determining that the time interval from T4 to T5 is not the SIFS, the receiving station 412 starts to measure a characterizing quantity of the coming interfering signal 416*b*, and determines that the interfering station which transmits the coming interfering signal 416*b* and the interfering station which transmits the last interfering signal do not perform communication with each other. When the interfering signal 416*b* ends at T6, the receiving station 412 assigns an identifier C to the measured characterizing quantity of the interfering signal 416*b*, and stores the measured characterizing quantity. Then, similarly, the receiving station 412 measures a characterizing quantity of the interfering signal 417*b*. When determining that a time interval (T6 to T7) between the interfering signal 416*b* and the interfering signal 417*b* is the SIFS, the receiving station 412 assigns an identifier D to the measured characterizing quantity of the interfering signal 417*b*, and stores that the communication partner station of the interfering station corresponding to the identifier D is the interfering station corresponding to the identifier C. Along with that, the receiving station 412 stores that the communication partner station of the interfering station corresponding to the identifier C is the interfering station corresponding to the identifier D.

When interfering signal measurement is performed as described using FIG. 37, information of the interfering signal is stored in the interference information storage section 426, and a characterizing quantity table is created as shown in FIG. 38. In the characterizing quantity table shown in FIG. 38, a column (a) shows a identifier of the first interfering station, a column (b) shows a the characterizing quantity of the interfering signal, a column (c) shows a identifier indicating the second interfering station which is the communication partner of the first interfering station shown in the column (a), and a column (d) shows a characterizing quantity of the interfering signal from the second interfering station. By referring to this information (the characterizing quantity table), the first interfering station, the characterizing quantity of the interfering signal transmitted by the first interfering station, the second interfering station which is the communication partner of the first interfering station, and the characterizing quantity of the interfering signal transmitted by the second interfering station can be known. For example, by referring to information concerning the interfering station of the identifier A, it can be known that the characterizing quantity of the interfering signal transmitted by the interfering station of the identifier A is $W_A$, the communication partner station of the interfering station of the identifier A is the interfering station of the identifier B, and the characterizing quantity of the interfering signal transmitted by the interfering station of the identifier B is $W_B$.

Figure 39:
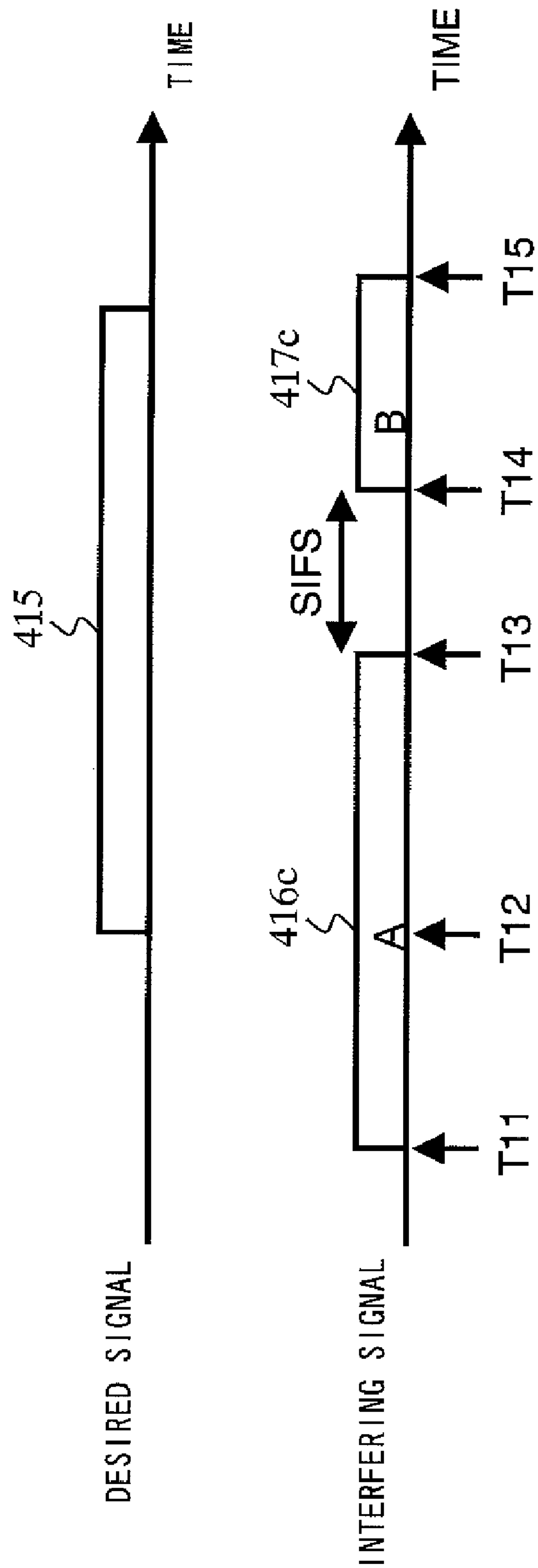
FIG. 39 is a time sequence diagram which shows a state where interfering signals come when the interfering signal suppressing device in the example 1 of the fourth embodiment suppresses an interfering signal.

Using FIGS. 33 and 39, the following will describe an example of an operation when the receiving station performs interfering signal suppression. As shown in FIG. 39, the transmitting station 411 transmits a desired signal 415, the interfering station 413 transmits an interfering signal 416*c*, and the interfering station 414 transmits an interfering signal 417*c*. In the middle of receiving the desired signal 415, the interfering station which transmits the interfering signal is changed from the interfering station 413 to the interfering station 414. Similarly as in the case of FIG. 37, the interfering station 414 transmits an ACK packet 417*c* at the SIFS interval with respect to a data packet 416*c* transmitted by the interfering station 413. The measurement of the interfering signal is in advance completed as described using FIG. 37.

At T11, the receiving station 412 detects that the interfering signal 416*c* comes, and starts to measure a characterizing quantity. At this time, the receiving station 412 compares the currently measured characterizing quantity with the characterizing quantities stored in the interference information storage section 426 thereby to determine that the coming interfering signal 416*c* is the interfering signal of the identifier A.

When the desired signal 415 is transmitted at T12, since the receiving station 412 performs preamble detection and the like in parallel with interfering signal measurement, the receiving station 412 detects that the desired signal 415 comes. The receiving station 412 performs interfering signal suppression by using the measured characterizing quantity of the interfering signal 416*c*, and demodulates the desired signal 415.

When detecting that the interfering signal 416*c* ends at T13, the receiving station 412 measures a time interval (T13 to T14) until the next interfering signal comes. When detecting at T14 that the interfering signal 417*c* comes and determining that the time interval of T13 to T14 is the SIFS, the receiving station 412 determines that the coming interfering signal 417*c* is transmitted by the communication partner station of the interfering station of the identifier A. By referring to information of the interfering station and the interfering signal characterizing quantity which is stored in advance as shown in FIG. 38 (the characterizing quantity table), the receiving station 412 determines that the communication partner station of the identifier A is the interfering station of the identifier B, switches to the characterizing quantity of the interfering station of the identifier B, and performs interfering signal suppression.

In the CSMA/CA method, in the case where a radio station newly transmits a packet, carrier sense is performed, and transmission is started after elapse of random time after carrier is not observed for more than DIFS, which is a time interval longer than the SIFS. In other words, in the CSMA/CA method, a radio station which can transmit a packet at the SIFS interval after end of a packet is limited. For example, in the CSMA/CA method, in the case where a data packet is transmitted, a radio station which is the destination of the data packet transmits an ACK packet at the SIFS interval when the radio station can correctly demodulate the data packet. Also, in the case where an RTS/CTS packet is transmitted, a radio station as a transmission source which is about to transmit a data packet transmits an RTS packet to a radio station which is the destination of the data packet. The radio station which is the destination of the data packet transmits back a CTS packet at the SIFS interval when the radio station can correctly demodulate the RTS packet. The radio station as the transmission source transmits the data packet at the SIFS interval when the radio station can correctly demodulate the CTS packet. Also, in the case where divided (fragment) packets are transmitted, after a radio station as a transmission source transmits a data packet, a radio station which is the destination transmits an ACK packet at the SIFS interval. After receiving the ACK packet, the radio station as the transmission source transmits a data packet at the SIFS interval, and then the same procedure is repeated until all the divided packets are transmitted. Thus, in the CSMA/CA method, a radio station which can transmit a packet at the SIFS interval after a packet ends is limited to a specific radio station. Therefore, as described above, in the case where the time interval of the interfering signal is the SIFS, the determination of the communication partner station of the interfering station and the determination of which interfering station the interfering signal comes from can be performed.

FIG. 40 is a flow chart showing an example of a measurement operation of an interfering signal in the interfering signal suppressing device of the example 1. Using FIG. 40, the measurement operation of an interfering signal in the interfering signal suppressing device will be described.

When an interfering signal is transmitted, the signal detection section 423 detects that the interfering signal comes (a step S431).

Next, the interfering signal suppression section 427 measures a characterizing quantity of the coming interfering signal (a step S432).

Next, the signal detection section 423 determines whether or not the interfering signal ends (a step S433). If the interfering signal has not ended (No of the step S433), the signal detection section 423 continues to measure the characterizing quantity of the interfering signal (the step S432). If the interfering signal ends (Yes of the step S433), an identifier is assigned to the measured characterizing quantity, and the measured characterizing quantity is stored (a step S434).

Next, the time interval measurement section 424 measures a time interval until the next interfering signal comes (a step S435).

Next, the interference identification section 425 determines whether or not the measured time interval is a predetermined value (a step S436). If the measured time interval is the predetermined value (Yes of the step S436), the interference identification section 425 determines that a second interfering station which transmits the coming interfering signal and a first interfering station which transmits the last interfering signal perform communication with each other (a step S437). If the measured time interval is not the predetermined value (No of the step S436), the interference identification section 425 determines that the second interfering station which transmits the coming interfering signal and the first interfering station which transmits the last interfering signal do not perform communication with each other (a step S438).

Next, the interfering signal suppression section 427 measures a characterizing quantity of the interfering signal until the coming interfering signal ends (a step S439, a step S4310). When the interfering signal ends, the interfering signal suppression section 427 outputs the measure characterizing quantity to the interference information storage section 426. The interference information storage section 426 stores information of the measured characterizing quantity and the communication partner station (a step S4311). Then, the processing returns to the step S431 again.

It is noted as a method of measuring a characterizing quantity, an average value of the characterizing quantities during a time period when the interfering signal comes may be stored as a measurement result, or a measurement result immediately before the end of the interfering signal among characterizing quantities measured for short periods may be stored. The former method is advantageous in that in the case where change of a propagation path is large and change of a characterizing quantity is large, the change of the characterizing quantity can be suppressed by averaging. The latter method is advantageous in that the latest result is used thereby to improve an effect of suppression during the interfering signal suppression period.

Figure 41:
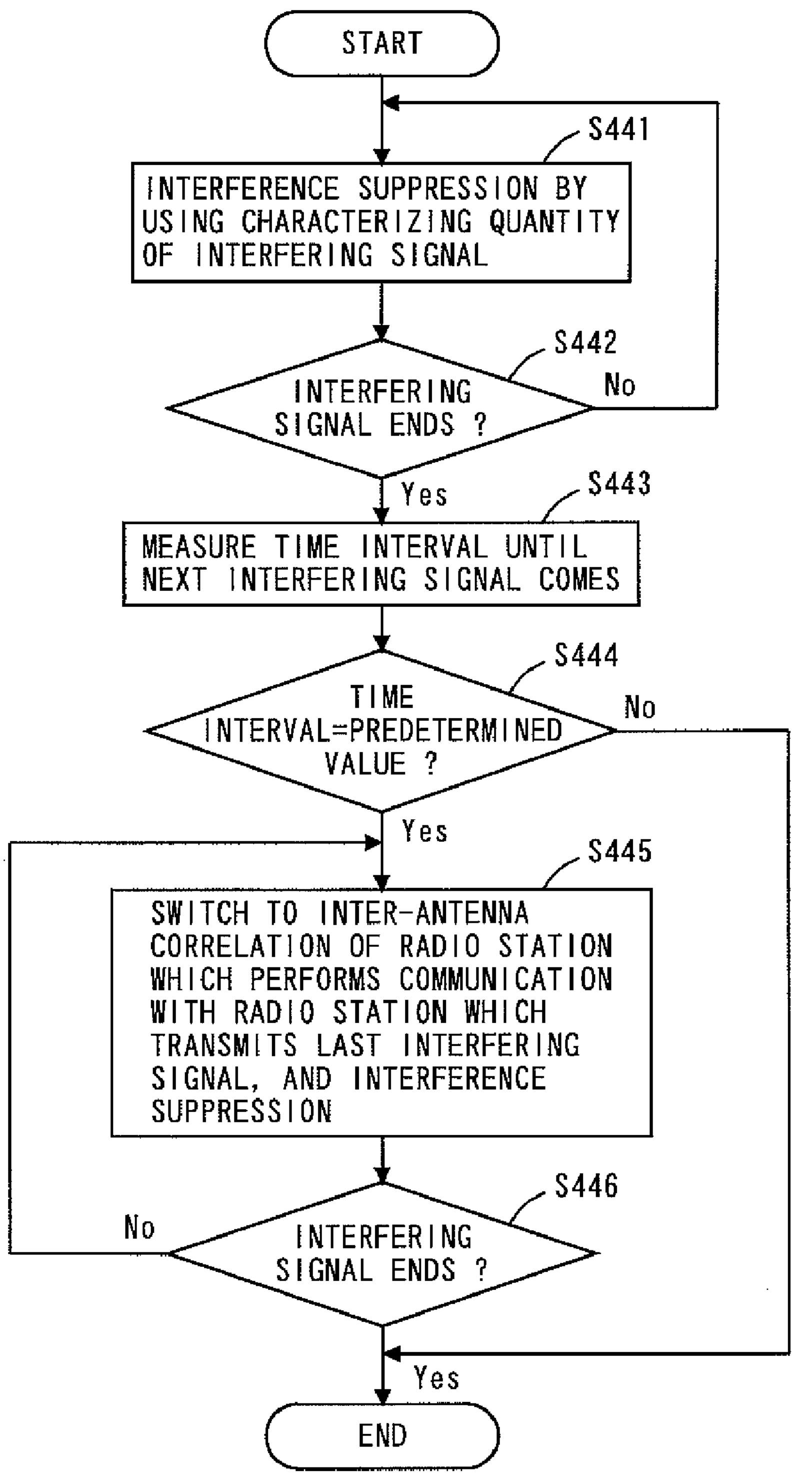
FIG. 41 is a flow chart showing an example of an interfering signal suppression operation of the interfering signal suppressing device according to the example 1 of the fourth embodiment.

FIG. 41 is a flow chart showing an example of an operation during interfering signal suppression in the interfering signal suppressing device of the example 1. FIG. 39 shows an example a state where signals come when the interfering signal suppressing device suppresses an interfering signal. Using FIGS. 39 and 41, an operation during the interfering signal suppression in the interfering signal suppressing device will be described.

Here, the interfering signal suppression section 427 suppresses the interfering signal included in the received signal by using the currently measured interfering signal characterizing quantity (a step S441). When the desired signal 415 comes in the middle of a time period when the interfering signal 416*c* comes as shown in FIG. 39, the interfering signal suppression section 427 performs desired signal detection (e.g. preamble detection and/or unique word detection) in parallel with measurement of the characterizing quantity of the interfering signal 416*c*. Then, the interfering signal suppression section 427 suppresses the interfering signal 416*c* included in the received signal by using the characterizing quantity of the interfering signal 416*c* which is measured until the desired signal 415 comes, and demodulation of the desired signal 415 can be started.

Next, the interfering signal suppression section 427 determines whether or not the interfering signal 416*c* ends (a step S442) while demodulating the desired signal 415. Since the length of the desired signal 415 can be known from header information which is added after the preamble of the desired signal 415 even though it is not a fixed length, the receiving station 412 can recognize the time of the end of the desired signal 415. Therefore, the receiving station 412 does not wrongly determine the end of the desired signal 415 and the end of the interfering signal 416*c*.

When the interfering signal 416*c* ends (Yes of the step S442), the time interval measurement section 424 measures a time interval until the next interfering signal comes (a step S443). When the interfering signal 416*c* has not ended (No of the step S442), the interfering signal suppression is continued (the step S441).

Next, the interference identification section 425 determines whether or not the measured time interval is a predetermined value (a step S444). If the measured time interval is the predetermined value (Yes of the step S444), the interference identification section 425 determines that the communication partner station of the interfering station which transmits the last interfering signal transmits the interfering signal, the characterizing quantity of the communication partner station is switched to, and the interfering signal 417*c* is suppressed (a step S445). If the measured time interval is not the predetermined value (No of the step S444), the interference identification section 425 determines that an interfering station other than the communication partner station of the interfering station which transmits the last interfering signal transmits the interfering signal, and the processing is terminated. During interfering signal suppression at the step S445, whether or not the interfering signal ends is measured (a step S446). If the interfering signal ends (Yes of the step S446), the processing is terminated. If the interfering signal has not ended (No of the step S446), the suppression of the interfering signal 417*c* is continued (the step S445).

As described above, during the interfering signal measurement period, the receiving station 412 in the example 1 determines that the second interfering station which transmits the coming other interfering signal and the first interfering station which transmits the last interfering signal perform communication with each other based on the time interval between the interfering signals. In addition, the characterizing quantity of the interfering signal and the characterizing quantity of the other interfering signal are measured, and these characterizing quantities are stored so as to correspond to the first interfering station and the second interfering station, respectively. Thus, the second interfering station which performs communication with the first interfering station and the characterizing quantity of the second interfering station can be recognized. Since the second interfering station is recognized based on the time interval of the interfering signal without demodulating the interfering signal, the second interfering station can be recognized easily in a short time. In addition to the same channel, for even the first interfering station and the second interfering station which perform communication with each other over different channels, the second interfering station and the characterizing quantity of the interfering signal can be recognized.

In addition, during the interfering signal suppression period, the receiving station 412 in the example 1 determined which interfering station the interfering signal comes from based on the time interval of the interfering signal and the stored information of the first interfering station and the second interfering station, and performs interfering signal suppression based on the characterizing quantity of the other interfering signal of the determined second interfering station (the communication partner station in this case). Thus, since the interfering station which interfering signal comes from can be recognized even if the first interfering station which transmits the interfering signal is changed to the second interfering station (the communication partner station) during the interfering signal suppression, the interfering signal included in the received signal is suppressed and the desired signal can be demodulated without error. Also, since the previously stored characterizing quantity is read based on the time interval of the interfering signal, which interfering station the interfering signal comes from can be determined easily in a short time, and the characterizing quantity can be switched.

It is noted that although signal processing such as interference detection, interfering signal suppression, and the like is performed on the received baseband signal in the above embodiment, it is not limited, and a configuration may be provided in which signal processing is performed on an intermediate-frequency signal and a high-frequency signal for each processing.

It is noted that although the CSMA/CA method has been described as an access method in the example 1, the access method which can be used for the present invention is not limited thereto. For example, a method such as a TDMA method, which performs access in time-divided slot units, can be used. If a protocol defines that in the case where a radio station transmits a packet to another radio station, the radio station as a destination transmits back an ACK packet (a NACK packet) in a slot after a predetermined interval, which interfering station as a second interfering station (a communication partner station in this case) an interfering signal comes from can be determined by using the present invention.

It is noted although the interfering signal suppression section 427 as shown in FIG. 36 has been described as an example in the example 1, the configuration of the interfering signal suppression section 427 is not limited thereto. Although the case of using the multicarrier modulation technique has been described in FIG. 36, for example, a single carrier modulation technique such as QPSK, QAM, and the like can be used. For using the single carrier modulation technique, a configuration may be provided, which does not have the sub-band division section in FIG. 36. Although a technique of interfering signal suppression based on the propagation path estimation result of the desired signal and the covariance matrix of the interfering signal has been described as a technique of suppressing an interfering component by using a characterizing quantity of the interfering signal, a technique of interfering signal suppression by adaptive array can be used as another technique of interfering signal suppression.

Figure 42:
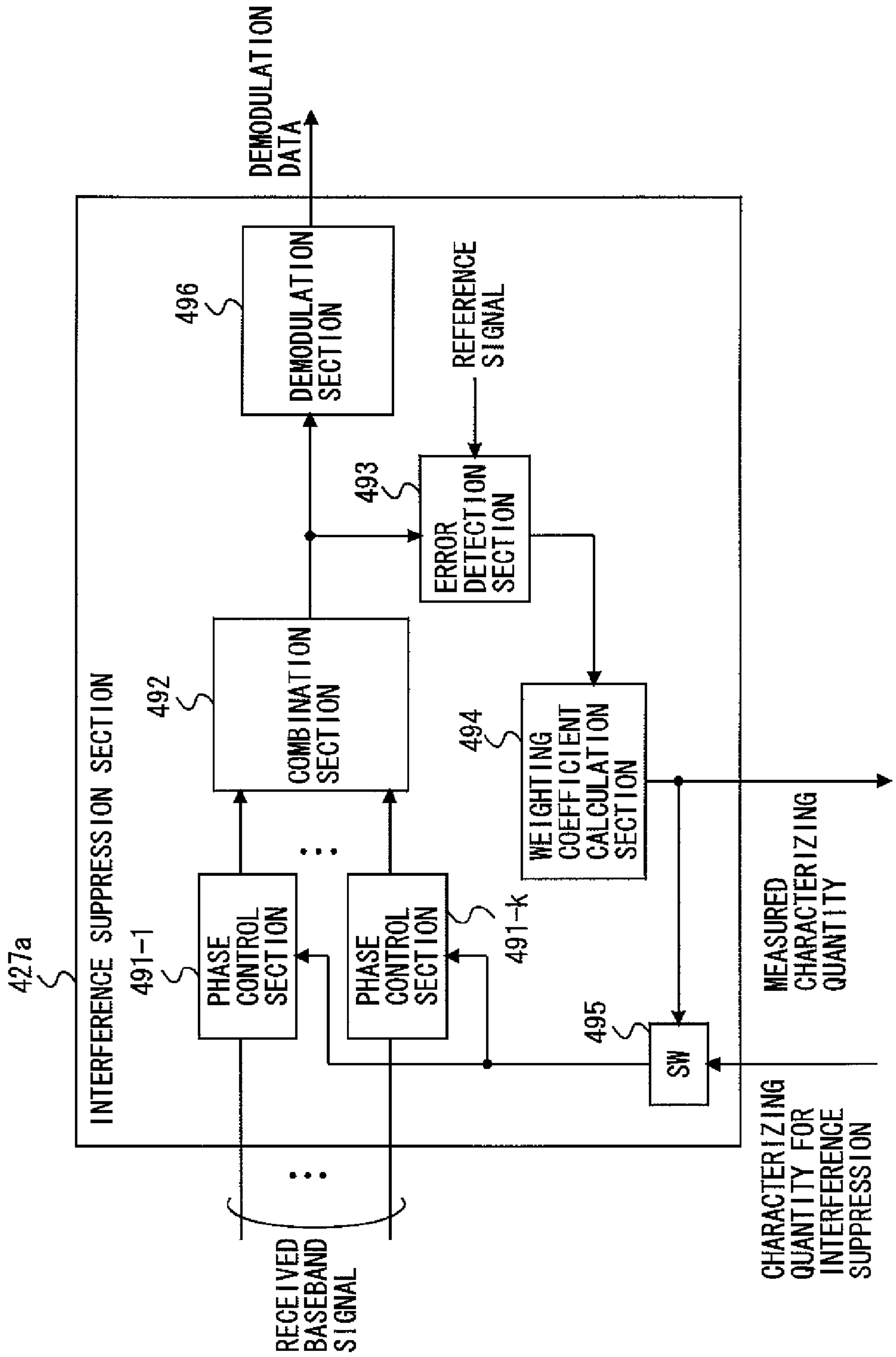
FIG. 42 is a block diagram showing an exemplary configuration of the interfering signal suppression section in the case where adaptive array is applied to the example 1 of the fourth embodiment.

With reference to FIG. 42, an operation of an interfering signal suppression section 427*a* in the case of using adaptive array will be described. The interfering signal suppression section 427*a* shown in FIG. 42 includes a plurality of phase control sections 491-1, . . . , 491-*k*, a combination section 492, an error detection section 493, a weighting coefficient calculation section 494, a switch 495, and a demodulation section 496.

The plurality of phase control sections 491-1, . . . , 491-*k* control phases of received baseband signals according to a characterizing quantity outputted from the switch 495, and outputs the received baseband signals to the combination section 492. The combination section 492 combines the received baseband signals the phase of which are controlled, and outputs a combined signal. The demodulation section 496 demodulates the combined signal, and outputs demodulation data. The error detection section 493 detects error between the combined signal and a reference signal, and outputs an error signal. The weighting coefficient calculation section 494 calculates a weighting coefficient for controlling the phases of the received baseband signals, outputs it as the characterizing quantity. The switch 495 switches between the characterizing quantity outputted from the interference information storage section 426 and the characterizing quantity outputted from the weighting coefficient calculation section 494 depending on during the interfering signal characterizing quantity measurement or during the interfering signal suppression, and outputs the characterizing quantity to the phase control sections 491-1, . . . , 491-*k*.

An operation in the case of performing interfering signal measurement by using the interfering signal suppression section 427*a* in FIG. 42 will be described. The switch 495 is controlled so as to output the characterizing quantity (the weighting coefficient) from the weighting coefficient calculation section 494 to the phase control sections 491-1, . . . , 491-*k*. When it is detected that the interfering signal comes, the weighting coefficient calculation section 494 calculates the weighting coefficient so that a null point is directed in the coming direction of the interfering signal. When the weighting coefficient converges, the interference information storage section 426 assigns an identifier to the converging weighting coefficient, and stores the weighting coefficient. As described above, the interfering signal suppression section 427*a* forms a feedback loop, thereby measuring the weighting coefficient which is used as the characterizing quantity of the interfering signal for interfering signal suppression. A method of determining the communication partner station based on the time interval of the interfering signal is as described above, and thus the description thereof will be omitted.

An operation in the case of performing interfering signal suppression by using the interfering signal suppression section 427*a* in FIG. 42 will be described. It is assumed that a desired signal and an interfering signal overlaps with each other and the interfering signal suppression section 427*a* performs interfering signal suppression by using the weighting coefficient of the interfering signal. In the case where the interfering signal ends and a time interval until the next interfering signal comes is a predetermined value, it is determined that the interfering signal comes from a second interfering station which is the communication partner of a first interfering station which transmits the last interfering signal, and the weighting coefficient for the second interfering station which is the communication partner is switched to. At this time, the switch 495 is controlled so as to output the weighting coefficient from the interference information storage section 426 to the phase control sections 491-1, . . . , 491-*k*. Once the weighting coefficient outputted from the interference information storage section 426 is read, the switch 495 switches to output again to the phase control sections 491-1, . . . , 491-*k* the weighting coefficient outputted from the weighting coefficient calculation section 494, and a feedback loop is formed again.

By the above operation, interfering signal suppression by the present invention is possible even though the interfering signal suppression section 427*a* using the adaptive array is used. Even though the interfering station which transmits the interfering signal is changed to the second interfering station (the communication partner station in this case) during the interfering signal suppression period, since the weighting coefficient stored in advance based on the time interval of the interfering signal is read, it is unnecessary to calculate a weighting coefficient during the interfering signal suppression period, and the weighting coefficient can be switched in a short time.

It is noted in the example 1, the interfering signal can be suppressed even in the case where there is a pair of the first interfering station and the second interfering station, and the interfering signal can be suppressed, or even in the case where there is a plurality of pairs of the first interfering station and the second interfering station. In other words, the characterizing quantity of the interfering signal from the first interfering station and the characterizing quantity of the interfering signal from the second interfering station are stored so as to be associated with each other for each first interfering station as shown in FIG. 38. Thus, when the interfering station which transmits the interfering signal is changed during a time period when the desired signal comes, the second interfering station which perform communication with the first interfering station is presumed, and the characterizing quantity for interfering signal suppression is switched to the characterizing quantity of the interfering signal from the second interfering station, thereby suppressing the interfering signal from the second interfering station.

In the case where interfering signal suppression is performed by using the stored characterizing quantity of the interfering signal and the stored characterizing quantity of the other interfering signal and certain communication quality is not obtained, the stored information may be deleted. When interfering signal suppression is performed by using the stored characterizing quantity of the interfering signal and the stored characterizing quantity of the other interfering signal and certain communication quality is not obtained, there is considered the case where the first interfering station is recognized as another interfering station because the first interfering station is moved to another place or a state of the propagation path is changed, or the like. As a method of determining that the certain communication quality is not obtained, for example, there is a method of determining that the certain communication quality is not obtained when error occurs in demodulation data due to error detection code such as CRC, or the like. Or, a number of times which error occurs in the demodulation data is stored and it may be determined that the certain communication quality is not obtained when demodulation data in which error occurs a predetermined number of times is received. As described above, in the case where the certain communication quality is not obtained, by deleting the stored information, a memory region for storage can be reduced, and interfering signal suppression can be performed more accurately.

It is noted that there may be the case where there are a plurality of candidate interfering stations from which the interfering signal is presumed to come. In this case, a characterizing quantity table can be created as shown in FIG. 43. In the case as shown in FIG. 43, there is the case where the interfering station of an identifier A performs communication with the interfering station of an identifier B (see a set of the first row), and the case where the interfering station of the identifier A performs communication with the interfering station of an identifier C (see a set of the third row). In such a case, for example, a characterizing quantity $W_B$ of the interfering signal transmitted by the second interfering station B, and a characterizing quantity $W_C$ of the interfering signal transmitted by the second interfering station C become characterizing quantity candidates for interfering signal suppression. In interfering signal suppression, corresponding circuits may be provided for performing interfering signal suppression by using these characterizing quantities, interfering signal suppression may be performed by using each characterizing quantity which is the candidate, demodulation may be performed, demodulation data in which error occurs a small number of times may be selected therefrom. Or, one circuit may be provided for performing interfering signal suppression by using each characterizing quantity, interfering signal suppression is performed by using the characterizing quantities which the candidate in order, and demodulation may be performed. In this case, obtained demodulation data concerning all the characterizing quantities which are the candidates may be compared and demodulation data in which error occurs a small number of times may be selected, or the demodulation data may be selected at the time when quality of obtained demodulation data satisfies a predetermined value and then interfering signal suppression may be not performed by using the characterizing quantities which are the candidates. Thus, compared to the case where the characterizing quantities which are the candidates are not narrowed down, a circuit scale and process latency of demodulation can be reduced.

As another response to the case where there are a plurality of candidate interfering stations from which the interfering signal is presumed to come, which interfering station the interfering signal comes from may be determined based on a previous communication history from the candidate interfering station from which the interfering signal is presumed to come. As a method of determining which interfering station the interfering signal comes from based on the previous communication history, for example, a number of times of previous transmission of the second interfering station (the communication partner station) may be stored, and the other interfering signal of the second interfering station which is transmitted the most number of times may be preferentially selected. Or, only the other interfering signal of the second interfering station which is transmitted just before may be stored, and the other interfering signal of the second interfering station which is transmitted just before may be selected. By such methods, in the case where there are a plurality of the candidate interfering station from which the interfering signal is presumed to come, the characterizing quantity of the other interfering signal which has the highest probability to come can be determined from them.

It is noted that when the stored information of the characterizing quantity of the interfering signal, the characterizing quantity of the other interfering signal, the first interfering station, and the second interfering station is not referred to for a certain period, the stored information may be deleted. When the stored information of the characterizing quantity of the interfering signal, the characterizing quantity of the other interfering signal, the first interfering station, and the second interfering station is not referred to for a certain period, it is considered that its first interfering station does not exist. Or, there is considered the case where the first interfering station is recognized as another interfering station because the first interfering station is moved to another place or a state of the propagation path is changed, or the like. As described above, by deleting information which is not referred to for a certain period, a memory region for storage can be reduced, and interfering signal suppression can be performed more accurately.

It is noted that the characterizing quantity storage section includes a characterizing quantity comparison section for comparing the characterizing quantity of the interfering signal with the characterizing quantity of the other interfering signal. In the case where the characterizing quantity comparison section determines that the characterizing quantity of the interfering signal and the characterizing quantity of the other interfering signal are not the same during the interfering signal measurement period, the first interfering station which transmits the interfering signal may be considered to be different from the second interfering station which transmits the other interfering signal, and the characterizing quantity storage section may store the characterizing quantity of the interfering signal and the characterizing quantity of the other interfering signal so as to be associated with each other for each first interfering station. As described above, by adding a condition that the characterizing quantity of the interfering signal is different from the characterizing quantity of the other interfering signal, it can be reliably determined that the first interfering station and the second interfering station have a communication relation with each other.

Example 2

Depending on the protocol to be used, there is the case where the same interfering station transmits a packet at a predetermined time interval after an interfering station transmits a packet. For example, a protocol which is called a block ACK applies to it. In performing the block ACK, a radio station as a transmission source continuously transmits data packets at an SIFS interval, and a radio station which is the destination of the data packets receives a plurality of data packets and transmits a ACK packet with respect to the plurality of received data packet. As described above, in the block ACK, the same radio station transmits packets at the SIFS interval.

For using such a protocol for the present invention, for example, during the interfering signal measurement period, in the case where the time interval of the interfering signal is a predetermined value, the characterizing quantity of a coming interfering signal is compared with the characterizing quantity of the last interfering signal. When the characterizing quantities of these interfering signals are the same or substantially the same, it is determined that the second interfering station which transmits the coming interfering signal and the first interfering station which transmits the last interfering signal are the same, the measured characterizing quantity of the interfering signal from the first interfering station may be stored as the characterizing quantity of the interfering signal from the second interfering station (actually, the interfering station which transmits the last interfering signal). During the interfering signal suppression period, interfering signal suppression may be performed based on the characterizing quantity of the interfering signal from the first interfering station which transmits the last interfering signal. On the other hand, during the interfering signal measurement period, in the case where the time interval of the interfering signal is a predetermined value, the characterizing quantity of the coming other interfering signal is compared with the characterizing quantity of the last interfering signal, and it is determined that the second interfering station which transmits the coming other interfering signal and the first interfering station which transmits the last interfering signal perform communication with each other when the characterizing quantities of these interfering signals are different from each other. In this case, information of the measured characterizing quantity of the last interfering signal, the characterizing quantity of the coming other interfering signal, the first interfering station, and the second interfering station (the communication partner station) may be stored. During the interfering signal suppression period, interfering signal suppression may be performed based on the characterizing quantity of the other interfering signal from the second interfering station.

Figure 44:
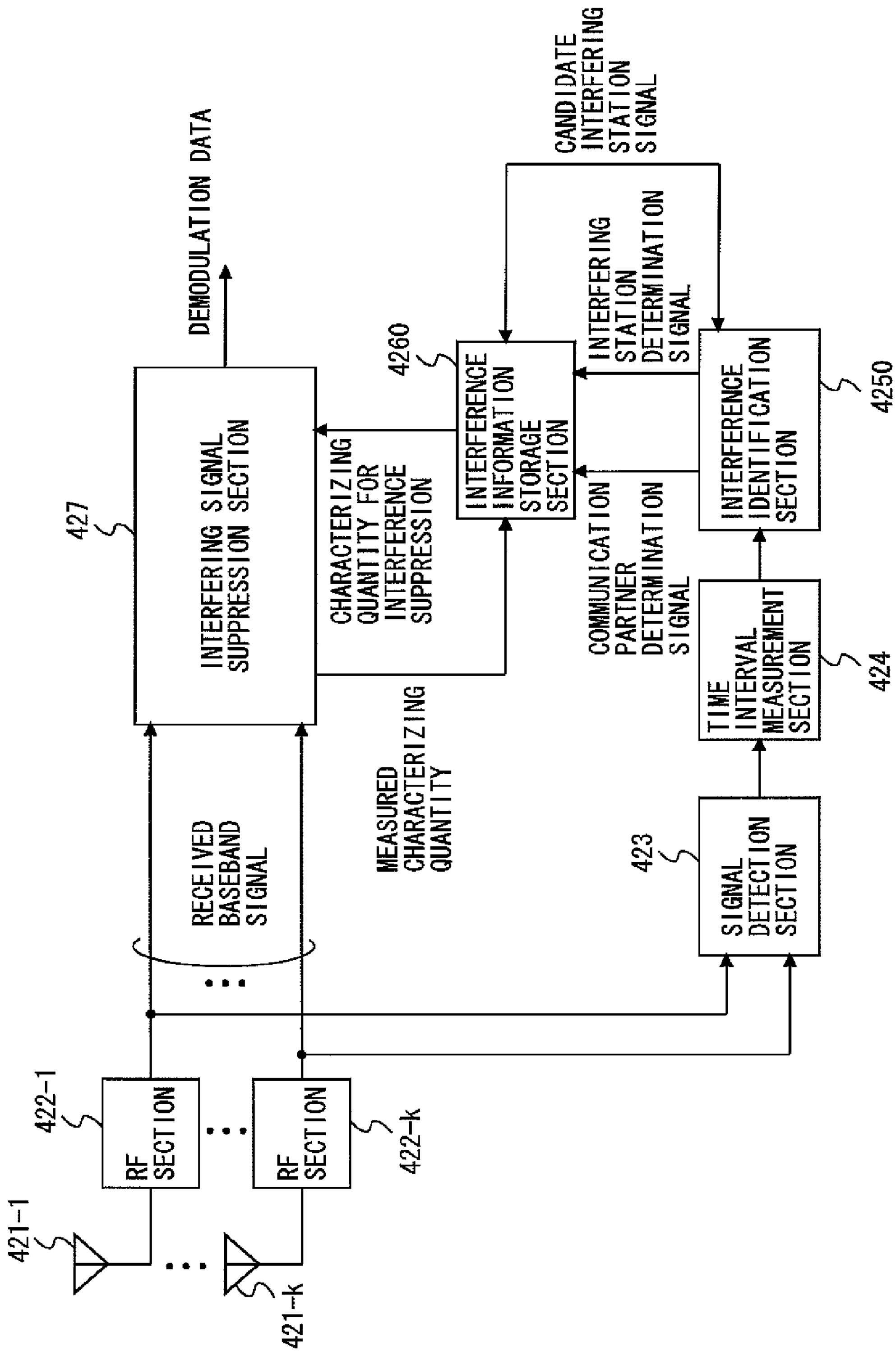
FIG. 44 is a block diagram showing a configuration of an interfering signal suppressing device according to an example 2 of the fourth embodiment.

FIG. 44 is a block diagram showing a configuration of an interfering signal suppressing device which can be adapted to the block ACK. The interfering signal suppressing device has all the functions of the interfering signal suppressing device of the example 1 shown in FIG. 34, and can perform suppression in a normal case (the case where a radio station as a transmission source and a radio station as a destination alternately exchange data packets and ACK packets) other than the block ACK. The following will describe mainly a configuration required for being adapted to the block ACK. Configurations which perform the same operations as those in the case of FIG. 34 are designated by the same reference numerals as those of FIG. 34, and the description thereof will be omitted.

The interfering signal suppressing device will described using wording of claims. The interfering signal suppressing device shown in FIG. 44 differs from the configuration shown in FIG. 34 mainly in the characterizing quantity storage section for being adapted to the block ACK.

The characterizing quantity storage section differs from that in the example 1 in further including a characterizing quantity comparison section. In the case where a time interval from the end of an interfering signal to a time when another interfering signal (the next interfering signal) comes is a predetermined time, the characterizing quantity comparison section compares whether the characterizing quantity of the interfering signal and the characterizing quantity of the other interfering signal are the same. When the characterizing quantity comparison section determines that the characterizing quantity of the interfering signal and the characterizing quantity of the other interfering signal are not the same, the first interfering station which transmits the interfering signal is considered to be different from the second interfering station which transmits the other interfering signal, and the characterizing quantity storage section stores the characterizing quantity of the interfering signal and the characterizing quantity of the other interfering signal so as to be associate with each other for each first interfering station. In this case, the first interfering station which transmits the interfering signal and the second interfering station which transmits the other interfering signal are considered to have a communication relation with each other, and information concerning the first interfering station, the characterizing quantity of the interfering signal, the second interfering station, and the characterizing quantity of the other interfering signal is stored as a set. On the other hand, when the characterizing quantity comparison section determines that the characterizing quantity of the interfering signal and the characterizing quantity of the other interfering signal are the same, the first interfering station which transmits the interfering signal and the second interfering station which transmits the other interfering signal are considered to be the same, and the characterizing quantity storage section stores the characterizing quantity of the interfering signal and the characterizing quantity of the other interfering signal so as to be associated with each other for each first interfering station. The characterizing quantity storage section corresponds to an interference information storage section 4260 in FIG. 44.

With reference to FIG. 44, the following will describe an operation of the interfering signal suppressing device according to the example 2, mainly, a part different from the example 1. The example 2 differs from the example 1 in an interference identification section 4250 and the interference information storage section 4260.

During the interfering signal measurement period, the interference identification section 4250 receives the time interval signal measured by the time interval measurement section 424. When the time interval becomes a predetermined value such as SIFS, or the like, the interference identification section 4250 outputs a communication partner determination signal indicating that the second interfering station which transmits the coming interfering signal (the other interfering signal) is the communication partner station of the first interfering station which transmits the last interfering signal or the first interfering station which transmits the last interfering signal.

During the interfering signal suppression period, the interference identification section 4250 determines which interfering station the interfering signal comes from based on the time interval signal from the time interval measurement section 424 and information of the second interfering station which is stored in the interference information storage section 4260, and outputs to the interference information storage section 4260 an interfering station determination signal indicating the determined second interfering station which transmits the coming interfering signal (the other interfering signal). More specifically, when the next interfering signal (the other interfering signal) comes after a predetermined time interval from the last interfering signal, a candidate interfering station signal indicating a candidate interfering station (the second interfering station) which is presumed to transmit the coming other interfering signal is outputted from the interference information storage section 4260 to the interference identification section 4250. When the time interval signal from the time interval measurement section 424 becomes the predetermined value, the interference identification section 4250 determines the interfering station which transmits the coming other interfering signal from the candidate second interfering station indicated by the candidate interfering station signal, and outputs an interfering station determination signal indicating the determined second interfering station. The candidate second interfering station can include the first interfering station in addition to the interfering station which perform communication with the first interfering station.

During the interfering signal measurement period, the interference information storage section 4260 receives the communication partner determination signal from the interference identification section 4250, the characterizing quantity signal indicating the characterizing quantity of the interfering signal and the characterizing quantity signal indicating the characterizing quantity of the other interfering signal (both of them are outputted from the interfering signal suppression section 427), assigns an identifier to each characterizing quantity, causes the characterizing quantity of the interfering signal and the characterizing quantity of the other interfering signal to be associated with the first interfering station and the second interfering station, respectively, and stores these characterizing quantities and the interfering stations as a set. Here, when the characterizing quantity of the interfering signal transmitted by the first interfering station and the characterizing quantity of the other interfering signal transmitted by the second interfering station are the same, it is determined that the first interfering station and the second interfering station are the same. The interference information storage section 4260 can create a characterizing quantity table as shown in FIG. 45. When it is determined that the first interfering station and the second interfering station are the same, as shown by a set of the fifth row in the characterizing quantity table, the same identifier (A in the figure) is assigned to the first interfering station and the second interfering station, and the first interfering station and the second interfering station are stored.

During the interfering signal suppression period, the interference information storage section 4260 outputs to the interfering signal suppression section 427 a characterizing quantity, which is to be used for interfering signal suppression, among the stored characterizing quantities of the other interfering signals of the second interfering stations based on the characterizing quantity signal from the interfering signal suppression section 427 or the interfering station determination signal from the interference identification section 4250.

The interfering signal suppressing device having such a configuration performs the following operation during the interfering signal measurement period. When the time interval measured by the time interval measurement section 424 corresponds to a predetermined period such as SIFS, or the like and the interfering signal suppressing device determines that the characterizing quantity of the interfering signal and the characterizing quantity of the other interfering signal are the same or substantially the same, the interfering signal suppressing device determines that the first interfering station and the second interfering station are the same, and stores the characterizing quantity of the interfering signal and the characterizing quantity of the other interfering signal so as to be associated with each other for each first interfering station. When the time interval measured by the time interval measurement section 424 corresponds to the predetermined period such as SIFS, or the like and the interfering signal suppressing device determines that the characterizing quantity of the interfering signal and the characterizing quantity of the other interfering signal are different from each other, the interfering signal suppressing device determines that the first interfering station and the second interfering station have a communication relation with each other, and stores the characterizing quantity of the interfering signal and the characterizing quantity of the other interfering signal so as to be associated with each other for each first interfering station.

It is noted that in the case where there are a plurality of candidate second interfering stations which are presumed to transmit the coming other interfering signal, this case can be dealt with by creating a characterizing quantity table as shown in FIG. 45. In the case as show in FIG. 45, there is the case where the interfering station of an identifier A performs communication with the interfering station of an identifier B (see a set of the first row), and the case where the interfering station of the identifier A performs communication with the interfering station of an identifier C (see a set of the third row). In the case as shown in FIG. 45, the interfering station of the identifier A has previously repeatedly transmitted interfering signals at a predetermined interval such as SIFS, or the like by the block ACK protocol. Thus, at a set of the fifth row, the identifier A is assigned as the first interfering station, and the identifier A is assigned as the second interfering station. Also, at the set of the fifth row, the characterizing quantity and the interfering signal transmitted by the first interfering station and the characterizing quantity of the interfering signal transmitted by the second interfering station are stored as $W_A$. In this case, for example, a characterizing quantity $W_B$ of the interfering signal from the second interfering station B, a characterizing quantity $W_C$ of the interfering signal from the second interfering station C, and the characterizing quantity $W_A$ of the interfering signal from the second interfering station A become candidates for the characterizing quantity which is to be used for interfering signal suppression. In interfering signal suppression, corresponding circuits may be provided for performing interfering signal suppression by using these characterizing quantities, interfering signal suppression may be performed by using each characterizing quantity which is the candidate, demodulation may be performed, and demodulation data in which error occurs a small number of times in demodulation may be selected therefrom. Or, one circuit may be provided for performing interfering signal suppression by using each characterizing quantity, interfering signal suppression is performed by using the characterizing quantities which are the candidates in order, and demodulation may be performed. In this case, obtained demodulation data concerning all the characterizing quantities which are the candidates may be compared and demodulation data in which error occurs a small number of times may be selected, or the demodulation data may be selected at the time when quality of obtained demodulation data satisfies a predetermined value and then interfering signal suppression may be not performed by using the characterizing quantities which are the candidates. Thus, compared to the case where the characterizing quantities which are the candidates are not narrowed down, a circuit scale and process latency of demodulation can be reduced.

As another response to the case where there are a plurality of candidate interfering stations from which the interfering signal is presumed to come, which interfering station the interfering signal comes from may be determined based on a previous communication history from the candidate interfering stations from which the interfering signal is presumed to come. As a method of determining which interfering station the interfering signal comes from based on the previous communication history, for example, a number of times of previous transmission of the second interfering station (the communication partner station) may be stored, and the other interfering signal of the second interfering station which is transmitted the most number of times may be preferentially selected. Or, only the other interfering signal of the second interfering station which is transmitted just before may be stored, and the other interfering signal of the second interfering station which is transmitted just before may be selected. By such methods, in the case where there are a plurality of candidate interfering signals from which the interfering station is presumed to come, the characterizing quantity of the other interfering signal which has the highest probability to come can be determined from them.

As described above, the interfering signal suppressing device shown in FIG. 44 can appropriately perform suppression in the case of using the block ACK protocol, in addition to in a normal case (the case where a radio station as a transmission source and a radio station as a destination alternately exchange data packets and ACK packets).

Example 3

Figure 46:
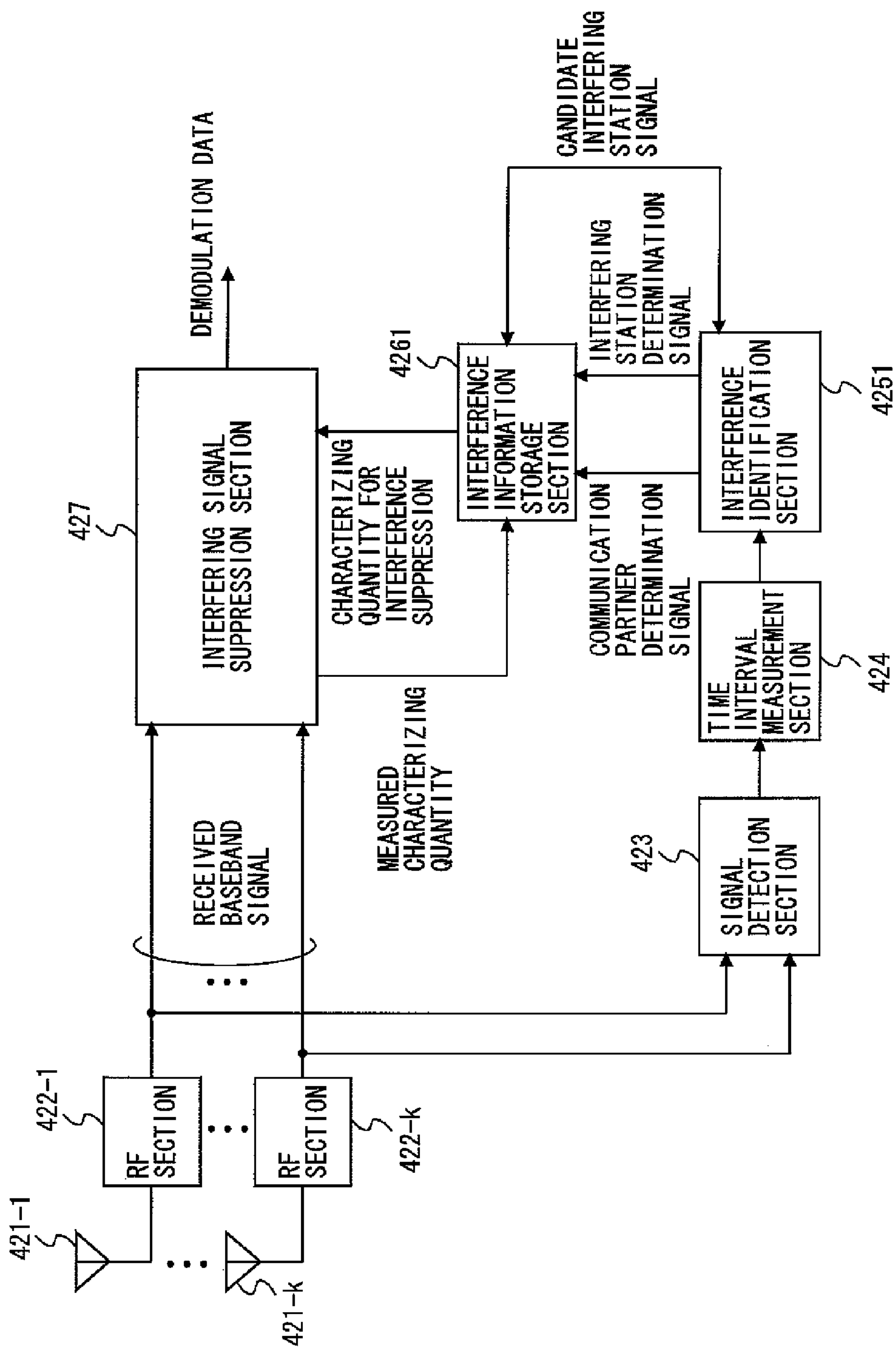
FIG. 46 is a block diagram showing a configuration of an interfering signal suppressing device according to an example 3 of the fourth embodiment.

FIG. 46 is a block diagram showing a configuration of an interfering signal suppressing device according to an example 3. This example relates to another example of the interfering signal suppressing device which can be adapted to the above block ACK protocol. The interfering signal suppressing device according to this example differs from that according to the example 2 mainly in a configuration of the characterizing quantity storage section. The same configurations as those of the example 2 are designated by the same numerals as those in FIG. 44, and the description thereof will be omitted.

The example 3 focuses on a fact that two transmission/reception patterns are assumed in the case where the time interval form the end of an interfering signal to the time when another interfering signal (the next interfering signal) comes is a predetermined interval and the characterizing quantity of the interfering signal and the characterizing quantity of the other interfering signal are different from each other. One of the two transmission/reception patterns is a pattern in which the first interfering station which transmits the interfering signal and the second interfering station which transmits the other interfering signal are different from each other. The other pattern is a pattern in which although the first interfering station which transmits the interfering signal and the second interfering station which transmits the other interfering signal are the same, since the interfering station moves or a state of the propagation path changes after transmission of the interfering signal, the characterizing quantity is different between the other interfering signal transmitted later by the interfering station and the interfering signal transmitted previously by the interfering station With reference to FIG. 46, the following will describe an operation of the interfering signal suppressing device according to the example 3, mainly, a part different from the example 2. The example 3 differs from the example 2 in an interference identification section 4251 and an interference information storage section 4261.

During the interfering signal measurement period, the interference identification section 4251 receives the time interval signal measured by the time interval measurement section 424. When the time interval becomes a predetermined value such as SIFS, or the like, the interference identification section 4251 outputs a communication partner determination signal indicating that the second interfering station which transmits the coming interfering signal (the other interfering signal) is the communication partner station of the first interfering station which transmits the last interfering signal or the first interfering station which transmits the last interfering signal.

During the interfering signal suppression period, the interference identification section 4251 determines which interfering station the interfering signal comes from based on the time interval signal from the time interval measurement section 424 and information of the second interfering station which is stored in the interference information storage section 4261, and outputs to the interference information storage section 4261 an interfering station determination signal indicating the determined second interfering station which transmits the coming other interfering signal. More specifically, when the next interfering signal (the other interfering signal) comes after a predetermined time interval from the last interfering signal, a candidate interfering station signal indicating a candidate interfering station (the second interfering station) which is presumed to transmit the coming other interfering signal is outputted from the interference information storage section 4261 to the interference identification section 4251. At this time, the candidate second interfering station can include the first interfering station in addition to the interfering station which performs communication with the first interfering station. When the time interval signal from the time interval measurement section 424 becomes the predetermined value, the interference identification section 4251 determines the interfering station which transmits the coming other interfering signal from the candidate second interfering station indicated by the candidate interfering station signal, and outputs an interfering station determination signal indicating the determined interfering station.

During the interfering signal measurement, the interference information storage section 4261 receives the communication partner determination signal from the interference identification section 4251, the characterizing quantity signal indicating the characterizing quantity of the interfering signal and the characterizing quantity signal indicating the characterizing quantity of the other interfering signal (both of them are outputted from the interfering signal suppression section 427). Further, the interference information storage section 4261 assigns an identifier to each characterizing quantity, causes the characterizing quantity of the interfering signal and the characterizing quantity of the other interfering signal to be associated with the first interfering station and the second interfering station, respectively, and stores these characterizing quantities and the interfering stations as a set in an interfering quantity table. Here, when the characterizing quantity of the interfering signal transmitted by the first interfering station and the characterizing quantity of the other interfering signal transmitted by the second interfering station are the same, it is determined that the first interfering station and the second interfering station are the same, and the same identifier is assigned to the first interfering station and the second interfering station. On the other hand, when the characterizing quantity of the interfering signal transmitted by the first interfering station and the characterizing quantity of the other interfering signal transmitted by the second interfering station are different from each other, as described above, it is determined that the second interfering station is different from the first interfering station and has a communication relation with the first interfering station, or that the second interfering station is the first interfering station but the characterizing quantity changes between before and after the movement or the like because of movement of the first interfering station or the like.

In the example 3, for responding to the case where the characterizing quantity of the interfering signal transmitted by the first interfering station and the characterizing quantity of the other interfering signal transmitted by the second interfering station are different from each other, the following two rows are provided in the characterizing quantity table. The first one of the two rows (the first row of the characterizing quantity table shown in FIG. 47) is for responding to the case where second interfering station is different from the first interfering station and has a communication relation with the first interfering station. The different identifiers A and B are assigned to the first interfering station and the second interfering station, respectively. The characterizing quantity of the interfering signal is, for example, $W_A$, and the characterizing quantity of the other interfering signal is, for example, $W_B$. The second one (the sixth row of the characterizing quantity table shown in FIG. 47) is for responding to the case where the second interfering station is the first interfering station but the characterizing quantity changes between before and after the movement or the like because of movement of the first interfering station or the like. The same identifier A is assigned to the first interfering station and the second interfering station. The characterizing quantity of the other interfering signal is, for example, $W_B$. The characterizing quantity of the interfering signal is, for example, $W_A$ before the movement of the first interfering station or the like, but changes to $W_B$ after the movement or the like. Here, the characterizing quantity of the interfering signal is rewritten to the characterizing quantity after the movement or the like, and stored in the characterizing quantity table as the value $W_B$ after the rewriting.

During the interfering signal suppression period, the interference information storage section 4261 selects a characterizing quantity, which is to be used for interfering signal suppression, from the characterizing quantities of the other interfering signals of the second interfering station, which are stored in the characterizing quantity table, based on the characterizing quantity signal from the interfering signal suppression section 427 or the interfering station determination signal from the interference identification section 4251, and outputs the selected characterizing quantity to the interfering signal suppression section 427.

It is noted that in the present embodiment, when the characterizing quantity of the interfering signal transmitted by the first interfering station and the characterizing quantity of the other interfering signal transmitted by the second interfering station are different from each other, as shown by sets of the first and fifth rows in FIG. 47, there are a plurality of candidate interfering stations which are presumed to transmit the other interfering signal. Even in this case, narrow-down of the characterizing quantity candidates, and the like can be performed in the same way as in the case of the above example 2.

In the example 3, an appropriate modulation signal can be selected by performing such narrow-down of the characterizing quantity.

Therefore, the interfering signal suppressing device shown in FIG. 46 can appropriately suppress the other interfering signal in the case of using the block ACK protocol, in addition to in a normal case (the case where a radio station as a transmission source and a radio station as a destination alternately exchange data packets and ACK packets).

It is noted that each of function blocks of the radio station described in each example is typically achieved as an LSI which is an integrated circuit. They may be individually made into one chip, or a part or all of them may be made into one chip. Although the LSI is described here, the integrated circuit is referred to as an IC, a system LSI, a super LSI, an ultra LSI depending on difference in integration degrees.

A technique of integrated circuit implementation is not limited to the LSI, but may be achieved by a dedicated circuit or a universal processor. An FPGA (Field Programmable Gate Array) which is programmable after production of an LSI and a reconfigurable processor in which the connection and the setting of a circuit cell inside the LSI are reconfigurable may be used. Further, if a technique of integrated circuit implementation which replaces the LSI by advancement of semiconductor technique and another technique derived therefrom is developed, naturally, the function blocks may be integrated by using the technique. Adaptation of a bio technique could be possible.

The following will describe a fifth embodiment of the present invention.

Fifth Embodiment

Example 1

An exemplary overall configuration and an exemplary overall operation of a radio communication system including an interfering signal suppressing device according to an example 1 of the fifth embodiment will be described. The interfering signal suppressing device according to the example 1 is regarded as a receiving station in the radio communication system. In the following description, the interfering signal suppressing device according to the example 1 is referred to as a receiving station according to need. FIG. 48 illustrates an example of the radio communication system including the interfering signal suppressing device according to the example 1. As shown in FIG. 48, the radio communication system including the interfering signal suppressing device 5802 (the receiving station 5802) according to the example 1 comprises a transmitting station 5101, the receiving station 5802, and interfering stations 5103 and 5104. The transmitting station 5101 converts transmission data, the destination of which is the receiving station 5802, into a radio signal 5105, and transmits the radio signal 5105. The receiving station 5802 receives and demodulates the radio signal 5105 to obtain the transmission data from the transmitting station 5101. Communication is performed by this sequence of operations.

On the other hand, the interfering station 5103 and the interfering station 5104 transmit radio signals independently of the transmitting station 5101 and the receiving station 5802. In this example, the radio station 5103 and the radio station 5104 performs transmission and reception of signals 5106 and 5107 by using a channel different from that used by the transmitting station 5101 and the receiving station 5802.

In the example 1, the radio stations 5101, 5802, 5103, and 5104 use the same access method, and, for example, can use the CSMA/CA method of IEEE802.11. In this method, the radio stations 5101, 5802, 5103, and 5104 each detect a radio communication carrier before transmission. If not detecting a carrier the level of which is equal to or higher than a threshold level, the radio stations 5101, 5802, 5103, and 5104 each wait for a random time to perform transmission, and then transmit a frame. This technique can prevent collision of frames due to concurrent transmission of signals by a plurality of radio stations which perform communication over the same channel. In this example, the interfering stations 5103 and 5104, which perform communication over the same channel, use this technique so as not to transmit signals concurrently.

It is noted in the IEEE802.11 standard, a format of a transmission frame is defined, and the MAC address of a transmission source radio station (the transmitting station 5101), the MAC address of a destination radio station (the receiving station 5802), and a frame length are described as header information in the header of the transmission frame.

Figure 49:
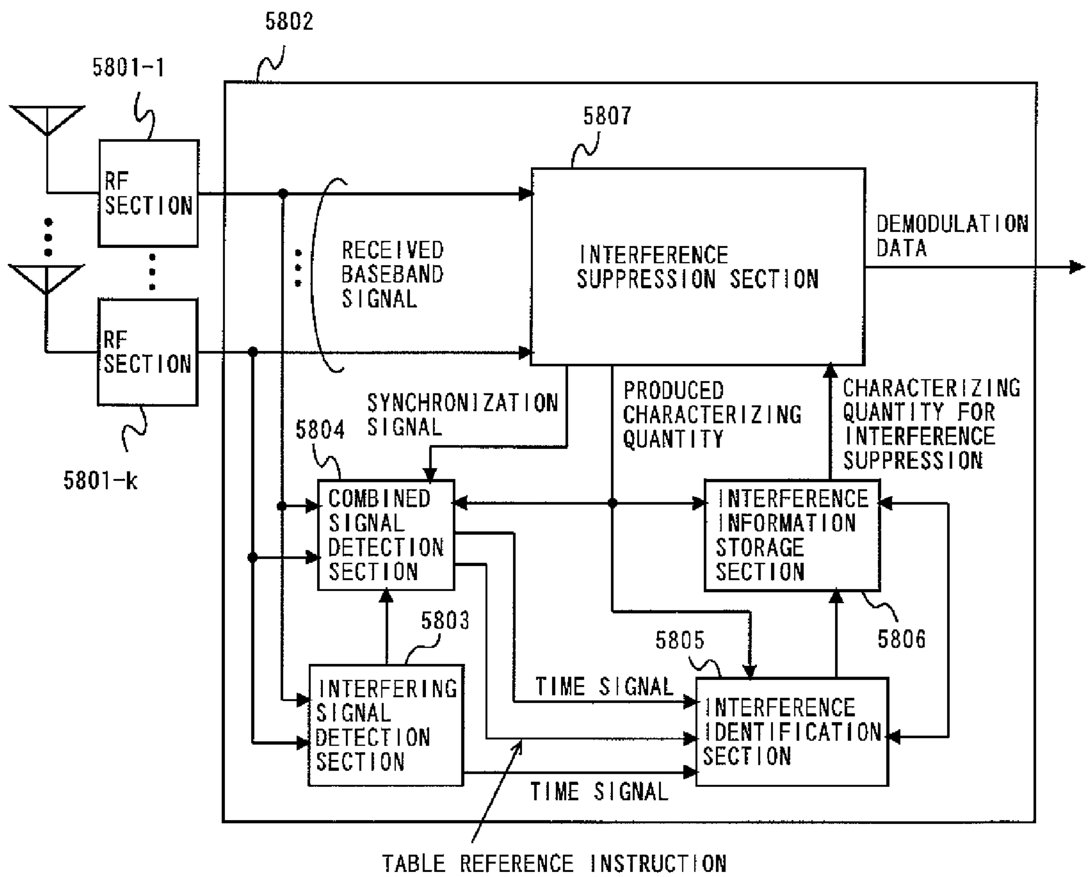
FIG. 49 is a block diagram showing an exemplary configuration of the interfering signal suppressing device according to the example 1 of the fifth embodiment.
Figure 50:
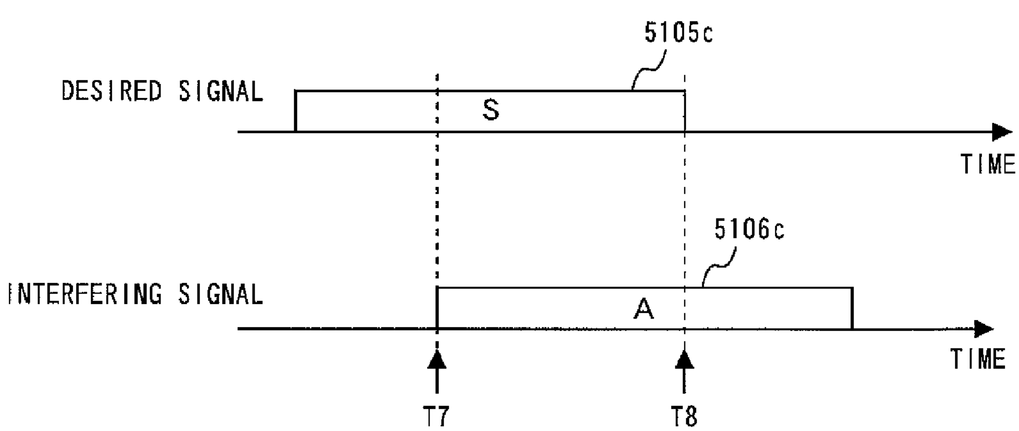
FIG. 50 is a time sequence diagram which shows that signals come when the interfering signal suppressing device according to the example 1 of the fifth embodiment suppresses an interfering signal.

The following will describe the interfering signal suppressing device 5802 (the receiving station 5802) according to the example 1 with reference to the figures. FIG. 49 is a block diagram showing an example of the interfering signal suppressing device according to the present invention, and shows the case of using the interfering signal suppressing device as the receiving station. FIG. 50 is a time sequence diagram which shows that signals come when the interfering signal suppressing device according to the present invention suppresses an interfering signal. FIG. 51 is a time sequence diagram which shows that a signal comes when the interfering signal suppressing device according to the present invention measures characterizing quantities of an interfering signal and a combined signal and creates a characterizing quantity table, and a timing at which a signal comes when the interfering signal suppressing device according to the present invention performs interfering signal suppression based on the characterizing quantity held in the characterizing quantity table.

The interfering signal suppressing device 5802 shown in FIG. 49 comprises a plurality of antennas, a plurality of RF sections 5801-1, . . . , **5801-*k*, an interfering signal detection section 5803, a combined signal detection section 5804, an interference identification section 5805, an interference information storage section 5806, and an interfering signal suppression section 5807**.

The interfering signal suppressing device 5802 shown in FIG. 49 is an interfering signal suppressing device for suppressing an interfering signal **5106*c* which comes during a time period when a desired signal 5105*c* is received (see FIG. 50). The interfering signal suppressing device 5802** comprises an interfering signal characterizing quantity measurement section, a first combined signal characterizing quantity measurement section, a characterizing quantity storage section, a second combined signal characterizing quantity measurement section, and an interfering signal characterizing quantity acquiring section in claims.

The interfering signal suppression section 5807 in FIG. 49 corresponds to the interfering signal characterizing quantity measurement section, the first combined signal characterizing quantity measurement section, and the second combined signal characterizing quantity measurement section in claims. In other words, the interfering signal suppression section 5807 has functions of the interfering signal characterizing quantity measurement section, the first combined signal characterizing quantity measurement section, and the second combined signal characterizing quantity measurement section in claims. The interference information storage section 5806 in FIG. 49 corresponds to the characterizing quantity storage section, and the interfering signal characterizing quantity acquiring section in claims. In other words, the interference information storage section 5806 has functions of the characterizing quantity storage section and the interfering signal characterizing quantity acquiring section in claims.

Here, an outline of the example 1 will be described using wording of elements of claims. The interfering signal suppressing device 5802 according to the example 1 comprises the interfering signal characterizing quantity measurement section, the first combined signal characterizing quantity measurement section, the characterizing quantity storage section, the second combined signal characterizing quantity measurement section, the interfering signal characterizing quantity acquiring section, and the interfering signal suppression section.

The interfering signal characterizing quantity measurement section measures a characterizing quantity of an interfering signal 5106*a*.

The first combined signal characterizing quantity measurement section measures a characterizing quantity of a combined signal (not shown) of the interfering signal 5106*a* and a desired signal 5105*a* when it is detected that the desired signal 5105*a* comes during a time period when the characterizing quantity of the interfering signal 5106*a* is measured.

The characterizing quantity storage section stores the measure interfering signal characterizing quantity and the measured combined signal characterizing quantity so as to be associated with each other for each interfering station 5103.

The second combined signal characterizing quantity measurement section measures a characterizing quantity of a combined signal of the desired signal 5105*c* and the interfering signal 5106*c* when it is detected that the interfering signal 5106*c* comes during the time period when the desired signal 5105*c* comes (see FIG. 50).

The interfering signal characterizing quantity selection section collates the measurement value of the second combined signal characterizing quantity measurement section with information stored in the characterizing quantity storage section, and selects the characterizing quantity of the interfering signal 5106*c* from the corresponding interfering station from the stored characterizing quantities of interfering signals from a plurality of interfering stations.

The interfering signal suppression section suppresses the interfering signal 5106*c* based on the interfering signal characterizing quantity which is selected by the interfering signal characterizing quantity selection section.

By these elements functioning so as to relate to each other, the interfering signal 5106*c* can be suppressed. In other words, an interfering signal characterizing quantity and a combined signal characterizing quantity are measured and stored so as to be associated with each other for each interfering station, and a characterizing quantity table is created in advance. Then, a combined signal characterizing quantity is measured for performing interfering signal suppression, its measurement value is collated with the combined signal characterizing quantities in the characterizing quantity table to select the characterizing quantity of the interfering signal of the corresponding interfering station 5103 from the stored characterizing quantities of the interfering signals from the plurality of interfering stations, and interfering signal suppression can be performed by using this interfering signal characterizing quantity.

Using FIG. 49, the following will describe in detail a configuration and effects of the example 1.

The plurality of antennas, and the plurality of RF sections 5801-1, . . . , 5801-*k* each receive the desired signals 5105*a*, 5105*b*, 5105*c* (see FIGS. 50 and 51), and the interfering signals 5106*a*, 5106*b*, and 5106*c* (see FIGS. 50 and 51). When the desired signal 5105*a*, 5105*b*, or 5105*c*, and the interfering signal 5106*a*, 5106*b*, or 5106*c* come during the same period as shown in FIGS. 50 and 51, the desired signal 5105*a*, 5105*b*, or 5105*c*, and the interfering signal 5106*a*, 5106*b*, or 5106*c* overlap with each other to generate a combined signal. The plurality of antennas, and the plurality of RF sections 5801-1, . . . , 5801-*k* each receive this combined signal. It is noted that in FIGS. 50 and 51, the combined signal is not shown specifically. Also, the plurality of antennas, and the plurality of RF sections 5801-1, . . . , 5801-*k* convert received signals which are high-frequency band signals into baseband signals by frequency conversion or the like, output this received baseband signals to the interfering signal suppression section 5807, the interfering signal detection section 5803, and the combined signal detection section 5804.

The interfering signal detection section 5803 detects that an interfering signal comes and that the coming interfering signal ends by receiving the received baseband signals, and outputs to the interference identification section 5805 a time signal indicating times when the interfering signal comes and ends. The interfering signal detection section 5803, for example, can detect that a radio signal comes and ends by detecting change of power values of the received baseband signals. Determination of whether or not the coming radio signal is an interfering signal can be performed by determining whether or not a preamble unique to a desired signal is detected at the header of the radio signal. Or, it can be performed by determining whether a unique word unique to the desired signal is detected after the preamble. In other words, the coming radio signal can be determined to be the desired signal if the preamble or the unique word unique to the desired signal is detected, and determined to be the interfering signal if the preamble or the unique word unique to the desired signal is not detected. In the case of using existence or nonexistence of the preamble or the unique word unique to the desired signal for the determination, even if there arises signal interference when change of a power value is hard to detect, interference of a leakage signal from an adjacent channel or the like, or signal interference from a communication incompatible system, its interfering signal can be reliably detected.

Concerning interference in the same channel as that of a communication compatible system, it can be determined that the signal is other than the desired signal by interpreting information of a source address or a destination address in a signal. Thus, it can be detected that the interfering signal comes. In addition, a time of the end of signal interference can be detected by interpreting packet length information, for example, from signal information in the signal. Further, the interfering station which transmits the signal can be identified from the MAC address in the signal.

As another method for detecting that an interfering signal comes and ends, a change of an inter-antenna correlation value of the received baseband signals obtained from the plurality of antennas may be detected. Or, a change of a covariance matrix including information of the inter-antenna correlation value and a signal power value may be detected. Since the inter-antenna correlation value substantially corresponds to a spatial angle at which a signal comes, the inter-antenna correlation value is advantageous in that even in the case where a change of a power value is hard to detect, a change of the signal can be detected by using information of the inter-antenna correlation value. Also, a signal in an adjacent channel may be observed to detect a change of the power value of the signal. In this case, among signals in the adjacent channel, a leakage signal which interferes the channel used by a receiving station can be detected with high accuracy.

Also, for example, in an interfering signal suppressing device including a plurality of antennas, power values of baseband signals of a plurality of types, which are received by the plurality of antennas, may be observed, and when any one of them exceeds or becomes smaller than a predetermined threshold value, it may be determined that an interfering signal comes or ends. Or, when the power values concerning a predetermined number or more of the types among the plurality of types exceed or become smaller than the predetermined threshold value, it may be determined that the interfering signal comes or ends. Also, when a signal which the received baseband signals of the plurality of types are combined into exceeds or becomes smaller than the predetermined threshold value, it may be determined that a signal comes or ends. As a configuration for detecting the above power value and the inter-antenna correlation value, or the like, the interfering signal detection section 5803 can be used. As shown in FIG. 52, the interfering signal detection section 5803 can include sub-band division sections 51201-1 . . . 51201-*k* the number of which is the same as a number of transmission lines for the received baseband signals, and a sub-band interfering signal integrated detection section 51202. In this case, change of the power value and the inter-antenna correlation value can be comprehensively detected by using the power value and the inter-antenna correlation value for each sub-band, and thus detection of an interfering signal can be possible with higher accuracy. In interference of an adjacent channel signal, although a large power is generated in a sub-band near the adjacent channel, its value is not large for the entire reception band. Thus, a power for each sub-band can be detected, and, for example, it may be determined that an interfering signal comes when a number of sub-bands the powers of which exceed a predetermined threshold value is equal to or larger than a predetermined number. In this case, more accurate detection of an interfering signal is possible.

It is noted that these interfering signal detection methods each can be used solely, or can be used in combination.

The combined signal detection section 5804 receives the received baseband signals from the RF sections 5801-1, . . . , 5801-*k*, a signal detection signal from the interfering signal detection section 5803, and the characterizing quantity and a synchronization detection signal from the interfering signal suppression section 5807, and perform its function. Based on these input signals, the combined signal detection section 5804 detects when a duration of overlap between an interfering signal and a desired signal starts and ends. In the case as shown in FIG. 50, a duration of overlap starts at the timing of T7, and ends at the timing of T8. In the case as shown in FIG. 51, a duration of overlap between at the timings of T2 and T5, and ends at the timings of T3 and T6. The combined signal detection section 5804 outputs to the interference identification section 5805 an overlap start time signal indicating detection of overlap duration start or an overlap end time signal indicating detection of overlap duration end. Detection that the desired signal comes during a time period when the interfering signal is detected can be performed by detecting the synchronization signal from the interfering signal suppression section 5807. It is noted that the detection of overlap duration end by the end of the desired signal during the time period when the interfering signal is received or by the end of the interfering signal can be performed by detecting a change of a correlation (an inter-antenna correlation value) between the received baseband signals obtained from the plurality of antennas after the interfering signal detection section 5803 detects the interfering signal, or by observing a signal of an adjacent channel and detecting a change of the power value of the signal of the adjacent channel.

The power value concerning each of the received baseband signals of a plurality of types, which correspond to the plurality of antennas, respectively, is observed, and when the power value of one of the received baseband signals of the plurality of types exceeds or becomes smaller than a predetermined threshold value, it may be determined that overlap occurs or is cancelled ends, namely, that a combined signal occurs or ends. Or, when the power values concerning a predetermined number or more of the types exceed or become smaller than the predetermined threshold value, it may be determined that a combined signal occurs or ends.

The combined signal detection section 5804 also has a function to detect that an interfering signal comes during a time period when a desired signal is received. This detection method is similar to the above operation of the interfering signal detection section 5803. More specifically, the combined signal detection section 5804 receives the received baseband signals obtained from the plurality of antennas, and detects a change of the correlation (the inter-antenna correlation value) between the received baseband signals, thereby detecting that an interfering signal comes during the time period when the desired signal is received, namely, a combined signal comes, and that the interfering signal or the desired signal ends during a time period when the combined signal comes, namely, the combined signal ends. Or, the combined signal detection section 5804 can detect that the combined signal comes and ends based on the change of the power values of the received baseband signals. Also, the combined signal detection section 5804 outputs to the interference identification section 5805 a time signal indicating times when the combined signal comes and ends. Upon the receipt of the time signal, the interfering interference identification section 5805 recognizes that the characterizing quantity from the interfering signal suppression section 5807 is the characterizing quantity of the combined signal. Also, when detecting that an interfering signal comes during the time period when the desired signal is received, the combined signal detection section 5804 outputs to the interference identification section 5805 an instruction to refer to the characterizing quantity table. "An instruction to refer to the characterizing quantity table" is an instruction to cause the interference identification section 5805 to refer to the characterizing quantity table in the interference information storage section 5806. Upon the receipt of this instruction, the interference identification section 5805 refers to information in the characterizing quantity table. When the interference identification section 5805 recognizes that the interference identification section 5805 receives a new characterizing quantity which does not exist in the table from the interfering signal suppression section 5807, the interference identification section 5805 outputs to the interference information storage section 5806 an instruction to store the new characterizing quantity.

It is noted that as shown in FIG. 53, the combined signal detection section 5804 can include a plurality of sub-band division sections 51301-1, . . . , 51301-*k*, and a sub-band combined signal integrated detection section 51302. Thus, changes of the power value and the inter-antenna correlation value can be comprehensively detected by using the power value and the inter-antenna correlation value for each sub-band, and thus detection of an interfering signal can be possible with higher accuracy.

The interference identification section 5805 outputs to the interference information storage section 5806 identification signals which are unique to the combined signal and the interfering signal, respectively, based on the time signal from the interfering signal detection section 5803, the time signal and the table reference instruction signal from the combined signal detection section 5804, and the characterizing quantity from the interfering signal suppression section 5807. This operation is an operation for uniquely recognizing the combined signal and the interfering signal. When the time signal indicating the time of when the interfering signal comes from the interfering signal detection section 5803 and the time signal indicating the time when the combined signal comes from the combined signal detection section 5804 are inputted to the interference identification section 5805, the interference identification section 5805 produces the identification signals based on the combined signal characterizing quantity and the interfering signal characterizing quantity from the interfering signal suppression section 5807, and outputs the identification signals to the interference information storage section 5806. More specifically, the identification signal can include a signal indicating the correlation (the inter-antenna correlation value) between the received baseband signals obtained from the plurality of antennas and a time average value of the inter-antenna correlation value, and a signal indicating a received power. It is noted that the same identification signal may be added if the inter-antenna correlation value is within a predetermined range.

If the interfering station transmits a signal over the same channel as that of the transmitting station and an interfering signal is received in advance by the receiving station prior to an operation of interfering signal suppression, the MAC address of the interfering signal may be the identification signal.

Also, when the table reference instruction signal is inputted to the interference identification section 5805 from the combined signal detection section 5804, the interference identification section 5805 produces an identification signal based on the characterizing quantity from the interfering signal suppression section 5807 similarly as in the above, and outputs the identification signal to the interference information storage section 5806.

When the interfering signal suppression section 5807 performs measurement of the interfering signal characterizing quantity, the interference information storage section 5806 receives the identification signal for the interfering signal characterizing quantity which is outputted from the interference identification section 5805, and the characterizing quantity signal (outputted from the interfering signal suppression section 5807) indicating the characterizing quantity of the interfering signal, and assigns an identification signal for the characterizing quantity to the characterizing quantity of the interfering signal, store them in a characterizing quantity table as shown in FIG. 54.

Also, when the interfering signal suppression section 5807 performs measurement of the combined signal characterizing quantity, the interference information storage section 5806 receives the identification signal for the combined signal characterizing quantity which is outputted from the interference identification section 5805, and the characterizing quantity signal (outputted from the interfering signal suppression section 5807) indicating the characterizing quantity of the combined signal, assigns an identification signal for the characterizing quantity to the characterizing quantity of the combined signal, and stores them in the characterizing quantity table as shown in FIG. 54.

On the other hand, when the interfering signal suppression section 5807 performs interfering signal suppression, identification information of the combined signal is outputted from the interference identification section 5805 to the interference information storage section 5806. The interference information storage section 5806 refers to the characterizing quantity table therein (see FIG. 54), estimates which interfering station the interfering signal comes from based on the inputted identification information (e.g. S+A). Then, the interference information storage section 5806 outputs the interfering signal characterizing quantity ($W_A$) of the presumed interfering station (e.g. A) to the interfering signal suppression section 5807.

The interfering signal suppression section 5807 measures the characterizing quantities of the interfering signal and the combined signal from the received baseband signals, and outputs their characterizing quantity signals to the combined signal detection section 5804, the interference identification section 5805, and the interference information storage section 5806. Also, the interfering signal suppression section 5807 suppresses the interfering signal components included in the received baseband signals by using the characterizing quantity of the interfering signal outputted from the interference information storage section 5806, demodulates the signals on which the interfering signal suppression is performed, and outputs demodulation data to the outside.

In the example 1, a technique (refer to International Publication WO No. 2006/003776) which is applied previously by the present applicant can be used for the interfering signal suppression section 5807 shown in FIG. 49 as an interfering signal suppression technique. This technique relates to an interfering signal suppressing device which by using a covariance matrix of an unnecessary signal column vector measured before receiving an interfering signal, estimates a transmission path from an interfering station to a receiving station, and a signal, which is transmitted from a desired signal transmitting station, with interference from the interfering station reflected. The case of using a multicarrier modulation technique such as an OFDM technique, and the like as a modulation/demodulation technique will be described.

FIG. 55 is a block diagram showing an example of an interfering signal suppression section 5807 in the case of using the interfering signal suppressing device which is disclosed in the above International Publication. An interfering signal suppression section 5807 shown in FIG. 55 comprises a plurality of sub-band division sections 51102-1, . . . , **51102-*k*, a transmission path estimation section 51104, an interfering signal measurement section 51105, a weighted combining section 51107, and a demodulation section 51106**.

The sub-band division sections 51102-1, . . . , **51102-*k* each divide each of received baseband signals of a plurality of types, which correspond to a plurality of antennas (not shown), into a plurality of sub-band signals, and output the received sub-band signals to a memory 51108, the transmission path estimation section 51104, and an interfering signal estimation section 51105. As a method of dividing a received baseband signal into a plurality of sub-band signals, for example, fast Fourier transform (FFT), wavelet conversion, a filter bank, or the like can be used. It is noted that in the case as shown in FIG. 55, the sub-band division sections 51102-1, . . . , 51102-*k*** are provided for antenna inputs, respectively, but one sub-band division section may be used for time division.

The transmission path estimation section 51104 performs transmission path estimation based on the known signal included in each received sub-band signal, and outputs a transmission path estimation signal H to the weighted combining section 51107. The interfering signal measurement section 51105 calculates a covariance matrix $R_{uu}$ (an inter-antenna correlation value) which is a correlation of each received sub-band signal as a characterizing quantity of each received sub-band signal, and outputs it as a characterizing quantity signal to the interference information storage section 5806 and the like (see FIG. 49). For each sub-band, the weighted combining section 51107 combines the received sub-band signals r with weighting coefficients as shown by equation 5-1 by using the transmission path estimation signal H which is outputted from the transmission path estimation section 51104 and the interfering signal characterizing quantity (the covariance matrix $R_{uu}$) for interfering signal suppression which is outputted from the interference information storage section 5806, and outputs a signal v in which the interfering signal component is suppressed.

$$v=R_{SS}H^H(HR_{SS}H^H+R_{uu})^{-1}r \qquad \text{(equation 5-1)}$$

Here, $A^H$ denotes a complex conjugate transposition of A, and $A^{-1}$ denotes an inverse matrix of A.

$R_{SS}$ denotes a covariance matrix of the signal s transmitted from the transmitting station, and can be known from statistical nature of transmission signals.

The demodulation section 51106 demodulates the signal v which is outputted from the weighted combining section 51107 and in which the interfering signal component is suppressed, and outputs demodulation data. The weighted combining section 51107 combines the plurality of sub-band signals from the sub-band division sections 51102-1, . . . , **51102-*k* with weighting coefficients based on the above transmission path estimation signal H and the covariance matrix $R_{uu}$. At this time, since a time for calculating the transmission path estimation signal H, namely, the characterizing quantity for interfering signal suppression, and a time for holding the characterizing quantity are needed, the memory 51108 temporarily holds the signals from the sub-band division sections 51102-1, . . . , 51102-*k*** for delaying those signals.

As described above, the interfering signal suppression section 5807 shown in FIG. 55 measures in advance the inter-antenna correlation value between the signals received by the plurality of antennas as an characterizing quantity of the interfering signal prior to interfering signal suppression. The plurality of sub-band signals are combined with weighting coefficients based on the inter-antenna correlation value, and thus the interfering signal suppression section 5807 can suppresses the interfering component in the received signal.

Using FIG. 51, an example of an operation when the receiving station 5802 measures an interfering signal will be described. When the interfering signal **5106*a* comes at a time T1, the receiving station 5802 (see FIG. 48) detects the time T1, and starts to measure a characterizing quantity such as an inter-antenna correlation value, and the like concerning the interfering signal 5106*a*. When the desired signal 5105*a* comes at a time T2, the receiving station 5802 detects the time T2, assigns an identifier A to the characterizing quantity of the interfering signal 5106*a* which has been measured, and stores it. At the time T2, since the desired signal 5105*a* also comes, the desired signal 5105*a* and the interfering signal 5106*a* overlap during a period between the time T2 and a time T3. The receiving station 5802 detects that the overlapped signal comes at the time T2, and starts to measure a characterizing quantity. When the receiving station 5802 detects that the interfering signal 5106*a* ends at T3, the receiving station 5802 determines that the measured characterizing quantity is a characterizing quantity of the combined signal of the interfering signal 5106*a*** and the desired signal, and assigns an identifier A+S to the characterizing quantity of the combined signal, and stores this characterizing quantity $W_{S+A}$.

The receiving station 5802 similarly detects a time T4 when the next interfering signal **5106*b* comes, and measures a characterizing quantity of the interfering signal 5106*b*. When a desired signal 5105*b* comes at a time T5, the receiving station 5802 detects the time T5, assigns an identifier B to the characterizing quantity of the interfering signal 5106*b* which has been measured, and stores this characterizing quantity $W_B$. In addition, the desired signal 5105*b* and the interfering signal 5106*b* overlap during a period between the time T5 and a time T6. The receiving station 5802 starts to measure a characterizing quantity, determines that the measured characterizing quantity is a characterizing quantity of the combined signal of the interfering signal 5106*b* and the desired signal 5105*b* when detecting the end of the interfering signal 5106*b* at T6**, assigns an identifier B+S to the characterizing quantity of the combined signal, and stores this characterizing quantity $W_{S+B}$.

When the interfering signal and the desired signal comes as shown in FIG. 51 and the characterizing quantities of these signals are measured, characterizing quantity information as shown in FIG. 54 is stored together with interfering station information in the interference information storage section 5806. This is referred to as a characterizing quantity table. In FIG. 54, a column (a) shows the identifier of an interfering station, and a column (b) shows the characterizing quantity of an interfering signal or a combined signal. The identifier S+A of the interfering station is the identifier of the combined signal of a desired signal S and an interfering signal A, and the characterizing quantity of this combined signal becomes $W_{S+A}$. Similarly, the identifier S+B of the interfering station is an identifier of the combined signal of the desired signal S and an interfering signal B, the characterizing quantity of this combined signal becomes $W_{S+B}$. By referring these information, the characterizing quantity of the combined signal is used as a clue to obtain the characterizing quantity of the interfering signal included in the combined signal.

With reference to FIG. 50, the following will describe an example of an operation when the receiving station suppresses an interfering signal. In FIG. 50, the desired signal **5105*c* is a signal transmitted by the transmitting station 5101, the interfering signal 5106*c* is a signal transmitted by the interfering station 5103. As already described with reference to FIG. 51**, the characterizing quantity of the interfering signal and the characterizing quantity of the combined signal are measured in advance prior to interfering signal suppression, and these information is stored in the characterizing quantity table.

At a time T7, the receiving station 5802 detects that the interfering signal **5106*c* comes with interference with the desired signal 5105*c*. At this time, the receiving station 5802 detects that the combined signal comes, and detects a characterizing quantity of this combined signal. Then, the receiving station 5802 refers to the characterizing quantity table shown in FIG. 54. By referring to the characterizing quantity table, the receiving station 5802 uses the characterizing quantity of the combined signal as a clue to estimate which interfering station the signal which overlaps with the desired signal 5105*c* comes from. In other words, when $W_{S+A}$ is measured as a combination characterizing quantity, the receiving station 5802 can estimate that the combined signal is a combined signal of the interfering signal 5106*c* transmitted from the interfering station A and the desired signal 5105*c* by referring to the characterizing quantity table in FIG. 54. Thus, during a period between the time T7 and a time T8, the receiving station 5802 can know the characterizing quantity $W_A$ of the coming interfering signal 5106*c***, and can suppress the interfering signal of the received signal by using this characterizing quantity $W_A$.

Figure 56:
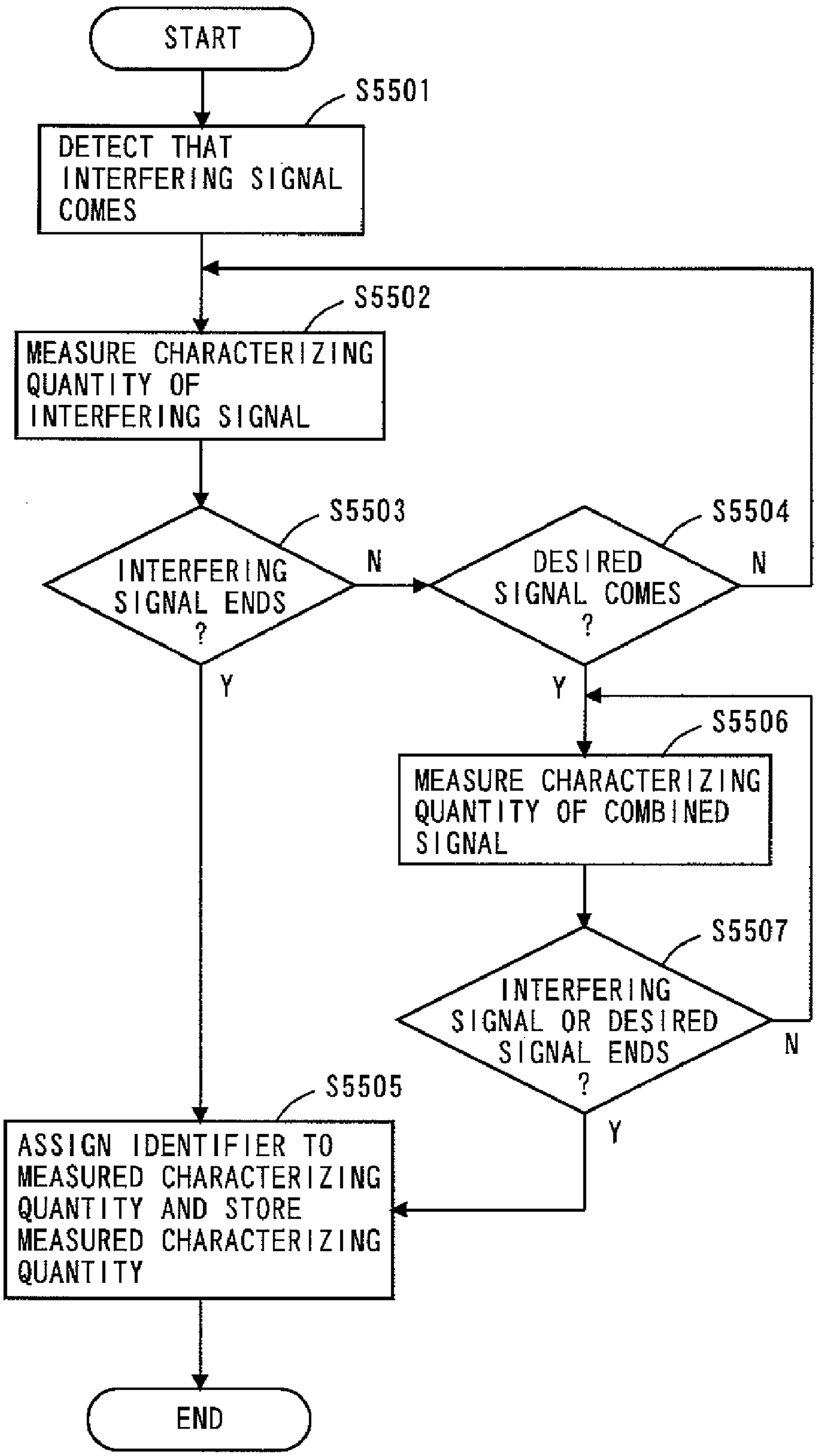
FIG. 56 is a flow chart showing an example of an interfering signal measurement operation in the example 1 of the fifth embodiment.

FIG. 56 a flow chart showing an example of a measurement operation of an interfering signal characterizing quantity and a combined signal characterizing quantity in the example 1 of the fifth embodiment, and an example of creating a table holding these characterizing quantities. Using FIGS. 51, 54, and 56, the measurement operation of an interfering signal characterizing quantity and a combined signal characterizing quantity, and the operation of creating a table holding these characterizing quantities will be described.

When the interfering signal 5106*a* (see FIG. 51) is transmitted, the receiving station detects that the interfering signal 5106*a* comes (a step S5501). Next, the receiving station measures a characterizing quantity of the coming interfering signal 5106*a* (a step S5502). Next, the receiving station determines whether or not the interfering signal 5106*a* ends (a step S5503). If the interfering signal 5106*a* has not ended (No of the step S5503), the receiving station determines whether or not the desired signal 5105*a* comes late (a step S5504). If the desired signal 5105*a* has not come (No of the step S5504), the receiving station continues to measure the characterizing quantity of the interfering signal 5106*a*. If the interfering signal 5106*a* ends (Yes of the step S5503), the receiving station assigns an identifier A to the measured characterizing quantity (see FIG. 54), and stores the characterizing quantity $W_A$ in the characterizing quantity table (a step S5505). When the interfering signal 5106*a* has not ended but the desired signal 5105*a* comes (Yes of the step S5504), the receiving station measures a characterizing quantity of a combined signal (a step S5506). While the combined signal comes (No of a step S5507), the receiving station continues to measure the characterizing quantity of the combined signal. When the interfering signal 5106*a* or the desired signal 5105*a* ends so that the combined signal ends (Yes of the step S5507), the receiving station assigns an identifier S+A to the measured characterizing quantity of the combined signal, and stores the characterizing quantity $W_{S+A}$ in the characterizing quantity table (the step S5505). Then, the measurement operation of the interfering signal 5106*a* and the combined signal, and the operation of creating the characterizing quantity table are completed.

FIG. 57 is a flow chart showing an example of an interfering signal suppression operation when a desired signal comes during a time period when an interfering signal is received in the receiving station of the example 1. Using FIGS. 51, 54, and 57, the interfering signal suppression operation when a desired signal comes during a time period when an interfering signal is received will be described.

The receiving station detects that the interfering signal 5106*a* comes (see FIG. 51) (a step S5601). Next, when detecting that the desired signal 5105*a* comes (a step S5602), the receiving station suppresses the interfering signal included in the received signal by using the characterizing quantity $W_A$ (see FIG. 54) of the interfering signal 5106*a*, which is measured until the desired signal 5105*a* comes (a step S5603), and can demodulate the desired signal 5105*a*. Next, the receiving station determines whether or not the interfering signal 5106*a* ends (a step S5604) while demodulating the desired signal 5105*a*. When the interfering signal 5106*a* ends (Yes of the step S5604), the receiving station determines whether or not the desired signal 5105*a* ends (a step S5605). When the desired signal has not ended (No of the step S5605), the receiving station continues to demodulate the desired signal 5105*a* until the desired signal 5105*a* ends (a step S5606). When the desired signal ends (Yes of the step S5605), the receiving station terminates the demodulation operation of the desired signal 5105*a*. Then, the interfering signal suppression operation, and the demodulation operation of the desired signal are completed. Since the length of the desired signal 5105*a* is a fixed length, or the length of the desired signal 5105*a* can be known from header information which is added after the preamble of the desired signal 5105*a* even if it is not a fixed length, the receiving station can recognize a time of the end of the desired signal 5105*a*. Thus, the receiving station does not wrongly determine the end of the desired signal 5105*a* and the end of the interfering signal 5106*a*.

Figure 58:
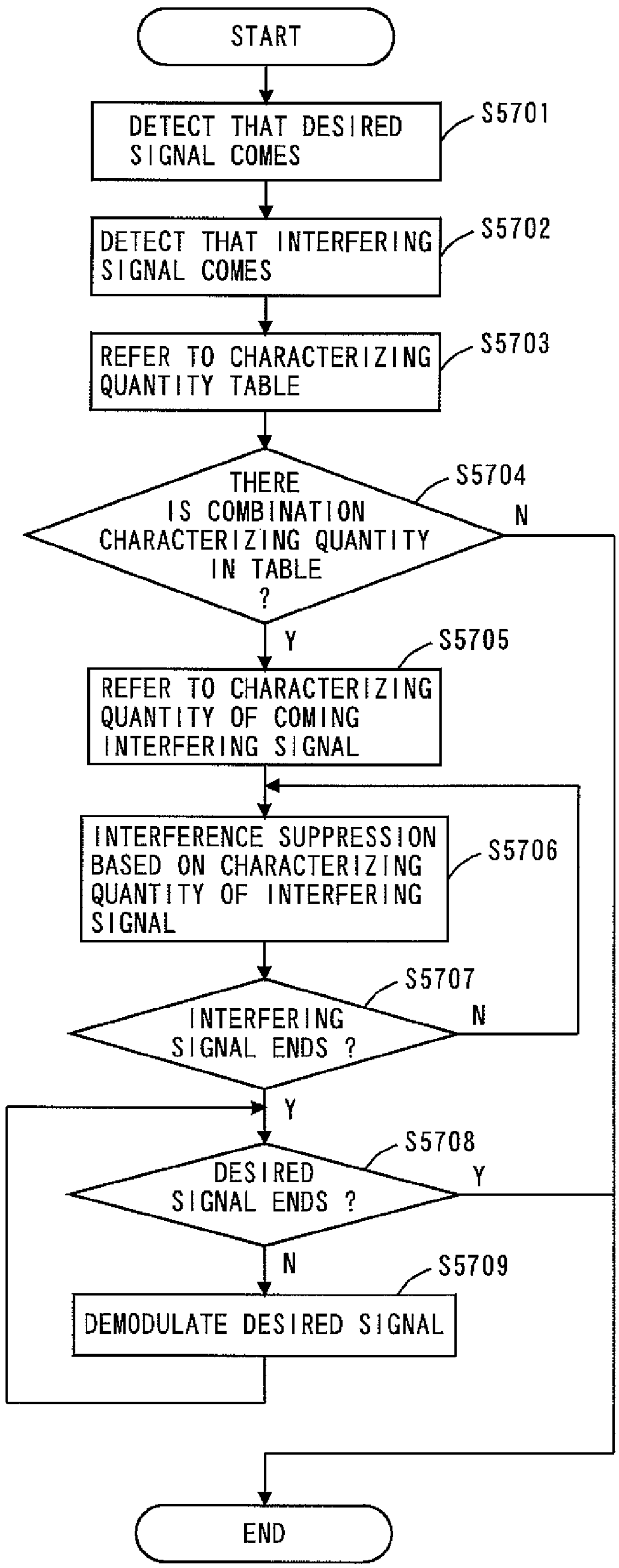
FIG. 58 is a flow chart showing an example of the interfering signal suppression operation in the example 1 of the fifth embodiment.

FIG. 58 is a flow chart showing an example of the interfering signal suppression operation when an interfering signal comes during a time period when a desired signal is received in the receiving station of the example 1. Using FIGS. 50, 54, and 58, the interfering signal suppression operation when an interfering signal comes during a time period when a desired signal is received will be described.

The receiving station detects that the desired signal 5105*c* comes (see FIG. 50) (a step S5701). When detecting that the interfering signal 5106*c* comes during the time period when the desired signal 5105*c* is received (a step S5702), the receiving station refers to the characterizing quantity table (a step S5703). When the combined signal characterizing quantity $W_{S+A}$ (see FIG. 54) exists in the characterizing quantity table (Yes of a step S5704), the receiving station identifies the interfering station A which transmits the interfering signal 5106*c* by referring to the characterizing quantity table (a step S5705), and performs interfering signal suppression by using the previously measured characterizing quantity $W_A$ of the interfering signal 5106*c* from the interfering station (a step S5706). Next, the receiving station determines whether or not the interfering signal 5106*a* ends (a step S5707) while demodulating the desired signal 5105*a*. When the interfering signal 5136*a* ends (Yes of the step S5707), the receiving station determines whether or not the desired signal 5105*a* ends (a step S5708). When the desired signal has not ended (No of the step S5708), the receiving station continues to demodulate the desired signal 5105*a* until the desired signal 5105*a* ends (a step S5709). When the desired signal ends (Yes of the step S5708), the receiving station terminates the demodulation operation of the desired signal 5105*a*. Then, the interfering signal suppression operation, and the demodulation operation of the desired signal are completed.

As described above, in the case where the desired signal comes during a time period when the interfering signal is received, the receiving station 5802 in the example 1 measures the characterizing quantity of the interfering signal before the desired signal comes, and suppresses the interfering signal included in the combined signal based on the characterizing quantity, and thus can demodulate the desired signal without error.

In addition, the receiving station 5802 in the example 1 can suppress the interfering signal even in the case where the interfering signal comes during the time period when the desired signal is received. In other words, the receiving station 5802 in the example 1 measures and stores the characterizing quantity of the interfering signal in a table, and also measures and stores the characterizing quantity of a combined signal, which is generated by interference of the interfering signal with the desired signal, in the table. More specifically, the characterizing quantity when only the interfering signal comes, and the characterizing quantity of the combined signal when the desired signal comes during the time period when the interfering signal is received are stored so as to be associated with each interfering station. Thus, when it is detected that the interfering signal comes during the time period when the desired signal is received, by measuring the characterizing quantity of the combined signal, the measured combination characterizing quantity can be collated with the stored combination characterizing quantity, the interfering signal characterizing quantity which is associated with the stored combination characterizing quantity can be read from the interference information storage section 5806, and interfering signal suppression can be performed based on the interfering signal characterizing quantity. Since this technique is characterized in that the characterizing quantity of the combined signal is stored, it can be used not only in a communication system which is operated over the same channel as that of the receiving station but also in a communication system which is operated over a channel different from that of the receiving station. In the case where a plurality of interfering signals overlap with a desired signal, when the characterizing quantity of a combined signal is held in advance, these interfering signals can be suppressed by the same technique. Since the previously stored characterizing quantity is read, which interfering station the interfering signal comes from is determined easily in a short time, and the characterizing quantity used for interfering signal suppression can be switched.

It is noted that although signal processing such as interfering signal detection, interfering signal suppression, and the like is performed on the received baseband signal in the example 1, it is not limited thereto, each signal processing may be performed on an intermediate-frequency signal or a high-frequency signal.

Figure 59:
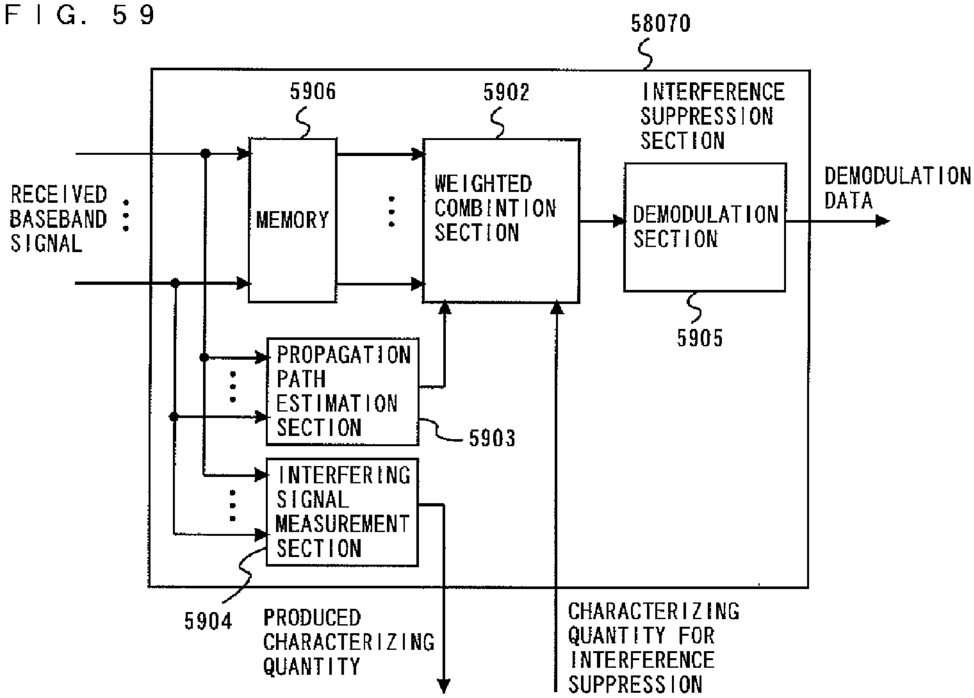
FIG. 59 is a block diagram showing an example of the interfering signal suppression section in the case where the example 1 of the fifth embodiment is applied to a single carrier modulation technique.

It is noted that although the interfering signal suppression section 5807 has been described with the example shown in FIG. 49 in the example 1, the configuration of the interfering signal suppression section 5807 is not limited thereto. In other words, although the case of using the multicarrier modulation technique has been described in FIG. 49, for example, a single carrier modulation technique such as QPSK, QAM, or the like can be used. For using the single carrier modulation technique, the interfering signal suppression section 5807 in FIG. 49 may be changed from that shown in FIG. 55 to that shown in FIG. 59. The interfering signal suppression section 5807 does not have a sub-band division section, and has the same configuration as that of FIG. 55 other than that. It is noted that the elements which perform the same operations are designated by the same reference numerals, and the description thereof will be omitted. Also, as another interfering signal suppression technique to suppress an interference component by using the characterizing quantity of an interfering signal, for example, an interfering signal suppression technique by adaptive array may be used.

Figure 60:
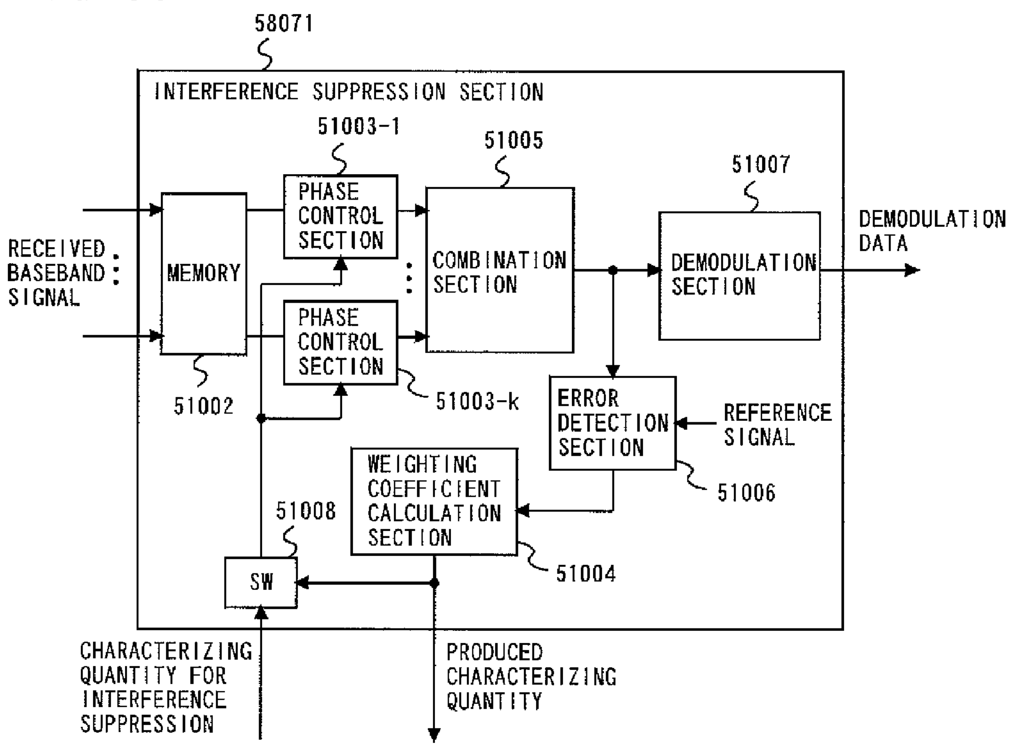
FIG. 60 is a block diagram showing an example of the interfering signal suppression section in the case where the example 1 of the fifth embodiment is applied to interference suppression by adaptive array.

Instead of the interfering signal suppression section 5807 shown in FIG. 49, an interfering signal suppression section 58071 using adaptive array, which is shown in FIG. 60, can be used. The interfering signal suppression section 58071 shown in FIG. 60 comprises a memory 51002, a plurality of phase control sections 51003-1, . . . , 51003-*k*, a combination section 51005, an error detection section 51006, a weighting coefficient calculation section 51004, a switch 51008, and a demodulation section 51007.

The plurality of phase control sections 51003-1, . . . , 51003-*k* control the phases of received baseband signals according to a characterizing quantity outputted from the switch 51008, and output the received baseband signals, the phases of which are controlled, to the combination section 51005. The combination section 51005 combines a plurality of received baseband signals, the phases of which are controlled, and outputs a combined signal. The demodulation section 51007 demodulates the inputted combined signal, and outputs demodulation data to the outside. The error detection section 51006 detects an error between the combined signal and a reference signal, and outputs an error signal to the weighting coefficient calculation section 51004. The weighting coefficient calculation section 51004 calculates, according to the error signal, a weighting coefficient for controlling the phases of the received baseband signals, and outputs it as a characterizing quantity to the switch 51008, the interference information storage section 5806, and the like (see FIG. 49). The switch 51008 switches between the characterizing quantity for interfering signal suppression which is outputted from the interference information storage section 5806, and the characterizing quantity which is outputted from the weighting coefficient calculation section 51004 depending on during the interfering signal measurement or during the interfering signal suppression, and outputs the characterizing quantity to the phase control sections 51003-1, . . . , 51003-*k*.

As described above, the interfering signal suppression section 58071 shown in FIG. 60 forms a feedback loop, thereby measuring, as a characterizing quantity of the interfering signal, the weighting coefficient which is used for interfering signal suppression.

An operation when an interfering signal measurement is performed by using the interfering signal suppression section 58071 shown in FIG. 60 will be described. The switch 51008 is controlled so as to output the characterizing quantity (the weighting coefficient) from the weighting coefficient calculation section 51004 to the phase control sections 51003-1, . . . , 51003-*k*. When it is detected that an interfering signal comes, the weighting coefficient calculation section 51004 calculates a weighting coefficient as a characterizing quantity of the interfering signal so that a null point is directed in the coming direction of the interfering signal. When the weighting coefficient converges, the interference information storage section 5806 assigns an identifier to the converging weighting coefficient, and stores it.

The following will describe an operation when interfering signal suppression is performed by using the interfering signal suppression section 58071 shown in FIG. 60. When an interfering signal comes during a time period when a desired signal is received, similarly as in the case described using FIG. 49, the characterizing quantity of the interfering signal is presumed based on the characterizing quantity of the combined signal, an appropriate weighting coefficient is switched to. At this time, the switch 51008 is controlled so as to output the characterizing quantity (the weighting coefficient) from the interference information storage section 5806 to the phase control sections 51003-1, . . . , 51003-*k*. Once the weighting coefficient outputted from the interference information storage section 5806 is read, the switch 51008 switches so as to output again the weighting coefficient outputted from the weighting coefficient calculation section 51004 to the phase control sections 51003-1, . . . , 51003-*k*.

According to the above operation, interfering signal suppression is possible even by using the interfering signal suppression section 58071 which uses adaptive array. Since the previously stored weighting coefficient is read, it is not necessary to newly calculate a weighting coefficient, and the weighting coefficient can be switched in a short time.

It is noted that in the example 1, a frame check section (not shown) which performs frame check of the signal after interfering signal suppression may be further provided. In this case, when there are a plurality of obtained interfering signal characterizing quantities, the interfering signal suppression section 5807 performs interfering signal suppression based on each characterizing quantity. In addition, the frame check section performs frame check of each signal after interfering signal suppression. By this frame check, only a signal on which interfering signal suppression is accurately performed can be extracted. A frame check method includes, for example, CRC (Cyclic Redundancy Check).

In the example 1, a deletion section (not shown) may be further provided, which deletes the characterizing quantity when a characterizing quantity stored in the interference information storage section 5806 is not used for a certain period for collation with the characterizing quantity of a combined signal which is measured during a interfering signal suppression period.

In the example 1, a deletion section (not shown) may be further provided, which deletes the characterizing quantity when a characterizing quantity stored in the interference information storage section 5806 is used for interfering signal suppression and a predetermined quality of communication is not obtained for the signal after interfering signal suppression. The communication quality can be confirmed, for example, by performing frame check, such as CRC, or the like, on the signal after interfering signal suppression.

In the example 1, in the case where there are a plurality of obtained interfering signal characterizing quantities, a characterizing quantity narrow-down section (not shown) may be further provided, which narrows down a number of the obtained interfering signal characterizing quantities based on a reception history of desired signals. It is highly likely to receive again a received signal, many records for which remain compared to those of the others among the desired signals remaining in the reception history. Thus, when a signal is newly received, the signal which is not the same as the received signal, the many records for which remain in the reception history, can be determined to be an interfering signal.

In the example 1, in the case where there are a plurality of obtained interfering signal characterizing quantities, a characterizing quantity narrow-down section (not shown) may be further provided, which narrows down a number of the obtained interfering signal characterizing quantities based on the desired signal which is last received. It is highly likely to receive again the signal which is last received. Thus, when a signal is newly received, the signal which is not the same as the last-received signal can be determined to be an interfering signal.

It is noted that each of function blocks of the radio station described in each embodiment is typically achieved as an LSI which is an integrated circuit. They may be individually made into one chip, or a part or all of them may be made into one chip. The integrated circuit used in the present embodiment can be referred to as an IC, a system LSI, a super LSI, an ultra LSI by difference in integration degrees.

A technique of integrated circuit implementation is not limited to the LSI, but may be achieved by a dedicated circuit or a universal processor. An FPGA (Field Programmable Gate Array) which is programmable after production of an LSI and a reconfigurable processor in which the connection and the setting of a circuit cell inside the LSI are reconfigurable may be used.

Further, if a technique of integrated circuit implementation which replaces the LSI by advancement of semiconductor technique and another technique derived therefrom is developed, naturally, the function blocks may be integrated by using the technique. Adaptation of a bio technique could be possible.

The following will describe a sixth embodiment of the present invention.

Sixth Embodiment

Example 1

An exemplary overall configuration and an exemplary overall operation of a radio communication system including an interfering signal suppressing device according to an example 1 of the sixth embodiment will be described. The interfering signal suppressing device according to the example 1 is regarded as a receiving station in the radio communication system. In the following description, the interfering signal suppressing device according to the example 1 is referred to as a receiving station according to need.

Figure 61:
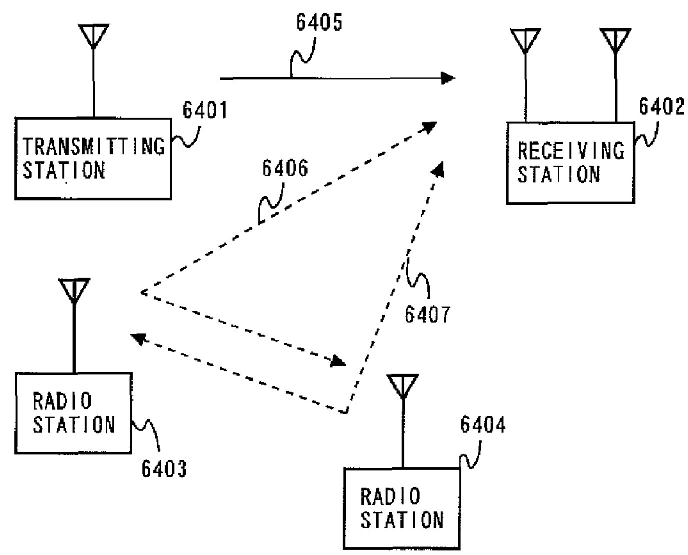
FIG. 61 illustrates a radio communication system including an interfering signal suppressing device according to an example 1 of a sixth embodiment.

FIG. 61 illustrates a configuration of the radio communication system including the interfering signal suppressing device (the receiving station) according to the example 1 of the sixth embodiment. The radio communication system includes a plurality of radio stations. Namely, the radio communication system comprises a transmitting station 6401, a receiving station 6402, and radio stations (interfering stations) 6403 and 6404 which transmit interfering signals.

The transmitting station 6401 converts transmission data, the destination of which is the receiving station 6402, into a radio signal (a desired signal) 6405, and transmits the radio signal 6405. The receiving station 6402 receives and demodulates the radio signal 6405 to obtain the transmission data from the transmitting station 6401, thereby performing communication.

On the other hand, the interfering station 6403 and the interfering station 6404 perform communication with each other. The interfering station 6403 transmits a radio signal (an interfering signal) 6406, the destination of which is the interfering station 6404, and the interfering station 6404 receives the radio signal 6406. Also, the interfering station 6404 transmits a radio signal (an interfering signal) 6407, the destination of which is the interfering station 6403, and the interfering station 6403 receives the radio signal 6407.

Here, when a timing of transmitting the radio signal 6405 overlaps with a timing of transmitting the radio signal 6406 or 6407, the receiving station 6402 receives a signal which includes the radio signal 6405, which is a desired signal, and the radio signal 6406 or 6407.

Figure 62:
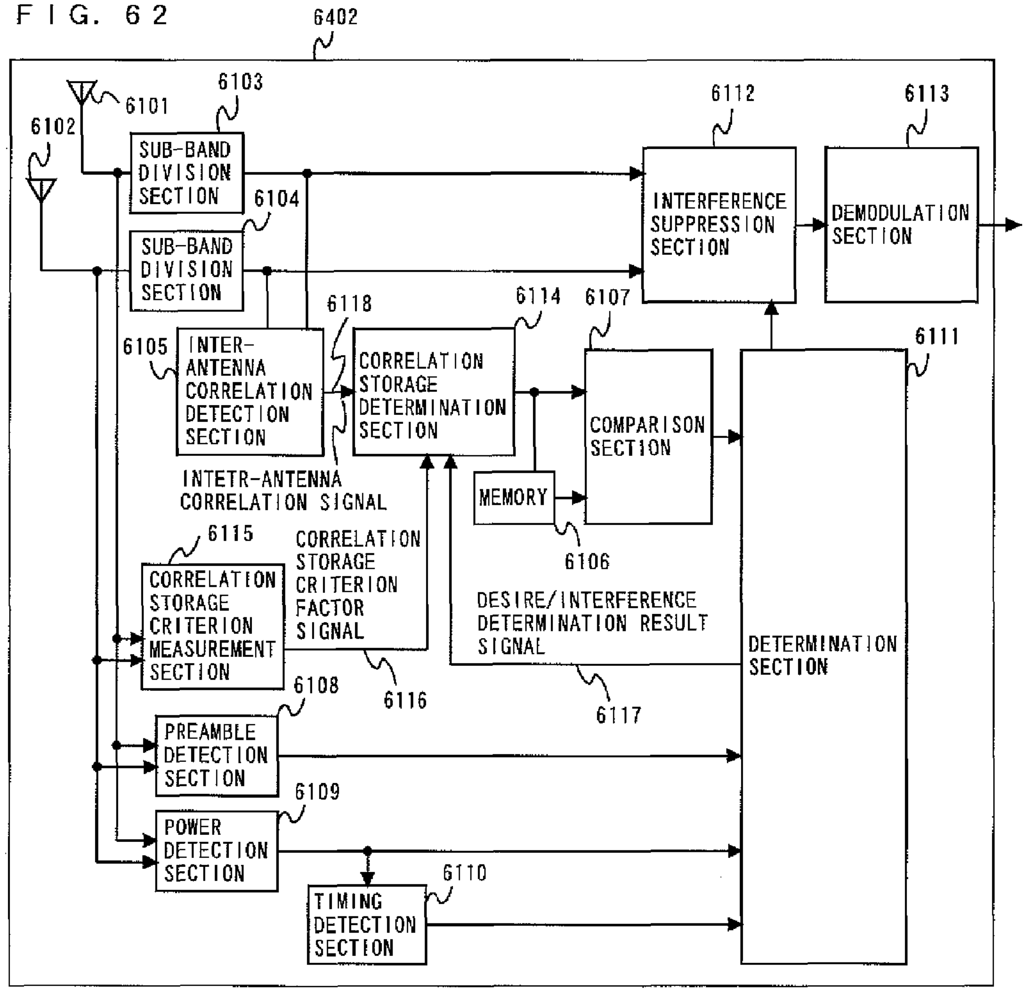
FIG. 62 is a block diagram showing an exemplary configuration of the interfering signal suppressing device according to the example 1 of the sixth embodiment.

FIG. 62 is a block diagram showing a configuration of the interfering signal suppressing device (the receiving station) 6402 in the example 1. As shown in FIG. 62, the interfering signal suppressing device 6402 according to the example 1 comprises antennas 6101 and 6102, sub-band division sections 6103 and 6104, an inter-antenna correlation value detection section 6105, a memory 6106, a comparison section 6107, a preamble detection section 6108, a power detection section 6109, a timing detection section 6110, a determination section 6111, an interfering signal suppression section 6112, a demodulation section 6113, a correlation storage determination section 6114, and a correlation storage criterion measurement section 6115.

Figure 63:
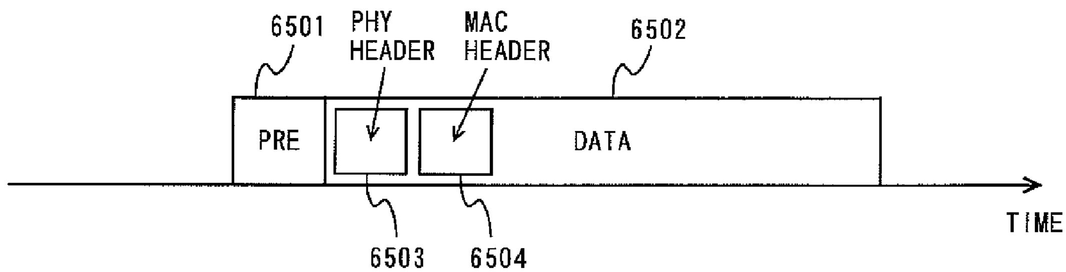
FIG. 63 illustrates a format of a radio signal which is transmitted by a transmitting station in the example 1 of the sixth embodiment.

FIG. 63 illustrates an example of a format of the radio signal which is transmitted by a transmitting station 6401. The desired signal includes a preamble symbol 6501 which is used for synchronization detection and transmission path estimation, and a data symbol 6502. The data symbol 6502 includes a PHY header 6503, and a MAC header 6504. The PHY header 6503 includes information concerning a modulation parameter and a data length, which is a part following the PHY header 6503 in the data symbol 6502. The MAC header 6504 includes a source address, a destination address, and control information. A modulation technique for the desired signal is not particularly limited, but, for example, each symbol in the desired signal is OFDM-modulated in a wireless LAN device of the IEEE802.11a standard.

Using FIG. 62, an outline of an operation of each section of the interfering signal suppressing device (the receiving station) 6402 will be described.

The signals received by the antennas 6101 and 6102 are each divided into a plurality of sub-band signals by the sub-band division section 6103 or 6104. For the sub-band division, for example, FFT, wavelet conversion, a filter bank, or the like can be used. In the case where each symbol of the radio signal is OFDM-modulated by the transmitting station 6401, FFT for OFDM demodulation may be used in the interfering signal suppressing device (the receiving station) 6402. It is noted that although the sub-band division sections 6103 and 6104 are provided for antenna inputs, respectively, in FIG. 62, one sub-band division section may be provided, and used for time division.

The inter-antenna correlation value detection section 6105 detects a signal correlation between the antennas 6101 and 6102 for each sub-band. A signal transmitted from a different direction has a different inter-antenna correlation value. Thus, based on the inter-antenna correlation value, each interfering signal source (for example, a radio station) can be roughly spatially identified. In the case of a configuration to obtain an inter-antenna correlation value as a characterizing quantity by using a plurality of antennas as described above, interfering signal sources of unknown signals, which are located in different positions, can be identified.

It is noted that the case of using the inter-antenna correlation value as a characterizing quantity is described here, but any type of a characterizing quantity may be used as long as it indicates a different value for each interfering station. In addition, characterizing quantities, each of which provides low identification accuracy, can be used in combination to improve identification accuracy of the interfering station.

For setting in the correlation storage determination section 6114 a criterion value for determining whether or not a coming interfering signal becomes a deterioration factor for a reception characteristic of a desired signal, the correlation storage criterion measurement section 6115 measures received powers, and the like of an interfering signal and a desired signal, which are set factors for the criterion value. The measured received powers, and the like of the interfering signal and the desired signal are inputted as correlation storage criterion factors to the correlation storage determination section 6114.

A type of a correlation storage criterion value is not particularly limited, but its initial value includes, for example, a received power of a thermal noise. Also, the correlation storage criterion value can be updatable. The correlation storage criterion value can be the received power of an interfering signal included in the received signal. Also, the initial value of the correlation storage criterion value is set to the received power of the thermal noise, and when a received interfering signal satisfies a predetermined requirement, the criterion value can be updated to the received power of the interfering signal. The predetermined requirement includes, for example, a requirement that the received power of the currently received interfering signal exceeds the maximum value of the received power of the previously received interfering signal. In the case of using this requirement, as an interfering signal with a larger power is received, the criterion value can be updated sequentially. In the case where the initial value is set to the received power of the thermal noise, when the interfering signal with a power which exceeds the received power of the thermal noise is received, the criterion value can be updated to the received power of the interfering signal. The correlation storage criterion value can be an SIR (desired signal power to interfering signal power ratio) of the received signal. For obtaining the SIR, the received power of the desired signal needs to be measured in addition to that of the interfering signal. In this case, the update requirement can be, for example, that the SIR of the currently received signal becomes smaller than that of the previously received signal.

The correlation storage determination section 6114 determines whether or not the inter-antenna correlation value detected by the inter-antenna correlation value detection section 6105 is to be stored in the memory 6106. The correlation storage determination section 6114 determines whether or not the inter-antenna correlation value is to be stored based on a correlation storage criterion factor signal 6116 inputted from the correlation storage criterion measurement section 6115 and a desire/interference determination result 6117 inputted from the determination section 6111.

The desire/interference determination result 6117 is a signal indicating that the inter-antenna correlation value of the currently received signal is of a desired signal or an interfering signal. The desire/interference determination result 6117 is outputted from the determination section 6111.

When the correlation storage determination section 6114 determines that the inter-antenna correlation value outputted from the inter-antenna correlation value detection section 6105 is to be stored, the inter-antenna correlation value is stored in the memory 6106.

The comparison section 6107 compares the inter-antenna correlation value of the currently received signal with a plurality of inter-antenna correlation values of the previously received interfering signals, which are stored in the memory 6106. According to the comparison, the comparison section 6107 calculates similarities between the inter-antenna correlation values stored in the memory 6106 and the inter-antenna correlation value of the currently received signal. The calculated similarities are outputted to the determination section 6111. A calculation method of the similarity is not particularly limited, but, for example, the same method as that in the first embodiment, and the like can be used.

The preamble detection section 6108 detects whether or not the preamble of a desired signal is included in the received signals which are inputted from the antennas 6101 and 6102.

The power detection section 6109 detects changes of the powers of the received signals which are inputted from the antennas 6101 and 6102. The timing detection section 6110 detects a time interval of the change based on the changes of the received powers detected by the power detection section 6109. The timing detection section 6110 measures, for example, a time period for which the continuous received power exceeding a predetermined threshold is detected, and a time period for which no received power is detected.

The determination section 6111 determines whether or not a desired signal is included in the currently received signal, for example, based on the output from the preamble detection section 6108 among the outputs of the comparison section 6107, the preamble detection section 6108, the power detection section 6109, and the timing detection section 6110. When determining that the desired signal is not included in the currently received signal, the determination section 6111 also can determine that the currently received signal is an interfering signal. Information concerning whether or not the desired signal is included in the received signal is out putted to the correlation storage determination section 6114, and the like. When determining that the desired signal is included in the currently received signal, the determination section 6111 also selects the inter-antenna correlation value having the highest similarity with the inter-antenna correlation value of the currently received interfering signal from the inter-antenna correlation values stored in the memory 6106 based on the information of the similarities which is inputted from the comparison section 6107. Information of the interfering signal characterizing quantity, which is determined to have the highest similarity among the inter-antenna correlation values stored in the memory 6106, is outputted to the interfering signal suppression section 6112.

The interfering signal suppression section 6112 suppresses the interfering signal which overlaps with the desired signal based on the information of the interfering signal characterizing quantity which is obtained from the determination section 6111. The demodulation section 6113 demodulates the desired signal in which the interfering signal is suppressed.

Figure 64:
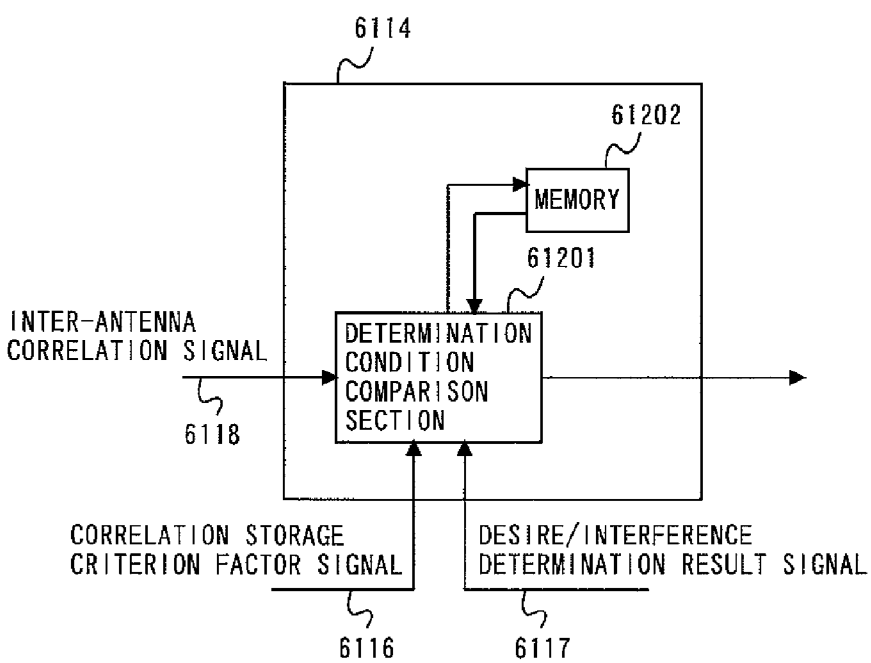
FIG. 64 is a block diagram showing a configuration of a correlation storage determination section in the example 1 of the sixth embodiment.

FIG. 64 is a block diagram showing a configuration of the correlation storage determination section 6114. The correlation storage determination section 6114 includes a determination condition comparison section 61201, and a memory 61202. The determination condition comparison section 61201 receives an inter-antenna correlation value signal 6118 from the inter-antenna correlation value detection section 6105, the correlation storage criterion factor signal 6116 from the correlation storage criterion measurement section 6115, and the desire/interference determination result 6117 from the determination section 6111.

When determining that a desired signal comes by the input of the desire/interference determination result 6117, the determination condition comparison section 61201 inputs to the memory 61202 a signal 6116 indicating the received power of the desired signal which is one of the correlation storage criterion factors. The memory 61202 updates the received power of the desired signal. The received power of the desired signal is used for obtaining the SIR as the correlation storage criterion value.

When determining that an interfering signal comes by the input of the desire/interference determination result 6117, the determination condition comparison section 61201 inputs to the memory 61202 a signal 6116 indicating the received power of the interfering signal which is one of the correlation storage criterion factors. When the received power of the currently received interfering signal is larger than that of the previously received interfering signal, the memory 61202 updates the stored received power of the interfering signal to its value. The received power of the interfering signal can be used as the correlation storage criterion value. Also, the received power of the interfering signal can be used for obtaining the SIR as the correlation storage criterion value.

When determining that the interfering signal comes by the input of the desire/interference determination result 6117, the determination condition comparison section 61201 obtains the received power of the interfering signal (the previously received interfering signal), which is one of the correlation storage criterion factors, from the memory 61202. The determination condition comparison section 61201 compares the previous received power of the interfering signal with the received power obtained from the currently received interfering signal. The received power obtained from the currently received interfering signal is "a comparison object value" described in the claims. When the received power obtained from the currently received interfering signal is larger than the previous received power, the currently received interfering signal affects a reception characteristic of the desired signal more largely than the previously received interfering signal. Thus, the determination condition comparison section 61201 outputs to the memory 6106 a signal indicating the inter-antenna correlation value of the currently received interfering signal. The memory 6106 stores the inputted inter-antenna correlation value of the interfering signal. Here, as an example of the correlation storage criterion value, the received power of the interfering signal is used. In this case, the memory 6106 for the interfering signal stores the inter-antenna correlation value of the interfering signal when the comparison object value exceeds the stored correlation storage criterion value. Thus, the capacity of the memory 6106 is not burdened more than need. In addition, only the inter-antenna correlation value of the interfering signal, which becomes the deterioration factor for the reception characteristic of the desired signal, can be stored.

If the storage criterion value obtained from the currently received interfering signal has a storage condition which is severer than that of the previous correlation storage criterion value, the memory 61202 updates the previous correlation storage criterion value to the storage criterion value obtained from the currently received interfering signal. If not, the contents stored in the memory 61202 are normally not updated.

Figure 65:
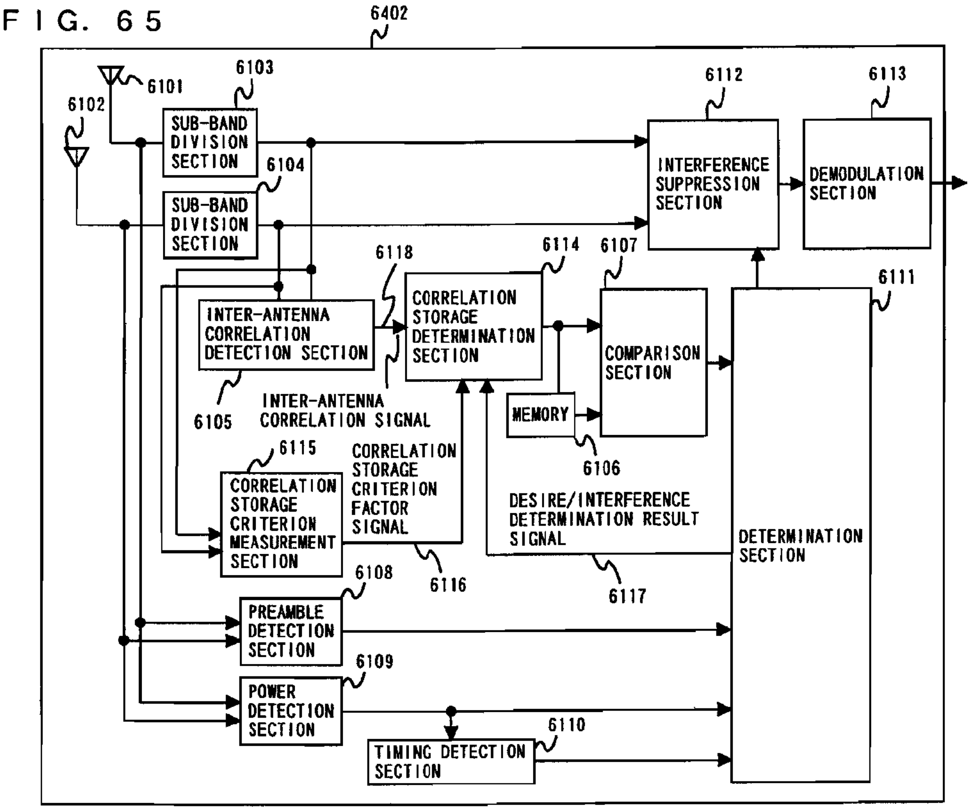
FIG. 65 is a block diagram showing a configuration of an interfering signal suppressing device according to a modified example of the example 1 of the sixth embodiment.

It is noted that the correlation storage criterion measurement section 6115 shown in FIG. 62 receives the received signals before the sub-band division, but does not necessarily receive the received signals before the sub-band division in the example 1. For example, as shown in FIG. 65, the correlation storage criterion measurement section 6115 may receive the received signals after the sub-band division. By inputting thereto the received signals after the sub-band division, measurement can be performed for each sub-band, and thus measurement can be performed with higher accuracy.

Figure 66:
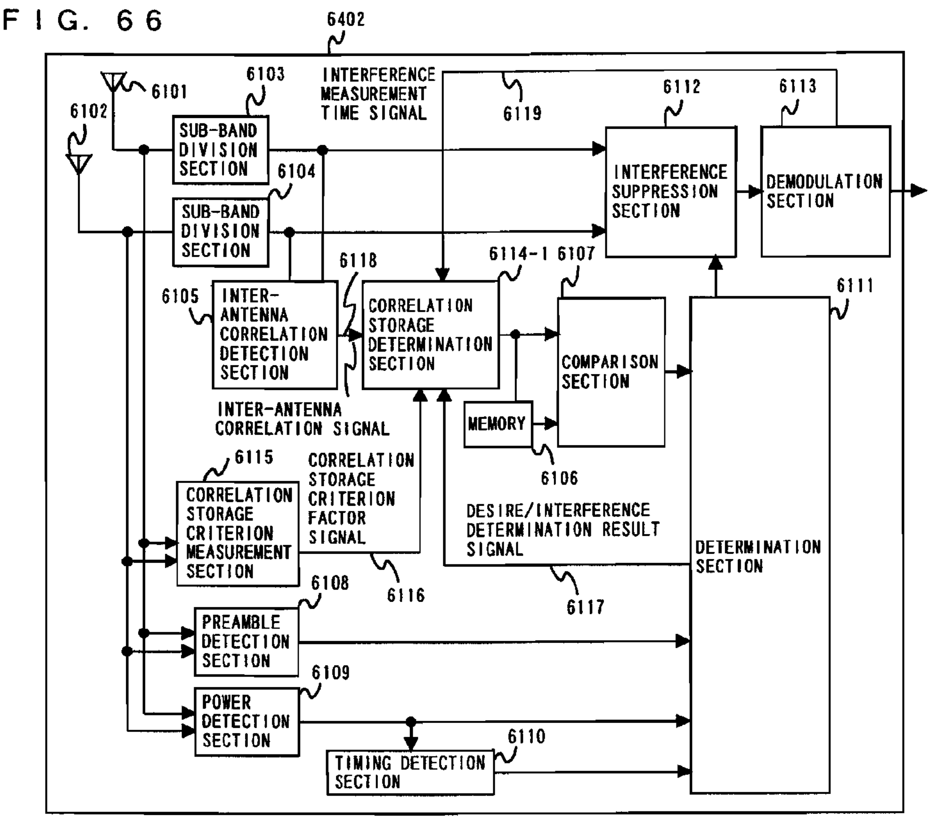
FIG. 66 is a block diagram showing a configuration of an interfering signal suppressing device according to a modified example of the example 1 of the sixth embodiment.
Figure 67:
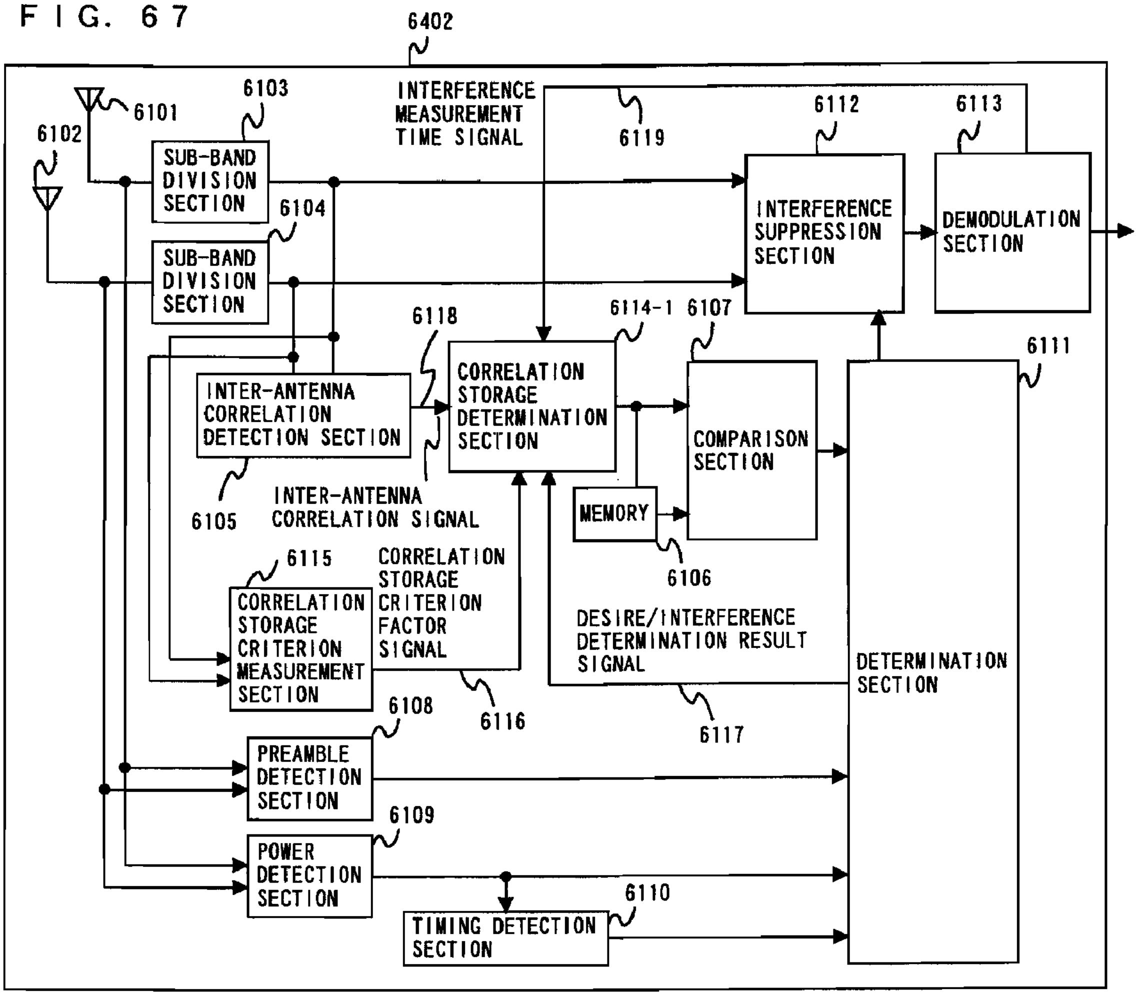
FIG. 67 is a block diagram showing a configuration of an interfering signal suppressing device according to a modified example of the example 1 of the sixth embodiment.

It is noted that the correlation storage determination section 6114 shown in FIG. 62 determines whether or not the currently received signal is an interfering signal based on only the desire/interference determination result 6117 from the determination section 6111, but the example 1 is not limited thereto. For example, as shown in FIGS. 66 and 67, the correlation storage determination section 6114 may determine whether or not the currently received signal is an interfering signal by using data after demodulation from the demodulation section 6113 in addition to the desire/interference determination result 6117 from the determination section 6111. Thus, it can be detected with high accuracy that a desired signal and an interfering signal come. The data after demodulation includes, for example, an interference measurement time signal 6119 indicating the length of the interfering signal.

Concerning detection that a desired signal and an interfering signal come, it may be determined based on only the data 6119 after demodulation of the demodulation section 6113. Thus, the circuit size of the determination section 6111 can be reduced.

Figure 68:
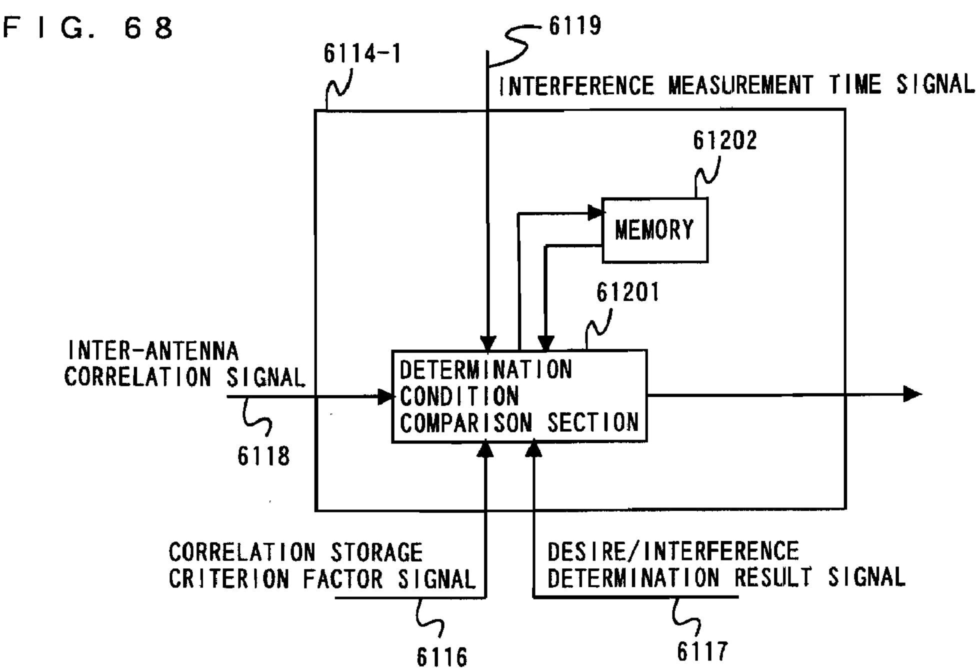
FIG. 68 is a block diagram showing a configuration of a modified example of the correlation storage determination section in the example 1 of the sixth embodiment.

FIG. 68 is a block diagram showing a configuration of a correlation storage determination section 6114-1 shown in FIGS. 66 and 67. The correlation storage determination section 6114-1 differs from the correlation storage determination section 6114 shown in FIG. 64 in further receiving the interference measurement time signal 6119 from the demodulation section 6113. By such a configuration, a time period for which an interfering signal comes, and a time period for which a desired signal comes can be detected accurately. It is noted that as a signal for knowing the time periods for which the interfering signal and the desired signal come, respectively, both the desire/interference determination result 6117 and the interference measurement time signal 6119 are not necessarily used as shown in FIG. 68, and only the interference measurement time signal 6119 may be used.

The signal 6119, which is inputted from the demodulation section 6113 to the correlation storage determination section 6114-1, notifies the correlation storage determination section 6114-1 of the time periods for which the desired signal and the interfering signal come, respectively, and time periods for which the desired signal and the interfering signal do not come, respectively. For example, when a signal indicating an SIFS time after the reception of the desired signal is inputted to the correlation storage determination section 6114-1, the time period for which the desired signal does not come can be notified.

It is noted that in a system (not shown) in which a centralized control station controls transmission of a receiving terminal, a signal indicating a time period for which a transmitting station of a desired signal does not transmit the desired signal can be used as a signal for knowing the time periods for which the interfering signal and the desired signal come, respectively.

The interference measurement time signal 6119 may be waiting period information in a control packet such as RTS/CTS (request to send/clear to send), and the like. For example, in a communication system using RTS/CTS, when an interfering signal suppressing device (a receiver) receives RTS/CTS information from a station other than the transmitting station of a desired signal, it is highly likely that transmission of the desired signal is stopped during a waiting period in RTS/CTS. Thus, there is a high probability that a signal which comes during the waiting period is an interfering signal.

Figure 69:
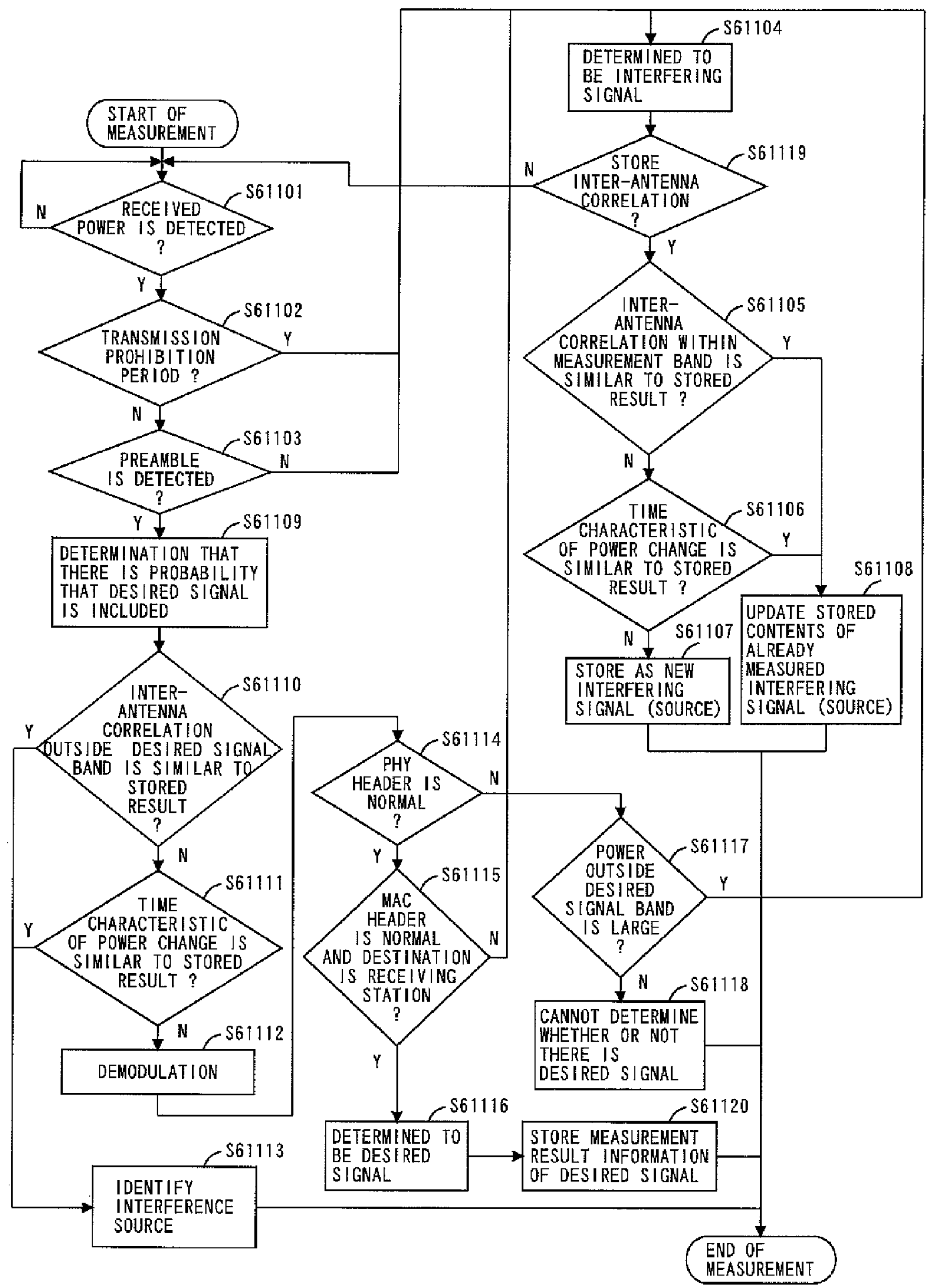
FIG. 69 is a flow chart showing an example of an operation of the interfering signal suppressing device according to the example 1 of the sixth embodiment.

FIG. 69 is a flow chart showing an example of an interference measurement operation of the interfering signal suppressing device according to the example 1. Using FIG. 69, the outline of a procedure of the interference measurement will be described.

At a step S61101, the interfering signal suppressing device determines whether or not a received power which is equal to or larger than a predetermined value is detected. When the received power which is equal to or larger than the predetermined value is not detected, the received power detection is continued until the received power which is equal to or larger than the predetermined value is detected. When the received power which is equal to or larger than the predetermined value is detected, the interfering signal suppressing device moves on to a step S61102.

At the step S61102, the interfering signal suppressing device determines whether or not a transmission prohibition period is currently set in a self communication area. When the transmission prohibition period is set, the interfering signal suppressing device determines that the currently received signal is interfering signal (a step S61104). When the transmission prohibition period is not set, the interfering signal suppressing device moves on to a step S61103.

At the step S61103, the interfering signal suppressing device determines whether or not the preamble of a desired signal is detected. When the preamble of the desired signal is not detected, the interfering signal suppressing device determines that the currently received signal is an interfering signal (the step S61104). When the preamble of the desired signal is detected, the interfering signal suppressing device determines that there is a high probability that the desired signal is included in the currently received signal (a step S61109).

At the step S61104, it is the state where it is determined that the currently received signal is the interfering signal. At a step S61119, the interfering signal suppressing device determines whether or not the measured inter-antenna correlation value is to be stored. A specific determination method will be described using FIGS. 70 to 72. At the subsequent steps S61105 to S61108, the interfering signal suppressing device determines whether or not the interfering signal source of the currently received interfering signal is the same as that of the previously received interfering signal. This determination is performed by comparing information of the currently received interfering signal with stored information of the previously received interfering signal. The information of the interfering signal includes the characterizing quantity such as the inter-antenna correlation value for each sub-band and the duration of the received power, and the like.

At the step S61105, the interfering signal suppressing device calculates similarities between the frequency characteristic of the inter-antenna correlation value of the currently received signal within a measurement frequency band including the frequency band of the desired signal and the frequency characteristics of the previously measured and stored inter-antenna correlation values of the interfering signals. When a frequency characteristic having a high similarity is stored, the interfering signal suppressing device determines that the currently received interfering signal comes from the same interfering signal source as the previously received interfering signal, and updates the stored characterizing quantity such as the inter-antenna correlation value, and the like to the characterizing quantity of the currently received interfering signal (the step S61108). When the frequency characteristic having a high similarity is not stored, the interfering signal suppressing device moves on to the step S61106.

At the step S61106, the interfering signal suppressing device determines whether or not the time characteristics of the received power and power change of the currently received signal are similar to those which are previously measured and stored. For example, during a period for which a substantially constant received power is continued, the interfering signal suppressing device determines that the signal from the same interfering signal source continues to come. Or, when the received power changes after a predetermined interval, the interfering signal suppressing device determines that the coming signal is changed to a signal from the different interfering signal source. When there are the similar time characteristics, the interfering signal suppressing device determines that the currently received signal comes from the same interfering signal source as the previously received interfering signal, and updates the stored information (the step S61108). If there are no similar time characteristics, the interfering signal suppressing device determines that the currently received signal comes from a new interfering signal source, and stores its information (the step S61107)

Since it is determined that the currently received interfering signal comes from the new interfering signal source at the step S61107, the interfering signal suppressing device stores information of the currently received interfering signal as information of a new interfering signal. The interfering signal suppressing device terminates the measurement when completing the storing of the information.

Since it is determined that the currently received interfering signal comes from the same interfering signal source as the previously received interfering signal at the step S61108, the interfering signal suppressing device updates information of the previously received signal which is determined to come from the same interfering signal source as the currently received signal.

At the step S61109, it is the state where it is determined that there is a probability that a desired signal is included in the currently received signal. At the subsequent steps S61110 and S61111, when the interfering signal is included in the currently received signal, the interfering signal suppressing device determines whether or not the interfering signal comes from the same interfering signal source as the previously received interfering signal, and identifies the interfering signal source. When the interfering signal source is identified, the interfering signal suppressing device can suppress the currently received interfering signal by using the stored information of the interfering signal. The information of the interfering signal is the characterizing quantity of the interfering signal, and, for example, the inter-antenna correlation value.

At the step S61110, the interfering signal suppressing device calculates similarities between the frequency characteristic of the inter-antenna correlation value of the currently received signal within the measurement frequency band including the desired signal frequency band and the previously measured and stored frequency characteristics of the inter-antenna correlation values of the interfering signals. When a frequency characteristic having a high similarity is stored, the interfering signal suppressing device determines that the currently received signal comes from the same interfering signal source as the previously received interfering signal. Thus, the interfering signal source can be identified (a step S61113). When the frequency characteristic having a high similarity is not stored, the interfering signal suppressing device moves on to the step S61111. It is noted the similarity determination is preferably performed on the frequency characteristic of the inter-antenna correlation value outside the desired signal band. This is because if the similarity determination is performed within the desired signal band, the similarity determination is performed in a frequency band in which the interfering signal and the desired signal interfere with each other, and thus the similarity determination for the interfering signal is hard to perform accurately.

At the step S61111, the interfering signal suppressing device determines whether or not the time characteristics of the received power value and power change of the currently received signal are similar to those which are previously measured and stored. For example, it is assumed that a power of which the preamble of a desired signal is not detected is continued, and the preamble is detected after the power substantially changes. In this case, it can be determined that the desired signal overlaps with the interfering signal in the middle of receiving an interfering signal. Thus, the interfering signal suppressing device can determine that the interfering signal continues to come from the same interfering signal source after the desired signal comes as from that before the desired signal comes. Or, when the received power once decreases during a time period when the desired signal is received and the received power increases after a predetermined time interval, it can be determined that the coming interfering signal is changed to an interfering signal from a different interfering signal source. When such similar time characteristics of the received power value and the power change are stored, the interfering signal suppressing device determines that the interfering signal from the same interfering signal source is previously received. Thus, the interfering signal source of the currently received interfering signal can be identified (the step S61113). When such similar time characteristics of the received power value and the power change are not stored, the interfering signal suppressing device moves on to a step S61112. When the interfering signal source of the currently received interfering signal is identified, the interfering signal suppressing device can suppress the currently received interfering signal by using the stored and characterizing quantity of the identified interfering signal.

At the step S61112, the interfering signal suppressing device demodulates the currently received signal. When the demodulation is completed, the interfering signal suppressing device moves on to a step S61114.

At the step S61114, the interfering signal suppressing device determines whether or not there is error in the PHY header of the demodulated signal. When there is error in the PHY header, the interfering signal suppressing device moves on to a step S61117. When there is no error in the PHY header, the interfering signal suppressing device moves on to a step S61115.

At the step S61115, the interfering signal suppressing device determines whether or not there is no error in the MAC header of the demodulated signal and the demodulated signal is a signal the destination of which is the interfering signal suppressing device. When the demodulated signal is not the signal the destination of which is the interfering signal suppressing device, the interfering signal suppressing device determines that the currently received signal is an interfering signal (the step S61104). Thus, the determination of an interfering signal can be possible for other communication which is performed over the same channel as that of the self communication. When the demodulated signal is the signal the destination of which is the interfering signal suppressing device, the interfering signal suppressing device determines that the currently received signal is a desired signal (a step S61116).

At the step S61116, it is the state where it is determined that the currently received signal is the desired signal. The interfering signal suppressing device stores in the correlation storage determination section 6114 a storage criterion value concerning the desired signal which is measured at this time (a step S61120), and terminates the measurement.

At the step S61117, the interfering signal suppressing device determines whether or not the received power outside the desired signal band is larger than that within the desired signal band. When there is error in the PHY header at the step S61114, there is a probability that demodulation error occurs due to the small received power of the desired signal or the preamble of an interfering signal in the adjacent channel is detected at the step S61103. Thus, when the received power outside the desired signal band is larger than that within the desired signal band, the interfering signal suppressing device determines that the currently received signal is an interfering signal (the step S61104). When the received power outside the desired signal band is not larger than that within the desired signal band, the interfering signal suppressing device determines that it cannot be determined that a desired signal is included in the currently received signal (a step S61118).

At the step S61118, it is a state where the currently received signal cannot be identified. The interfering signal suppressing device does not store information of the inter-antenna correlation value, the received power, and the like which are measured at this time, and terminates the measurement.

By the above processing, it is possible to measure and store the characterizing quantity of the interfering signal.

It is noted that at the step S61105 and the step S61106, and the step S61110 and the step S61111 in the present example 1, the case where the determination is performed based on the time characteristic of the received power when there is no similar frequency characteristic of the inter-antenna correlation value has been described. However, the method of determining whether or not the currently received interfering signal comes from the same interfering signal source as the previously received interfering signal is not limited thereto. The determination is possible by using only the frequency characteristic of the inter-antenna correlation value, or the order of the determinations may be changed. In addition to performing the determinations in order, the frequency characteristic of the inter-antenna correlation value and the time characteristic of the received power can be used in combination for performing the determination.

In the present example 1, whether or not a desired signal is included in the received signal is determined by using the four determination methods of confirming whether or not there is the transmission prohibition period, whether or not the preamble is detected, whether or not there is error in the PHY header, and confirming whether or not there is error in the MAC header and it is communication the destination of which is the interfering signal suppressing device. Each of these four methods can be used solely, or criteria other than the four criteria can be used in combination.

Using FIGS. 70 to 72, the following will describe mainly operations of the correlation storage determination section 6114 and the correlation storage criterion measurement section 6115 when a desired signal and an interfering signal come.

FIG. 70 is a flow chart in determining whether or not an inter-antenna correlation value is to be stored.

At a step S61301, the correlation storage determination section 6114 determines whether or not a desired signal comes. When it is determined that the desired signal comes, the correlation storage determination section 6114 updates the received power of the desired signal which is stored in the memory 61202 within the correlation storage determination section 6114 at a step S61302. When it is determined that the desired signal does not come at the step S61301, the correlation storage determination section 6114 determines whether or not an interfering signal comes at a step S61303. When it is determined that the interfering signal comes, the correlation storage determination section 6114 determines whether or not the coming interfering signal satisfies a correlation storage condition at a step S61304. When the coming interfering signal satisfies the correlation storage condition, namely, when the received power of the currently received interfering signal is larger than that of the previously received interfering signal, the correlation storage determination section 6114 updates the received power of the interfering signal at a step S61305. If the correlation storage criterion value is the received power of the interfering signal, update of the received power of the interfering signal means update of the correlation storage criterion value. When the coming interfering signal does not satisfy the correlation storage condition, the update is not performed.

If the correlation storage criterion value is the SIR, a new SIR is calculated based on the received power of the currently received interfering signal and the received power of the desired signal, and whether or not the new SIR is smaller than the previous SIR is determined. When the new SIR is smaller than the previous SIR, the currently received interfering signal has a higher probability to affect the reception characteristic of the desired signal. Thus, the previous SIR is updated to the new SIR. When the new SIR is larger than the previous SIR, the SIR is not updated. When the correlation storage criterion value is updated, the memory 6106 stores the inter-antenna correlation value at the step S61305, the processing is terminated. When the interfering signal does not come at the step S61303, or when the coming interfering signal does not satisfy the correlation storage condition at the step S61304, the signal detection is continued. It is noted that when the received powers of the desired signal and the interfering signal are used as the correlation storage criterion factors, namely, when the SIR is used as the correlation storage criterion value, the correlation storage condition can be set with higher accuracy than when only the interfering signal is used as the correlation storage criterion factor.

FIG. 71 is a flow chart showing a specific example when the received power of an interfering signal is used for the correlation storage condition at the step S61304.

At a step S61401, whether or not the received power of the interfering signal is larger than a threshold value (a received power threshold value of the interfering signal), which is set in the communication system, is determined. The threshold value is, for example, the received power of a thermal noise. When it is determined that the received power of the interfering signal is larger than the interference threshold value, the correlation storage determination section 6114 refers to the measurement result of the received power of the previously received interfering signal from the memory 61202 at a step S61402. When it is determined that the received power of the interfering signal is equal to or smaller than the interference threshold value, the correlation storage determination section 6114 returns to the step S61301 in FIG. 70. At a step S61403, the correlation storage determination section 6114 determines there is the measurement result of the received power of the previously received interfering signal in the memory 61202. When it is determined that there is no previous measurement result, the correlation storage determination section 6114 updates (stores) the received power of the interfering signal at a step S61305, and stores the inter-antenna correlation value of the currently received interfering signal in the memory 6106 at a step S61306. When it is determined that there is the previous measurement result at the step S61403, the correlation storage determination section 6114 determines whether or not the received power of the currently received interfering signal is larger than the previous measurement result at a step S61406. When it is determined that the received power of the currently received interfering signal is larger than the previous measurement result, the correlation storage determination section 6114 updates the received power of the interfering signal at a step S61305, and stores the inter-antenna correlation value of the currently received interfering signal in the memory 6106 at a step S61306. On the other hand, when it is determined that the received power of the currently received interfering signal is equal to or smaller than the previous measurement result, the correlation storage determination section 6114 returns to the step S61301 shown in FIG. 70. In this case, the received power and the inter-antenna correlation value of the interfering signal are not updated.

Here, it is preferable that the interfering signal threshold value at the step S61401 be the received power of a thermal noise. Thus, the inter-antenna correlation values of the signals transmitted by the interfering stations can be storage determination objects.

FIG. 72 is a flow chart showing a specific example when the SIR (desired signal received power to interfering signal received power ratio) is used for the correlation storage condition at the step S61304.

At a step S61401, whether or not the received power of the interfering signal is larger than a threshold value (a interfering signal received power threshold value), which is set in the communication system, is determined. When it is determined that the received power of the currently received interfering signal is larger than the threshold value, the correlation storage determination section 6114 refers to measurement results of the received powers of the previously received interfering signals and desired signals from the memory 61202 at a step 61402 S61402. When it is determined that the received power of the currently received interfering signal is equal to or smaller than the threshold value, the correlation storage determination section 6114 returns to the step S61301 in FIG. 70. At a step S61403, whether or not there is the measurement result of the received power of the previously received interfering signal in the memory 61202 is determined. When it is determined that there is no previous measurement result, the correlation storage criterion value is updated at a step S61305. At a step S61306, the inter-antenna correlation value of the currently received interfering signal is stored in the memory 6106. When it is determined that there is the previous measurement result at the step S61403, whether or not there is the measurement result of the received power of the previously received desired signal is determined at a step S61505. When it is determined that there is no measurement result, the correlation storage criterion value is updated at the step S61305. At the step S61306, the inter-antenna correlation value is stored in the memory 6106. When there is the measurement result of the received power of the previously received desired signal at the step S61505, an SIR is calculated at a step S61506. When the calculated SIR is smaller than an SIR threshold value, the correlation storage criterion value is updated at the step S61305. At the step S61306, the inter-antenna correlation value of the currently received interfering signal is stored in the memory 6106. When the calculated SIR is equal to or larger than the SIR threshold value at the step S61506, the correlation storage determination section 6114 returns to the step S61301 in FIG. 70.

It is noted that a received power is measured as an instantaneous value in power detection. However, a power measurement technique in the present invention is not necessarily limited to this measurement method.

For example, concerning the measurement method for the received power, an averaged received power for a constant time period may be measured. In this case, even if the received power of the interfering signal temporarily falls due to rapid change of propagation environment, an effect which the power fall has on the measurement value can be suppressed.

It is noted that an example of the measurement method of the correlation storage criterion value has been described using FIGS. 14 and 15, but it is not necessarily limited to this technique in the present invention.

For example, in comparing the received powers of the currently received interfering signal and the desired signal with the previous received powers, they may be compared with the power which is obtained by averaging a predetermined number of received powers on the past time axis, in addition to the comparison with the last received power. Thus, the received powers of the interfering signal and the desired signal are stably measured without depending on an instantaneous change of propagation environment.

In averaging a predetermined number of received powers on the past time axis, a weighted averaging on the time axis can be used, and the weights of the recently received powers are made large. Thus, the comparison with the received power of the last interfering signal, which has a high probability to come again as an interfering signal, can be emphasized while the averaging of the received powers is achieved.

When wireless terminals are equipped with a GPS and the like and the distance between the wireless terminals is measured, whether or not the characterizing quantity of the interfering signal is to be stored may be determined based on the distance between the wireless terminals, not based on the received power. Thus, the determination of whether or not the characterizing quantity is to be stored can be performed without depending on propagation environment.

It is noted that the storage determination is performed by determining whether or not the calculated SIR concerning the currently received signal is larger than the SIR threshold value at the step S61506, and it is preferable that the SIR threshold value be determined based on demodulation error of the desired signal.

It is noted that there is considered a method in which the inter-antenna correlation value is stored when the calculated SIR concerning the currently received signal is smaller than the SIR threshold value and smaller than the SIR of the previous measurement result, in addition to the magnitude relation with the SIR threshold value. Thus, the inter-antenna correlation value of the interfering signal, which largely affects the reception characteristic, can be stored in the memory.

The SIR threshold value does not necessarily have to be a unique value which is set in a system, and may be changed according to transmission mode information or according to a receiving decoding characteristic. Thus, it is possible to set an SIR threshold value which is more suitable for environment of a radio communication system.

The correlation storage criterion value does not necessarily have to be the signal power and the SIR.

For example, the correlation storage criterion value may be a value based on a channel occupancy ratio such as a time for which an interfering signal uses a radio channel (an occupancy time), and the like. More specifically, it is preferable that an identifier is assigned to an interfering station which transmits the interfering signal, and the characterizing quantity of an interfering signal from the interfering station, which performs signal transmission for a certain period a number of times which is equal to or larger than a threshold value, is preferentially stored as the characterizing quantity of the deterioration factor interfering signal. Thus, the interfering signal, which has a high probability to come so as to overlap with the desired signal, can be determined and suppressed.

There is considered as a method of preferentially storing as the deterioration factor interfering signal the characterizing quantity of the interfering signal from an interfering station, which occupies a time longer than a threshold value within a certain period as the channel occupancy ratio. Thus, the interfering signal, which has a high probability to come so as to overlap with the desired signal, can be determined and suppressed.

The correlation storage criterion value may be set by using a type of data of the interfering signal. For example, an interfering signal conveying data with a short waiting time, an interfering signal conveying data which has a high transmission priority and is to be transmitted many times, and an interfering signal transmitted from the radio station which is provided with a function to use preferentially a radio channel are considered to have a high probability to interfere with a desired signal. Thus, a criterion for storing the correlation values of these interfering signals is loosened, thereby improving the reception characteristic.

The correlation storage criterion value may be set subject to communication environment of a radio system. In the case of severe change of propagation environment due to movement of a terminal, the reliability of the previous SIR and the previous received power value becomes low. Thus, in the case of the severe change of propagation environment, the correlation storage criterion is loosened, and the measurement results of the recent correlation storage criterion values are stored in the memory, thereby improving the reception characteristic of the desired signal.

At the step S61306, the inter-antenna correlation value is stored in the memory 6106. Some methods are considered as the storage method. In the case where a number of inter-antenna correlation values which can be stored is 1, when it is determined that the inter-antenna correlation value is to be stored as the result of the correlation storage determination, the content in the memory 6106 is updated sequentially.

In the case where there are a plurality of the memories 6106, or in the case where the one memory 6106 can store a plurality of inter-antenna correlation values, more inter-antenna correlation values can be stored. Here, when a region for storing the inter-antenna correlation value is unoccupied in the memory 6106, the inter-antenna correlation value can be stored in the unoccupied part of the memory region. When the region for storing the inter-antenna correlation value is occupied in the memory 6106, any of the stored inter-antenna correlation values needs to be deleted. At this time, as a preferable memory deletion method, there is a method to delete the oldest stored result. Thus, the latest inter-antenna correlation value can be always stored.

It is noted that the memory deletion method is not limited thereto. For example, a method to delete the result having the lowest priority is considered. As an example of the priority, the result having a large received power or a large SIR has a high priority. Thus, the inter-antenna correlation value of the interfering signal, which largely affects deterioration of the reception characteristic of the desired signal, can be stored.

The following will describe in detail an example of an operation of a transmitter/receiver system shown in FIG. 61.

Communication between the transmitting station 6401 and the receiving station 6402 is referred to as self communication. Communication between the radio station 6403 and the radio station 6404, which are interfering stations for the self communication, is referred to as other communication. The other communication is performed over a channel adjacent to that of the self communication. FIG. 73 shows frequency bands of the self communication and the other communication. The self communication uses a frequency band 6801, and the other communication uses a frequency band 6802 adjacent to the frequency band of the self communication. A part of the power for the other communication leaks to the frequency band of the self communication.

Here, the self communication and the other communication uses the same access protocol. This protocol defines that a predetermined interval is put between frames for giving a transmission priority. For example, in the CSMA/CA of the IEEE802.11, SIFS (Short Inter Frame Space), PIFS (Point Coordination IFS), DIFS (Distributed Coordination IFS), and the like are defined in ascending order of frame interval. The SIFS having the highest transmission priority is used for transmitting an acknowledge (ACK) packet. A period between frames is a transmission prohibition period. Another transmission prohibition period includes a period for which a NAV (Network Allocation Vector) which gives transmission right to only a specific radio station is set, and the like.

FIG. 74 shows an example of the received power for the other communication which is received by a receiving station 6402 shown in FIG. 61. T1 to T13 each indicate a time. Between T1 and T2, the radio signal 6406 is transmitted from the radio station 6403 toward the radio station 6404. The radio station 6404 receives and demodulates the radio signal 6406. When the demodulation is performed normally, the radio station 6404 transmits an acknowledge packet. The radio station 6404 transmits a radio signal 6407 as the acknowledge packet toward the radio station 6404 between the time T3 and the time T4 after a frame interval (from T2 to T3) defined by the protocol. At this time, due to distances between the radio station 6403 and the radio station 6404 and the receiving station 6402 and relations of locations thereof, the received power of the radio signal 6406 is different from that of the radio signal 6407.

Here, an example of operations of the power detection section 6109 and the timing detection section 6110 will be described. When the power detection section 6109 detects a received power which is equal to or larger than a predetermined value, the timing detection section 6110 detects its duration and a time period (a frame interval) for which no received power is detected. In the case of FIG. 74, a period between T1 and T2 and a period between T3 and T4 are detected as duration, and a period between T2 and T3 is detected as a frame interval. At this time, when the received power value between T1 and T2 is different from that between T3 and T4 and the period between T2 and T3 is the interval defined by the protocol, it can be determined that the received signal between T1 and T2 and the received signal between T3 and T4 are transmitted alternately by two different radio stations. Also, when the time period from T3 to T4 is equal to the length of a control packet defined by the protocol, such as the ACK packet of the IEEE802.11, it can be more reliably determined that two radio stations alternately performs transmission.

As described above, in the case of the configuration in which a time occupancy ratio and a coming interval of the interfering signal are measured, if the measured interval is the known protocol, accuracy of identifying the radio station which transmits an interfering signal can be improved.

The following will describe an example of operations of the sub-band division sections 6103 and 6104 and the inter-antenna correlation value detection section 6105.

Each of the received signals is divided into a plurality of sub-bands by the sub-band division section 6103 or 6104. The inter-antenna correlation value detection section 6105 detects an inter-antenna correlation value for each sub-band of the received signals. Here, the sub-band division sections 6103 and 6104 uses FFT, the self communication is performed by using OFDM signals. In the following description, each sub-band indicates a frequency bin of the FFT. The inter-antenna correlation value is obtained between a plurality of antenna inputs for each sub-band. For example, an antenna number is denoted by n (n is a natural number between 1 and N), a sub-band number is denoted by m (m is a natural number between 1 and M), and a reception sub-band signal is denoted by $r_m$ (n). An inter-antenna correlation value $R_m$ for the sub-band m may be represented as:

$$R_m=[r_m(1)\ldots r_m(n)]^H[r_m(1)\ldots r_m(n)]. \quad \text{(equation 6-1)}$$

Here, $^H$ denotes a complex conjugate transposition. R denotes a received power for each sub-band in the case of one antenna. In the case of a plurality of antennas, R is a matrix indicating a received power for each antenna as a diagonal component, and correlation between the antennas as another component.

Figure 75:
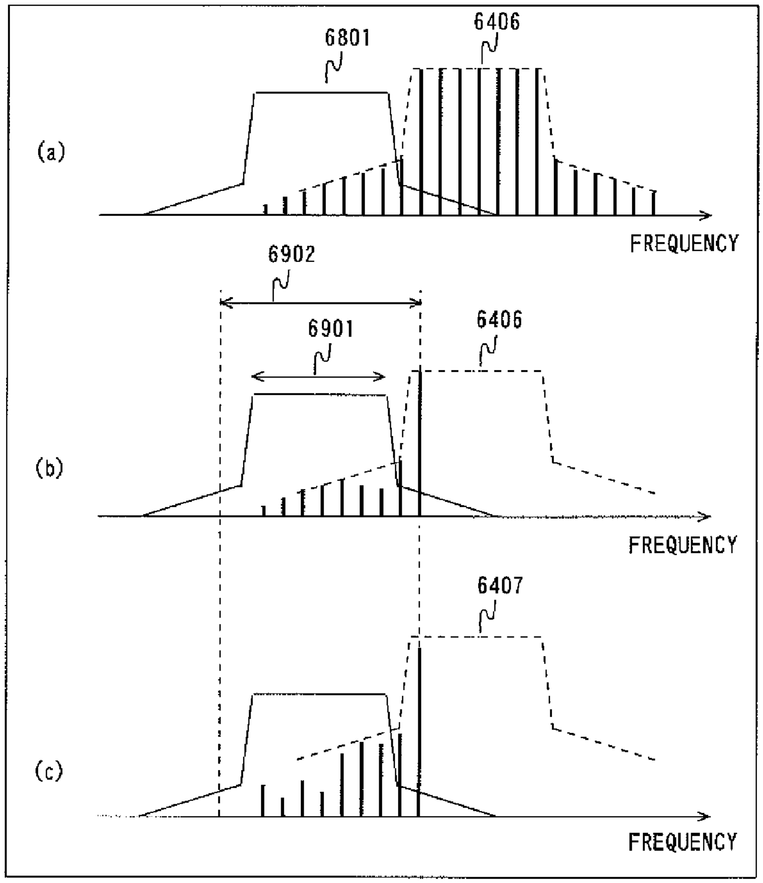
FIG. 75 illustrates an example in which a characterizing quantity for the other communication which is received by the receiving station is shown on a frequency axis in the example 1 of the sixth embodiment.

FIG. 75 illustrates an example in which a characterizing quantity for the other communication which is received by the receiving station 6402 is shown on a frequency axis. FIG. 75 (a) shows a radio signal 6801 for the self communication. The vertical lines within the radio signal 6406 each indicate a characterizing quantity for each sub-band. The characterizing quantity includes, for example, a power, a phase, and an inter-antenna correlation value.

FIG. 75 (b) illustrates an example of a state where the radio signal 6406 is divided into a plurality of sub-bands by FFT of the receiving station 6402. A frequency band 6902 in which FFT is performed, and a frequency band 6901 of the self communication are shown. In the receiving station 6402, only a part within the frequency band of the self communication is taken out by a filter, processed by FFT. Thus, the characterizing quantity of the radio signal 6406 is shown at each sub-band within the frequency band 6902.

Similarly, FIG. 75 (c) illustrates an example when the radio signal 6407 is divided into a plurality of sub-bands by FFT of the receiving station 6402. Within the frequency band 6902, the frequency characteristic of the characterizing quantity of the radio signal 6406 is different from that of the radio signal 6407 due to differences in a received power, a transmission path, and a coming direction.

As described above, in the case of a configuration in which the frequency characteristic of the inter-antenna correlation value is measured also in a region outside the desired signal band, concerning interference of a leakage signal from an adjacent channel frequency band, its interfering signal source can be identified.

The following will describe an example of an operation of the receiving station 6402 when receiving a received power shown in FIG. 74.

The receiving station 402 starts to observe an interfering signal at a time T0. Between T0 and T4, the transmission prohibition period is not set in a self communication area, but the self communication is not performed.

As shown in FIG. 74, a certain received power is detected at the time T1. Since the transmission prohibition period is not set in the self communication area between T1 and T4, whether or not a preamble for the self communication is detected is determined. Here, since the radio signal 6406 is a signal for the other communication, the preamble for the self communication is not detected. Thus, the receiving station 6402 determines that the received signal, which lasts between T1 and T2, is an interfering signal.

Between T1 and T2, the characterizing quantity (hereinafter, referred to as interference frequency characteristic according to need) of the received signal 6801 within the frequency band 6902 is obtained as shown in FIG. 75 (b). Next, whether or not the interference frequency characteristic is to be stored is determined. When it is determined that it is to be stored, an operation of storing the interference frequency characteristic is started. First, whether or not among the previously stored interference frequency characteristics there is an interference frequency characteristic which is similar to that of the currently received interfering signal is determined. The similarity determination can be performed, for example, by obtaining a difference between characterizing quantities for each sub-band, obtaining a sum or an average of all the differences within the frequency band 6902, and determining that a characterizing quantity having the smallest difference is similar to that of the currently received interfering signal. Alternatively, the similarity determination may be performed by obtaining a difference between adjacent subbands similarly as the above, and selecting a characterizing quantity having the smallest difference. Alternatively, the similarity determination may be performed by obtaining a linear or curved line approximated to the interference frequency characteristic, and selecting an interference frequency characteristic having the most fitting its approximated linear or curved line. Still alternatively, a plurality of these similarity determination methods may be used in combination.

When the interference frequency characteristic similar to that in FIG. 75 (b) is not stored at a point between T1 and T2, it is determined that the interference frequency characteristic is of a new different interfering signal. Next, whether or not the interference frequency characteristic is to be stored is determined. When it is determined that it is to be stored, a unique identifier is assigned to the interference frequency characteristic, and the interference frequency characteristic is stored. Here, for example, the interference frequency characteristic is referred to as an interference frequency characteristic 1.

When the interference frequency characteristic is measured a plurality of times between T1 and T2, it is determined that the received signal is the same interfering signal since the same power is continued. Next, whether or not the interference frequency characteristic is to be stored is determined. When it is determined that it is to be stored, whether or not among the previously stored interference frequency characteristics there is an interference frequency characteristic which is similar to this interference frequency characteristic is determined. When there is the similar interference frequency characteristic, the similar interference frequency characteristic is updated to the new interference frequency characteristic, which is determined to be to be stored. By averaging the new interference frequency characteristic and the stored interference frequency characteristic, accuracy of estimating a characterizing quantity can be further improved.

Between T3 and T4, the interference frequency characteristic is obtained as shown in FIG. 75 (c). Next, whether or not the interference frequency characteristic is to be stored is determined. When it is determined that it is to be stored, the interference frequency characteristic is compared with the previously stored interference frequency characteristic 1 to determine a similarity therebetween. When it is determined that the similarity between the interference frequency characteristic of the currently received interfering signal and the interference frequency characteristic 1 is low, the interference frequency characteristic of the currently received interfering signal is stored as an interference frequency characteristic 2.

When whether or not it is similar cannot be determined by the comparison of the interference frequency characteristic, it is determined by using a time characteristic. The interfering signal represented by the interference frequency characteristic 1 ends at the time T2, a different power is detected at T3 after a frame interval (between T2 and T3). Therefore, it can be determined that the signal between T3 and T4 is transmitted from a radio station different from that which transmits the interfering signal of the interference frequency characteristic 1. When the power detected at T3 is the same as that at T2, it can be determined that the signal between T3 and T4 and the interfering signal of the interference frequency characteristic 1 are transmitted from the same radio station.

Similarly as in the case between T1 and T2, when the interference frequency characteristic can be measured a plurality of times between T3 and T4, between which a power is continued, the interference frequency characteristic 2 is updated.

During a period for which the self communication is not performed, namely, during a transmission prohibition period in the self communication area or during a period for which the preamble for the self communication is not detected, the above operations are repeated. In other words, whether or not the interference frequency characteristic is to be stored is determined while the interfering signal is identified. When it is determined that it is to be stored, the interference frequency characteristic is stored.

The following will describe an operation when a desired signal overlapped with interfering signals are received.

Figure 76:
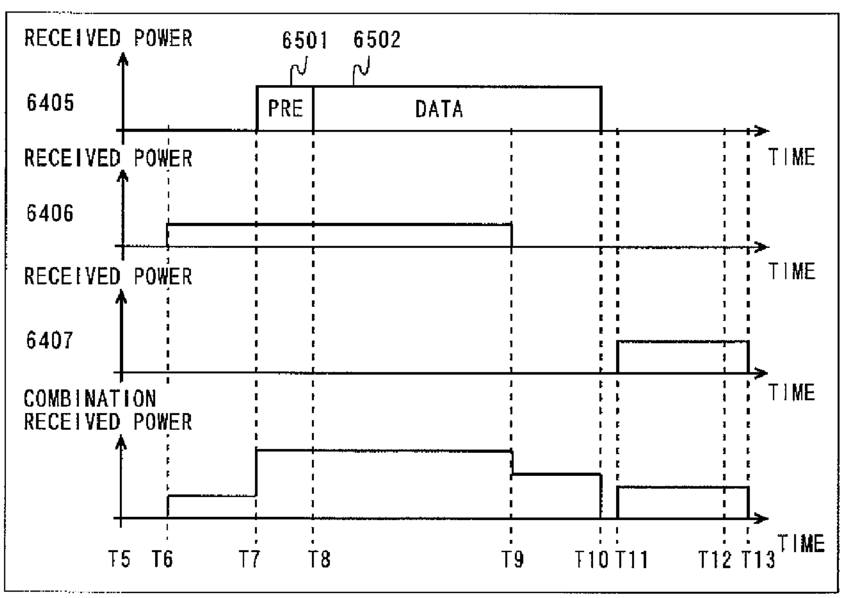
FIG. 76 is a time sequence diagram which shows a state where signals come and end in the case where a desired signal and an interfering signal come during the substantially same period in the example 1 of the sixth embodiment.
Figure 79:
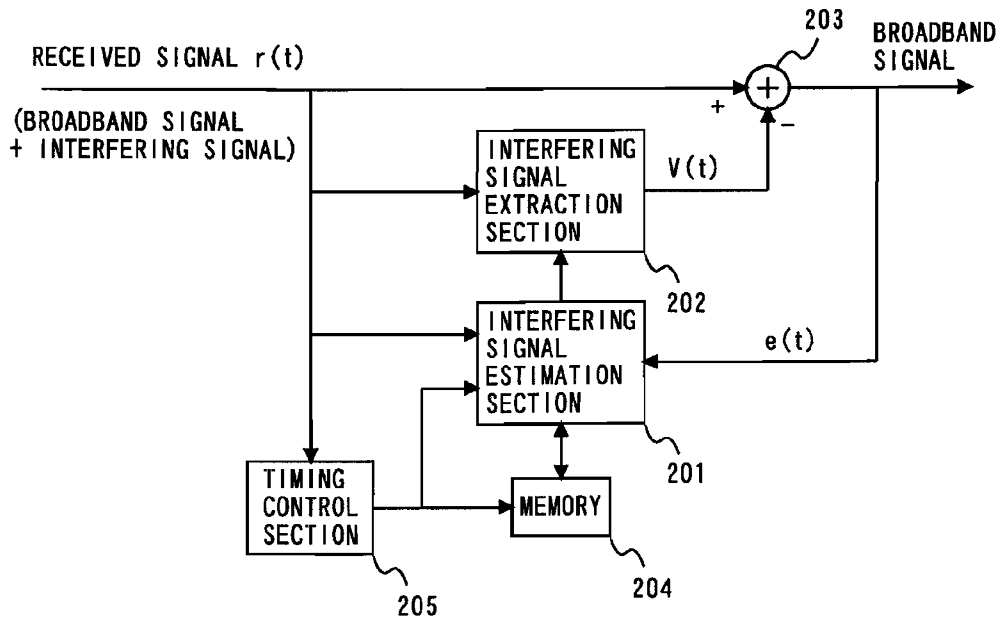
FIG. 79 illustrates a configuration of an interfering signal eliminator in the Patent Document 1.
Figure 80:
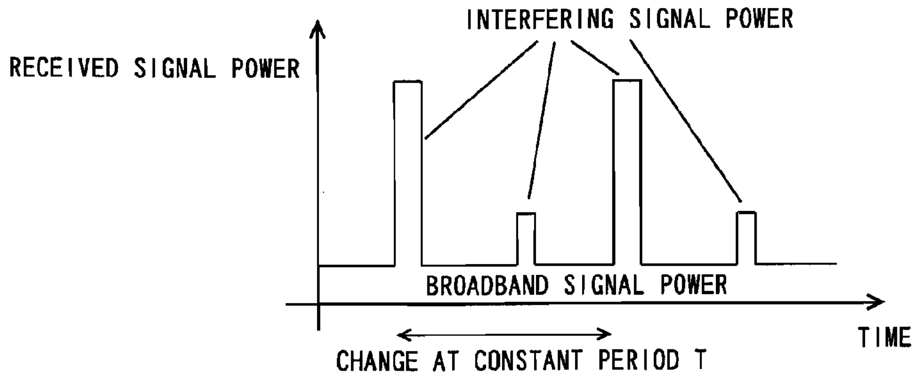
FIG. 80 shows interfering signals, as objects to be suppressed by the interfering signal eliminator in the Patent Document 1, which have constant packet lengths and come at a constant interval.

FIG. 76 is a time sequence diagram which shows a state where signals come and end in the case where a desired signal and an interfering signal come during the substantially same period. The radio signal 6406, which is an interfering signal, is detected between T6 and T9, and the radio signal 6407, which is another interfering signal, is detected between T11 and T13. On the other hand, the radio signal 6405, which is a desired signal for the self communication, is detected between T7 and T10. The bottom figure in FIG. 76 shows received powers detected by the receiving station 6402.

The receiving station 6402 already measures and stores the interference frequency characteristics 1 and 2 between T0 and T4. Between T6 and T7, the same measurement as the above is performed, and the interference frequency characteristic 1 is updated.

From T7, a change of the received power is detected, and preamble detection is performed. The desired signal 6405 includes a unique preamble 6501. Thus, the preamble is detected at a time T8.

When detecting the preamble unique to the desired signal 6405, the receiving station 6402 determines that there is a high probability that the desired signal is included in the currently received signal.

The receiving station 6402 compares parts of the stored interference frequency characteristics and a part of the interference frequency characteristic of the currently received signal outside the frequency band of the desired signal 6405. According to this comparison, the receiving station 6402 identifies the currently received interfering signal which partially overlaps with the desired signal. The interference frequency characteristic of the currently received signal is measured in a zone of the frequency band 6902 in which the sub-band division is performed. There is a probability that a desired signal exists in the frequency band 6901 of the desired signal within the frequency band 6902, and there is a probability that the characterizing quantity of the interfering signal and the characterizing quantity of the desired signal are combined. Thus, the frequency band 6901 of the desired signal is excluded from an object to be compared. The receiving station 6402 determines similarities between parts of the interference frequency characteristics 1 and 2, and a part of the interference frequency characteristic 6802 of the currently received signal outside the desired signal frequency band 6901.

It is noted that when there is a sub-band, within the frequency band of the desired signal, which is not used for the self communication, the sub-band can be used for the similarity determination. For example, in the preamble symbol between T7 and T8, there are carriers only in a small number of certain sub-bands, and null-carries are used in the rest of sub-bands. FIG. 77 illustrates an example of an interference frequency characteristic in a preamble symbol. In this example, the preamble symbol includes carriers, which carry preamble information thereon, only in sub-bands 61001, 61002, and 61C03 within the frequency band 6901 of the desired signal, and null-carries in the rest of sub-bands. In this case, a part of the interference frequency characteristic of the interfering signal 6406 appears in the sub-bands of the null-carriers.

In the case where it is determined by the comparison of the interference frequency characteristic outside the desired signal band that there is no interference frequency characteristic, which is similar to the interference frequency characteristic of the currently received signal, among the stored interference frequency characteristics, a similarity concerning the received power is determined.

When the characterizing quantity of the interfering signal can be identified, the interfering signal overlapped with the desired signal can be suppressed. Thus, accuracy of demodulation of the desired signal can be improved. For example, a technique (refer to International Publication WO No. 2006/003776) which is applied previously by the present applicant can be used for interfering signal suppression.

Although the preamble unique to the desired signal is detected, when the characterizing quantity of the interfering signal cannot be identified at the time, the currently received signal is once demodulated as the desired signal, and the interfering signal is identified by using the demodulation result as described later.

The data symbol sequence 6502 is demodulated sequentially. The header of the data symbol 6502 includes a PHY (Physical Layer) header 6503. The receiving station 6402 detects the PHY header, and when confirming that it is unique to the desired signal, continues to perform demodulation according to a modulation parameter described in the PHY header. A modulation technique and a data length of the data symbol, and the like are described in the modulation parameter.

The header of the modulation data includes a MAC (Media Access Control) header 6504. The MAC header includes a parameter which is used by a MAC layer for control. The parameter includes a source address, a destination address, a frame type, and the like. The receiving station 6402 detects the MAC header. The receiving station 6402 determines whether or not the destination address is its own address. When the destination address is its own address, it is determined that the received signal is the desired signal. The receiving station 6402 does not store the interference frequency characteristic of the desired signal. It is noted that the measured correlation storage criterion value is stored. The characterizing quantity of the desired signal outside the frequency band may be newly stored, or may be updated.

When the reception of the radio signal 6406 ends at T9, the received power rapidly falls. The receiving station 6402 can determine that the coming interfering signal ends by detecting the rapid fall of the received power. Or, when the received power rapidly rises, the receiving station 6402 can determine that a new interfering signal comes and overlaps with the desired signal. When there is no error in the PHY header of the desired signal, the length of the desired signal can be known. Thus, the rapid change of the received power between T9 and T10 can be used for determining whether or not the interfering signal overlaps with the desired signal. A period from a time when the coming interfering signal ends to a time when a new interfering signal comes can be detected as a frame interval of the other communication.

The reception of the desired signal 405 ends at T10.

A new received power is detected at T11. A period from T10 to T12 is a frame interval defined by the protocol for the self communication, and the transmission prohibition period. Thus, the receiving station 6402 can determine that the received power detected during this period is the power of the interfering signal. The receiving station 6402 determines whether or not the interference frequency characteristic of the newly coming interfering signal is to be stored. When determining that it is to be stored, the receiving station 6402 stores the interference frequency characteristic.

The interfering signals which come from the different radio stations at random timings can be identified by repeating the above operation during reception.

It is noted that although the similarity determination of the stored interference frequency characteristics and the interference frequency characteristic of the currently received interfering signal is performed after the determination of whether or not the interference frequency characteristic is to be stored (namely, the determination of whether or not the interference frequency characteristic satisfies the storage criterion) is performed in the above description, these determinations do not necessarily have to be performed in this order. For example, the similarity determination is performed first. As the result, when it is determined that the interfering signal coming from the same interfering signal source as the previously received interfering signal is being received, even though the interfering signal does not satisfy the storage criterion, this interference frequency characteristic may be updated. Thus, for example, a problem can be solved, that in the case where the received power of the interference frequency characteristic of an interfering signal which is measured at a past point is extremely large due to change of radio wave environment, the interference frequency characteristic of an interfering signal from a station cannot be updated to the interference frequency characteristic of another interfering signal transmitted from the same station.

It is noted although the method in which interfering signal suppression section 6112 performs interfering signal suppression by using the inter-antenna correlation value has been described above, the interfering signal can be suppressed by a method different from that by using the inter-antenna correlation value in the example 1. For example, an interfering signal suppression technique by adaptive array can be used.

The configuration of the present embodiment is not limited to the configuration as described above, and various configurations may be used. The application field of the present invention is not limited to the field as described above, and the present invention is applicable to various fields. As an example, the case in which the present invention is applied to a wireless LAN system by a CSMA using a multicarrier modulation method has been described in the present example, but the present invention may be applied to a radio system using single carrier modulation, or a radio system using various access methods such as TDMA, FDMA, CDMA, SDMA, and the like.

It is noted that each of function blocks of the sub-band division section, the inter-antenna correlation value detection section, the memory, the comparison section, the preamble detection section, the power detection section, the timing detection section, the determination section, the interfering signal suppression section, the demodulation section, the correlation storage determination section, the correlation storage criterion measurement section, and the like is typically achieved as an LSI which is an integrated circuit. They may be individually made into one chip, or a part or all of them may be made into one chip.

Although the LSI is described here, the integrated circuit is referred to as an IC, a system LSI, a super LSI, an ultra LSI depending on difference in integration degrees.

A technique of integrated circuit implementation is not limited to the LSI, but may be achieved by a dedicated circuit or a universal processor. An FPGA (Field Programmable Gate Array) which is programmable after production of an LSI and a reconfigurable processor in which the connection and the setting of a circuit cell inside the LSI are reconfigurable may be used. A configuration in which the processor is controlled by executing a control program stored in a ROM in a hardware resource equipped with a processor, a memory, and the like may be used.

Further, if a technique of integrated circuit implementation which replaces the LSI by advancement of semiconductor technique and another technique derived therefrom is developed, naturally, the function blocks may be integrated by using the technique. Adaptation of a bio technique could be possible.

INDUSTRIAL APPLICABILITY

An interfering signal measurement method and measurement device according to the present invention can identify interfering signals coming at random timings from different radio stations, and thus are useful to be used, especially, in a radio system of a random access method such as CSMA, and the like.

The invention claimed is:

1. An interfering signal characterizing quantity acquiring method for acquiring a characterizing quantity of an interfering signal included in a received signal, said method comprising:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

an interfering signal characterizing quantity storage step of storing the characterizing quantity of the received signal as an interfering signal characterizing quantity when it is determined at the received signal determination step that there is no probability that the desired signal is included in the received signal;

a similarity calculation step of calculating a similarity between the characterizing quantity of the received signal and the interfering signal characterizing quantity stored at the interfering signal characterizing quantity storage step when it is determined at the received signal determination step that there is the probability that the desired signal is included in the received signal; and an interfering signal characterizing quantity selection step of selecting an interfering signal characterizing quantity having a highest similarity from a plurality of stored interfering signal characterizing quantities when there are interfering signal characterizing quantities having similarities, which are equal to or higher than a predetermined value, among the stored interfering signal characterizing quantities.

2. The interfering signal characterizing quantity acquiring method according to claim 1, wherein the characterizing quantity is a correlation value between signals which are concurrently received by a plurality of antennas.

3. The interfering signal characterizing quantity acquiring method according to claim 1, further comprising a step of dividing the received signal into a plurality of sub-bands, wherein at the characterizing quantity calculation step, the characterizing quantity of the received signal is calculated for each sub-band.

4. The interfering signal characterizing quantity acquiring method according to claim 1, further comprising:

a first time interval measurement step of measuring a time interval from an end of the interfering signal to a time when another interfering signal comes;

a characterizing quantity association storage step of storing the characterizing quantity of the interfering signal and a characterizing quantity of the another interfering signal so as to be associated with each other for each first interfering station, which transmits the interfering signal, when the time interval is a predetermined interval;

a second time interval measurement step of measuring a time interval from the end of the interfering signal to the time when the another interfering signal comes when the desired signal comes during a time period when the characterizing quantity of the interfering signal is measured and the interfering signal ends during a time period when the desired signal comes;

a time interval determination step of determining whether or not the time interval measured at the second time interval measurement step corresponds to the predetermined interval; and a characterizing quantity selection step of collating the characterizing quantity of the interfering signal, which has been coming at a time when the desired signal comes, which characterizing quantity is measured before the desired signal comes, with information stored at the interfering signal characterizing quantity storage step when determination of a correspondence is made at the time interval determination step, and selecting a characterizing quantity of the another interfering signal, which corresponds to the characterizing quantity of the interfering signal, from a plurality of stored characterizing quantities of the another interfering signal.

5. The interfering signal characterizing quantity acquiring method according to claim 1, further comprising:

a first combined signal characterizing quantity measurement step of measuring a characterizing quantity of a combined signal of the interfering signal and the desired signal when it is detected that the desired signal comes during a time period when the characterizing quantity of the interfering signal is measured;

a characterizing quantity association storage step of storing the interfering signal characterizing quantity and the combined signal characterizing quantity so as to be associated with each other for each interfering station;

a second combined signal characterizing quantity measurement step of measuring a characterizing quantity of the combined signal of the desired signal and the interfering signal when it is detected that the interfering signal comes during a time period when the desired signal comes; and an interfering signal characterizing quantity selection step of collating a value measured at the second combined signal characterizing quantity measurement step with information stored at the characterizing quantity association storage step, and selecting a characterizing quantity of an interfering signal of a corresponding interfering station from stored interfering signal characterizing quantities of a plurality of interfering stations.

6. The interfering signal characterizing quantity acquiring method according to claim 3, wherein the similarity is a similarity which is calculated for a sub-band, among the plurality of sub-bands, which is outside of a frequency band of the desired signal.

7. The interfering signal characterizing quantity acquiring method according to claim 2, further comprising a phase component extraction step of extracting a phase component from the correlation value, wherein at the similarity calculation step, a similarity concerning the phase component is calculated.

8. The interfering signal characterizing quantity acquiring method according to claim 2, further comprising a complex region determination step of determining in which region on a complex plane, which is divided into N regions, N being an integer number which is equal to or greater than 2, the correlation value, which is a complex number, exists, wherein at the similarity calculation step, a similarity concerning a result of the region determination is calculated.

9. The interfering signal characterizing quantity acquiring method according to claim 4, wherein the characterizing quantity association storage step includes a characterizing quantity comparison step of comparing the characterizing quantity of the interfering signal with the characterizing quantity of the another interfering signal, the characterizing quantity comparison step includes a storage pattern in which when determining, based on a result of the comparison, that the characterizing quantity of the interfering signal and the characterizing quantity of the another interfering signal do not satisfy a predetermined condition concerning sameness, the first interfering station which transmits the interfering signal is considered to be different from a second interfering station which transmits the another interfering signal, and the characterizing quantity of the interfering signal and the characterizing quantity of the another interfering signal are stored so as to be associated with each other for each first interfering station, and the characterizing quantity comparison step includes a storage pattern in which when determining, based on the result of the comparison, that the characterizing quantity of the interfering signal and the characterizing quantity of the another interfering signal satisfy the predetermined condition concerning sameness, the first interfering station which transmits the interfering signal is considered to be the same as the second interfering station which transmits the another interfering signal, the characterizing quantity of the interfering signal and the characterizing quantity of the another interfering signal are stored so as to be associated with each other for each first interfering station.

10. An interfering signal suppressing method for suppressing an interfering signal included in a received signal, said method comprising:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

an interfering signal characterizing quantity storage step of storing the characterizing quantity of the received signal as an interfering signal characterizing quantity when it is determined at the received signal determination step that there is no probability that the desired signal is included in the received signal;

a similarity calculation step of calculating a similarity between the characterizing quantity of the received signal and the interfering signal characterizing quantity stored at the interfering signal characterizing quantity storage step when it is determined at the received signal determination step that there is the probability that the desired signal is included in the received signal;

an interfering signal characterizing quantity selection step of selecting an interfering signal characterizing quantity having a highest similarity from a plurality of stored interfering signal characterizing quantities when there are interfering signal characterizing quantities having similarities, which are equal to or higher than a predetermined value, among the stored interfering signal characterizing quantities; and an interfering signal suppression step of suppressing the interfering signal by using the selected interfering signal characterizing quantity.

11. The interfering signal suppressing method according to claim 10, further comprising:

a transmission path estimation step of performing transmission path estimation of the desired signal for each of a plurality of sub-bands; and a weighting coefficients calculation step of calculating weighting coefficients from the selected interfering signal characterizing quantity and a transmission path estimation value of the desired signal, wherein at the interfering signal suppression step, the interfering signal is suppressed by weighted combining a plurality of received signals with the weighting coefficients.

12. An interfering signal characterizing quantity acquiring device for acquiring a characterizing quantity of an interfering signal included in a received signal, said device comprising:

a characterizing quantity calculation section for calculating a characterizing quantity of the received signal;

a received signal determination section for determining a probability that a desired signal is included in the received signal, and determining that the received signal is an interfering signal when determining that there is no probability that the desired signal is included in the received signal;

an interfering signal characterizing quantity storage section for storing the characterizing quantity of the received signal as an interfering signal characterizing quantity when the received signal determination section determines that there is no probability that the desired signal is included in the received signal;

a similarity calculation section for calculating a similarity between the characterizing quantity of the received signal and the interfering signal characterizing quantity stored by the interfering signal characterizing quantity storage section when the received signal determination section determines that there is the probability that the desired signal is included in the received signal; and an interfering signal characterizing quantity selection section for selecting an interfering signal characterizing quantity having a highest similarity from a plurality of the stored interfering signal characterizing quantities when there are interfering signal characterizing quantities having similarities, which are equal to or higher than a predetermined value, among the stored interfering signal characterizing quantities.

13. An interfering signal suppressing device for suppressing an interfering signal included in the received signal, said device comprising:

a characterizing quantity calculation section for calculating a characterizing quantity of the received signal;

a received signal determination section for determining a probability that a desired signal is included in the received signal, and determining that the received signal is an interfering signal when determining that there is no probability that the desired signal is included in the received signal;

an interfering signal characterizing quantity storage section for storing the characterizing quantity of the received signal as an interfering signal characterizing quantity when the received signal determination section determines that there is no probability that the desired signal is included in the received signal;

a similarity calculation section for calculating a similarity between the characterizing quantity of the received signal and the interfering signal characterizing quantity stored by the interfering signal characterizing quantity storage section when the received signal determination section determines that there is the probability that the desired signal is included in the received signal;

an interfering signal characterizing quantity selection section for selecting an interfering signal characterizing quantity having a highest similarity from a plurality of stored interfering signal characterizing quantities when there are interfering signal characterizing quantities having similarities, which are equal to or higher than a predetermined value, among the stored interfering signal characterizing quantities; and an interfering signal suppression section for suppressing the interfering signal by using the selected interfering signal characterizing quantity.

14. An interfering signal characterizing quantity storing method for storing a characterizing quantity of an interfering signal included in a received signal, said method comprising:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

a criterion value setting step of setting a criterion value which is a criterion for determining whether or not the interfering signal becomes a deterioration factor for a reception characteristic of the desired signal;

a comparison object value calculation step of calculating a comparison object value concerning the interfering signal, which is a comparison object for the criterion value, when it is detected that the interfering signal comes;

a significant interfering signal determination step of determining whether or not the interfering signal is an interfering signal which becomes the deterioration factor for the reception characteristic of the desired signal based on the criterion value and the comparison object value when it is detected that the interfering signal comes; and an interfering signal characterizing quantity storage step of storing the characterizing quantity of the received signal as an interfering signal characterizing quantity when it is determined at the significant interfering signal determination step that the interfering signal is the interfering signal which becomes the deterioration factor for the reception characteristic of the desired signal, wherein an initial value of the criterion value is a received power value of a thermal noise which is a type of the interfering signal, and the criterion value is updatable.

15. An interfering signal characterizing quantity storing method for storing a characterizing quantity of an interfering signal included in a received signal, said method comprising:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

a criterion value setting step of setting a criterion value which is a criterion for determining whether or not the interfering signal becomes a deterioration factor for a reception characteristic of the desired signal;

a comparison object value calculation step of calculating a comparison object value concerning the interfering signal, which is a comparison object for the criterion value, when it is detected that the interfering signal comes;

a significant interfering signal determination step of determining whether or not the interfering signal is an interfering signal which becomes the deterioration factor for the reception characteristic of the desired signal based on the criterion value and the comparison object value when it is detected that the interfering signal comes; and an interfering signal characterizing quantity storage step of storing the characterizing quantity of the received signal as an interfering signal characterizing quantity when it is determined at the significant interfering signal determination step that the interfering signal is the interfering signal which becomes the deterioration factor for the reception characteristic of the desired signal, wherein the criterion value is a received power of the interfering signal which is previously received, the comparison object value is a received power of the interfering signal which is currently received, and at the significant interfering signal determination step, it is determined that the interfering signal which is currently received becomes the deterioration factor for the reception characteristic of the desired signal when the comparison object value is larger than the criterion value.

16. An interfering signal characterizing quantity storing method for storing a characterizing quantity of an interfering signal included in a received signal, said method comprising:

a characterizing quantity calculation step of calculating a characterizing quantity of the received signal;

a received signal determination step of determining a probability that a desired signal is included in the received signal, and determining that the received signal is an interfering signal when determining that there is no probability that the desired signal is included in the received signal;

a criterion value setting step of setting a criterion value which is a criterion for determining whether or not the interfering signal becomes a deterioration factor for a reception characteristic of the desired signal;

a comparison object value calculation step of calculating a comparison object value concerning the interfering signal, which is a comparison object for the criterion value, when it is detected that the interfering signal comes;

a significant interfering signal determination step of determining whether or not the interfering signal is an interfering signal which becomes the deterioration factor for the reception characteristic of the desired signal based on the criterion value and the comparison object value when it is detected that the interfering signal comes; and an interfering signal characterizing quantity storage step of storing the characterizing quantity of the received signal as an interfering signal characterizing quantity when it is determined at the significant interfering signal determination step that the interfering signal is the interfering signal which becomes the deterioration factor for the reception characteristic of the desired signal, wherein the criterion value is a ratio (SIR) of a received power of the desired signal which is previously received to a received power of the interfering signal which is previously received, or a ratio (SIR) of a received power of the desired signal which is currently received to the received power of the interfering signal which is previously received, the comparison object value is a ratio (SIR) of the received power of the desired signal which is previously received to a received power of the interfering signal which is currently received, or a ratio (SIR) of the received power of the desired signal which is currently received to the received power of the interfering signal which is currently received, and at the significant interfering signal determination step, it is determined that the interfering signal which is currently received becomes the deterioration factor for the reception characteristic of the desired signal when the comparison object value is larger than the criterion value.

* * * * *